United States Patent [19]
Pechanek et al.

[11] Patent Number: 5,329,611
[45] Date of Patent: Jul. 12, 1994

[54] SCALABLE FLOW VIRTUAL LEARNING NEUROCOMPUTER

[75] Inventors: Gerald G. Pechanek, Endwell; Stamatis Vassiliadis; Jose G. Delgado-Frias, both of Vestal, all of N.Y.

[73] Assignee: International Business Machines Corp., Armonk, N.Y.

[21] Appl. No.: 80,989

[22] Filed: Jun. 21, 1993

Related U.S. Application Data

[63] Continuation of Ser. No. 702,262, May 17, 1991, abandoned, which is a continuation-in-part of Ser. No. 526,866, May 22, 1990, Pat. No. 5,065,339, Ser. No. 682,786, Apr. 9, 1991, and Ser. No. 681,842, Apr. 8, 1991.

[51] Int. Cl.[5] ............................................. G06F 15/00
[52] U.S. Cl. ........................................ 395/27; 395/11; 395/800
[58] Field of Search ..................... 395/27, 11, 800

[56] References Cited
U.S. PATENT DOCUMENTS
4,796,199 1/1989 Hammerstrom et al. ........... 364/513

OTHER PUBLICATIONS

"Parallel Distributed Processing" Rumelhart et al., vol. 1 MIT Press 1986, Foundations Cambridge, Mass.
"Neurons with Graded Response Have Collective..." Hopefield Proceedings of the Nat'l Acad. of Sci. 81, pp. 3088-3092, May 1984, Digital Computer System Principles, H. Hellerman, McGraw-Hill Book Company, pp. 346-348.

Primary Examiner—Allen R. MacDonald
Attorney, Agent, or Firm—Eugene I. Shkurko; Lynn L. Augspurger

[57] ABSTRACT

A scalable flow virtual learning neurocomputer system and appratus with a scalable hybrid control flow/data flow employing a group partitioning algorithm, and a scalable virtual learning architecture, synapse processor architecture mapping, inner square folding and array separation, with capability of back propagation for virtual learning. The group partitioning algorithm creates a common building block of synapse processors containing their own external memory. The processor groups are used to create a general purpose virtual learning machine which maintains complete connectivity with high performance. The synapse processor group allows a system to be scalable in virtual size and direct execution capabilities. Internal to the processor group, the synapse processors are designed as a hybrid control flow/data flow architecture with external memory access and reduced synchronization problems.

40 Claims, 117 Drawing Sheets

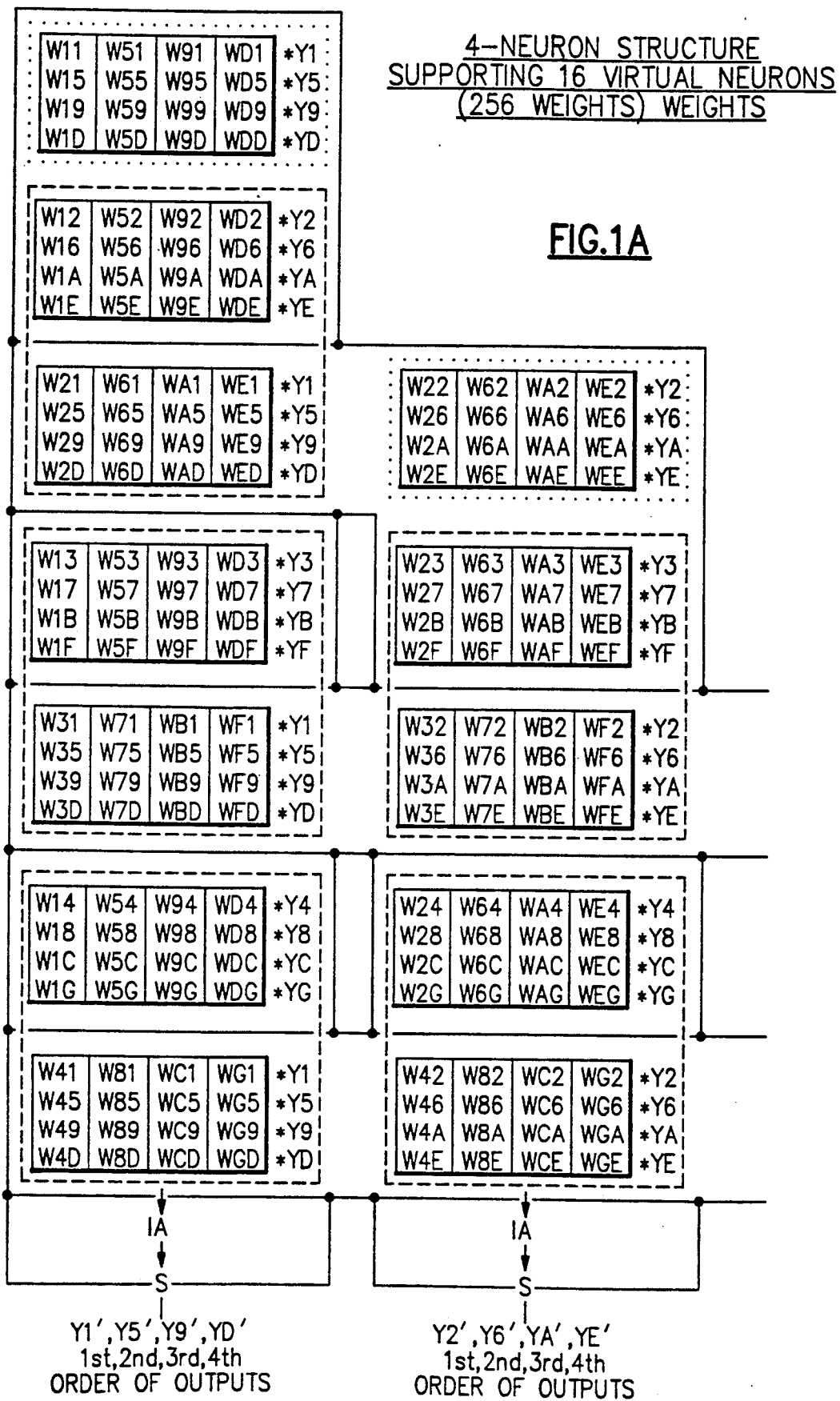

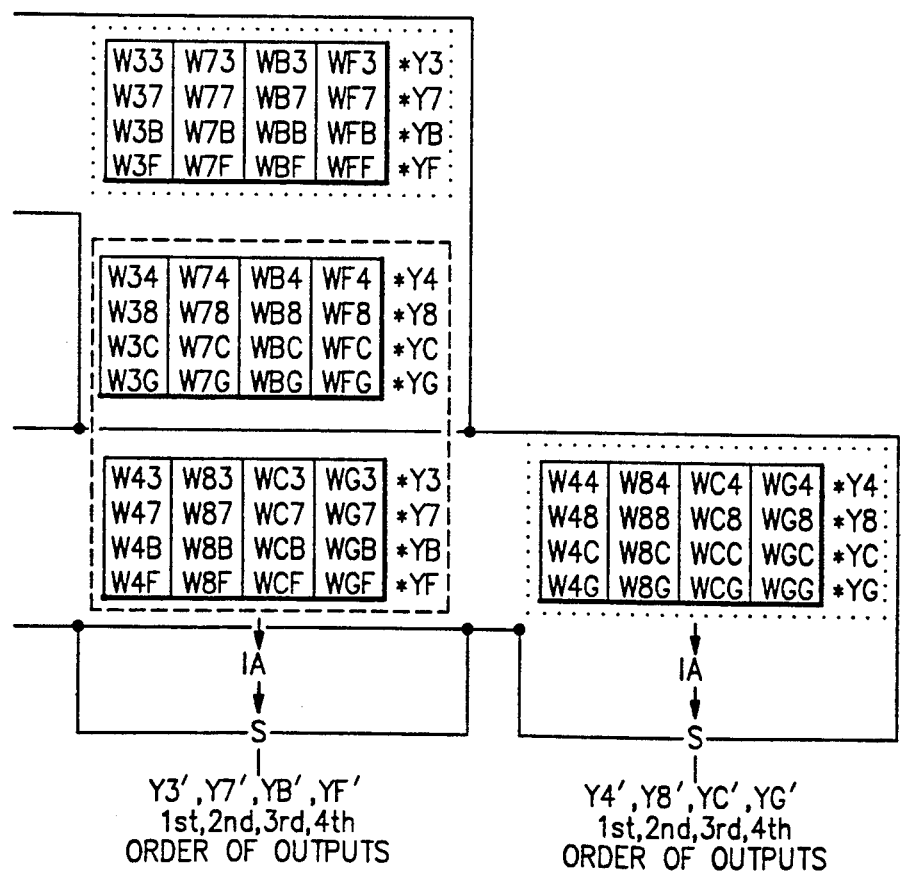

8 NEURON ARRAY MODEL

COMMAND EXAMPLE:
ASSUME SYNAPSE PROCESSING ELEMENTS HAVE RECEIVED MPYA R1*R2→T
THIS IS INDICATED BY Wij*Yj
CMDS RECEIVED FROM THE TOP SUMMATION TREE GO TO CR2 AND
CMDS RECEIVED FROM THE BOTTOM SUMMATION TREE GO TO CR2
(RELATIVE ADDRESSING ASSUMED)

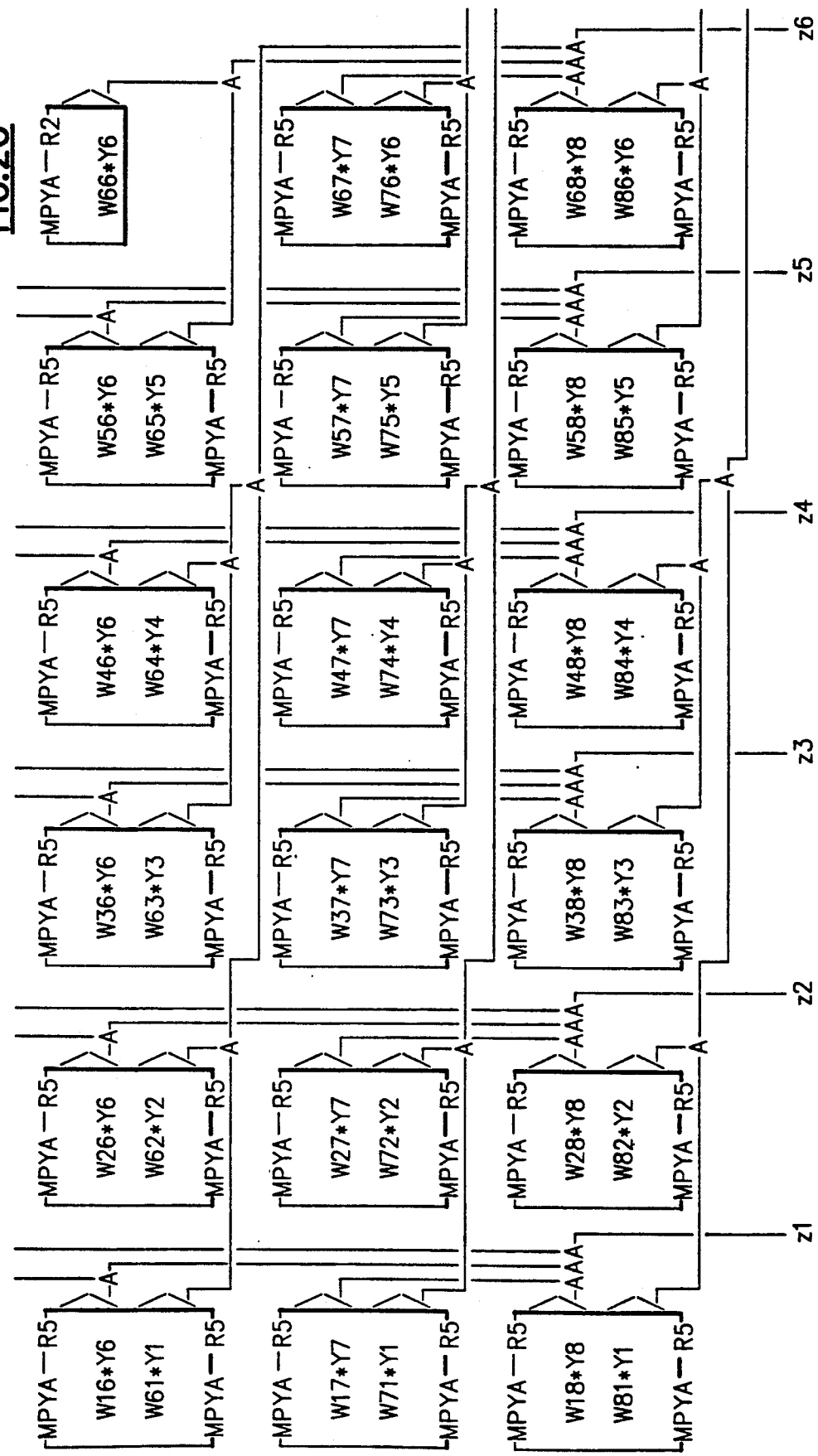

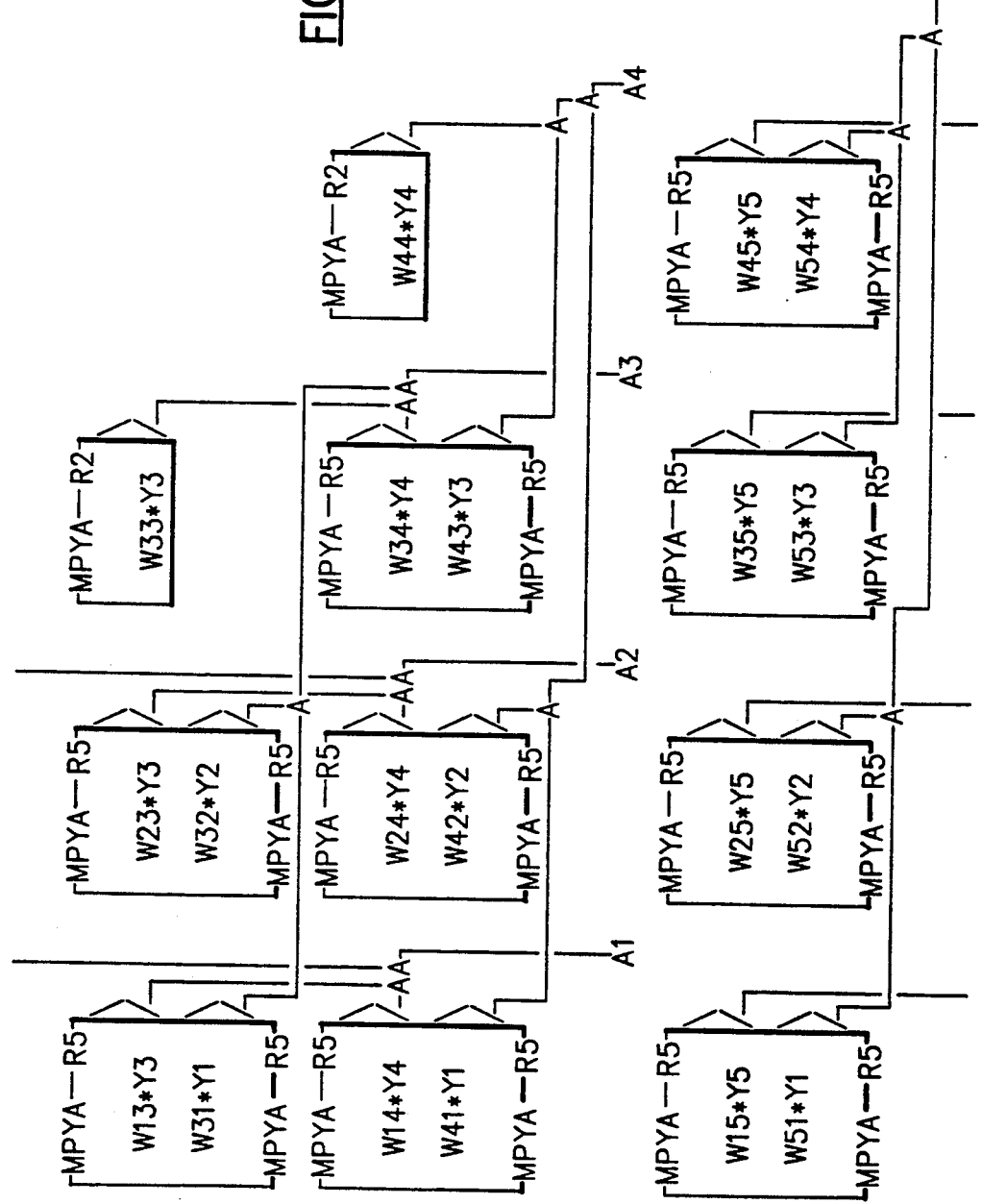

FOLDED INNER SQUARE SEPARATED INTO TWO TRIANGULAR ARRAYS

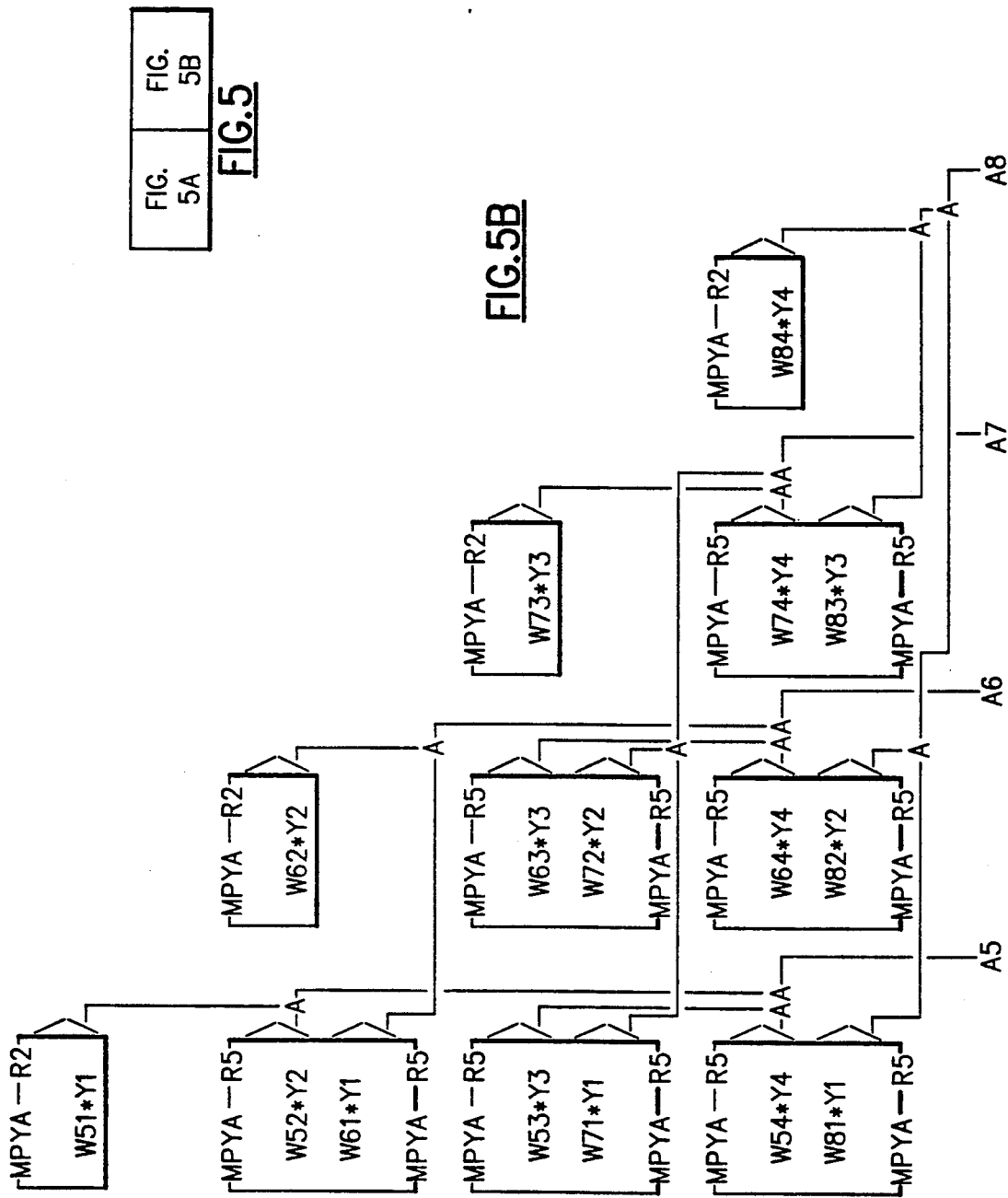

16-NUERON ARRAY MODEL WEIGHT MATRIX WITH NEURON Y VALUES

FIG.7A

| | | | | |
|---|---|---|---|---|
| W1,1*Y1 | | | | |
| W1,2*Y2 | | | | |
| W2,1*Y1 | W2,2*Y2 | | | |
| W1,3*Y3 | W2,3*Y3 | | 1 | |
| W3,1*Y1 | W3,2*Y2 | W3,3*Y3 | | |
| W1,4*Y4 | W2,4*Y4 | W3,4*Y4 | | |
| W4,1*Y1 | W4,2*Y2 | W4,3*Y3 | W4,4*Y4 | |
| W1,5*Y5 | W2,5*Y5 | W3,5*Y5 | W4,5*Y5 | |
| W5,1*Y1 | W5,2*Y2 | W5,3*Y3 | W5,4*Y4 | W5,5*Y5 |
| W1,6*Y6 | W2,6*Y6 | W3,6*Y6 | W4,6*Y6 | W5,6*Y6 |
| W6,1*Y1 | W6,2*Y2 | W6,3*Y3 | W6,4*Y4 | W6,5*Y5 |
| W1,7*Y7 | W2,7*Y7 | W3,7*Y7 | W4,7*Y7 | W5,7*Y7 |
| W7,1*Y1 | W7,2*Y2 | W7,3*Y3 | W7,4*Y4 | W7,5*Y5 |
| W1,8*Y8 | W2,8*Y8 | W3,8*Y8 | W4,8*Y8 | W5,8*Y8 |
| W8,1*Y1 | W8,2*Y2 | W8,3*Y3 | W8,4*Y4 | W8,5*Y5 |
| W1,9*Y9 | W2,9*Y9 | W3,9*Y9 | W4,9*Y9 | W5,9*Y9 |
| W9,1*Y1 | W9,2*Y2 | W9,3*Y3 | W9,4*Y4 | W9,5*Y5 |
| W1,10*Y10 | W2,10*Y10 | W3,10*Y10 | W4,10*Y10 | W5,10*Y10 |
| W10,1*Y1 | W10,2*Y2 | W10,3*Y3 | W10,4*Y4 | W10,5*Y5 |
| W1,11*Y11 | W2,11*Y11 | W3,11*Y11 | W4,11*Y11 | W5,11*Y11 |
| W11,1*Y1 | W11,2*Y2 | W11,3*Y3 | W11,4*Y4 | W11,5*Y5 |
| W1,12*Y12 | W2,12*Y12 | W3,12*Y12 | W4,12*Y12 | W5,12*Y12 |
| W12,1*Y1 | W12,2*Y2 | W12,3*Y3 | W12,4*Y4 | W12,5*Y5 |
| W1,13*Y13 | W2,13*Y13 | W3,13*Y13 | W4,13*Y13 | W5,13*Y13 |
| W13,1*Y1 | W13,2*Y2 | W13,3*Y3 | W13,4*Y4 | W13,5*Y5 |
| W1,14*Y14 | W2,14*Y14 | W3,14*Y14 | W4,14*Y14 | W5,14*Y14 |
| W14,1*Y1 | W14,2*Y2 | W14,3*Y3 | W14,4*Y4 | W14,5*Y5 |
| W1,15*Y15 | W2,15*Y15 | W3,15*Y15 | W4,15*Y15 | W5,15*Y15 |
| W15,1*Y1 | W15,2*Y2 | W15,3*Y3 | W15,4*Y4 | W15,5*Y5 |
| W1,16*Y16 | W2,16*Y16 | W3,16*Y16 | W4,16*Y16 | W5,16*Y16 |
| W16,1*Y1 | W16,2*Y2 | W16,3*Y3 | W16,4*Y4 | W16,5*Y5 |

| | | | | |
|---|---|---|---|---|
| W6,9*Y9   | W7,9*Y9   | W8,9*Y9   | W9,9*Y9   | |
| W9,6*Y6   | W9,7*Y7   | W9,8*Y8   |           | |
| W6,10*Y10 | W7,10*Y10 | W8,10*Y10 | W9,10*Y10 | |
| W10,6*Y6  | W10,7*Y7  | W10,8*Y8  | W10,9*Y9  | W10,10*Y10 |
| W6,11*Y11 | W7,11*Y11 | W8,11*Y11 | W9,11*Y11 | W10,11*Y11 |
| W11,6*Y6  | W11,7*Y7  | W11,8*Y8  | W11,9*Y9  | W11,10*Y10 |
| W6,12*Y12 | W7,12*Y12 | W8,12*Y12 | W9,12*Y12 | W10,12*Y12 |
| W12,6*Y6  | W12,7*Y7  | W12,8*Y8  | W12,9*Y9  | W12,10*Y10 |
| W6,13*Y13 | W7,13*Y13 | W8,13*Y13 | W9,13*Y13 | W10,13*Y13 |
| W13,6*Y6  | W13,7*Y7  | W13,8*Y8  | W13,9*Y9  | W13,10*Y10 |
| W6,14*Y14 | W7,14*Y14 | W8,14*Y14 | W9,14*Y14 | W10,14*Y14 |
| W14,6*Y6  | W14,7*Y7  | W14,8*Y8  | W14,9*Y9  | W14,10*Y10 |
| W6,15*Y15 | W7,15*Y15 | W8,15*Y15 | W9,15*Y15 | W10,15*Y15 |
| W15,6*Y6  | W15,7*Y7  | W15,8*Y8  | W15,9*Y9  | W15,10*Y10 |
| W6,16*Y16 | W7,16*Y16 | W8,16*Y16 | W9,16*Y16 | W10,16*Y16 |
| W16,6*Y6  | W16,7*Y7  | W16,8*Y8  | W16,9*Y9  | W16,10*Y10 |

Regions: 2, 3, 7, 9, 10

|FIG. 7A|FIG. 7B|FIG. 7C|
|---|---|---|

| W11,13*Y13  W12,13*Y13 | | | | |
| W13,11*Y11  W13,12*Y12 | W13,13*Y13 | | | |
| W11,14*Y14  W12,14*Y14 | W13,14*Y14 | | | |
| W14,11*Y11  W14,12*Y12 | W14,13*Y13 | W14,14*Y14 | 4 | |
| W11,15*Y15  W12,15*Y15 | W13,15*Y15 | W14,15*Y15 | | |
| W15,11*Y11  W15,12*Y12 | W15,13*Y13 | W15,14*Y14 | W15,15*Y15 | |
| W11,16*Y16  W12,16*Y16 | W13,16*Y16 | W14,16*Y16 | W15,16*Y16 | |
| W16,11*Y11  W16,12*Y12 | W16,13*Y13 | W16,14*Y14 | W16,15*Y15 | W16,16*Y16 |

TRIANGULAR ARRAYS 1 AND 2

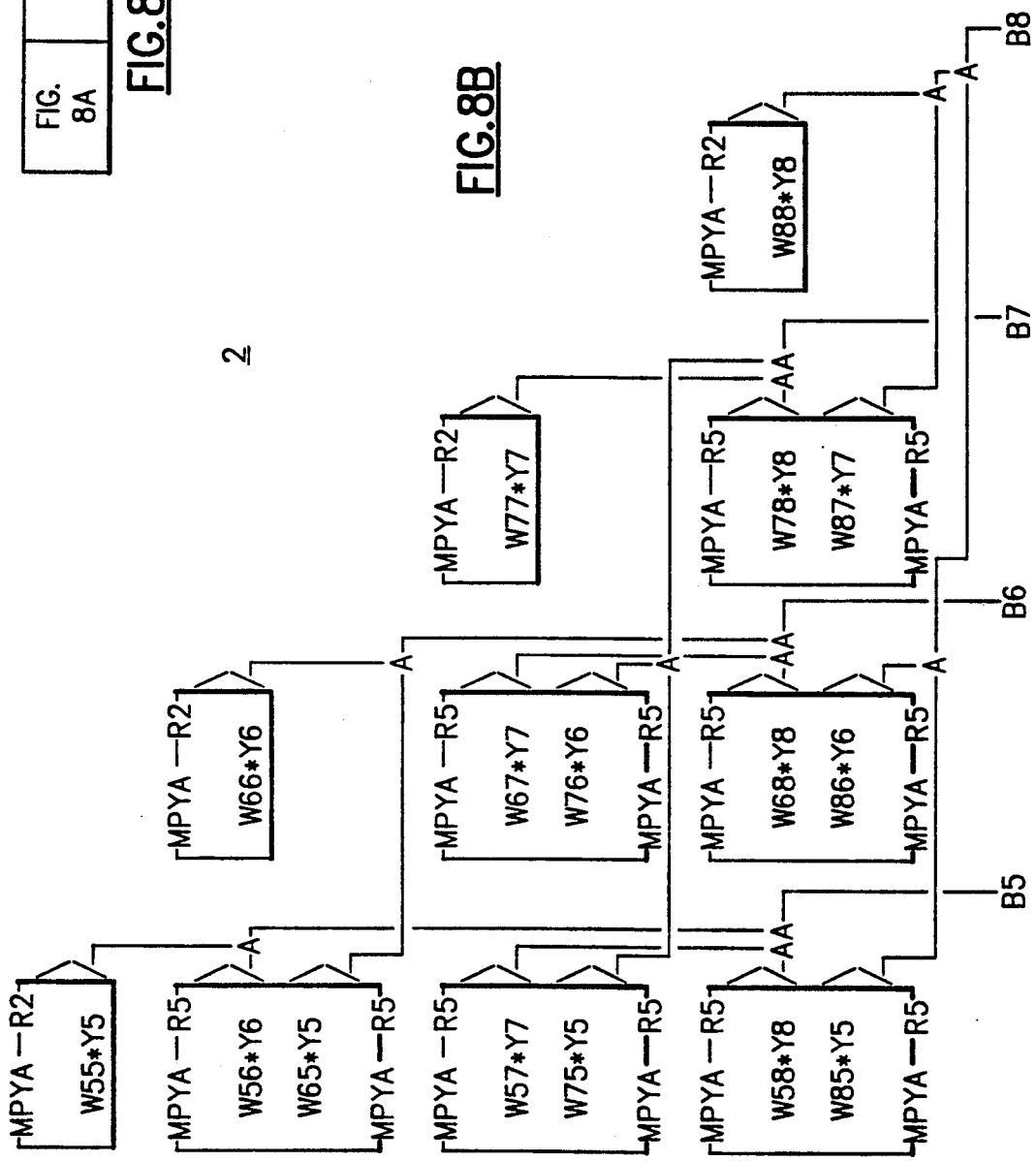

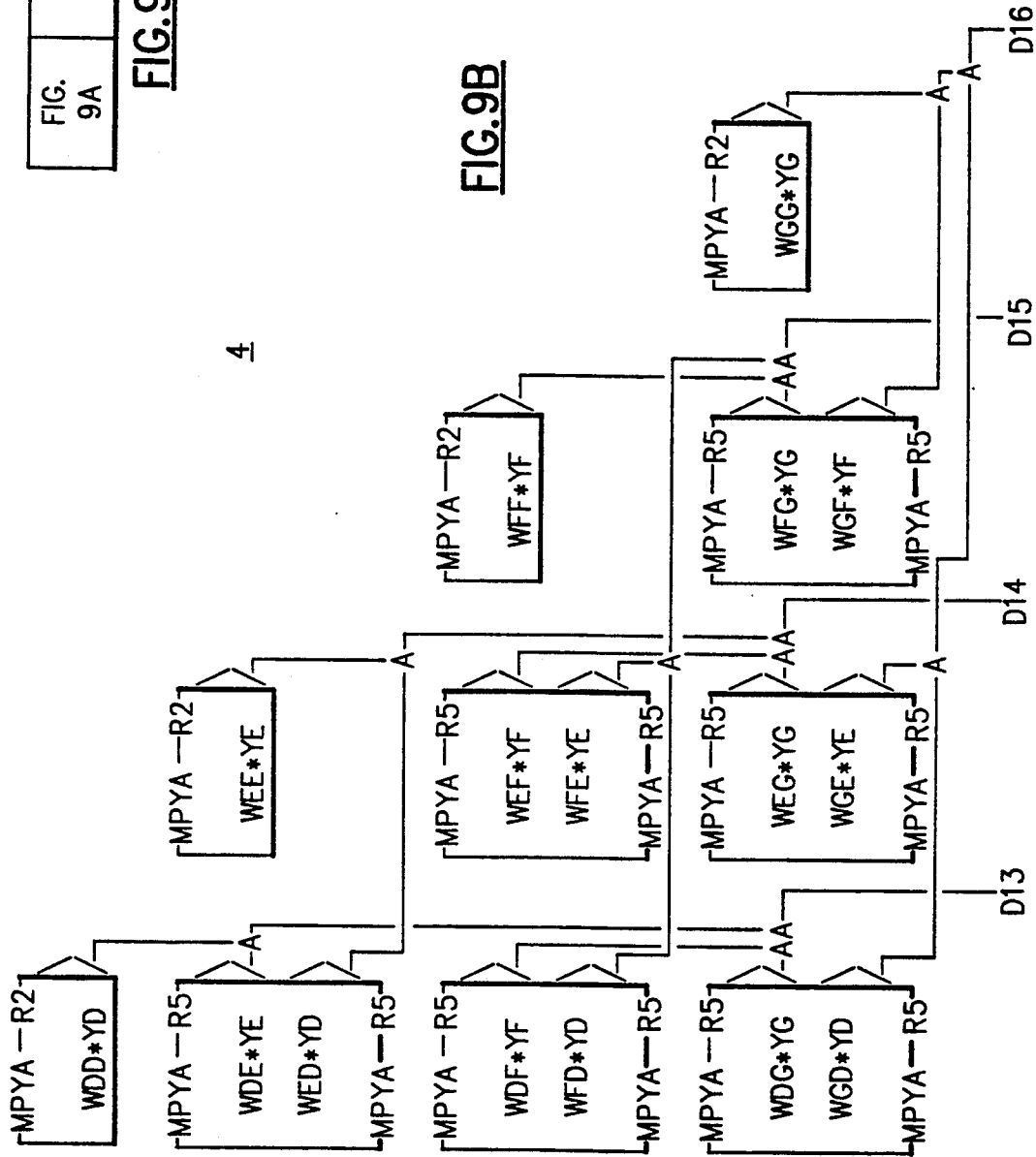

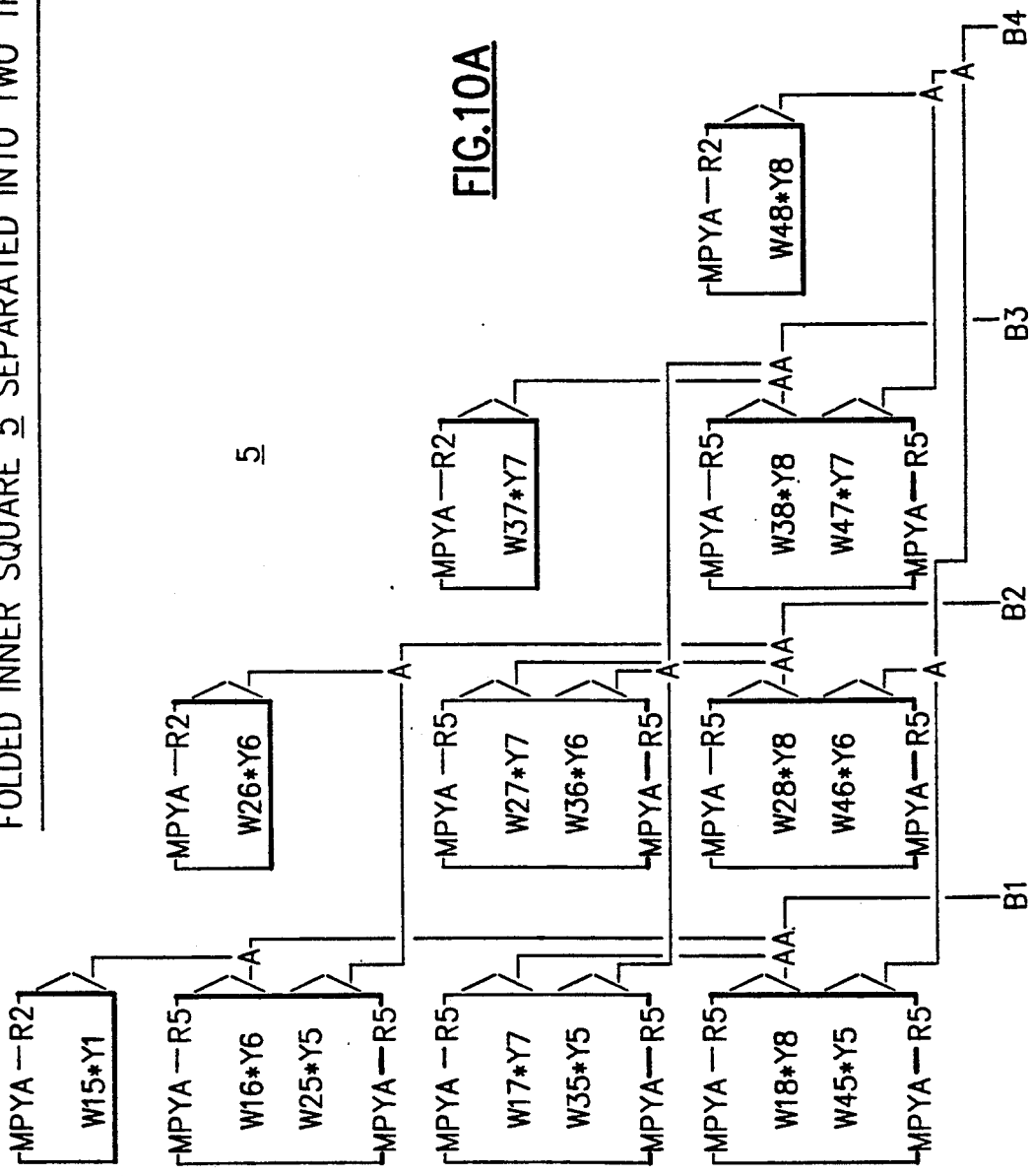
FIG.10A — FOLDED INNER SQUARE 5 SEPARATED INTO TWO TRIANGULAR ARRAYS

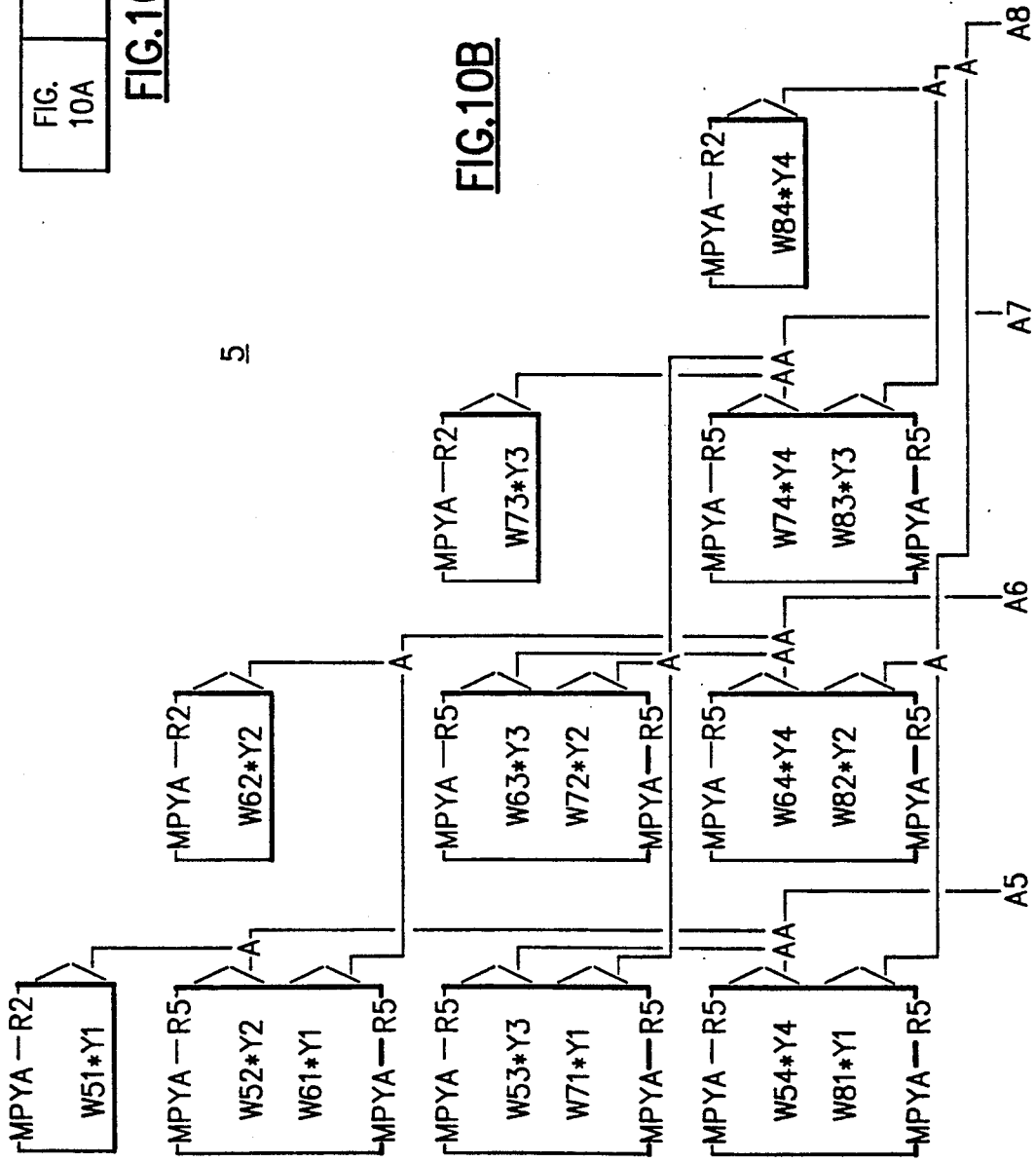

FOLDED INNER SQUARE 6 SEPARATED INTO TWO TRIANGULAR ARRAYS

FIG.11A

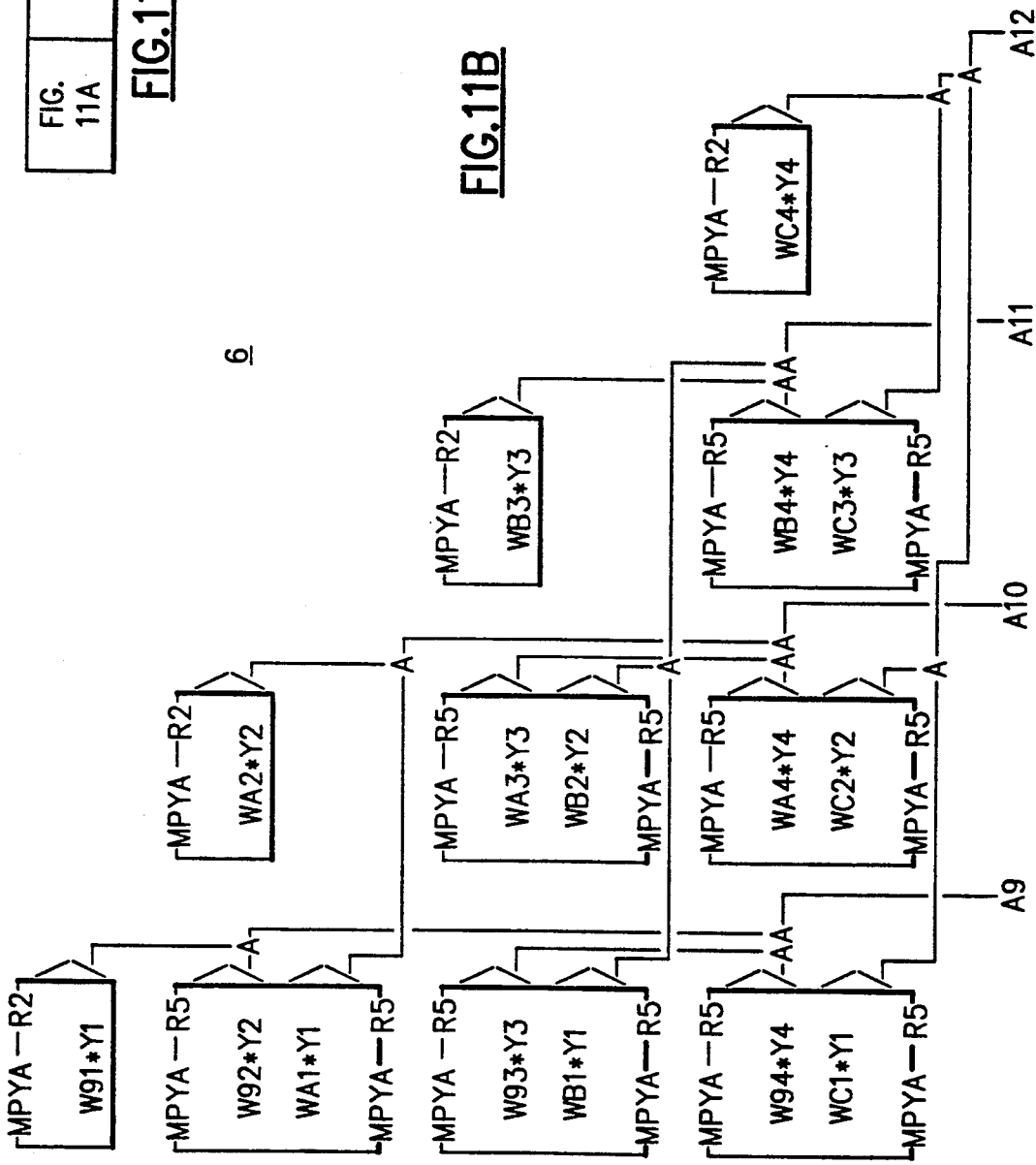

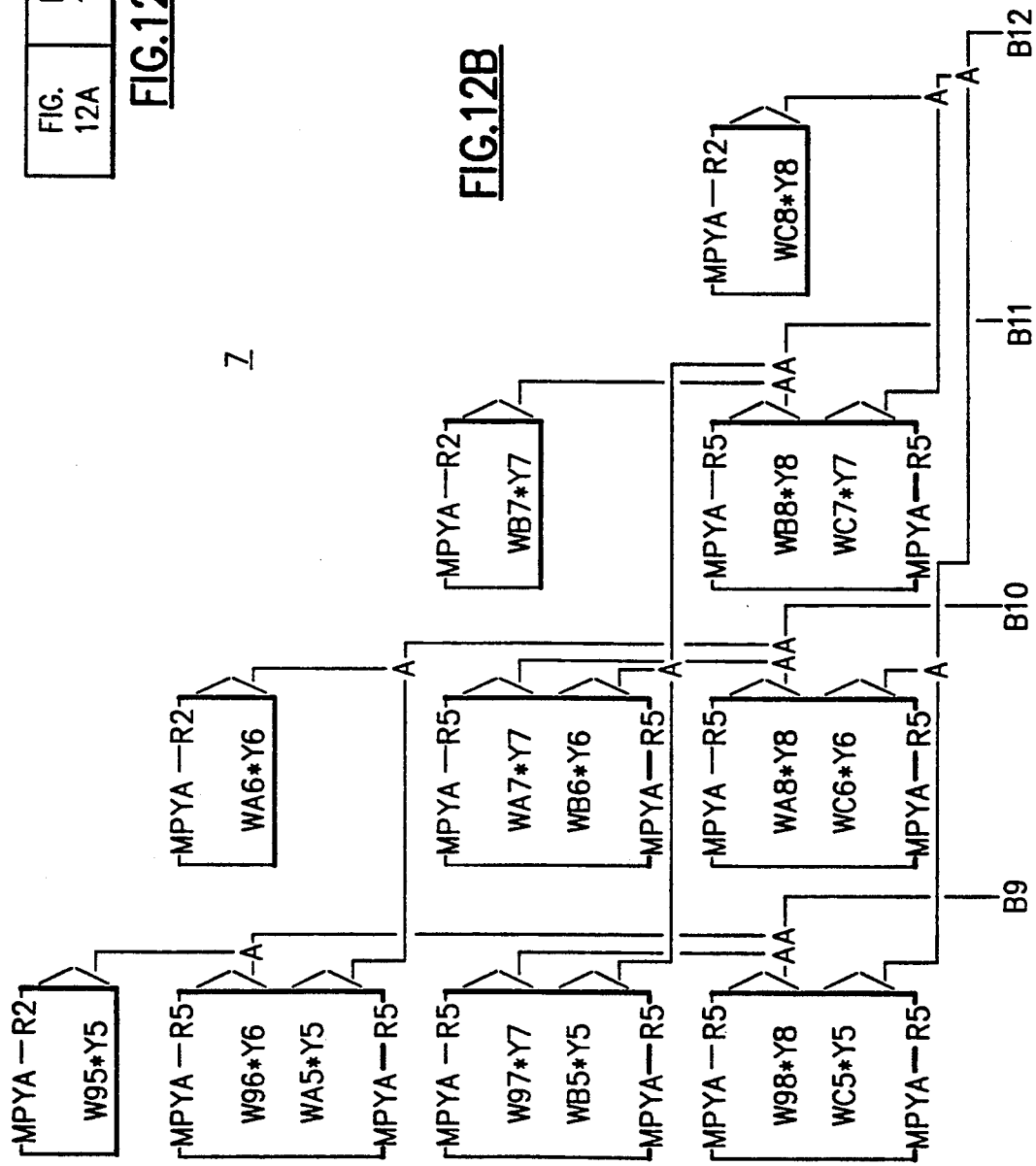

FOLDED INNER SQUARE 8 SEPARATED INTO TWO TRIANGULAR ARRAYS

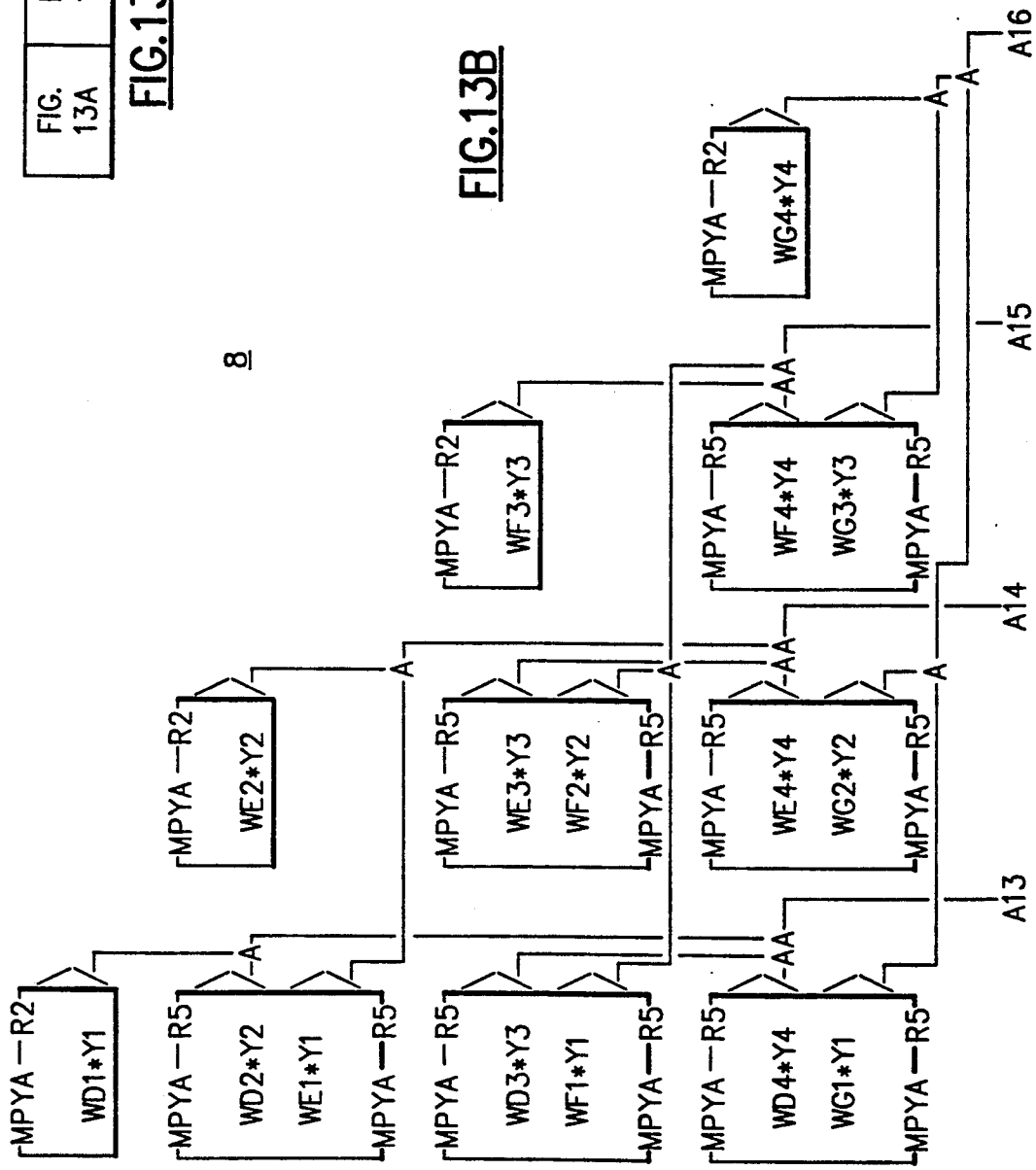

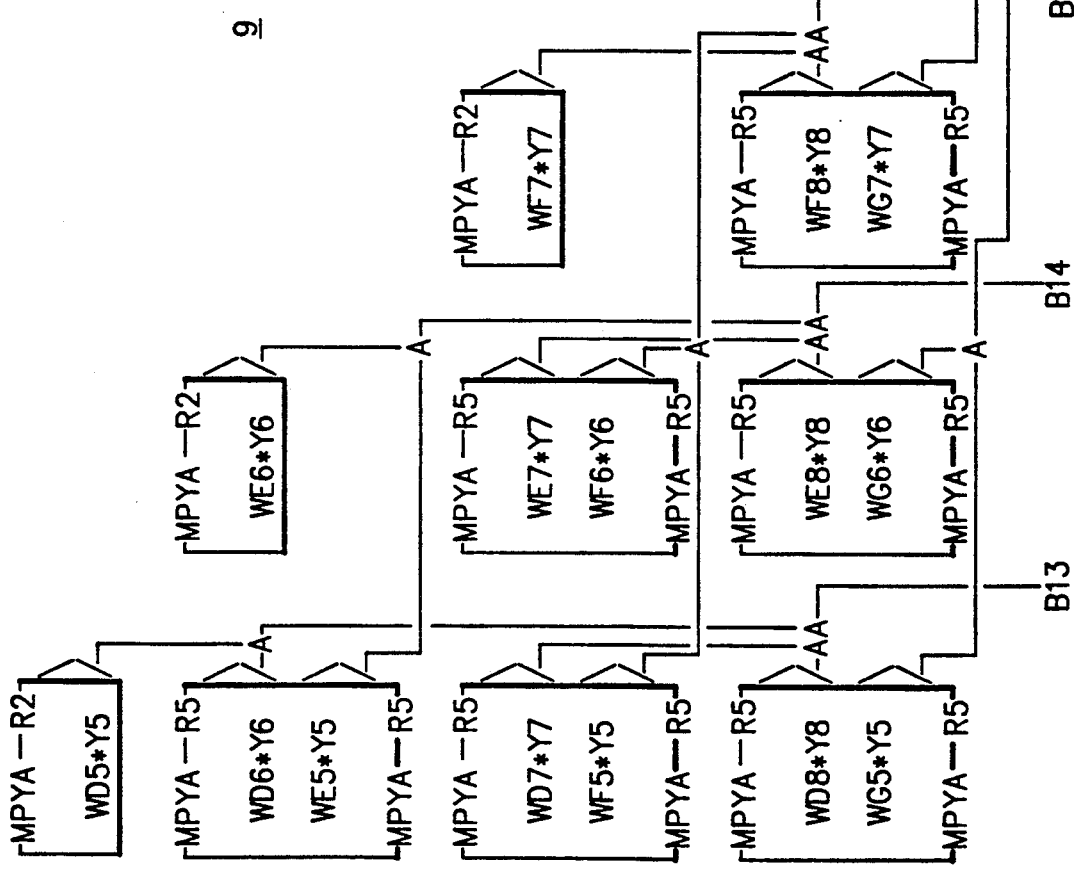

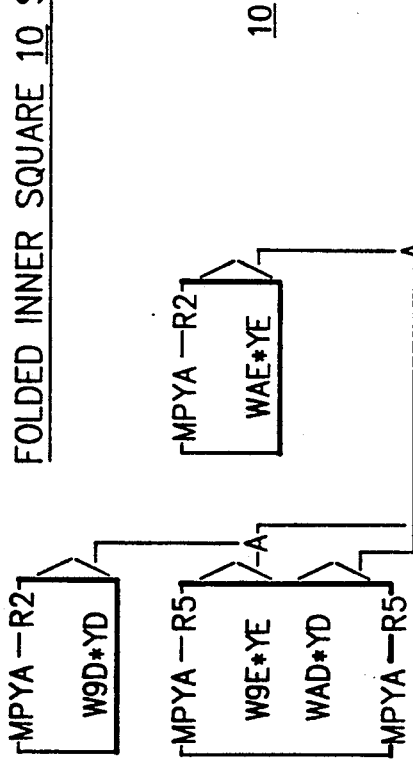
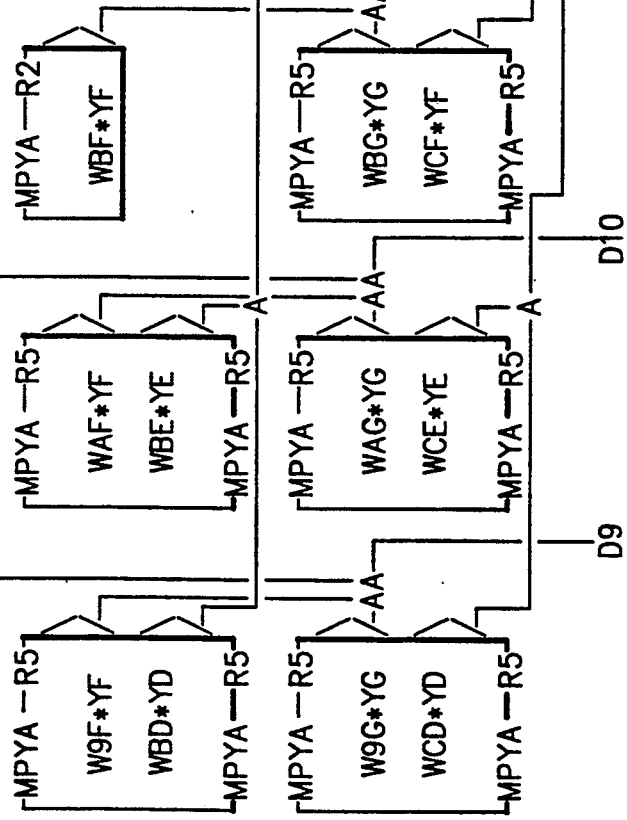
FIG.15A
FOLDED INNER SQUARE 10 SEPARATED INTO TWO TRIANGULAR ARRAYS

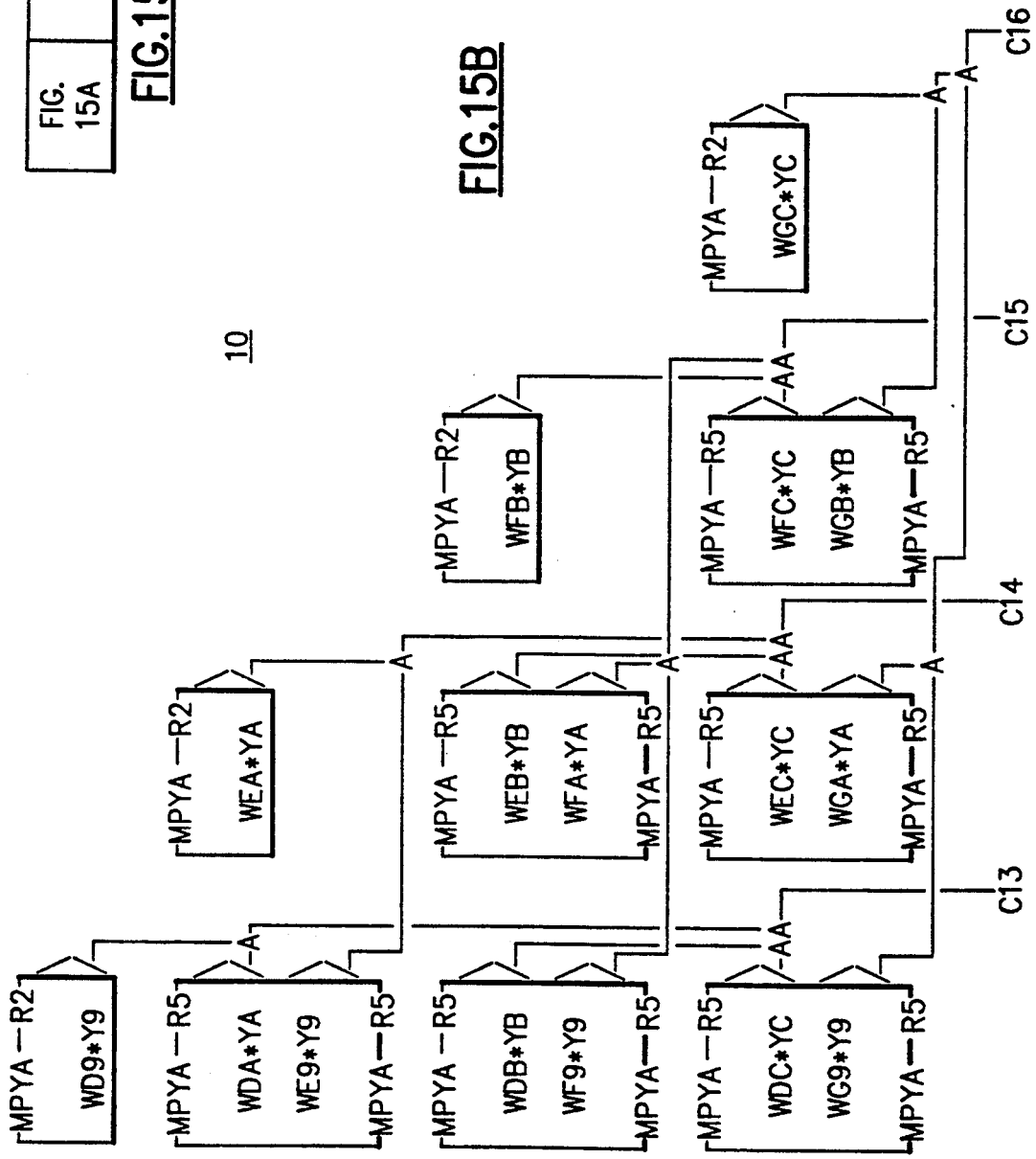

EXTERNAL SUMMATION, SIGMOID GENERATOR, AND REVERSE COMMUNICATIONS PATH

| FIG. 16A | FIG. 16B |

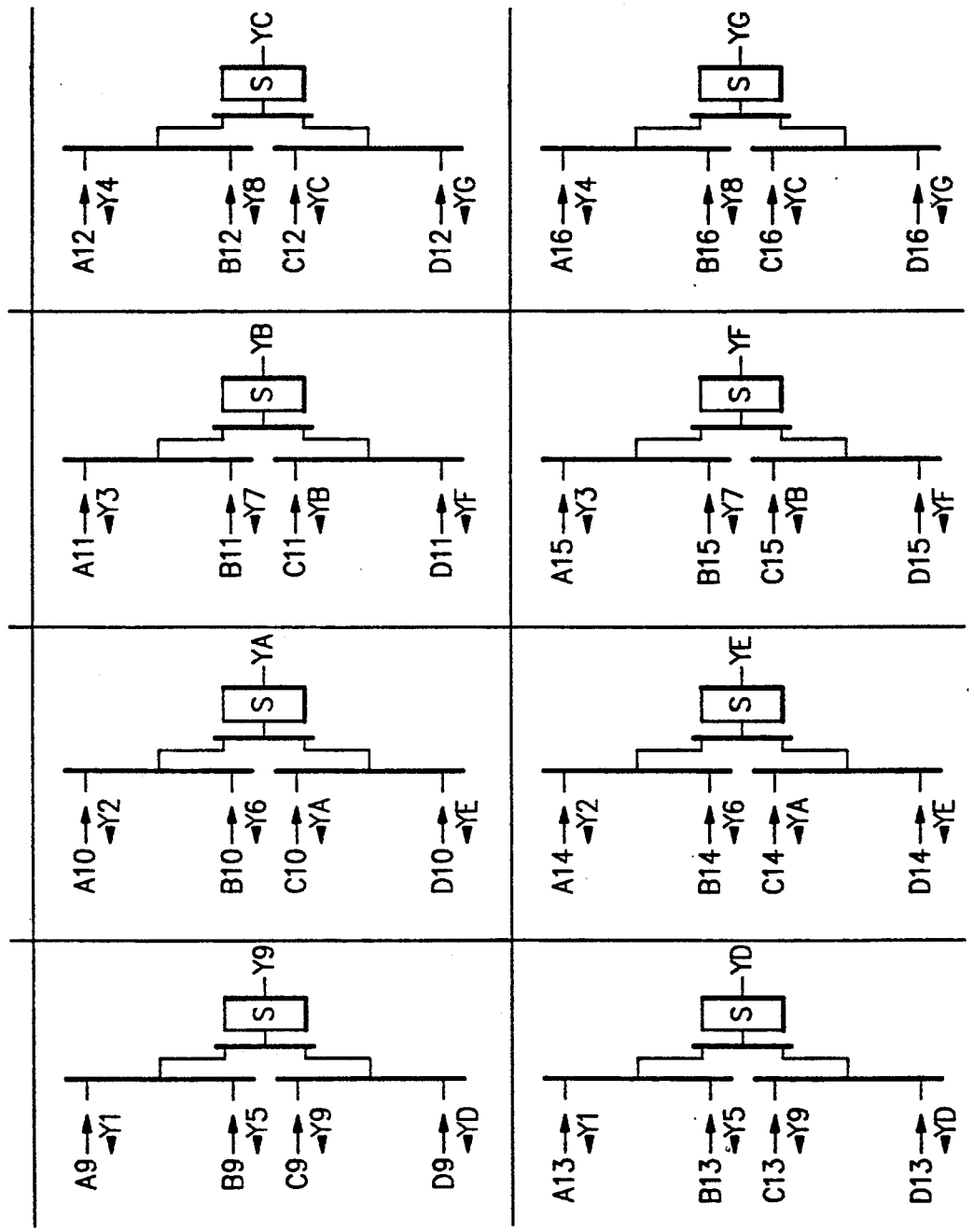
FIG.16B
S = SIGMOID GENERATOR

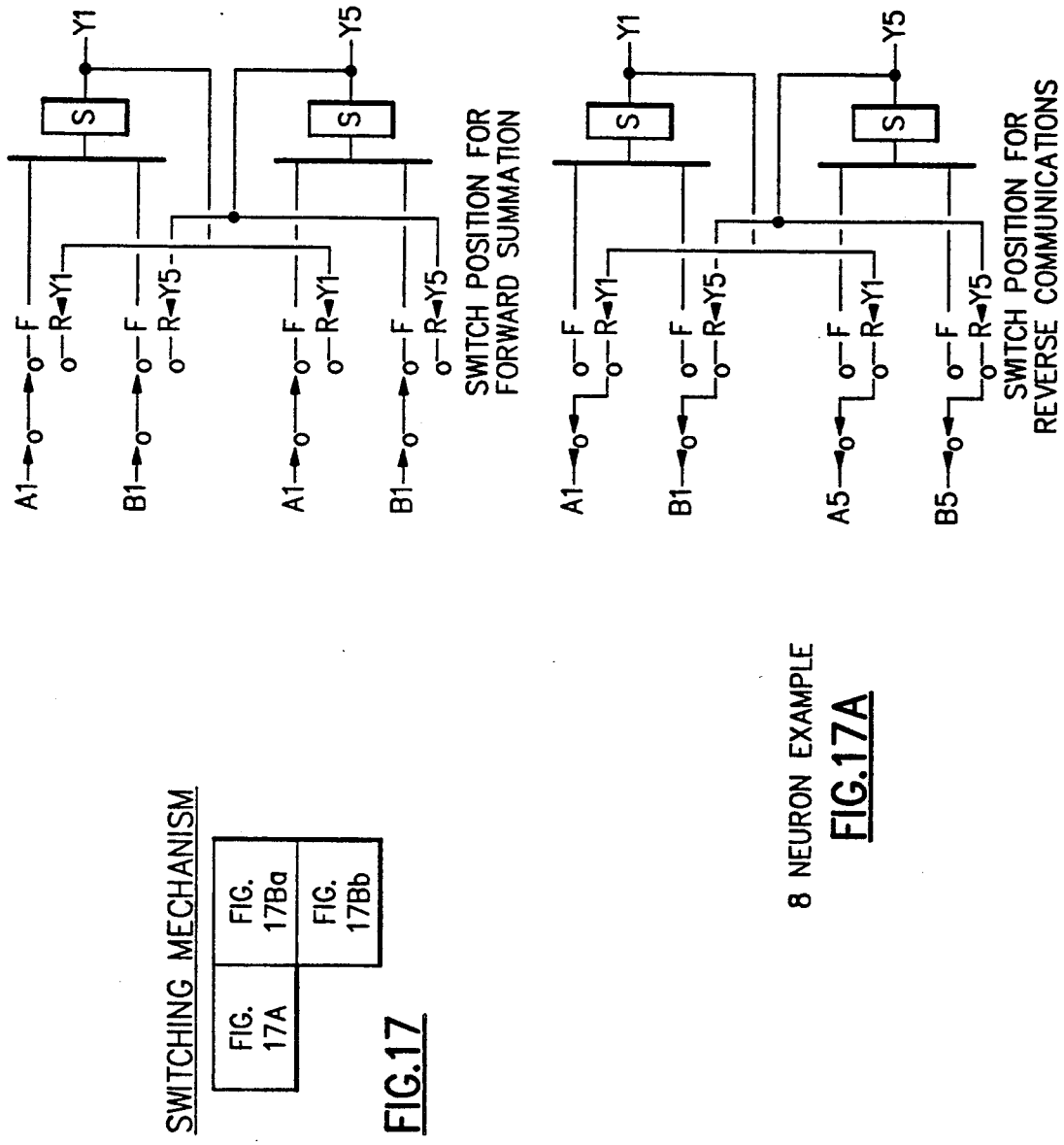

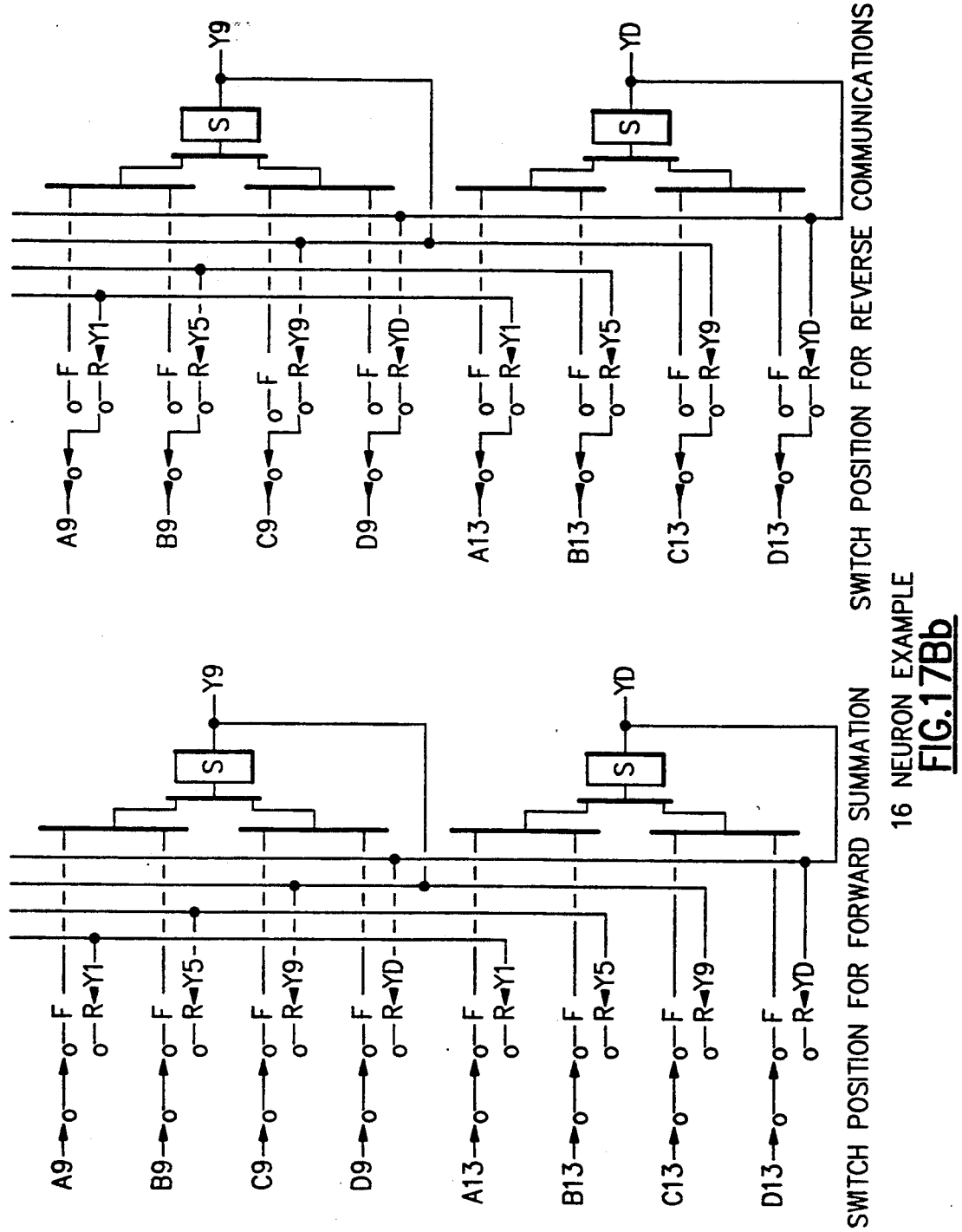

MODIFIED 8 NEURON SWITCHING MECHANISM TO SUPPORT LEARNING
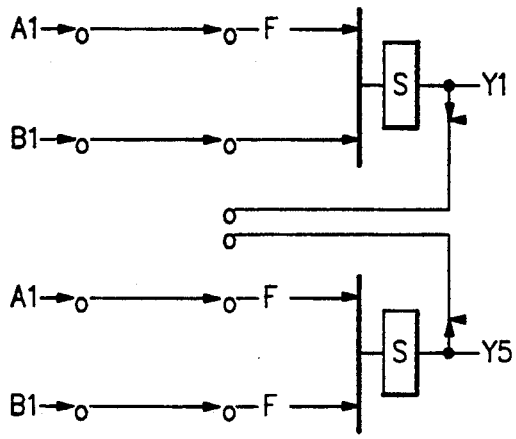
PATH POSITION FOR NEURON
INPUT FORWARD SUMMATION
(1)
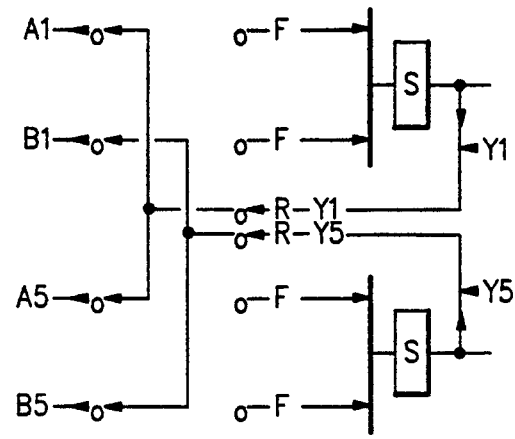
PATH POSITION FOR Y VALUE
REVERSE COMMUNICATIONS
(2)
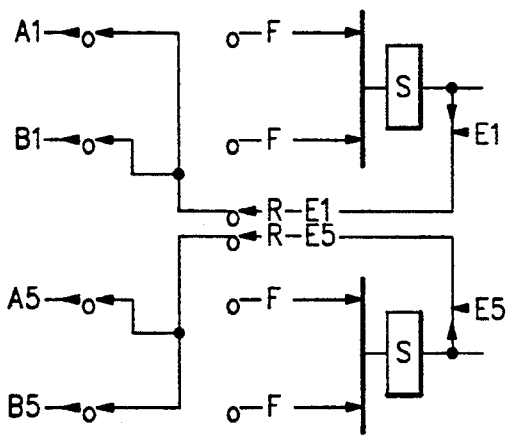
PATH POSITION FOR E VALUE
REVERSE COMMUNICATIONS
(3)
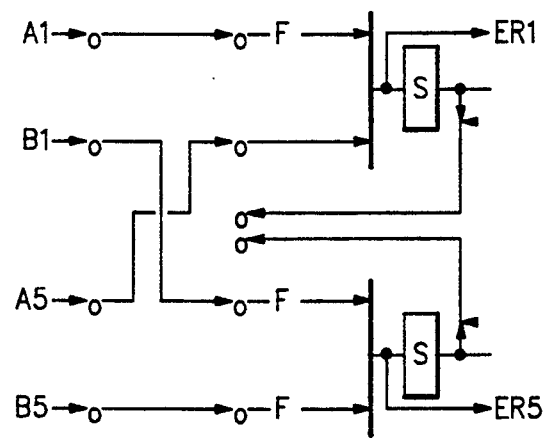
PATH POSITION FOR WEIGHTED
ERROR SUMMATIONS
(4)
F → FORWARD SUMMATION
R → REVERSE COMMUNICATIONS
FIG.18

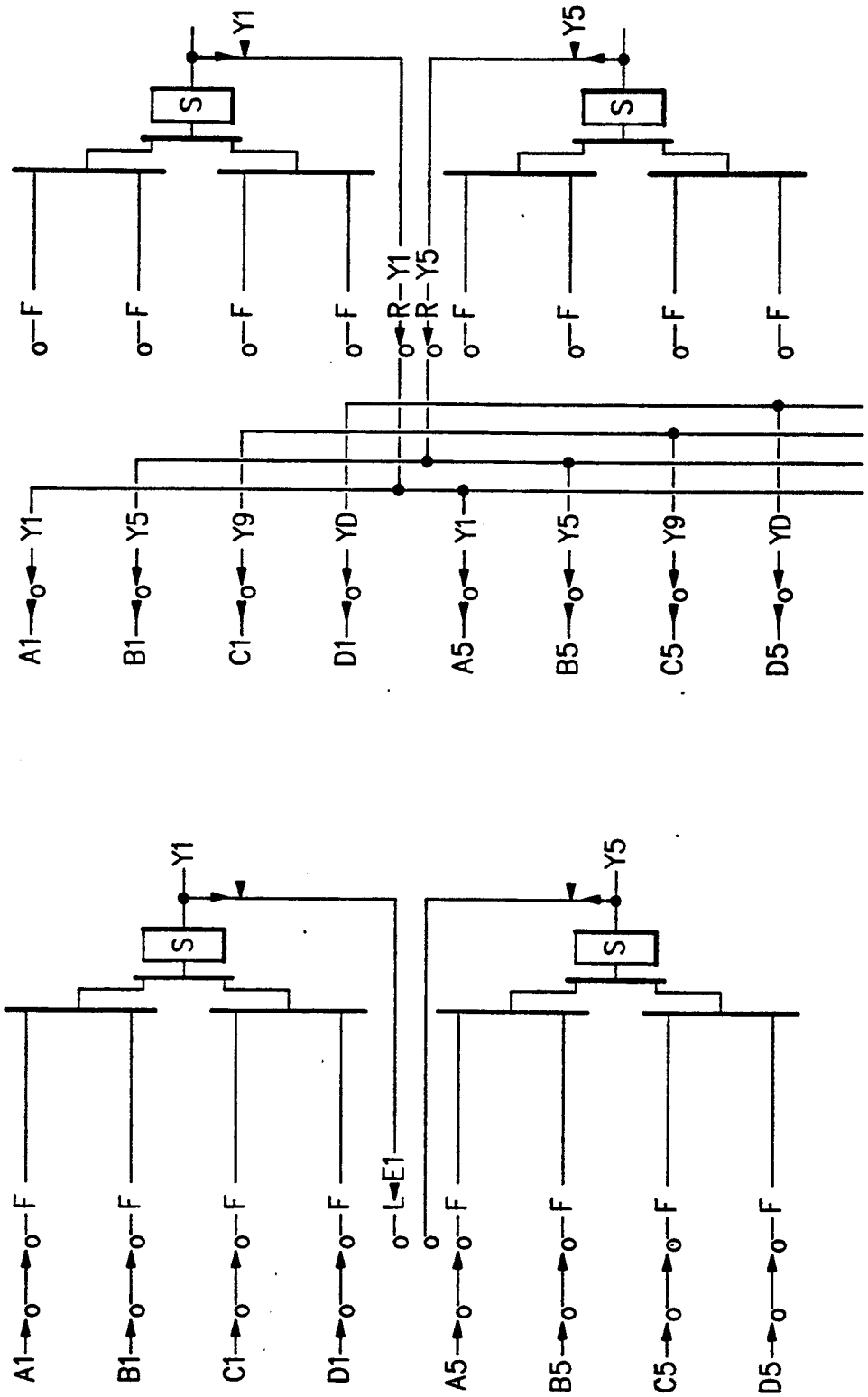

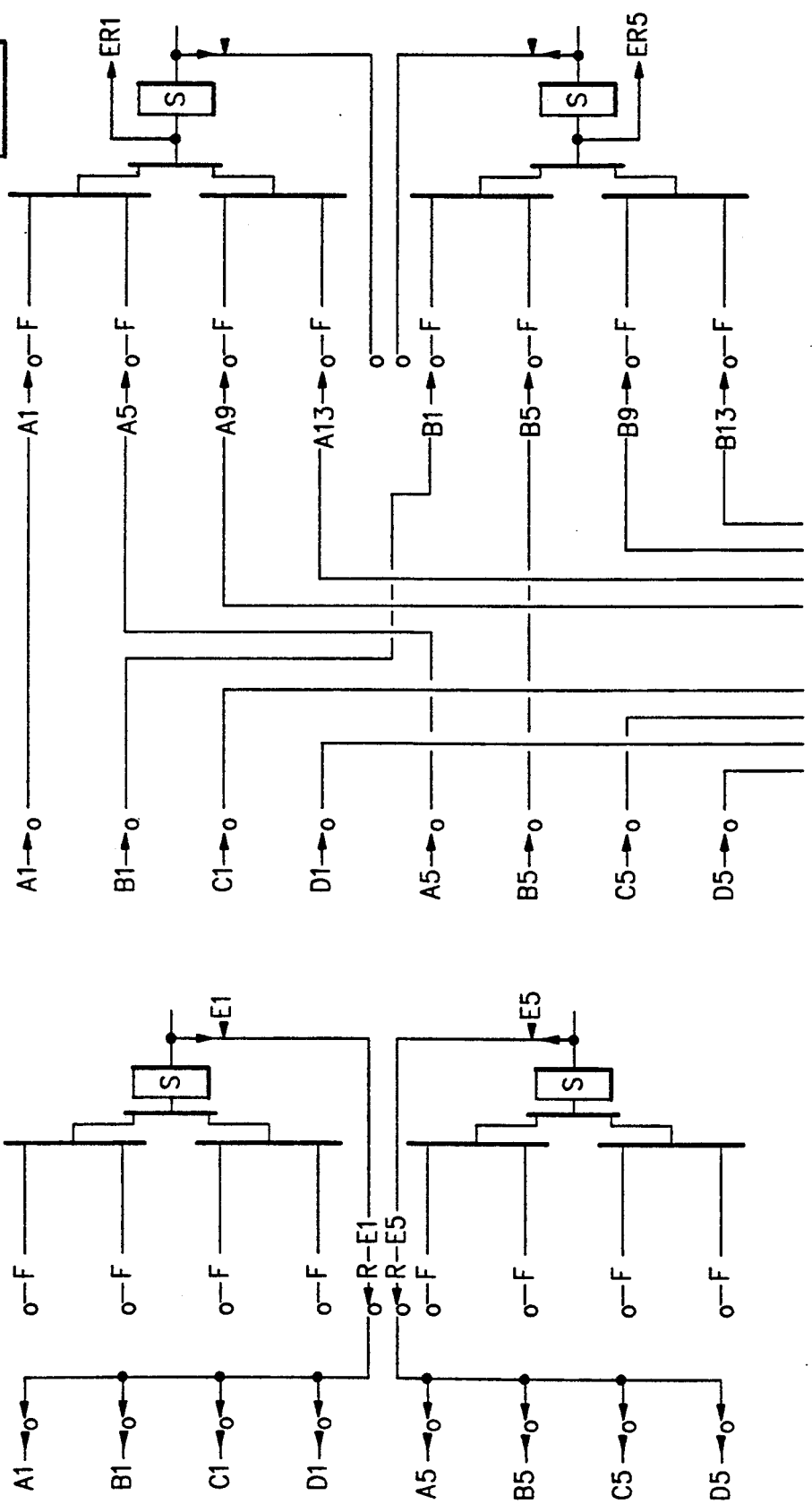

V, N RELATIONSHIP TO STORAGE AND OPERATING CYCLES

| V | N | WEIGHTS PER ELEMENT | Y VALUES PER ELEMENT | NUMBER OF IA CYCLES | NUMBER OF SO CYCLES |
|---|---|---|---|---|---|
| 16 | 4 | 16 | 4 | 4 | 4 |
| 256 | 4 | 4,096 | 64 | 64 | 64 |
| 1024 | 4 | 65,536 | 256 | 256 | 256 |
| 256 | 64 | 16 | 4 | 4 | 4 |
| 1024 | 64 | 256 | 16 | 16 | 16 |

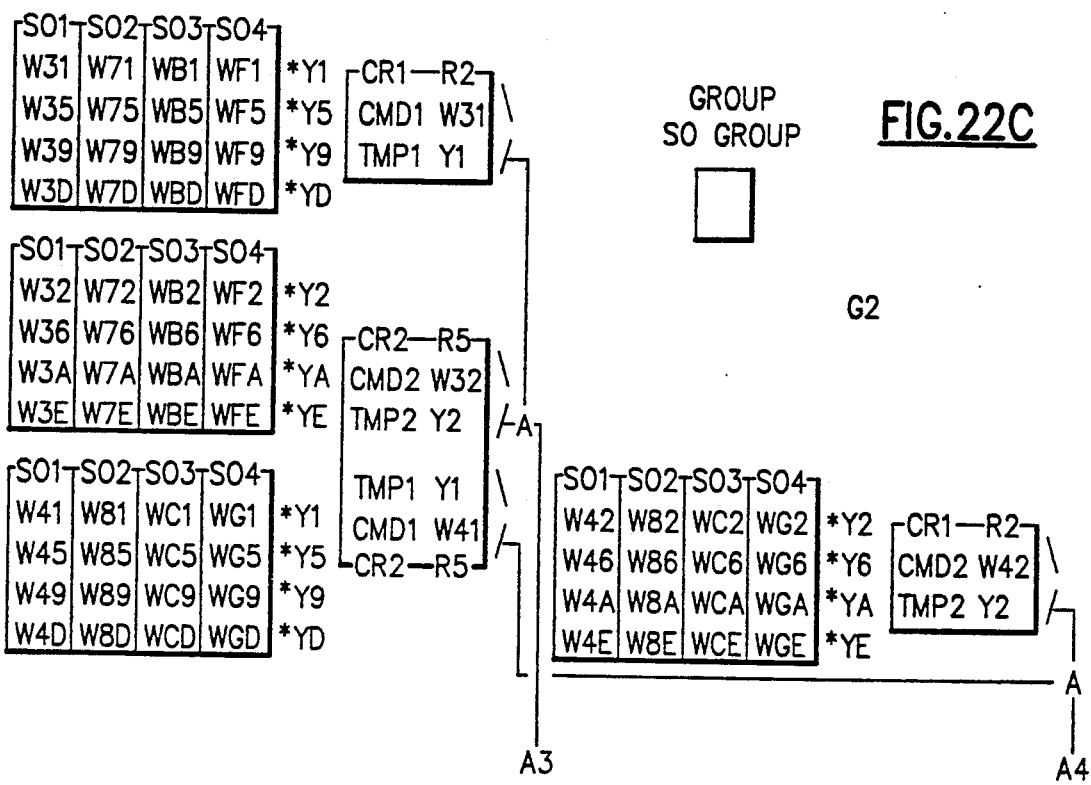
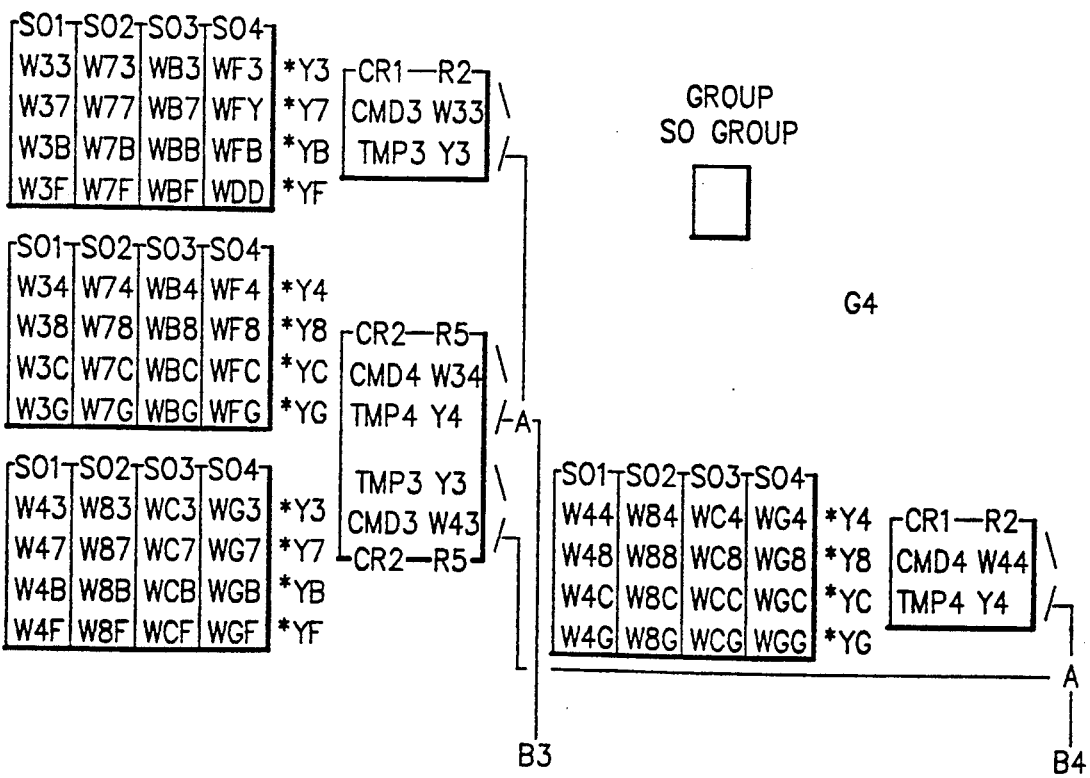
FIG.22C

SYNAPSE PROCESSOR ARCHITECTURE WITH EXTERNAL MEMORY

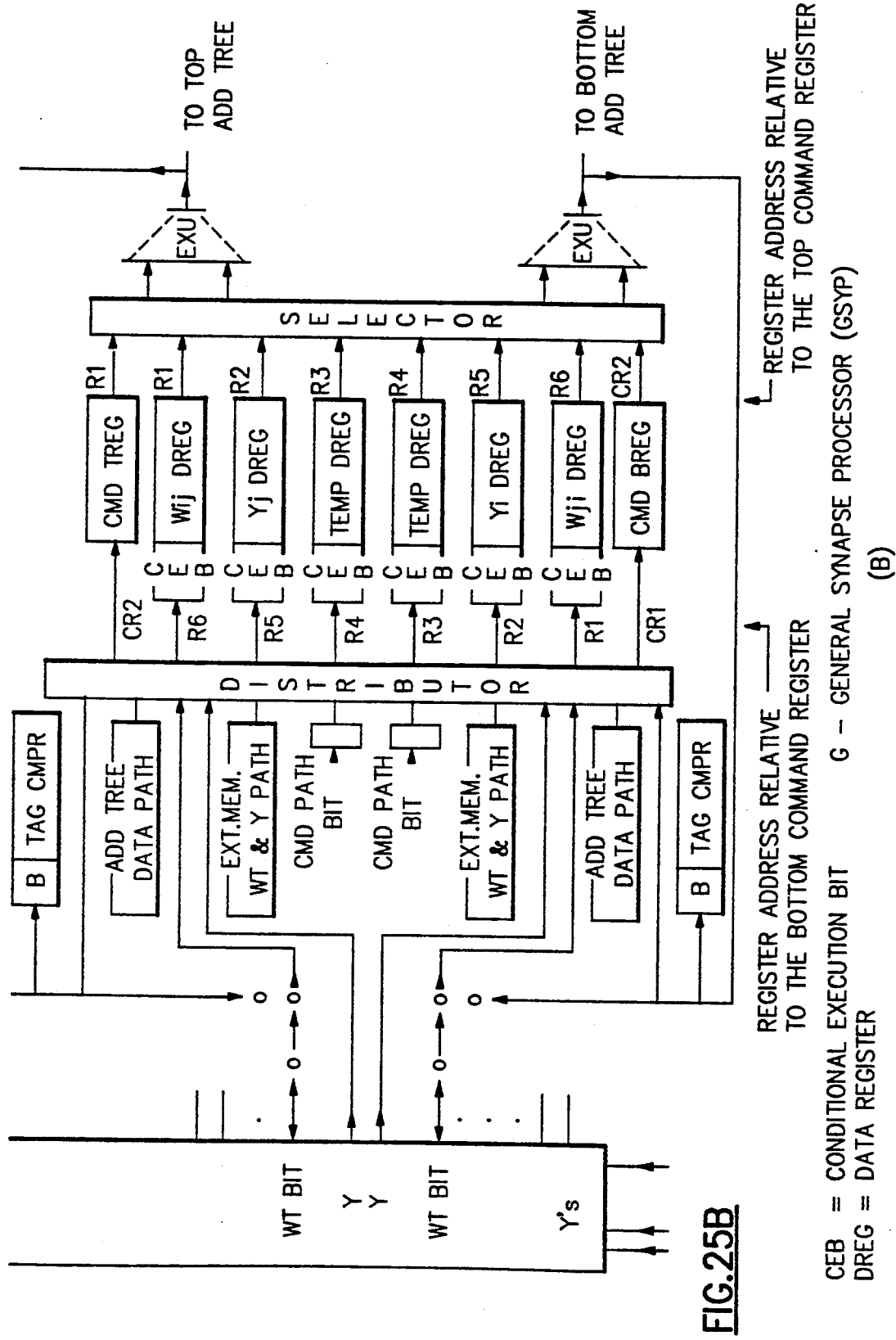

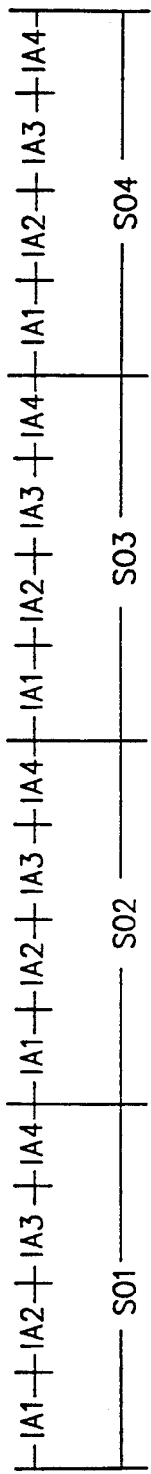
FIG.26 4-NEURON SVLM TIMING FOR A 16 NEURON NEURAL NETWORK
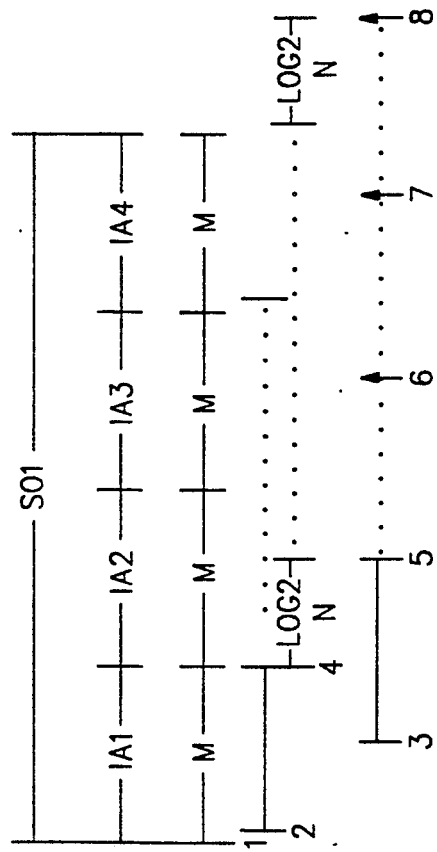
FIG.27 IA1 CYCLE TIME SCALE EXPANDED TO SHOW DETAILED TIMING

11 NEURON I/O ENCODER PROBLEM MAPPED ONTO A 4 NEURON SCALABLE SVLM WITH V = 16, H = 4, G = 4
FIG. 31A
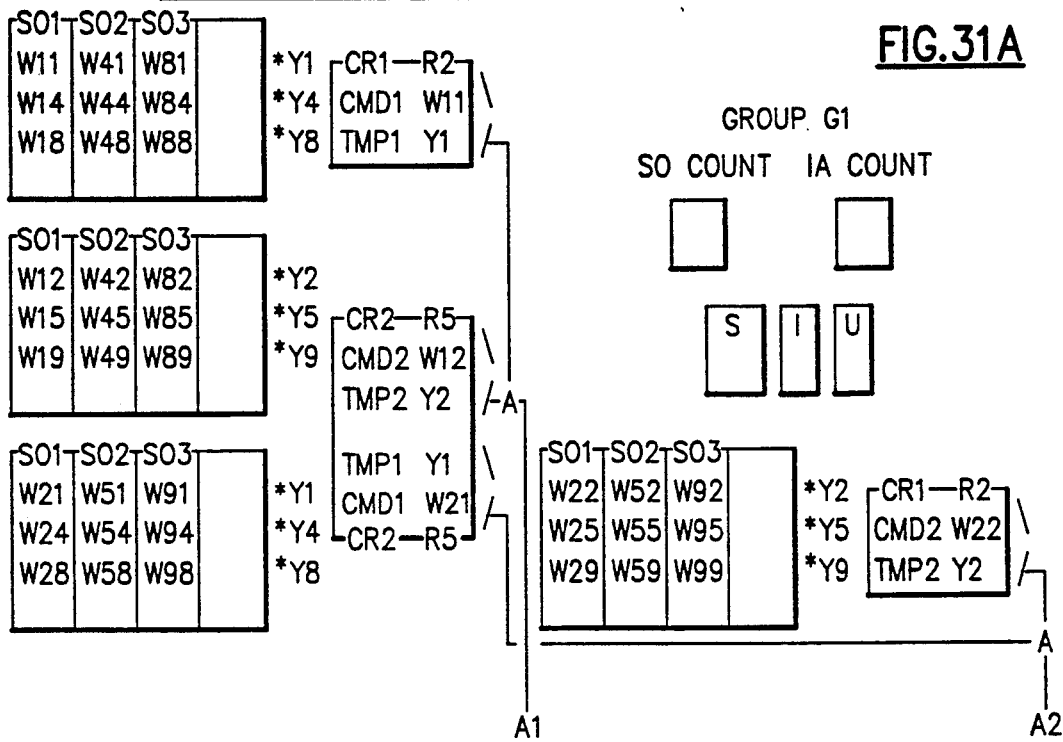
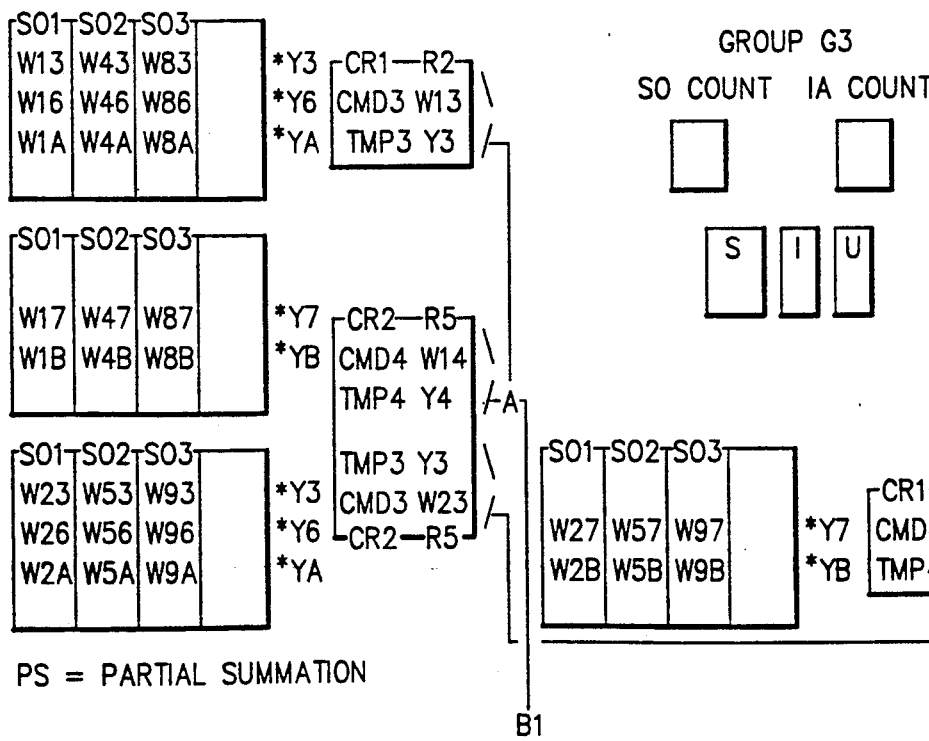
PS = PARTIAL SUMMATION

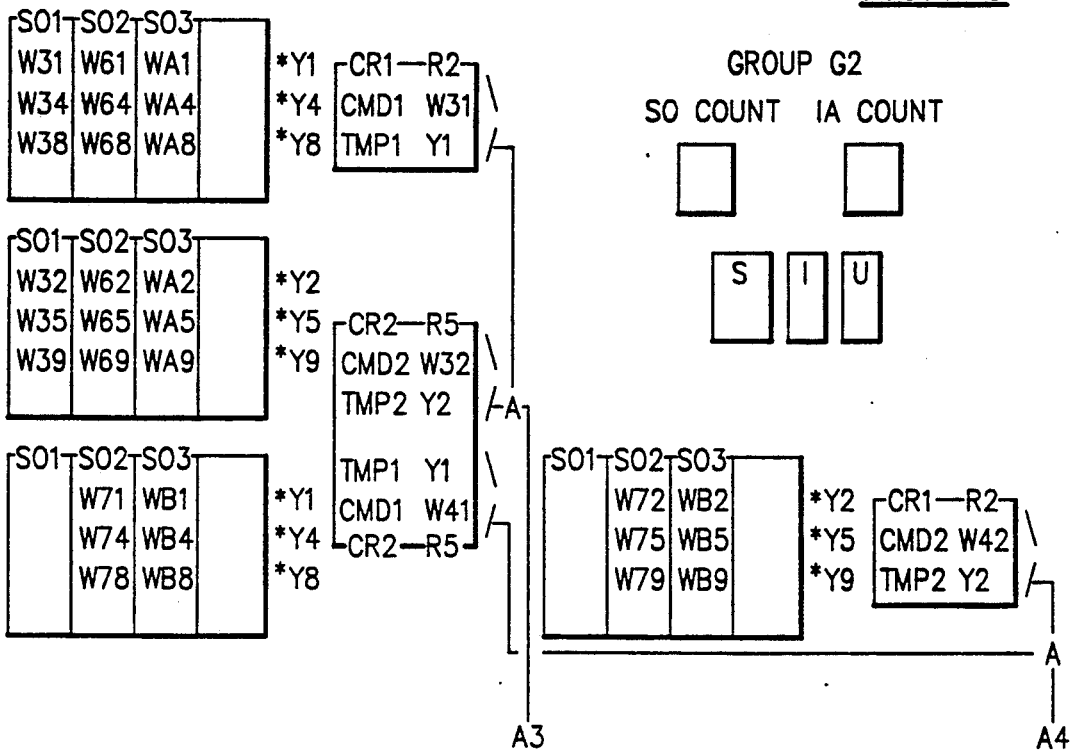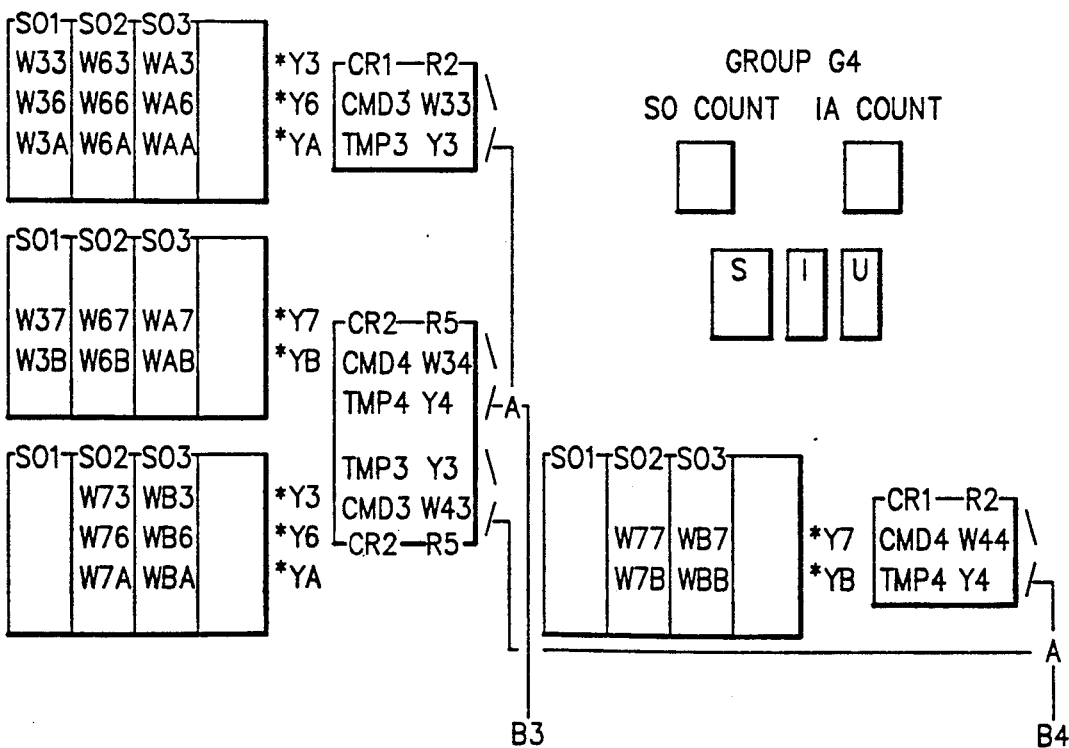
FIG.31C

INITIALIZATION
FIG.32A
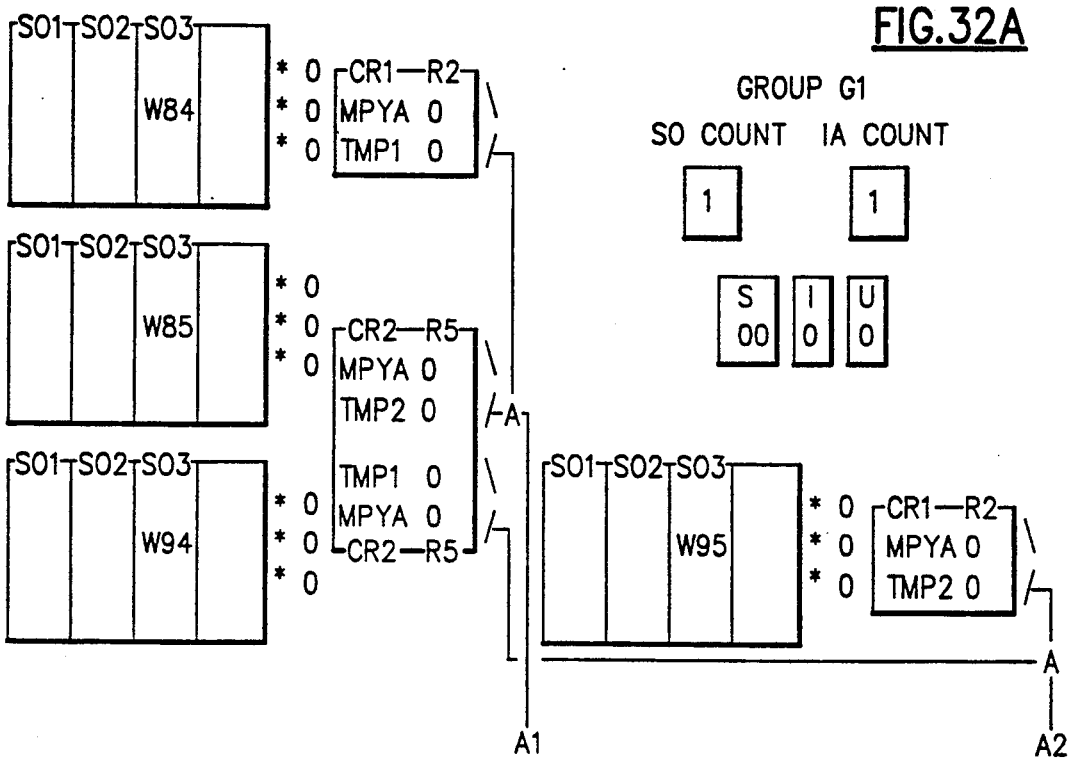
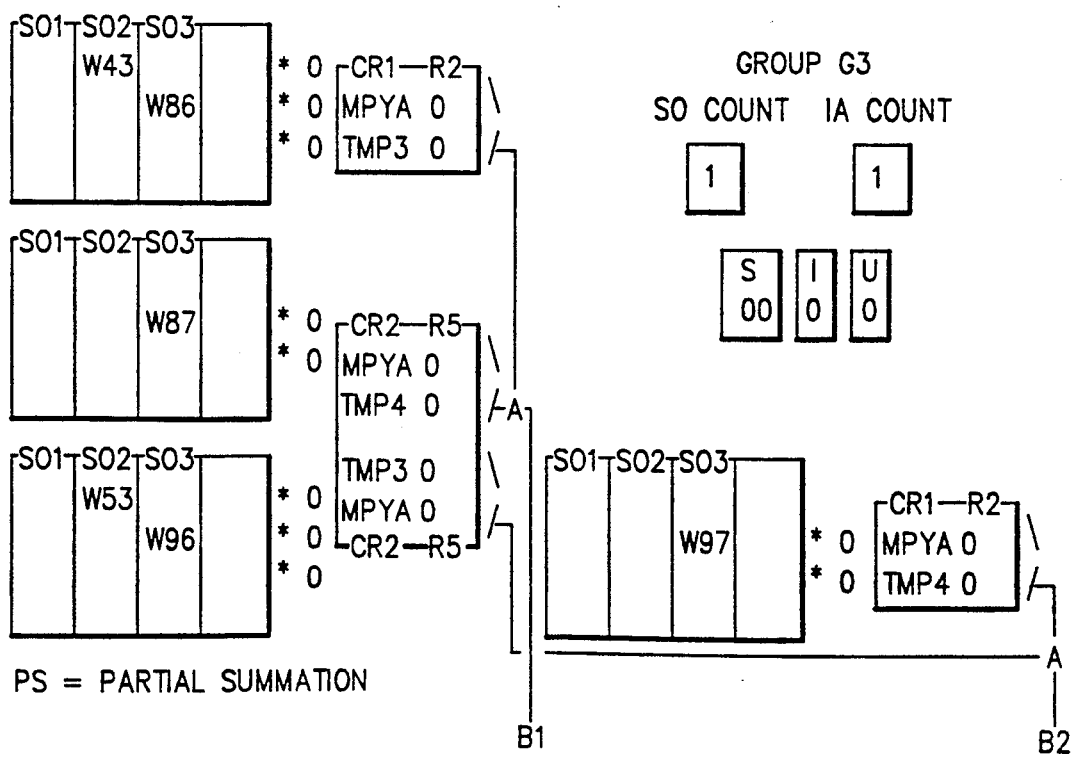
PS = PARTIAL SUMMATION

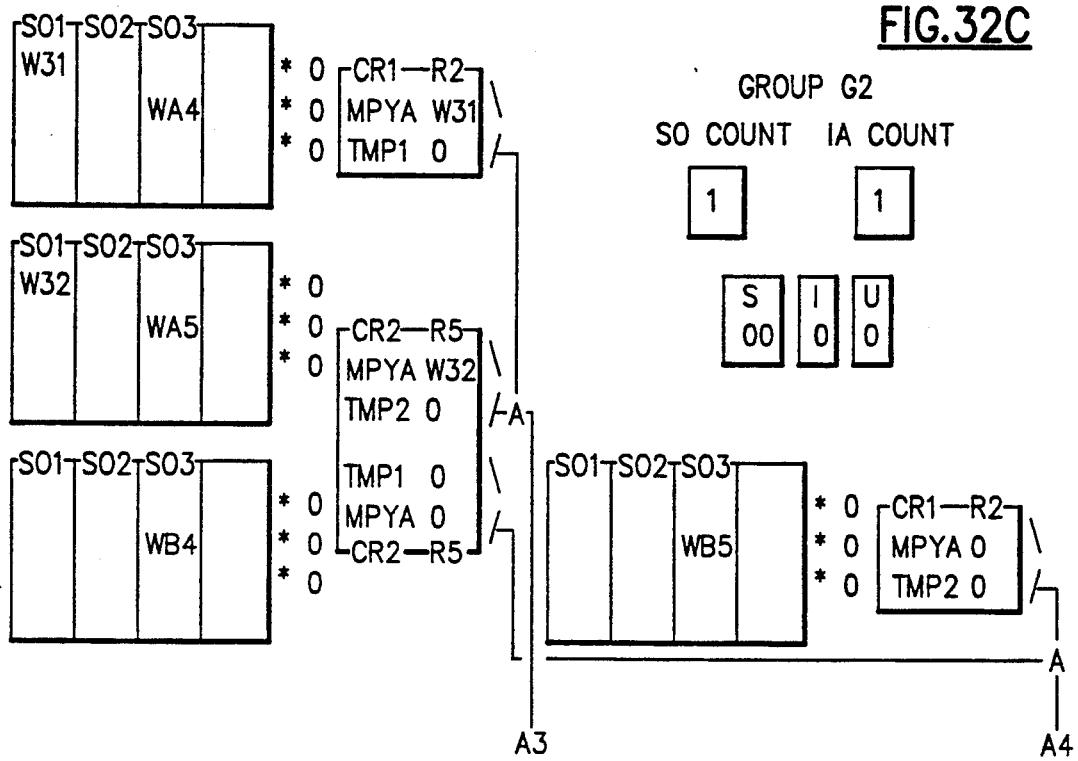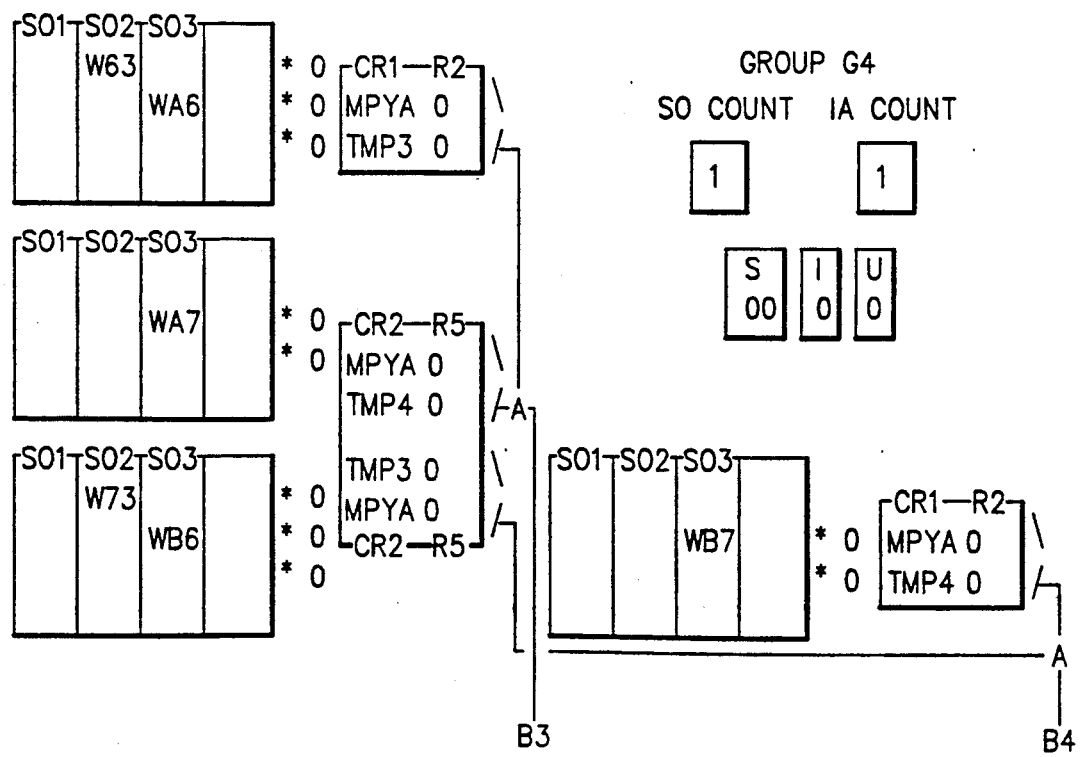

FIRST LAYER EXECUTION
FIG. 33A
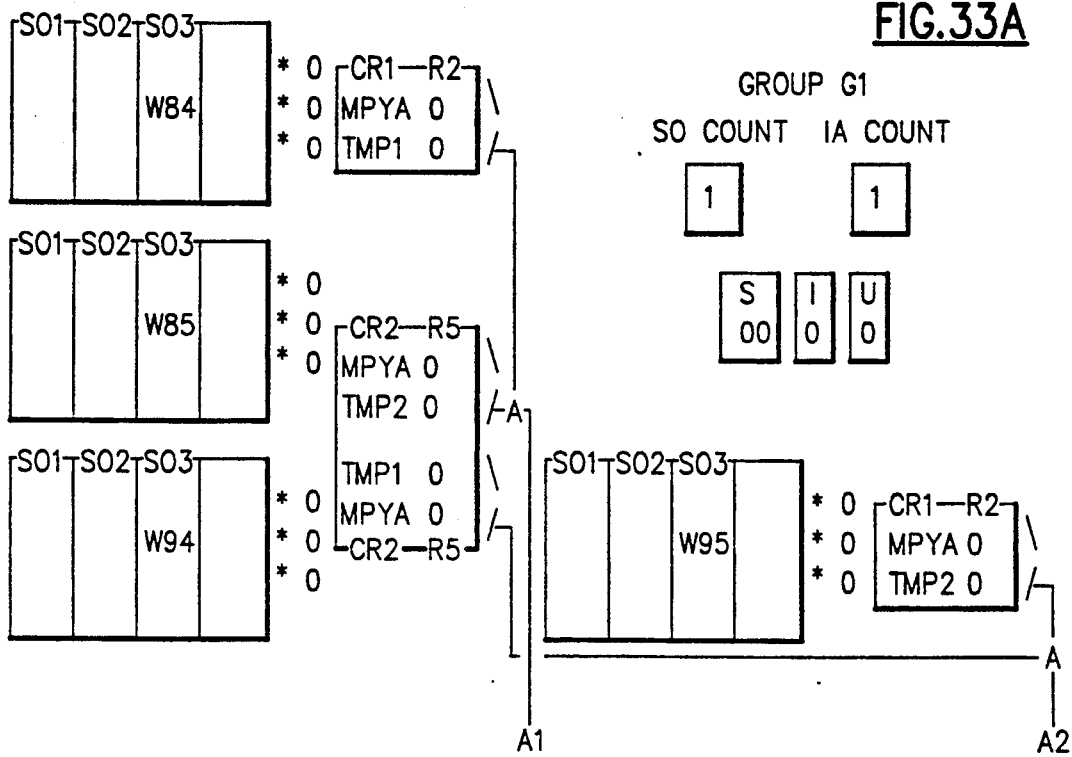
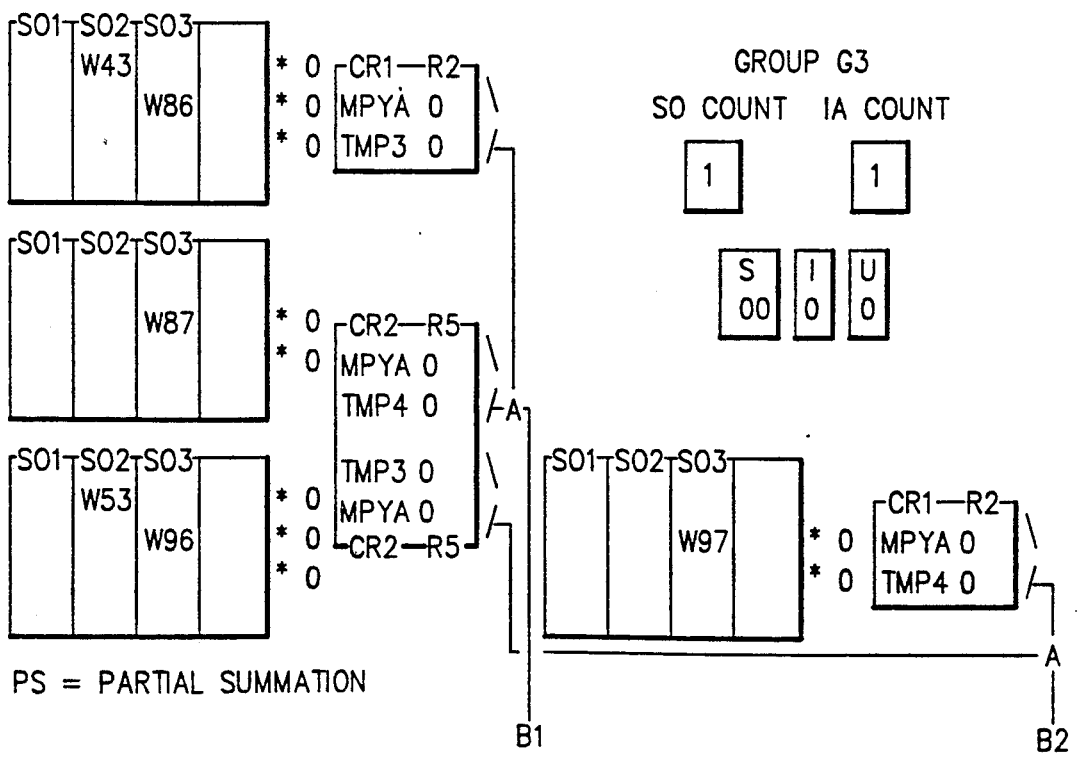
PS = PARTIAL SUMMATION

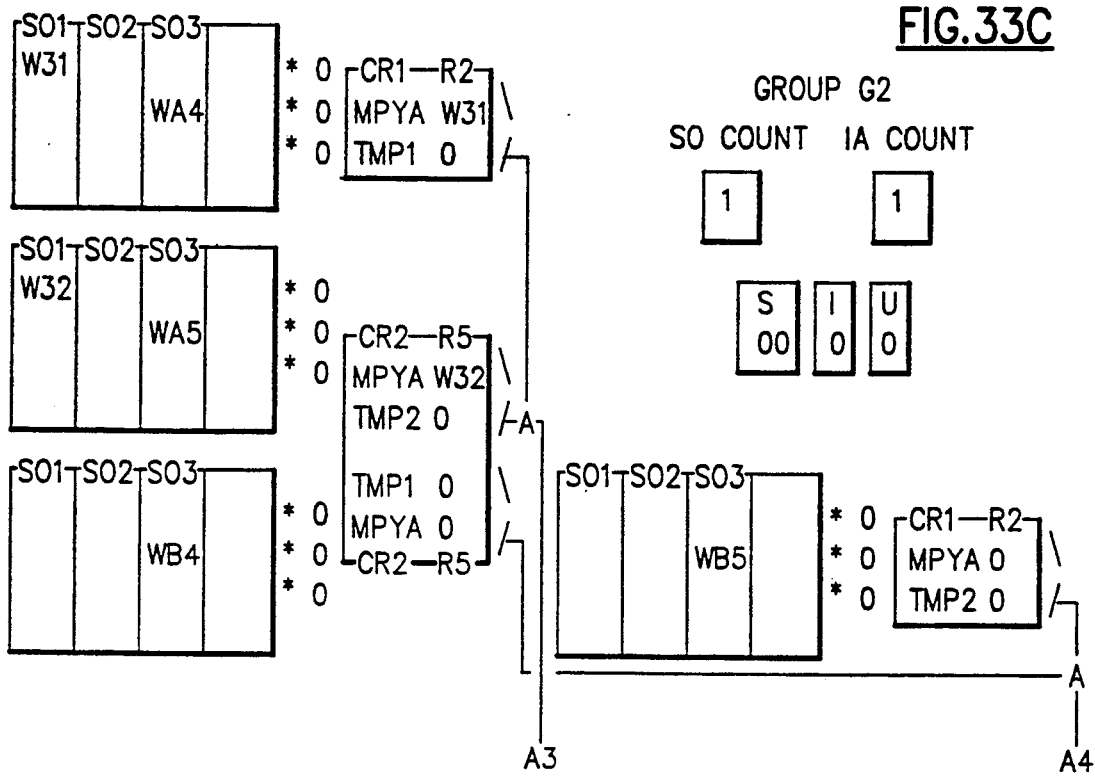
FIG.33C
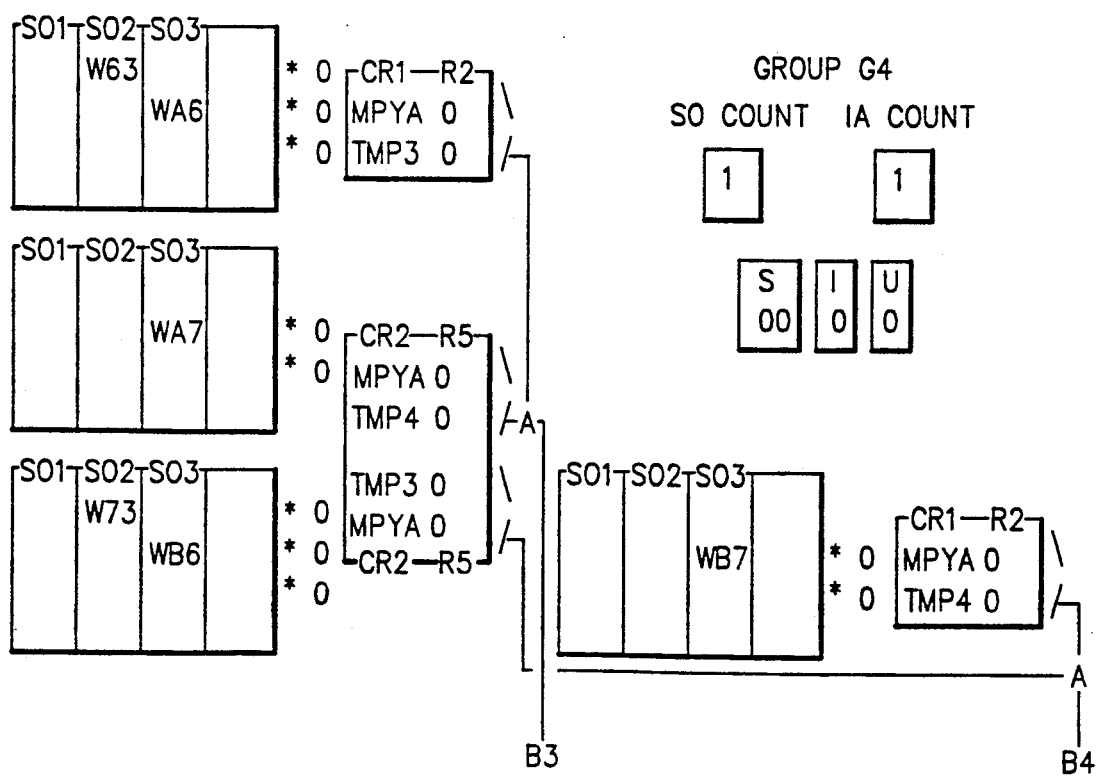

SET SO COUNT TO ADVANCE MODE AND REVERSE COMMUNICATE Y1' AND Y2'
FIG.34A
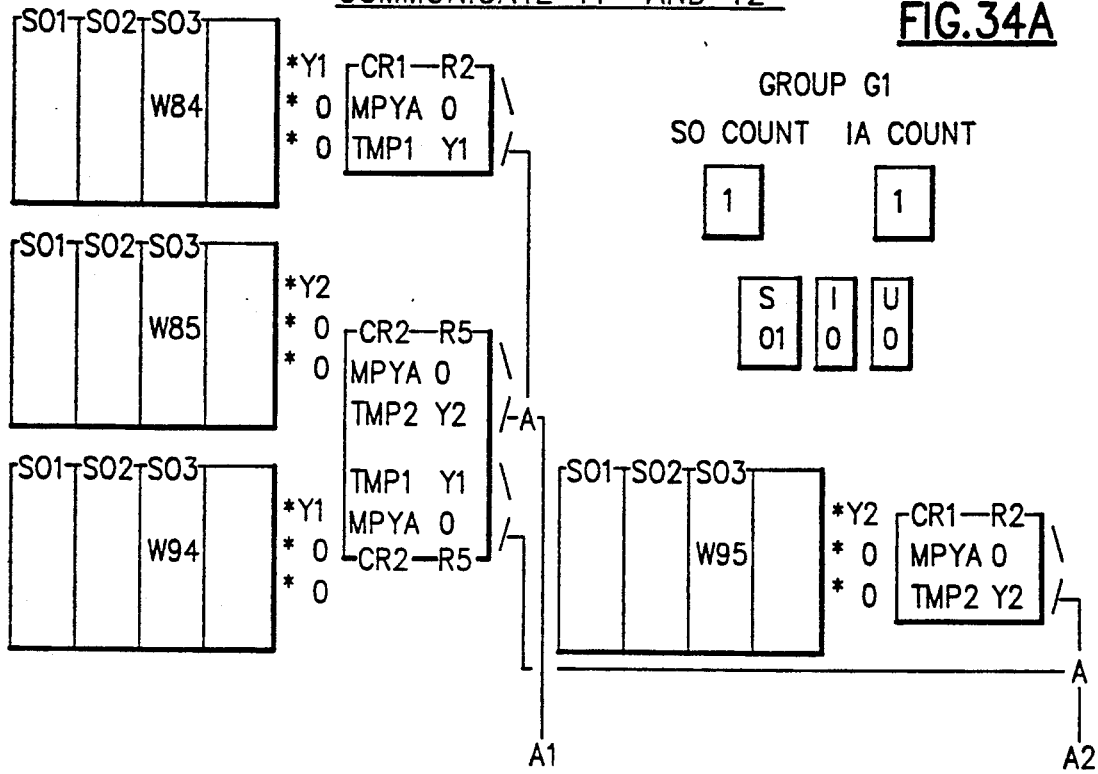
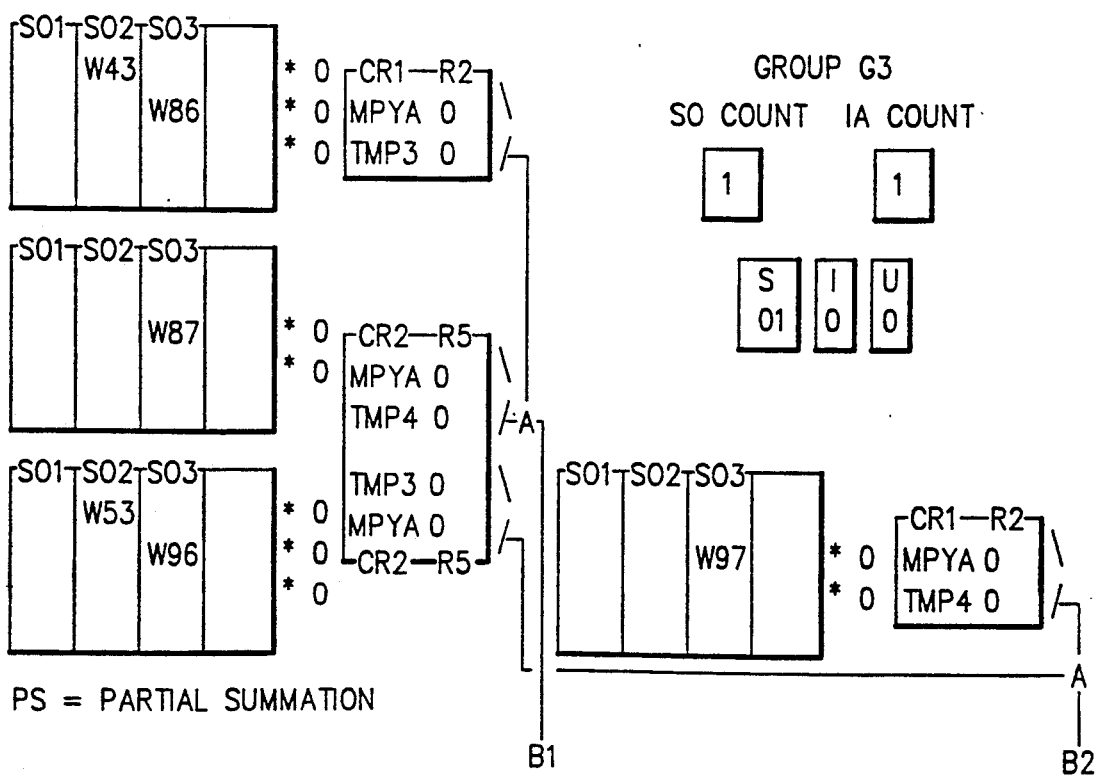
PS = PARTIAL SUMMATION

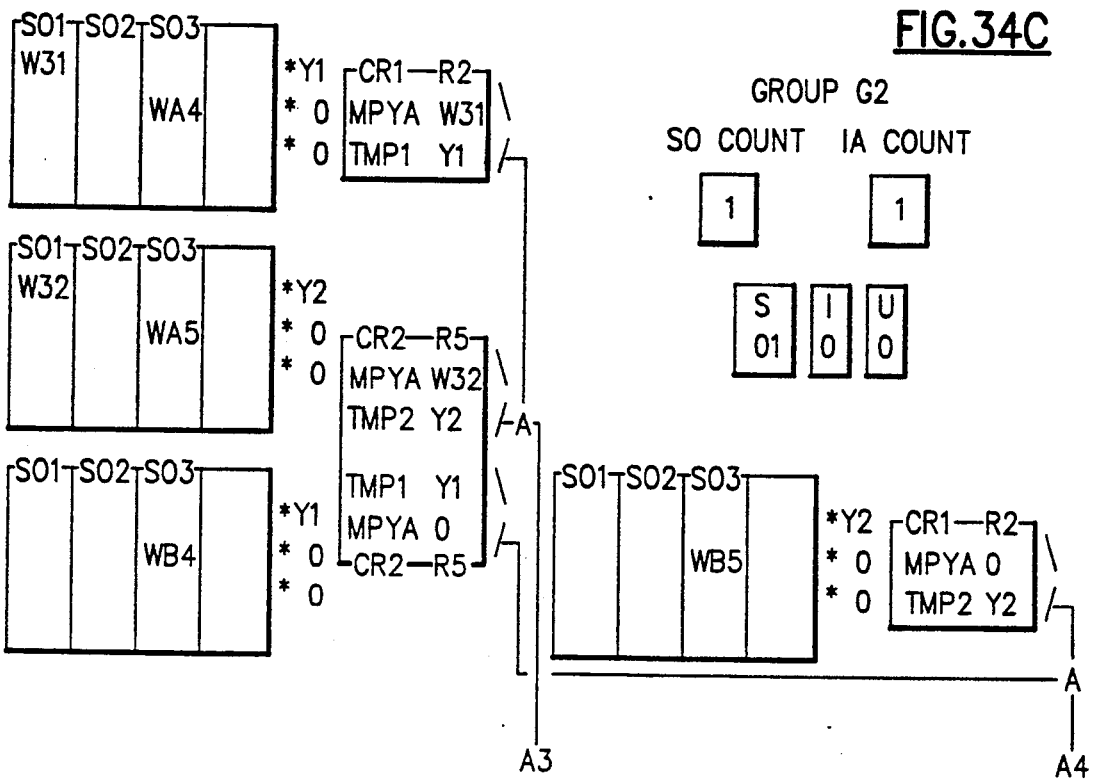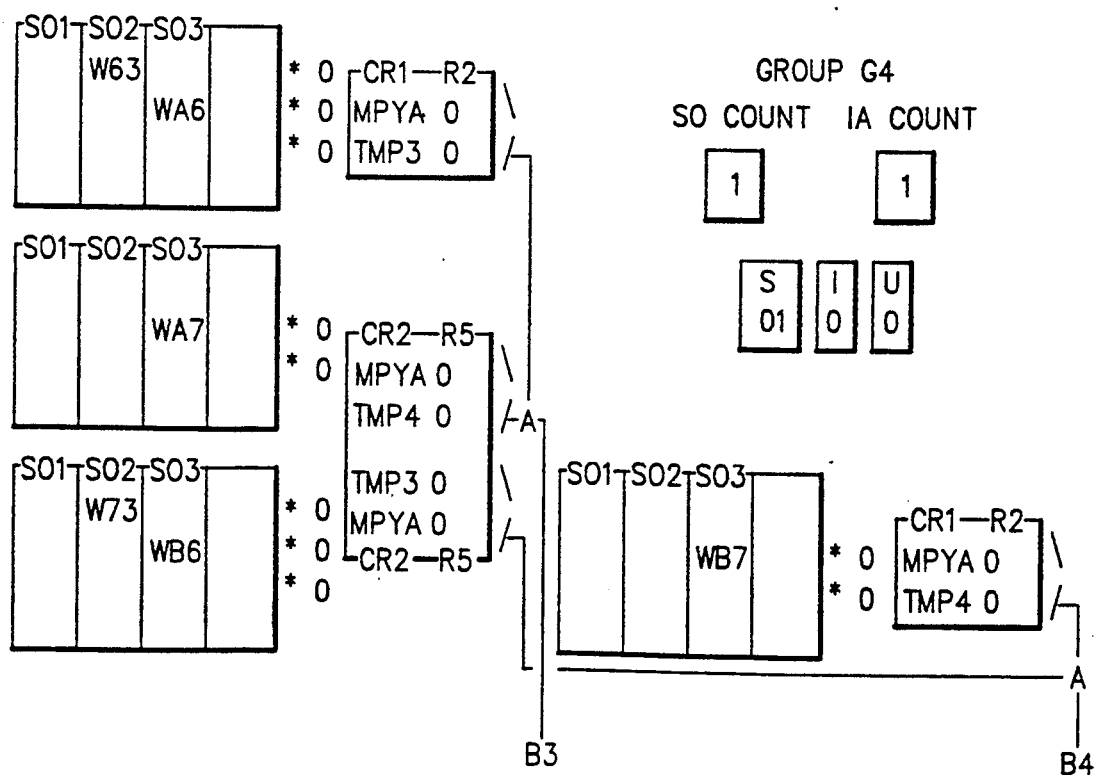
FIG.34C

SECOND LAYER EXECUTION
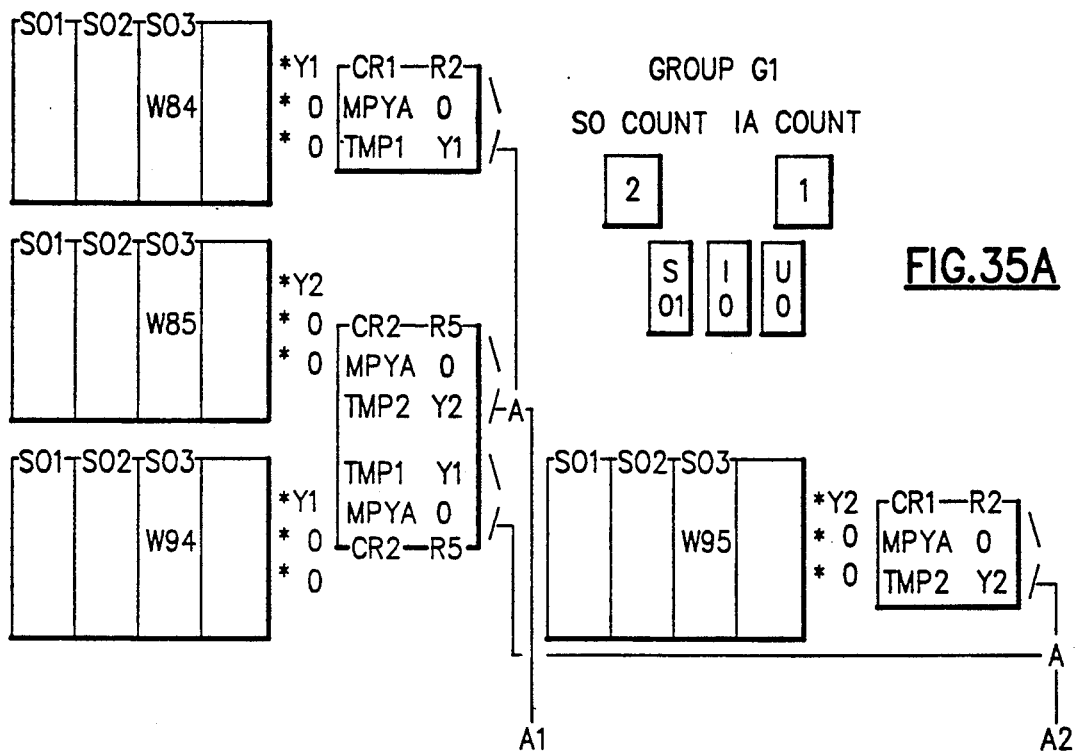
FIG.35A
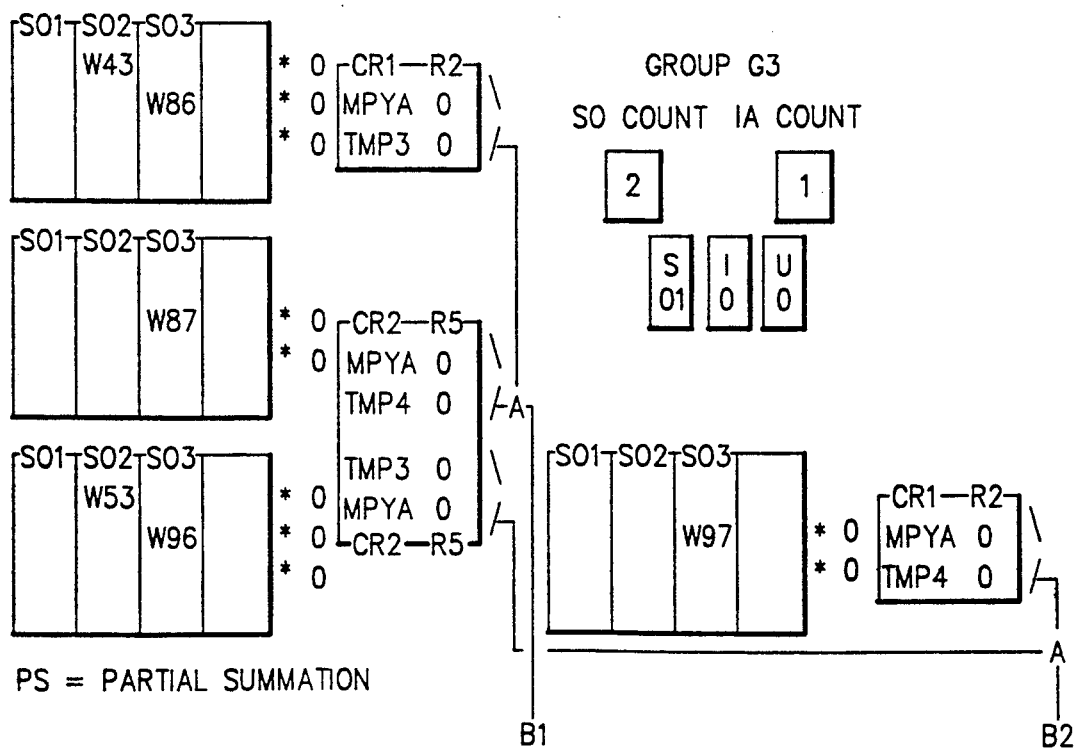
PS = PARTIAL SUMMATION

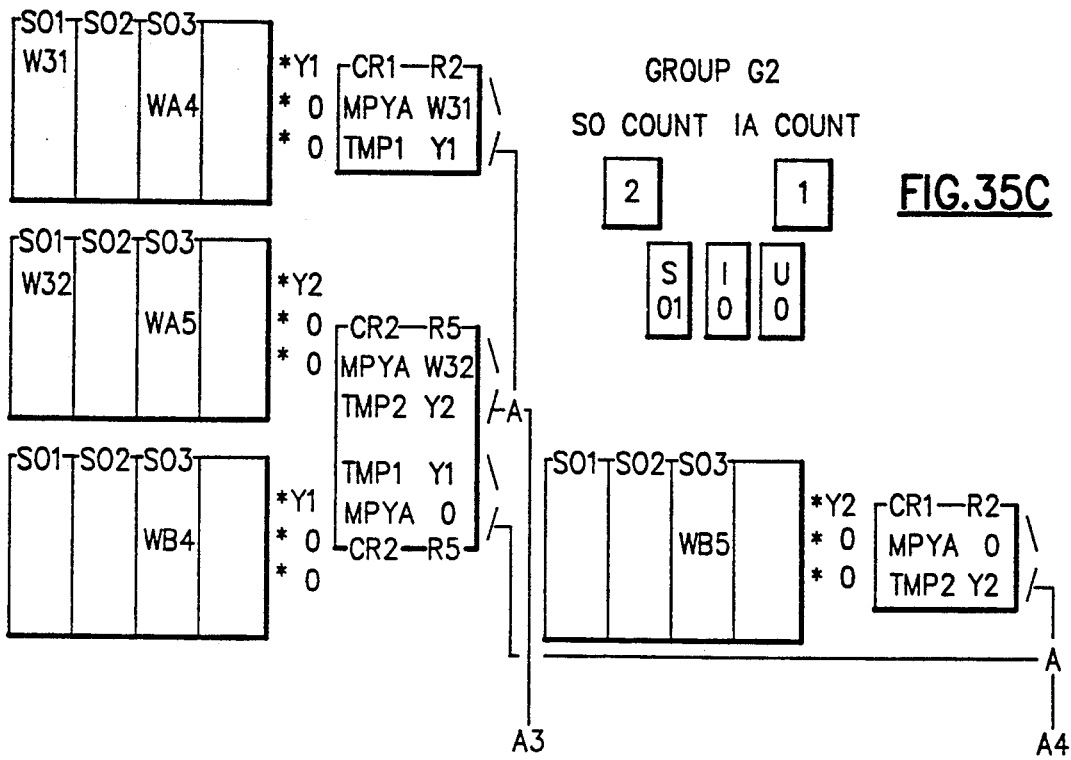
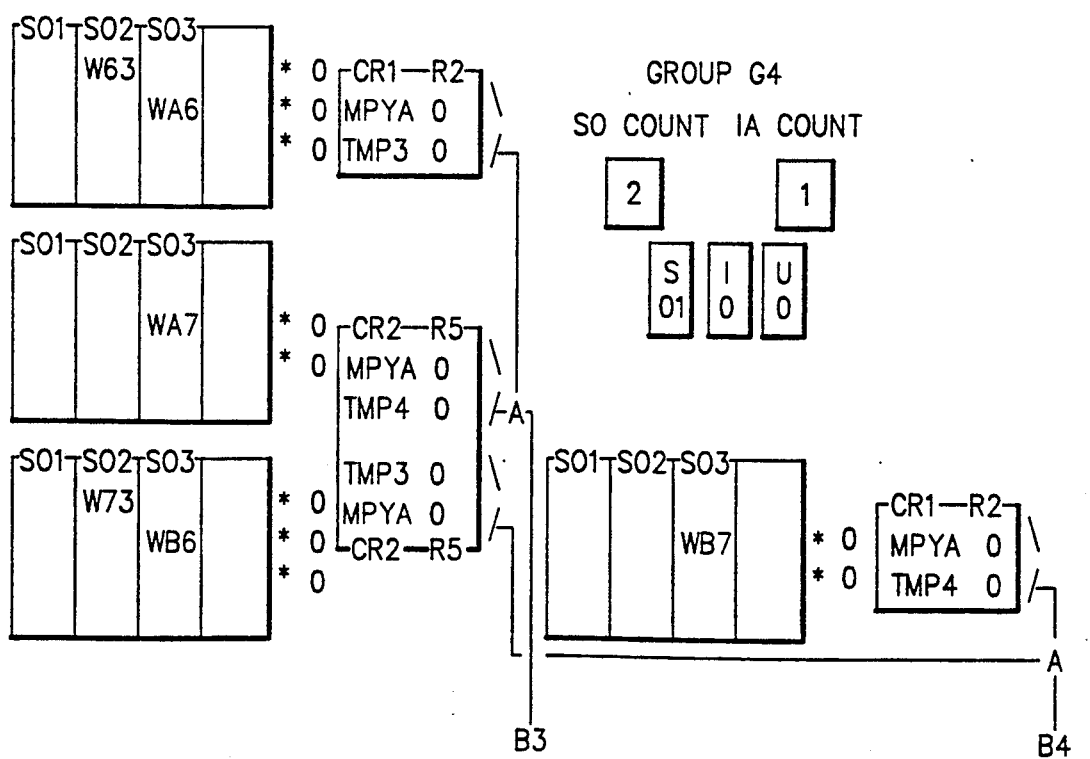
FIG.35C

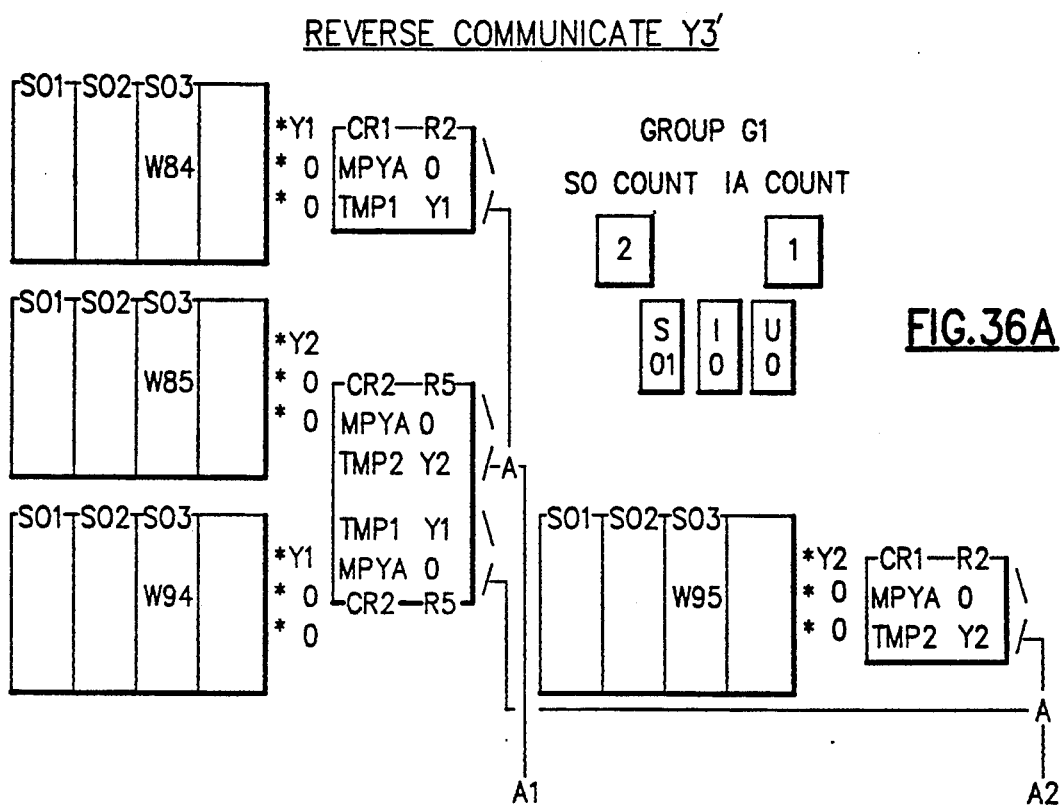
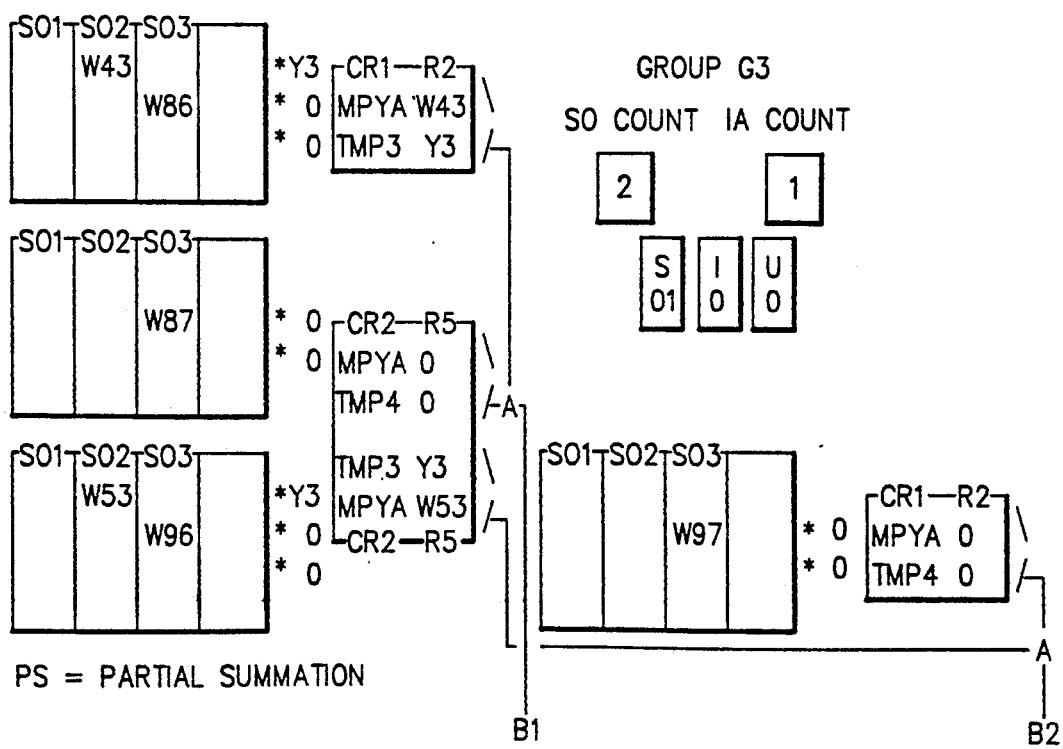
FIG. 36A

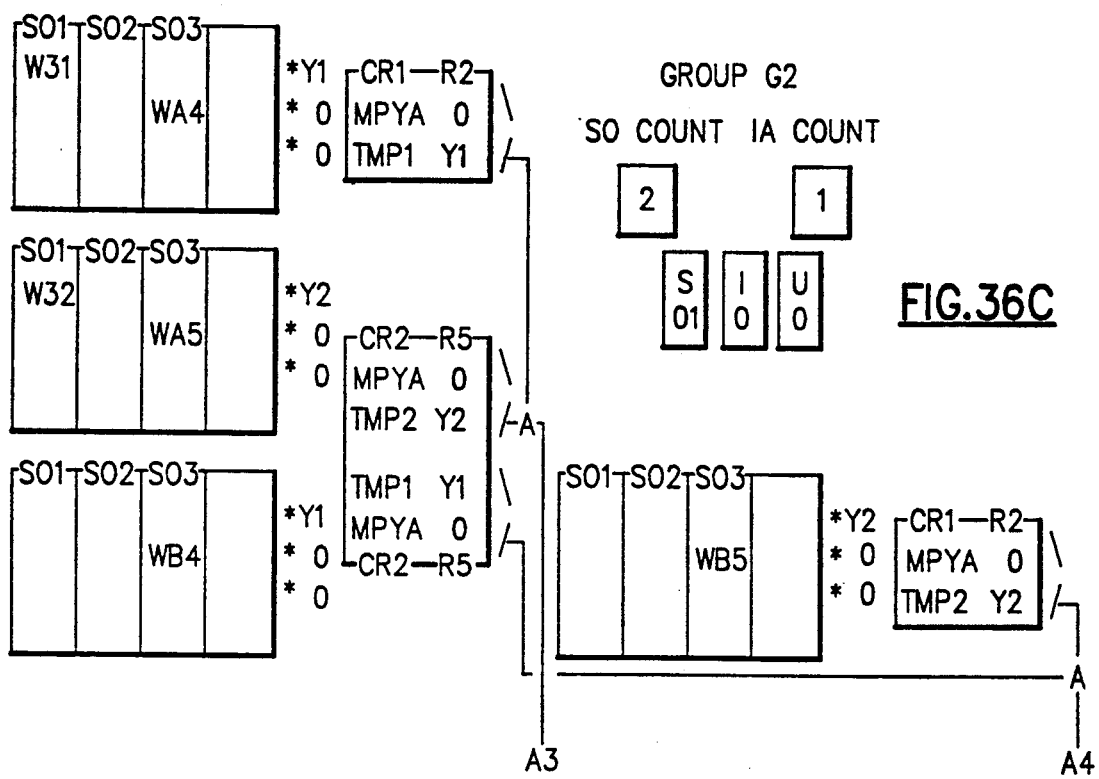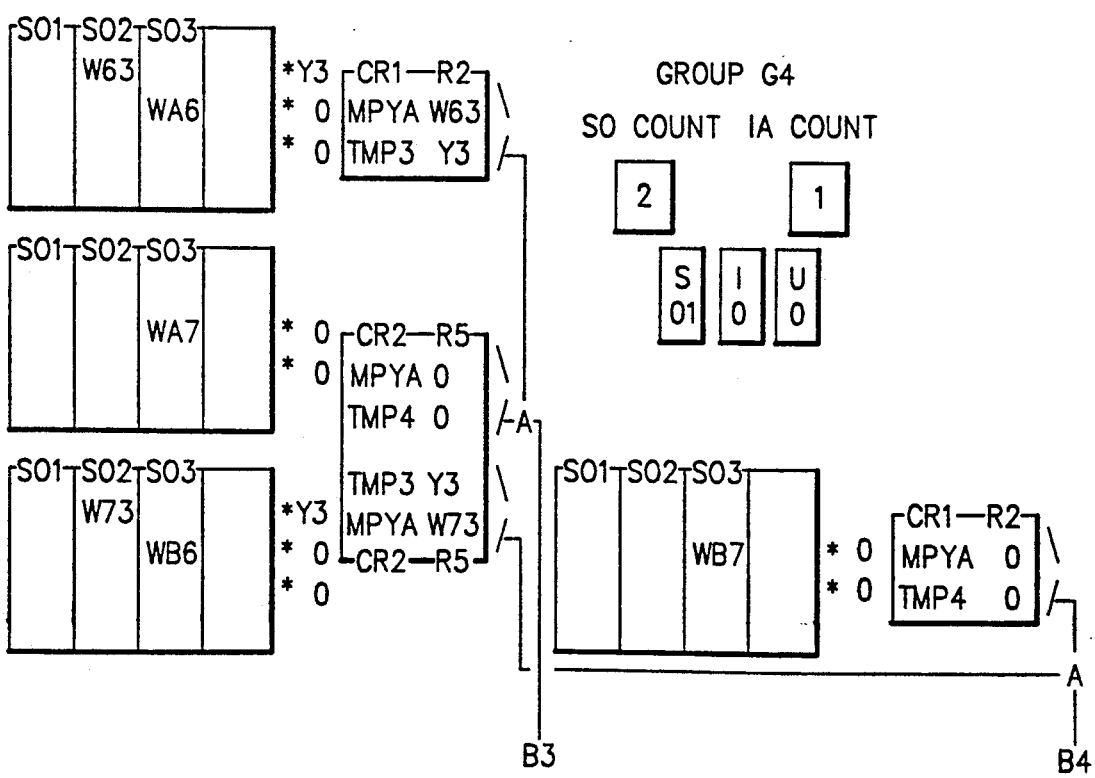

THIRD LAYER EXECUTION
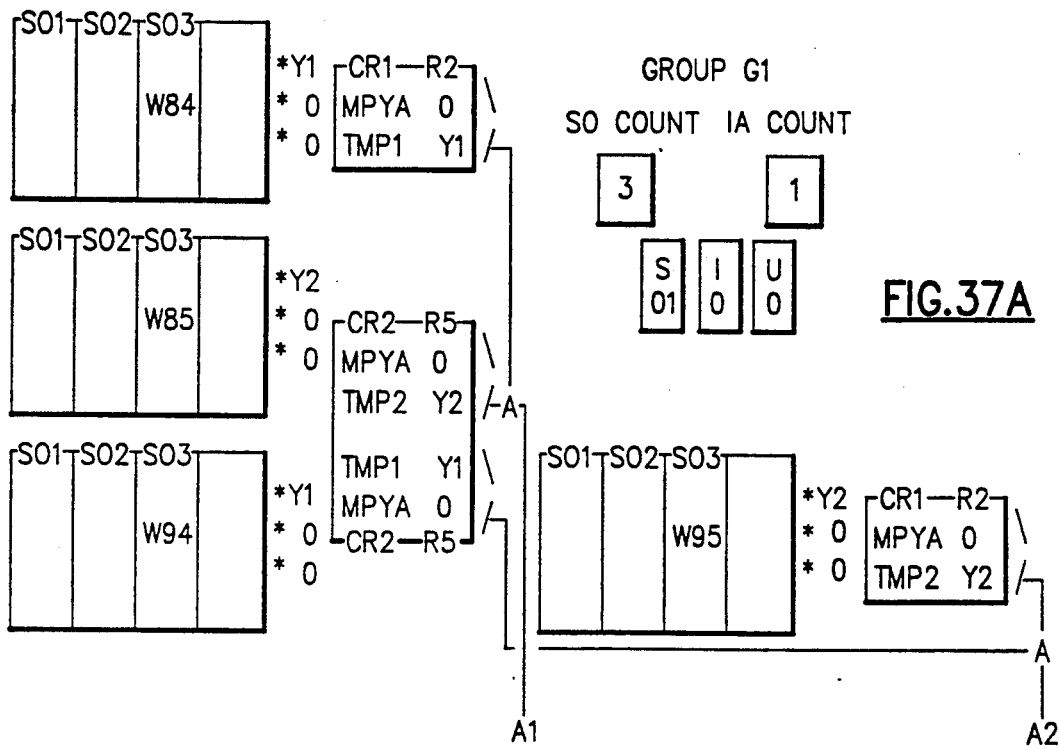
FIG.37A
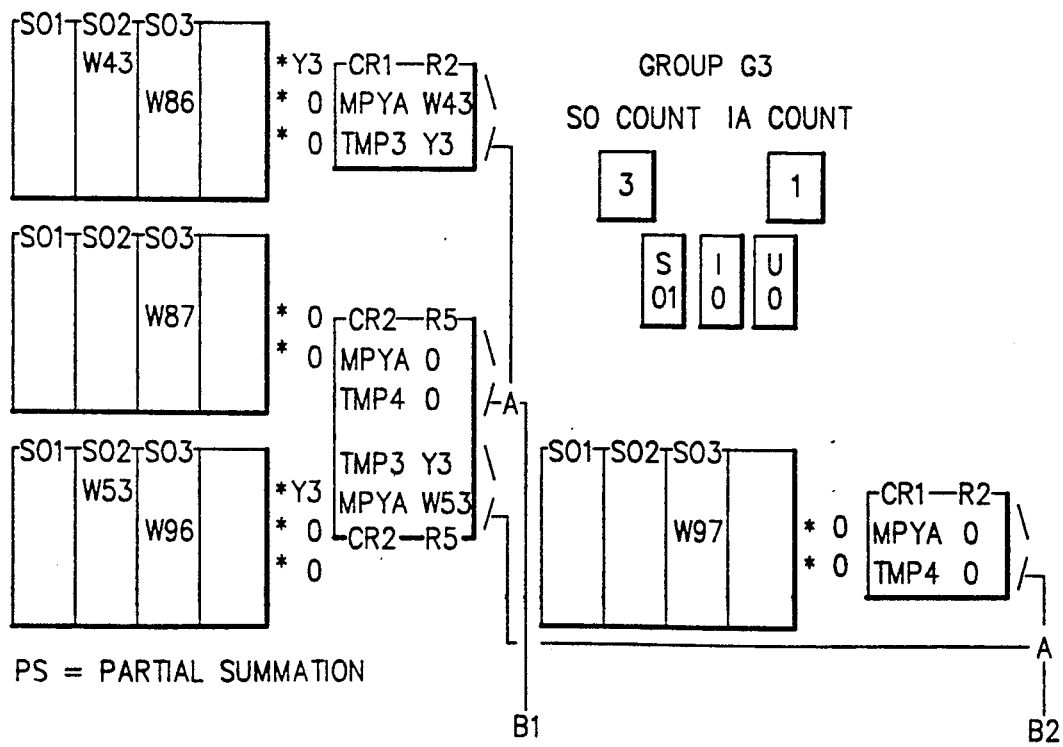
PS = PARTIAL SUMMATION

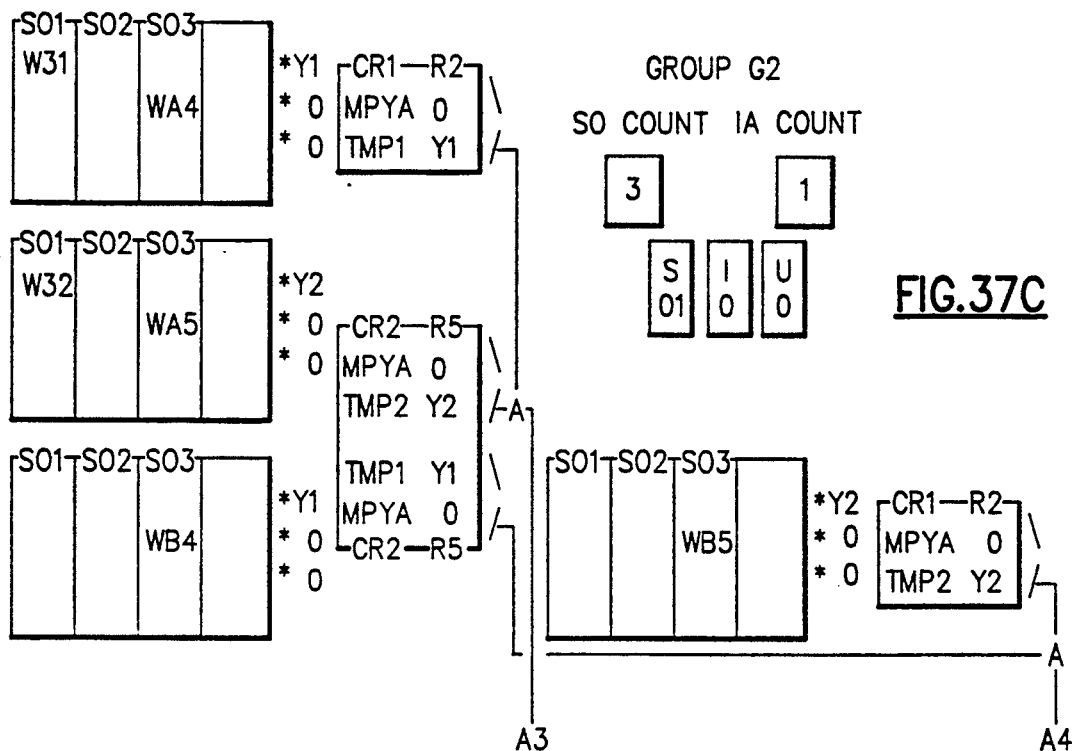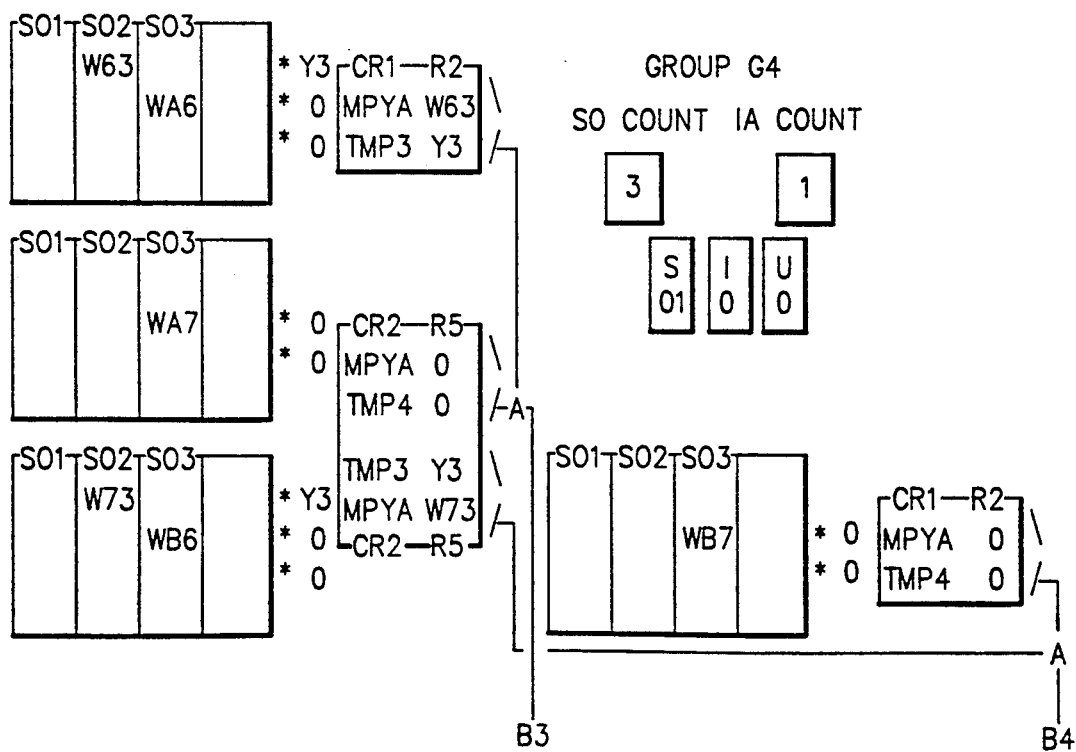
FIG.37C

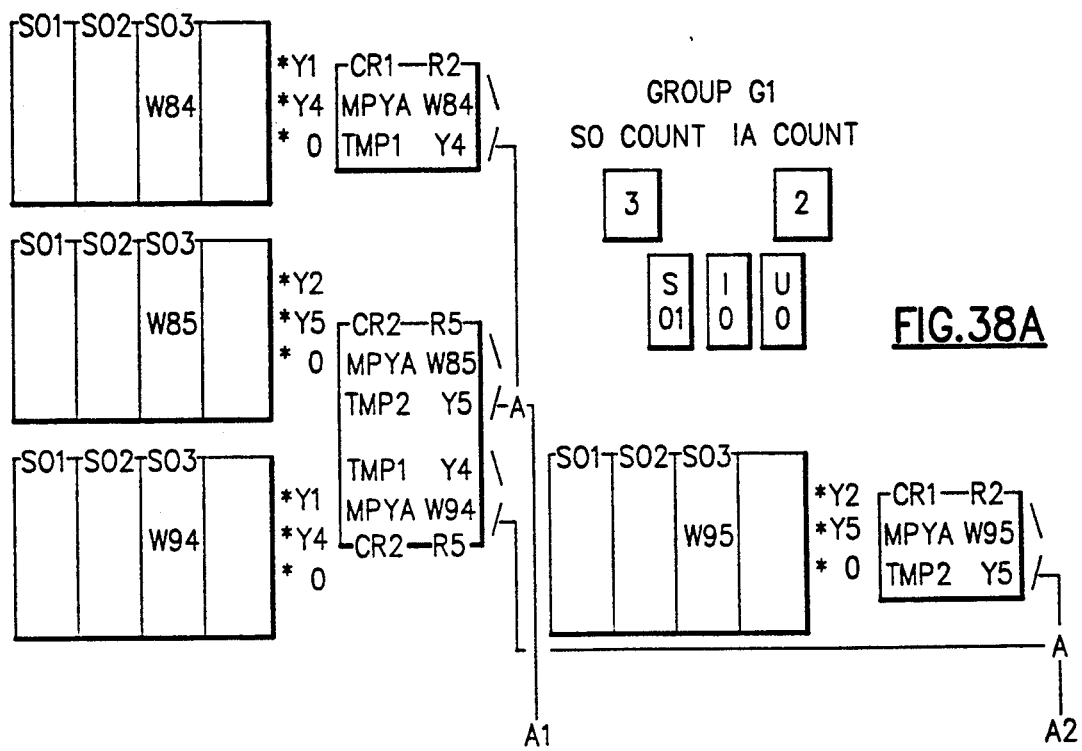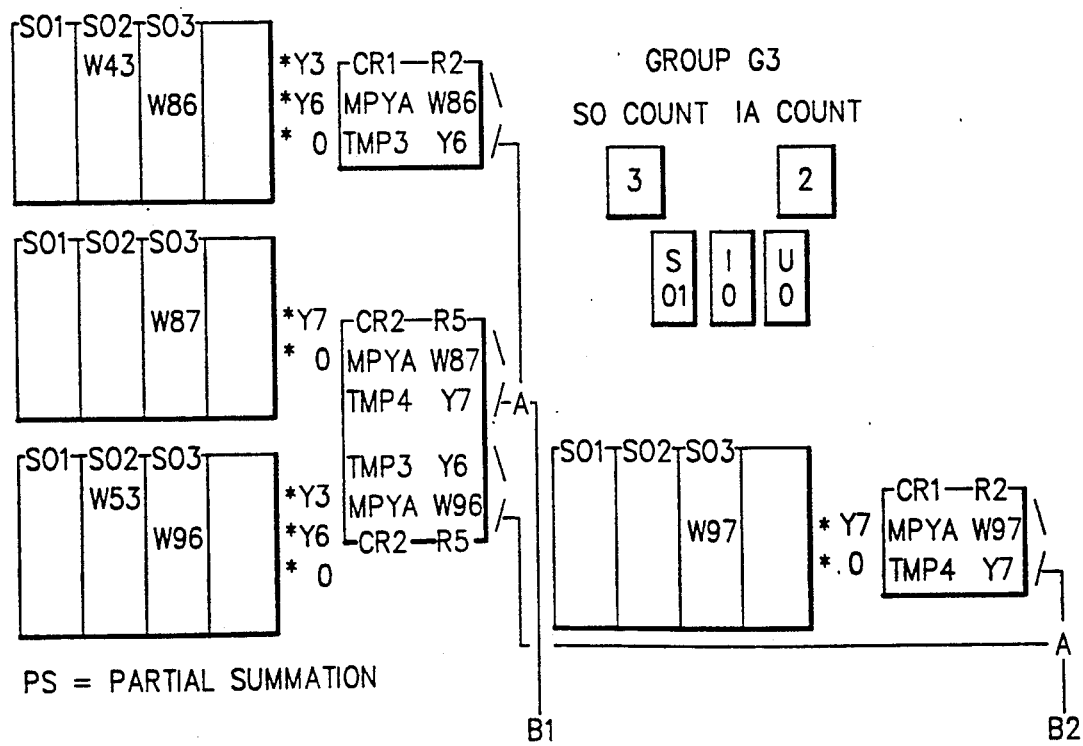
FIG. 38A

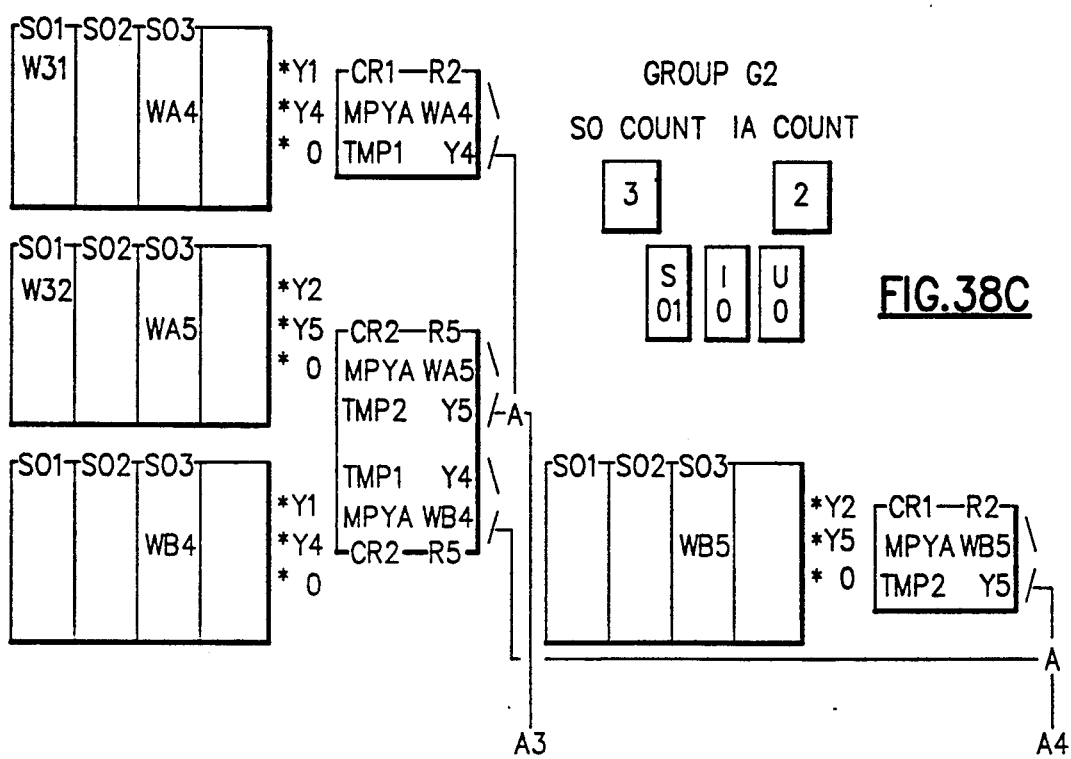
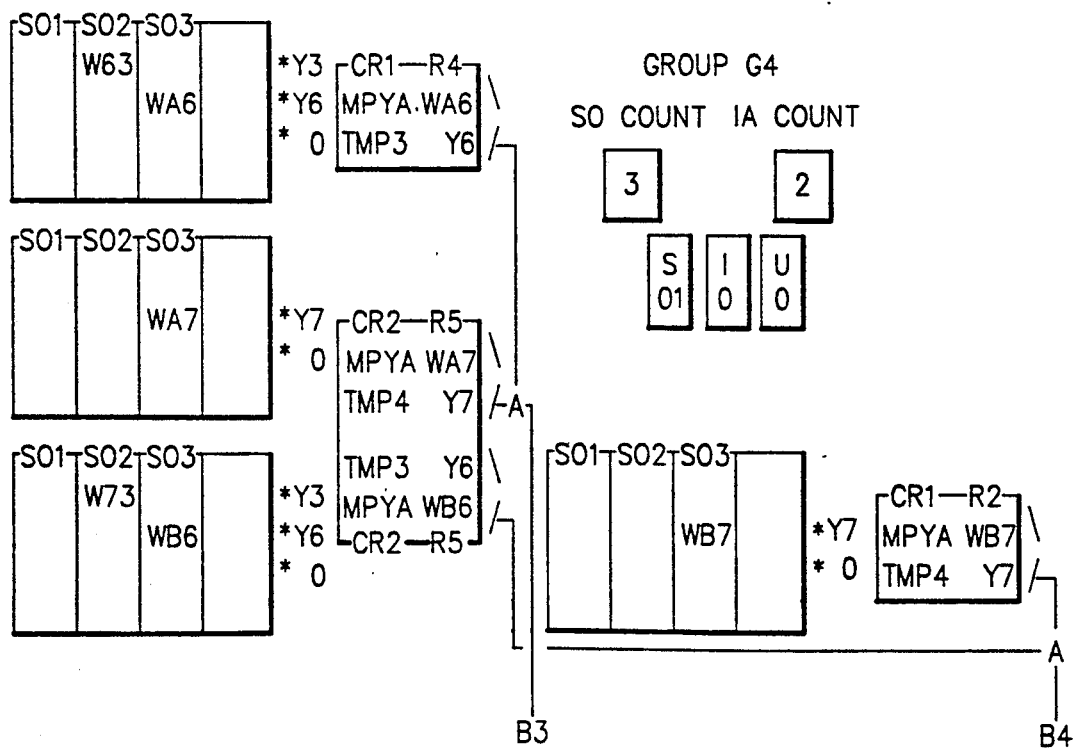
FIG.38C

FOURTH LAYER EXECUTION
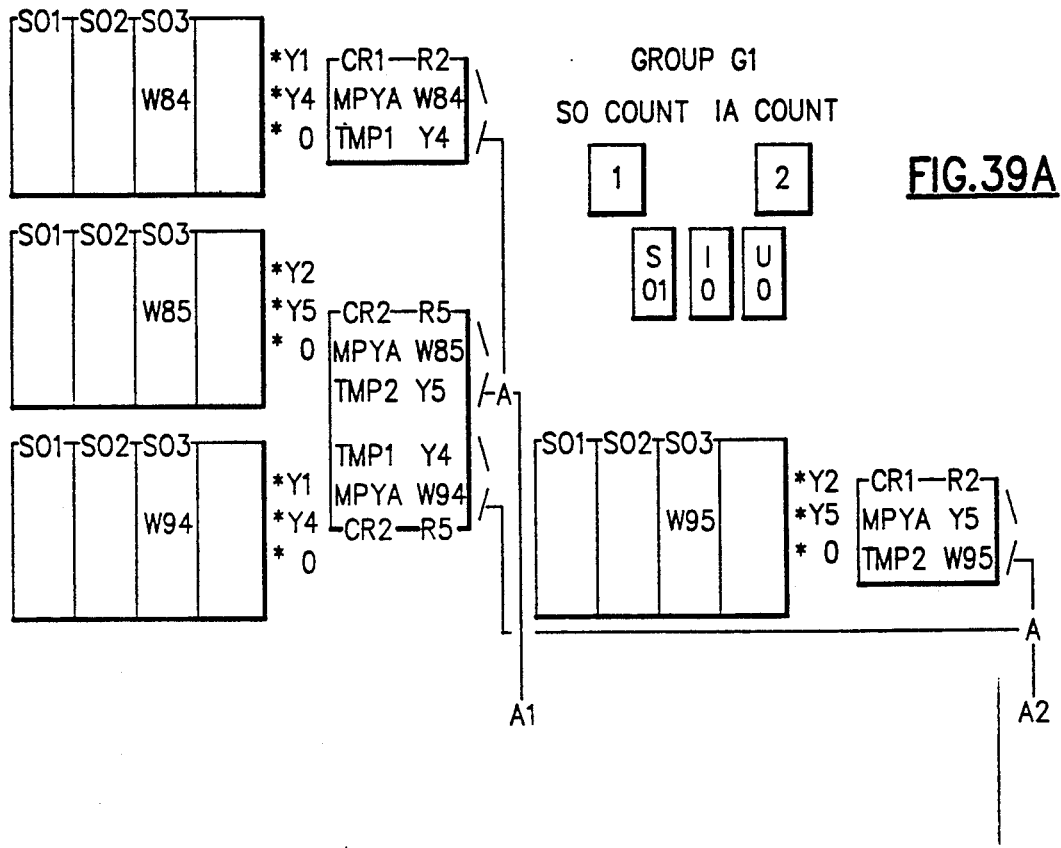
FIG.39A
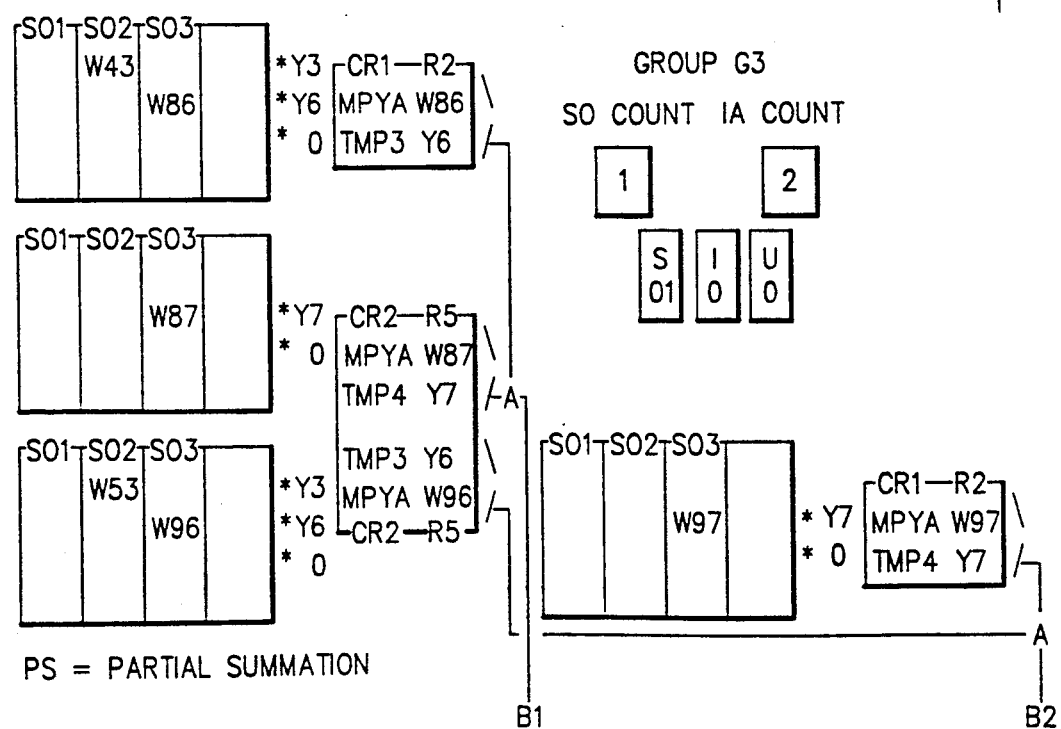
PS = PARTIAL SUMMATION

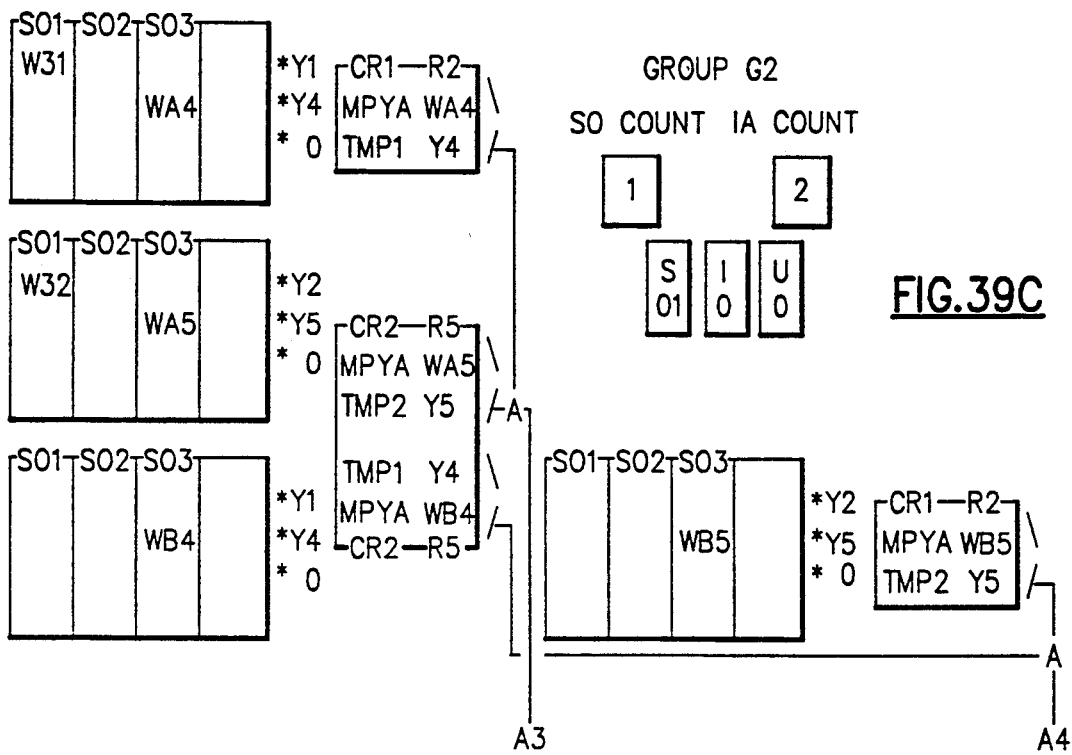
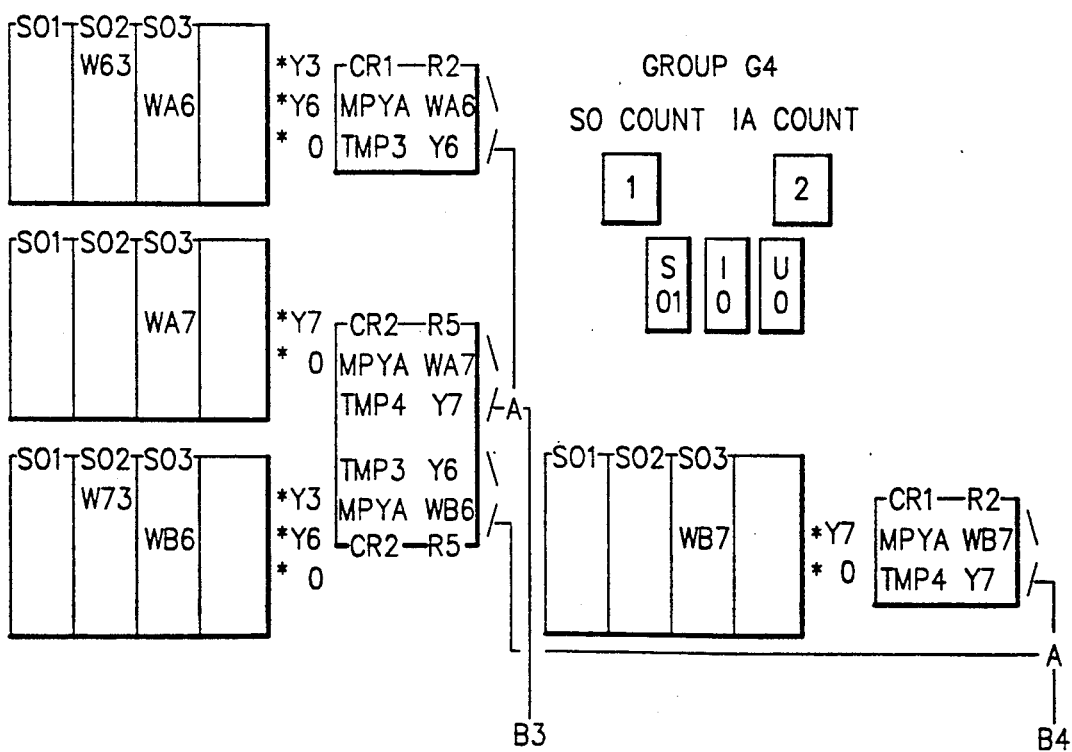
FIG.39C

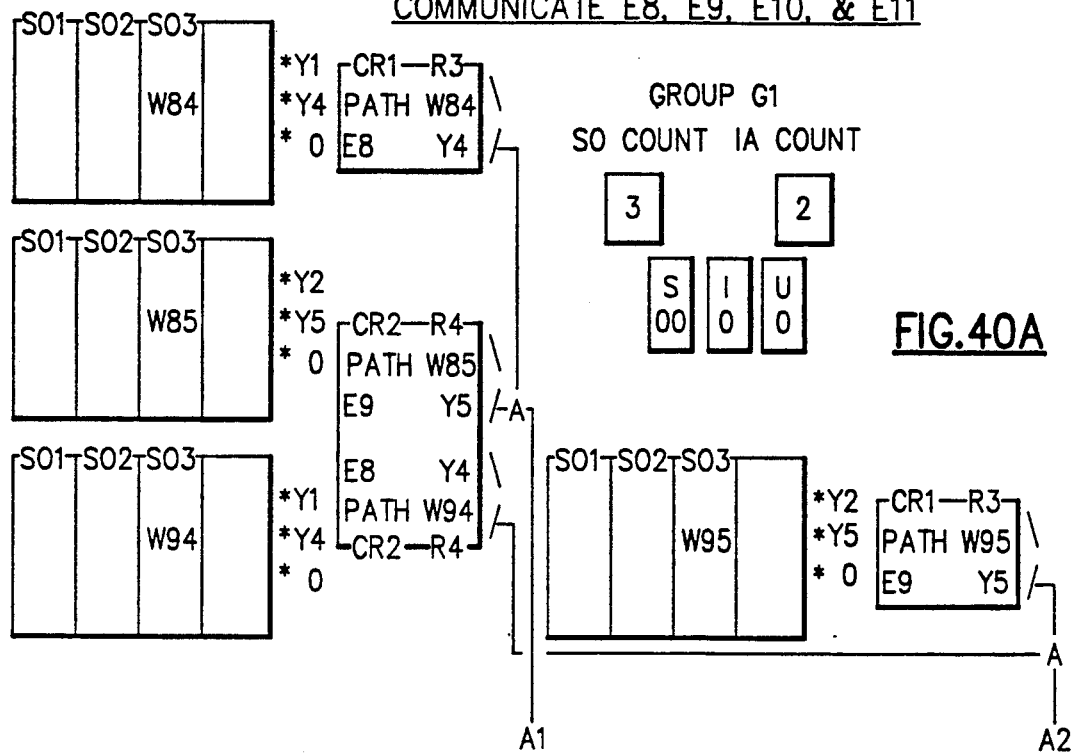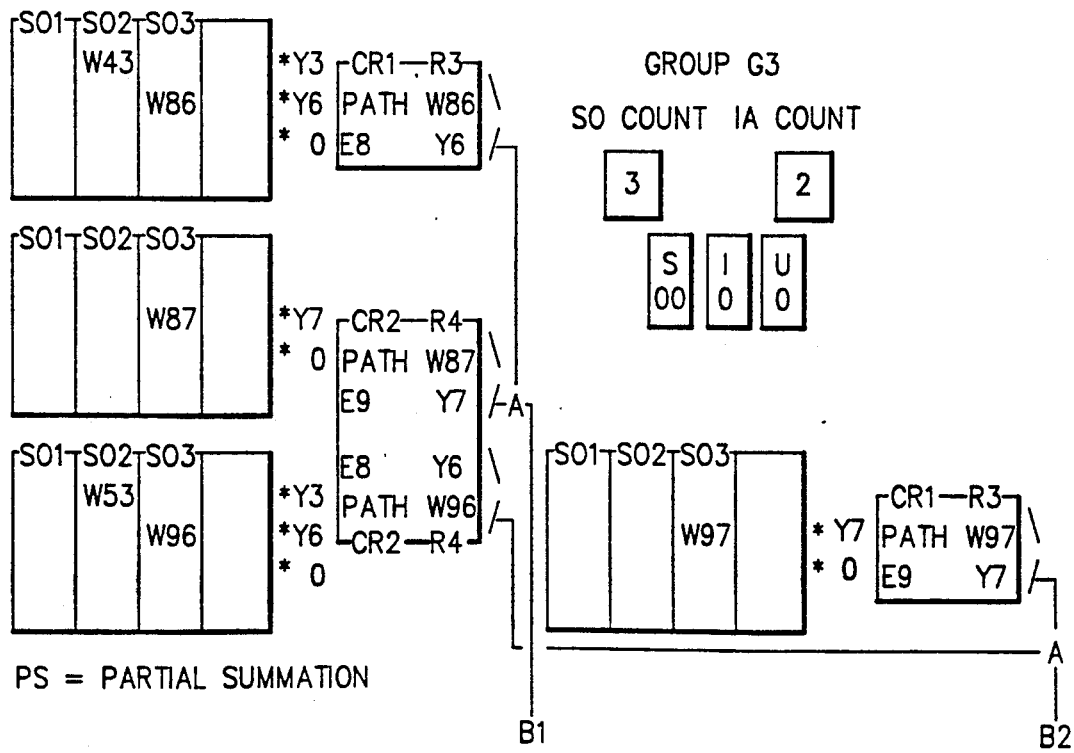
FIG. 40A
LEARNING MODE – LOAD S & I BITS AND SO & IA COUNTS, CHANGE DATA PATH TO R4, AND REVERSE COMMUNICATE E8, E9, E10, & E11
PS = PARTIAL SUMMATION

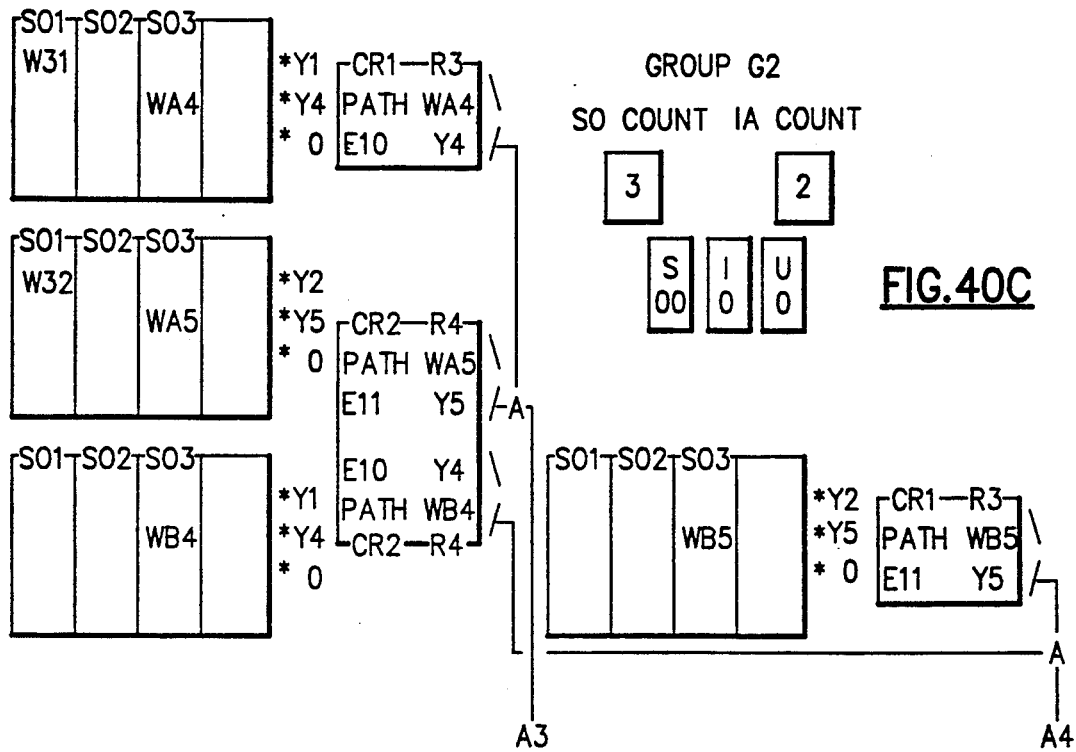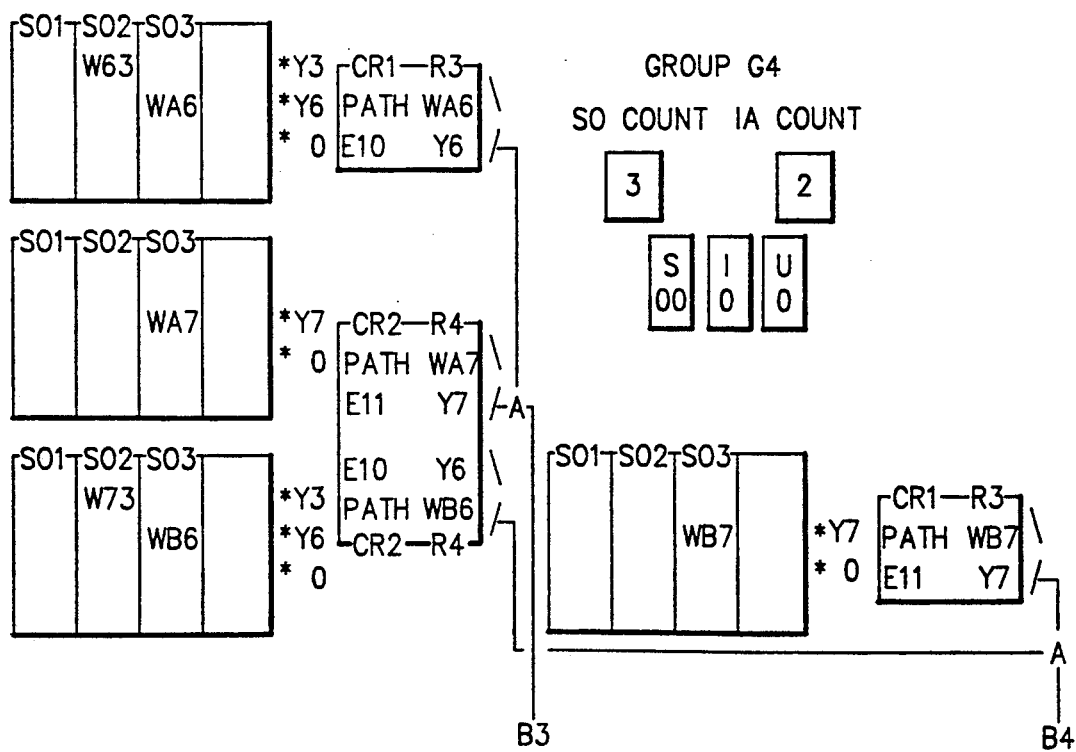
FIG. 40C

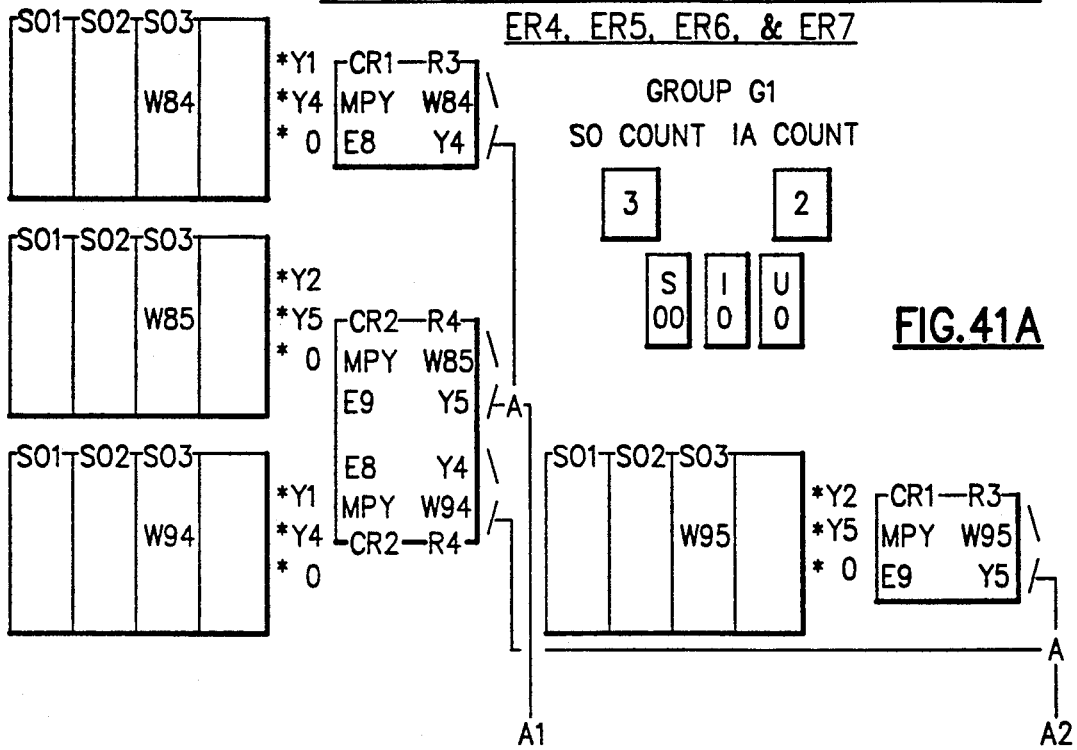
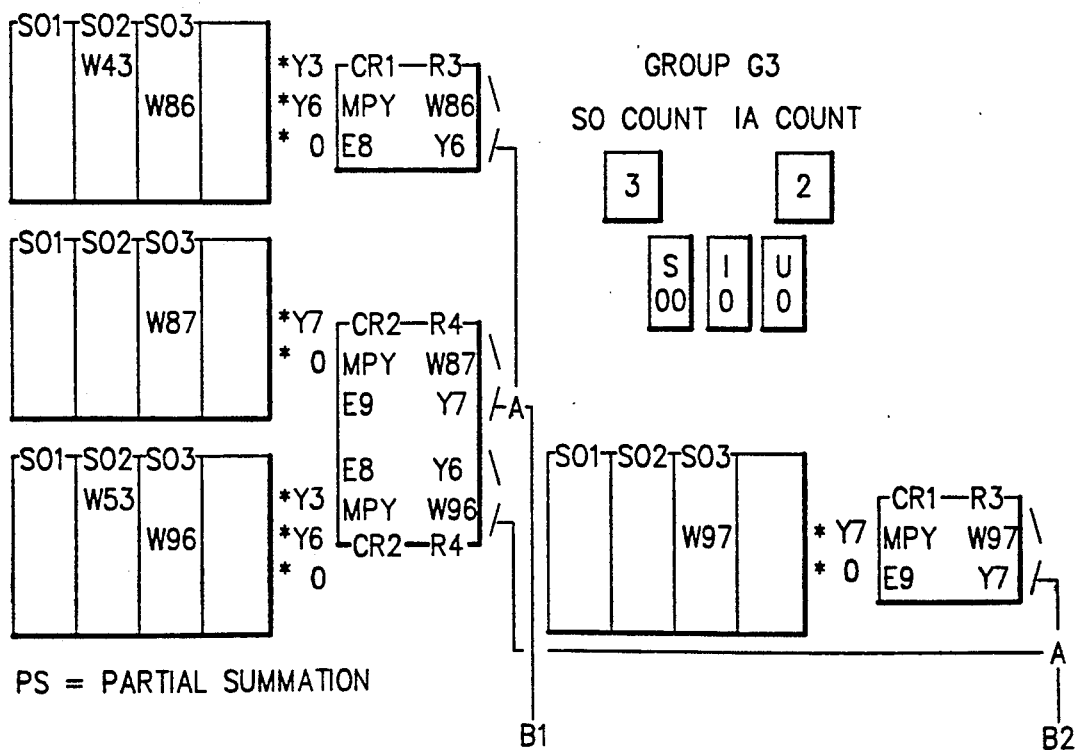
FIG.41A

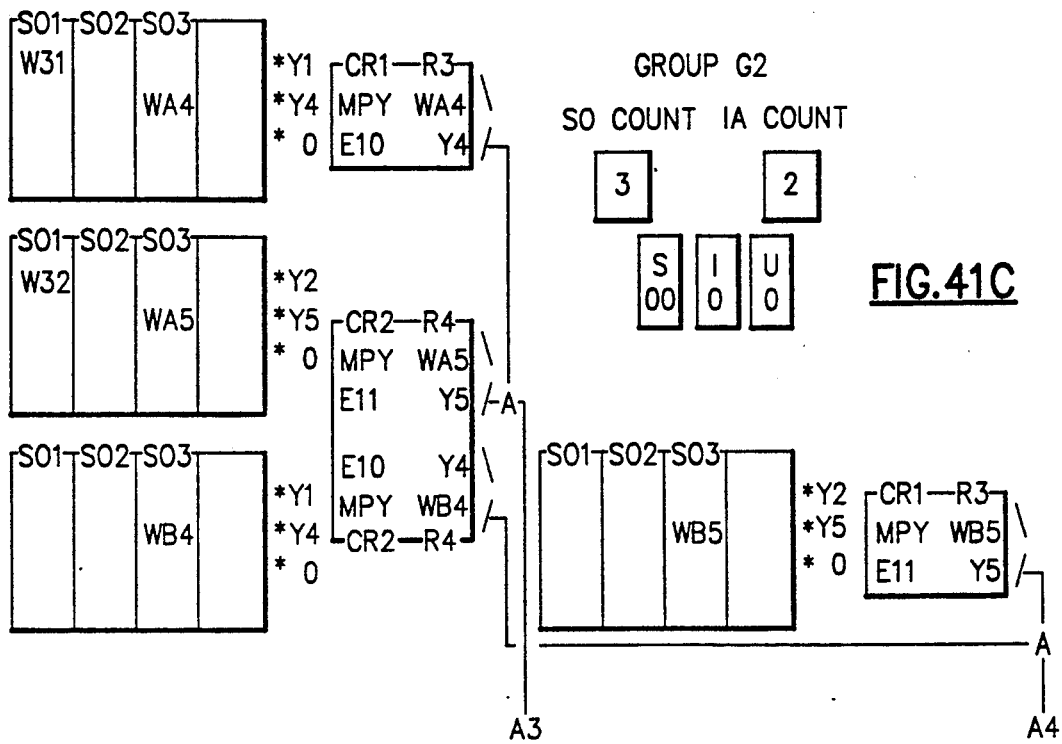
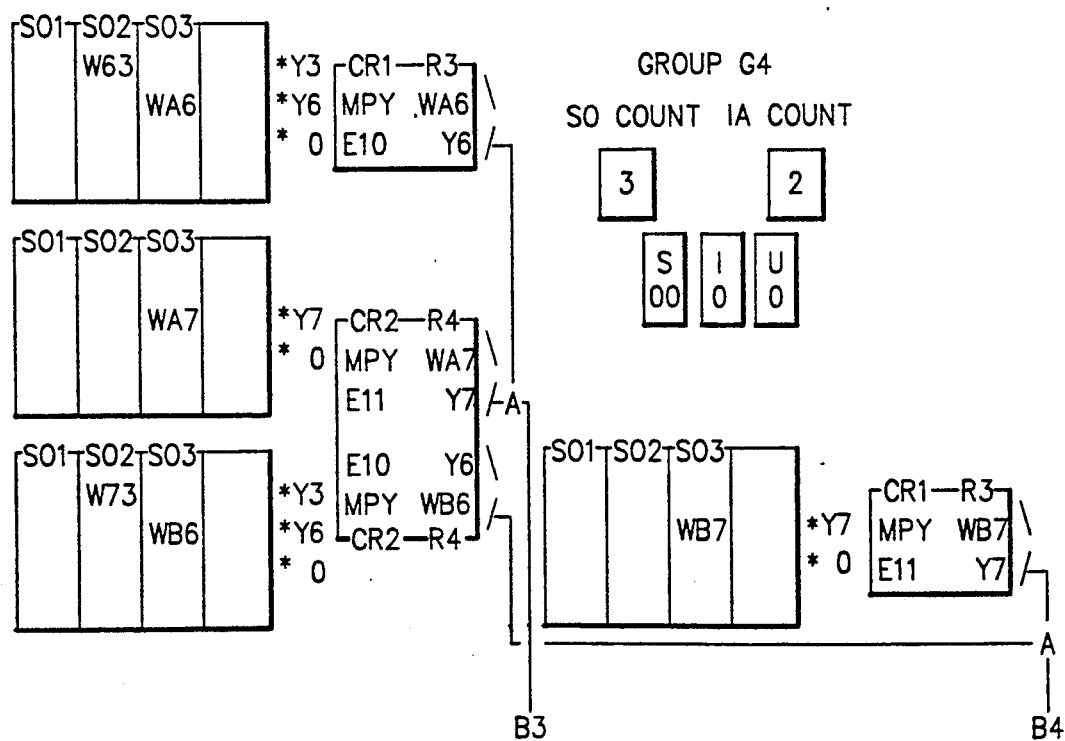
FIG.41C

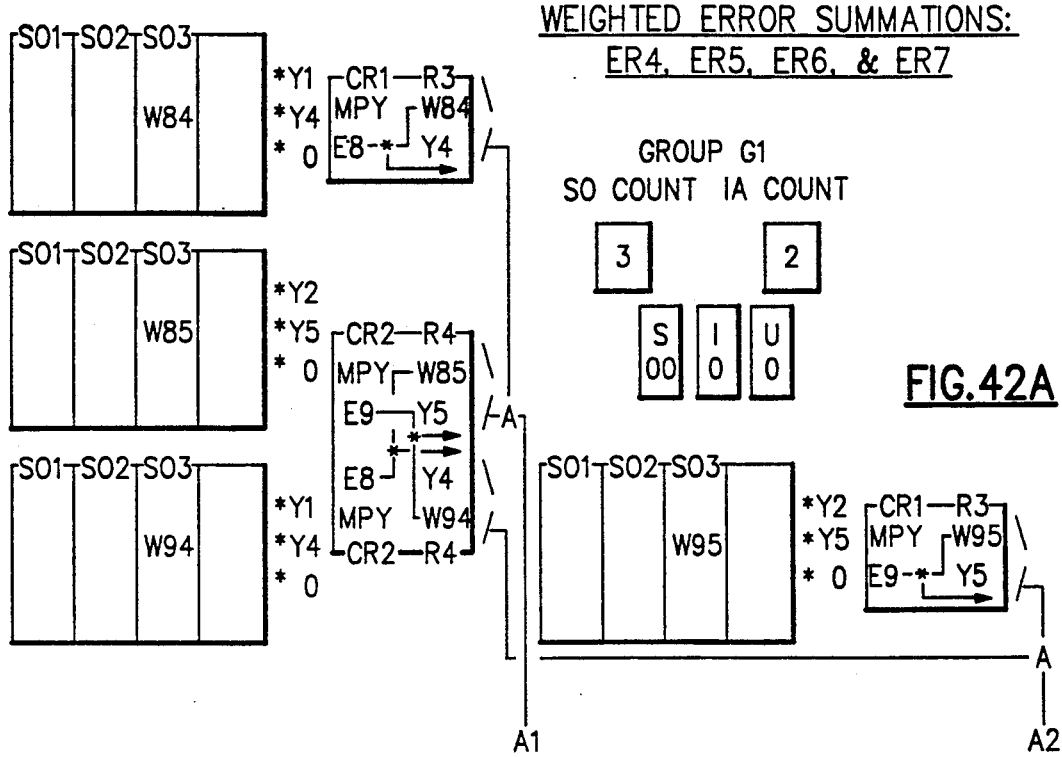
FIG. 42A
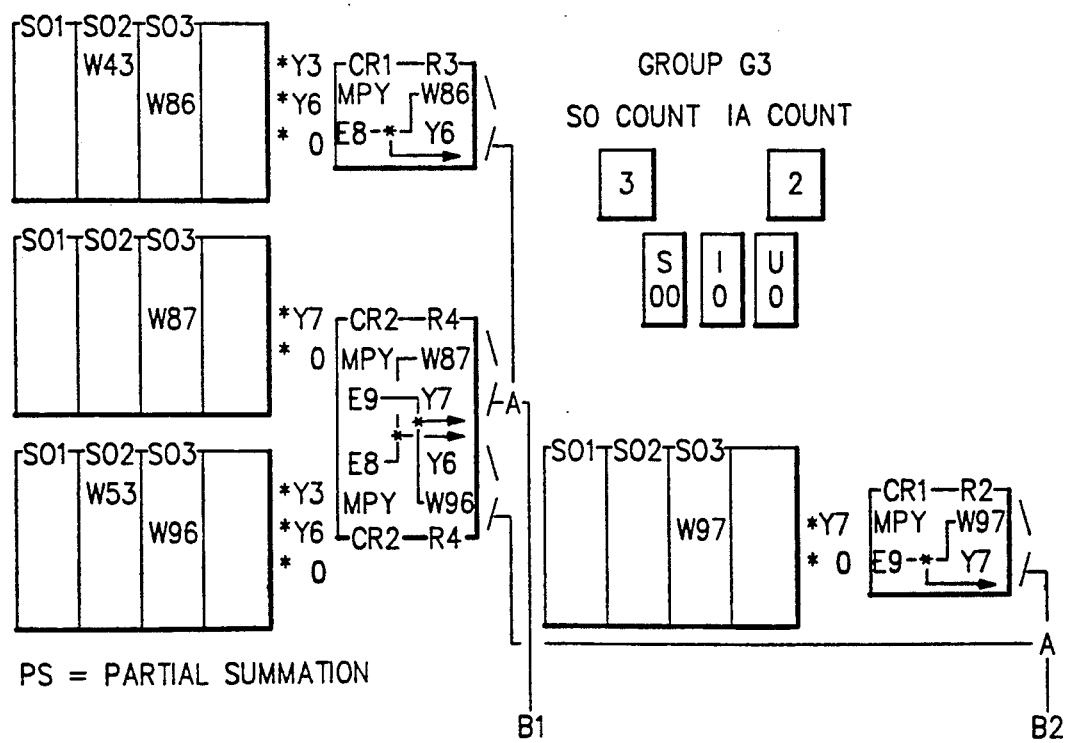
PS = PARTIAL SUMMATION

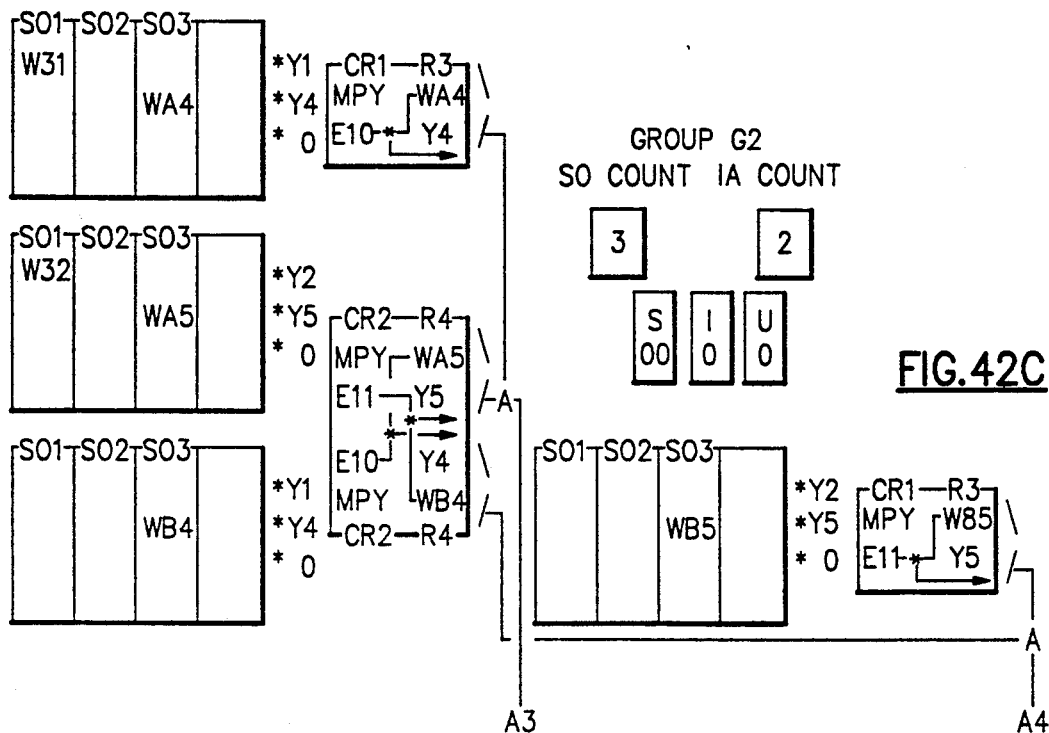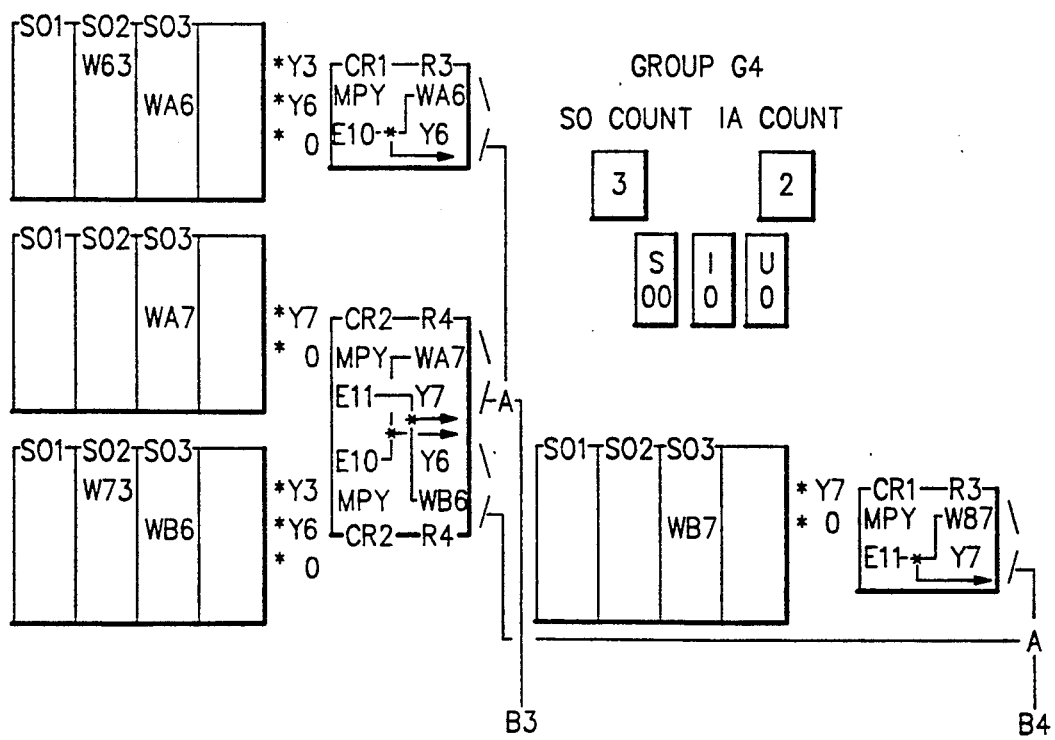
FIG. 42C

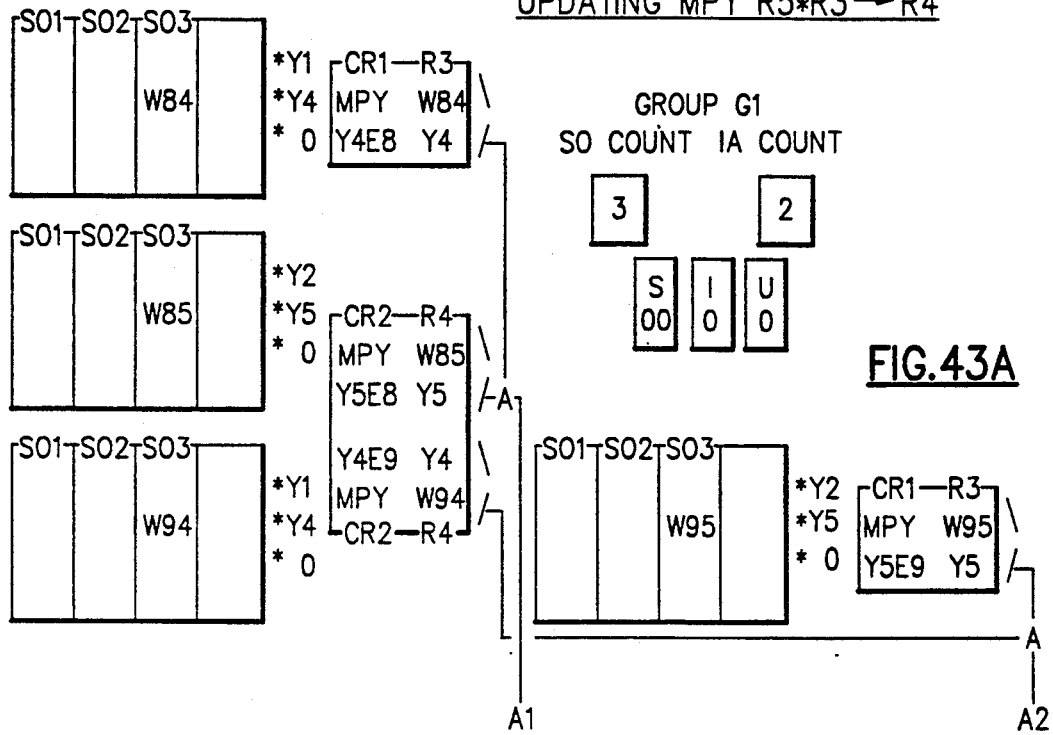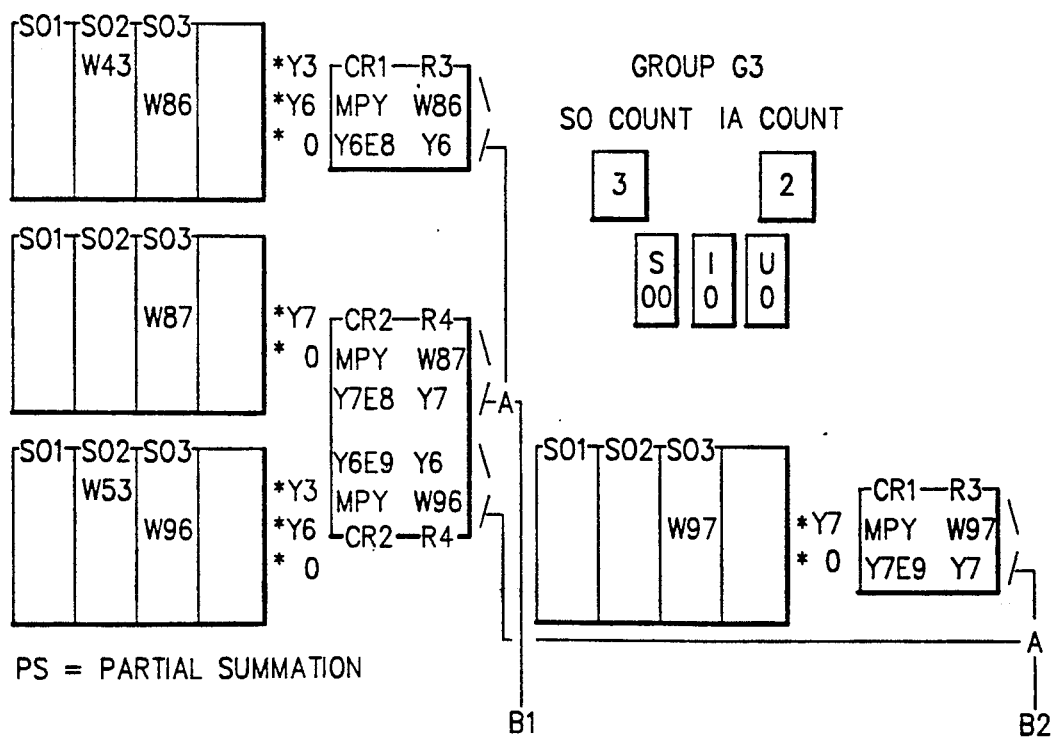
FIG.43A

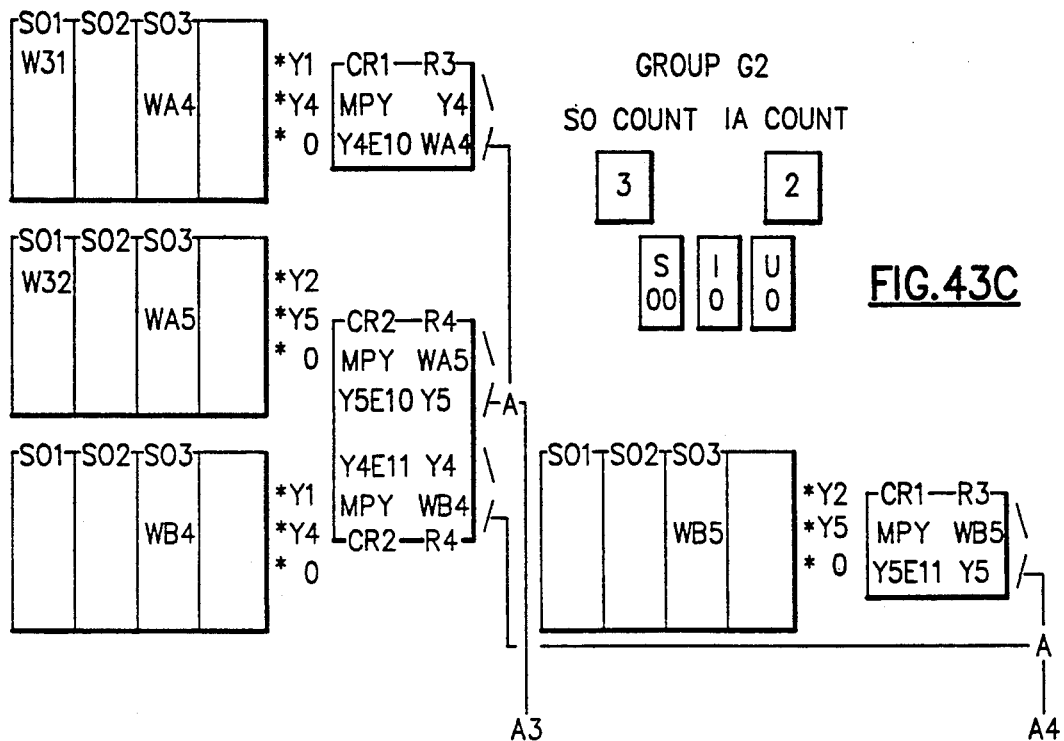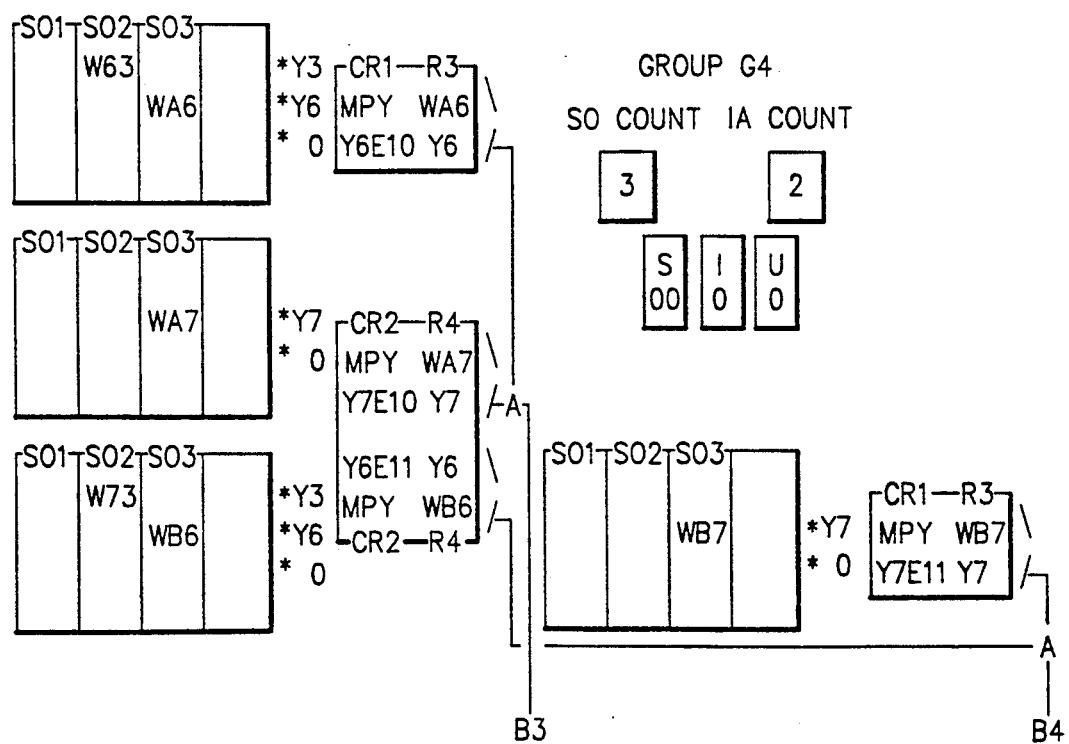
FIG.43C

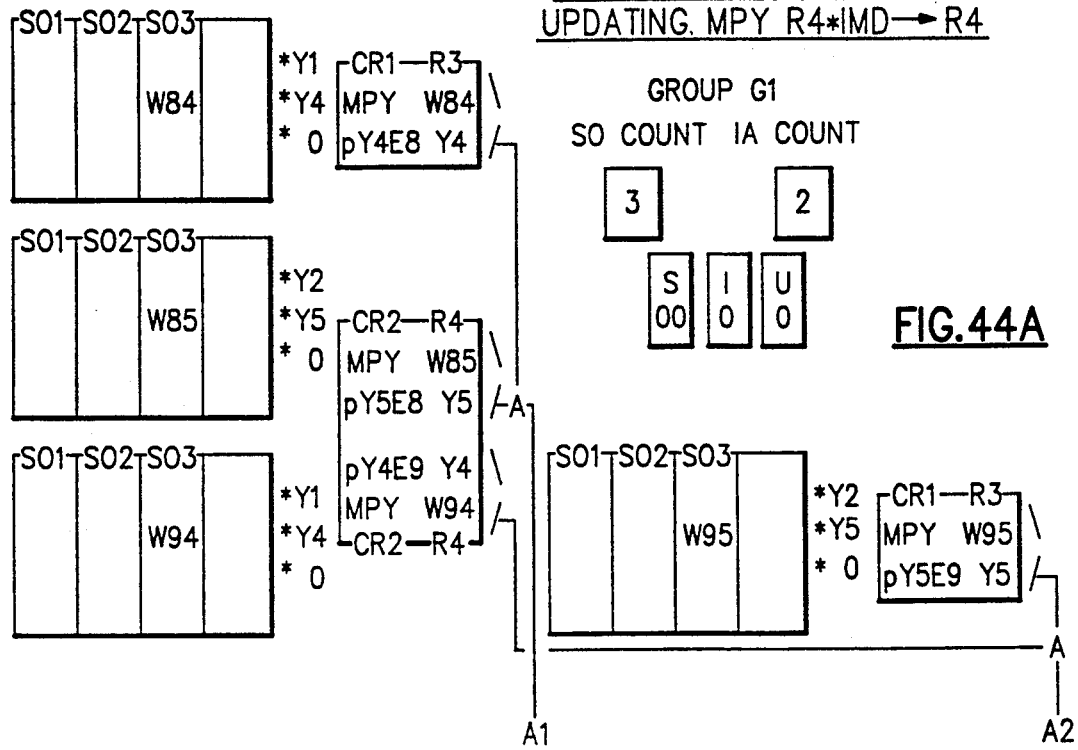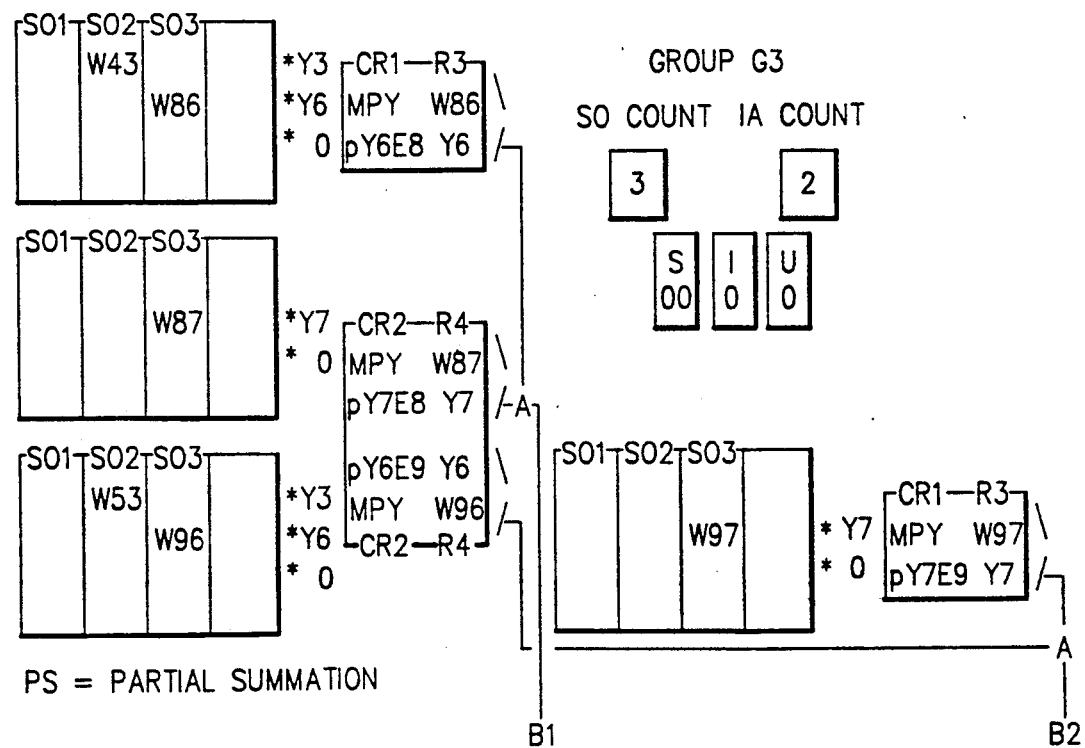
FIG. 44A

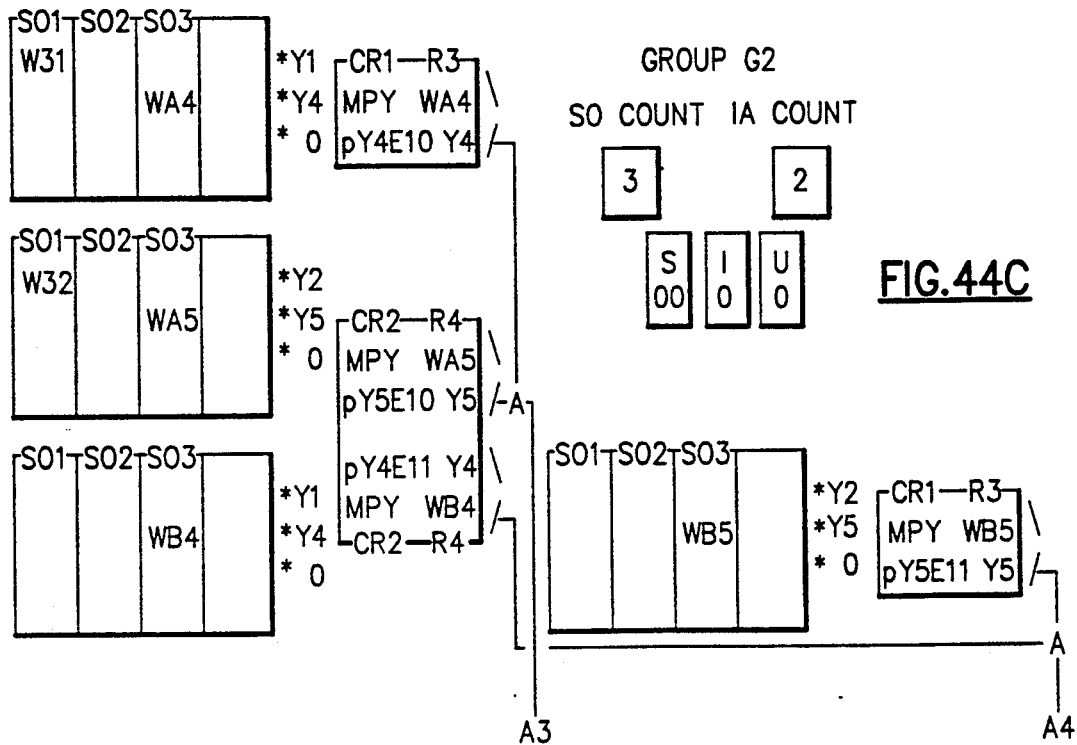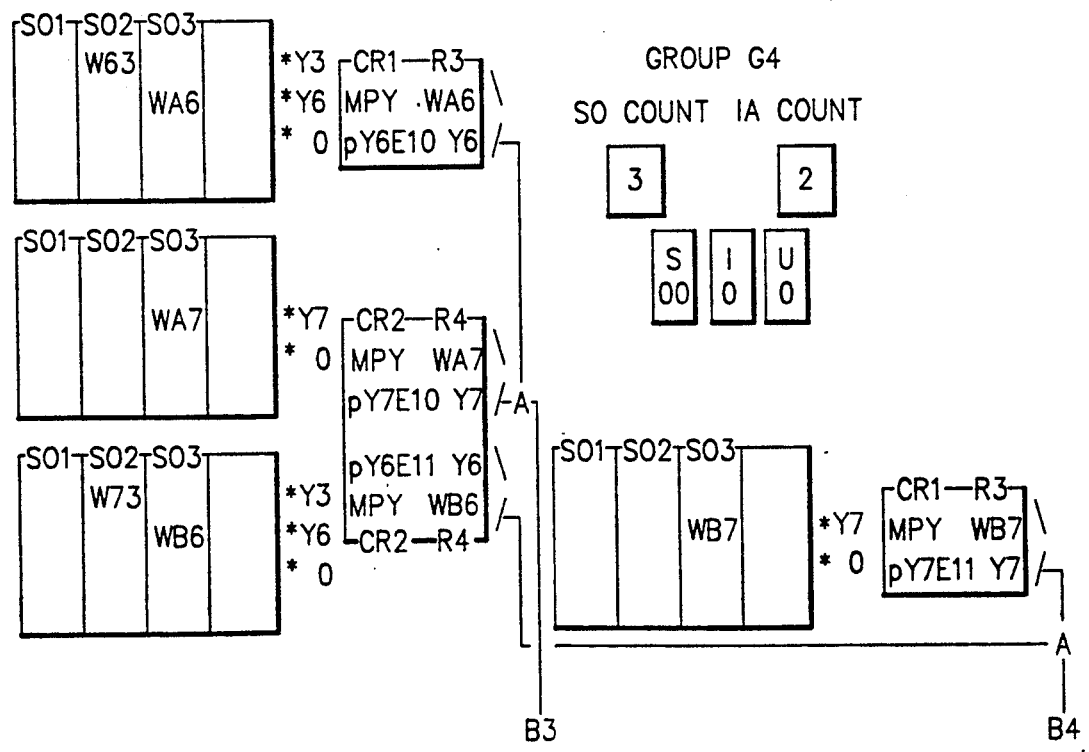
FIG.44C

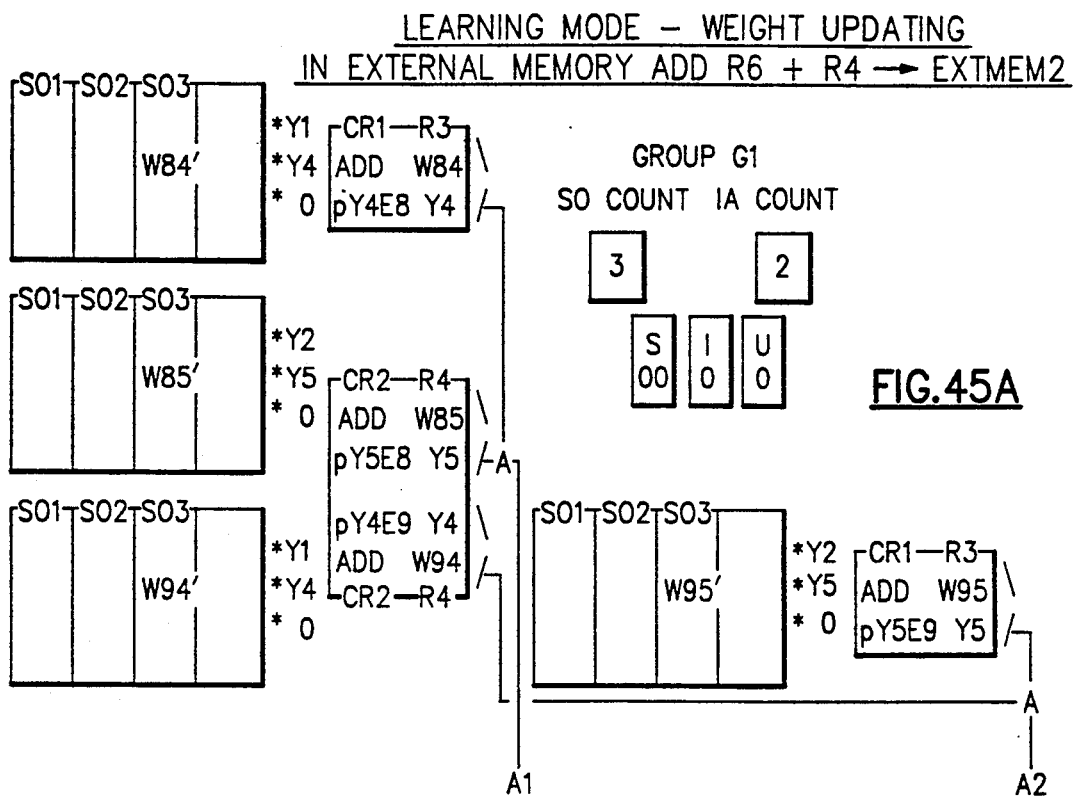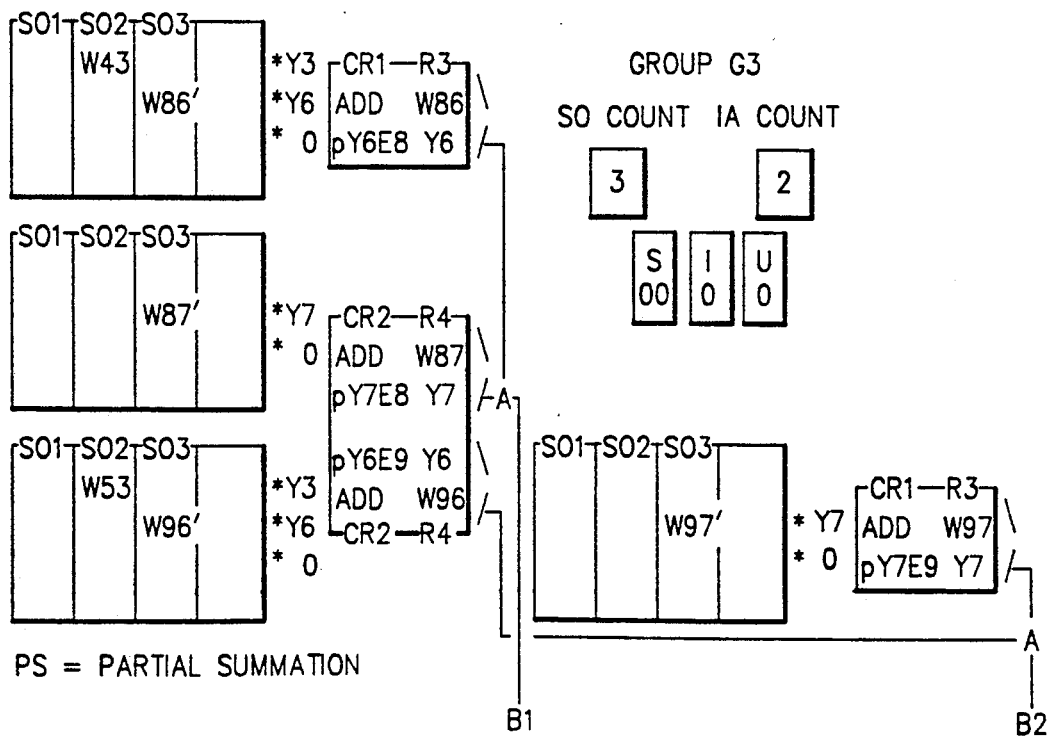

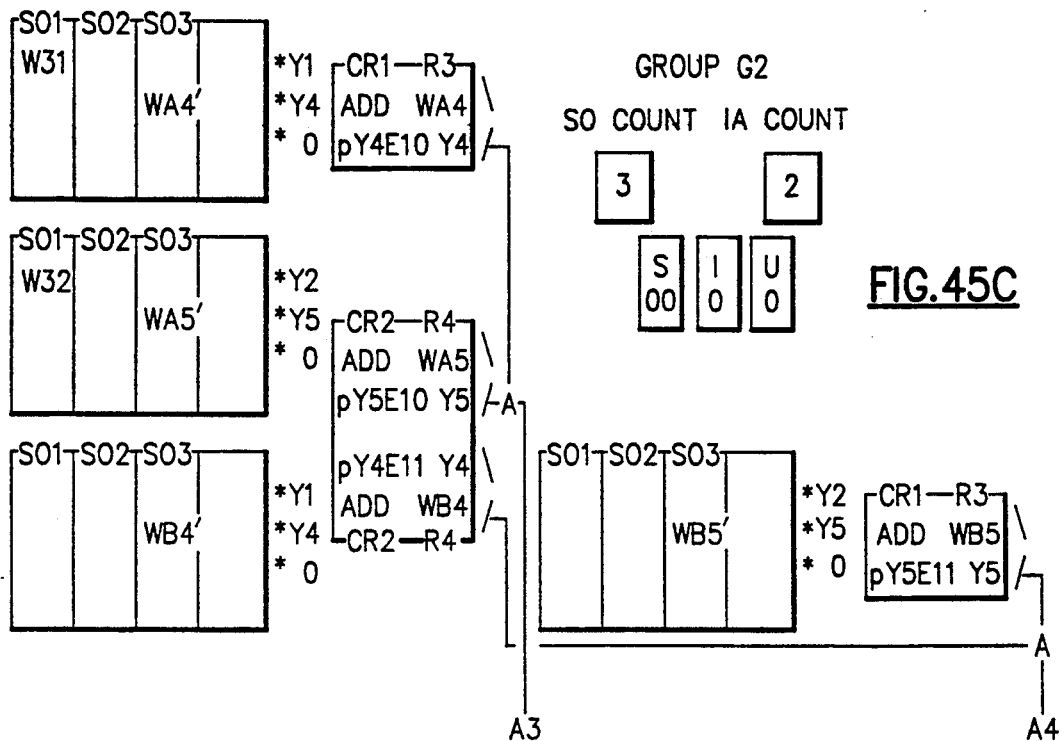
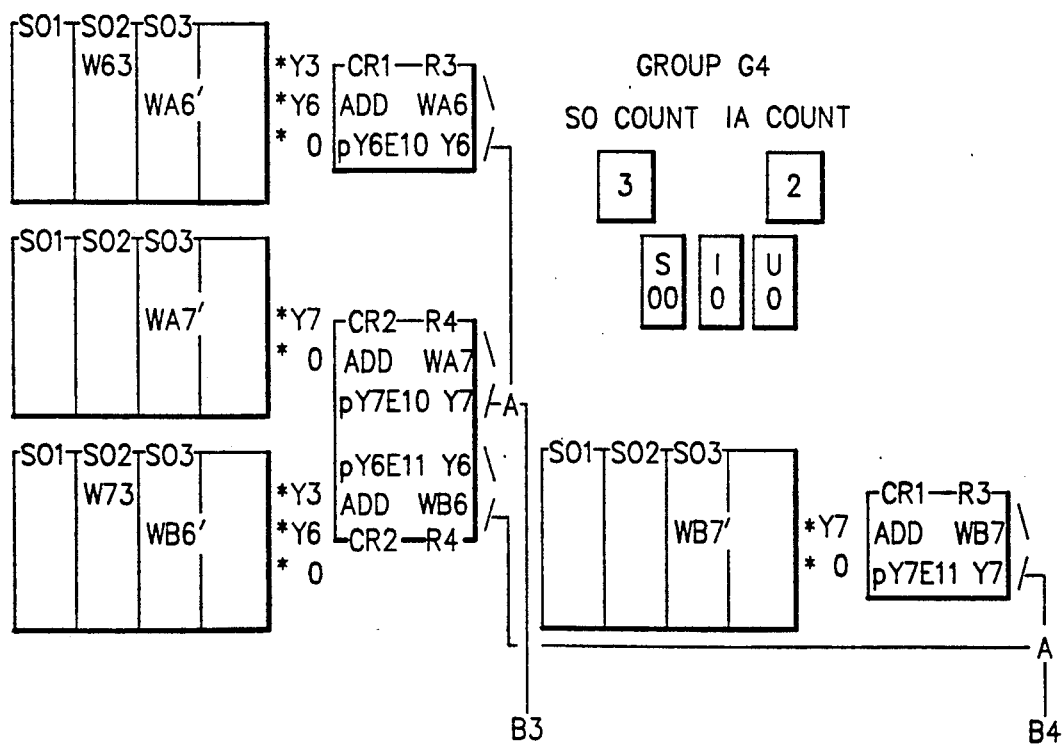
FIG. 45C

SCALABLE FLOW VIRTUAL LEARNING NEUROCOMPUTER

CROSS REFERENCE TO RELATED APPLICATIONS

This application is a continuation of U.S. application Ser. No. 07/702,262, filed May 17, 1991, now abandoned which is a continuation-in-part of the following related co-pending Patent Applications:

APPARATUS AND METHOD FOR NEURAL PROCESSOR, S. Vassiliadis, and G. G. Pechanek, U.S. Ser. No. 07/526,866, filed May 22, 1990 issued as U.S. Pat. No. 5,065,339; sometimes referred to as "SNAP"

A TRIANGULAR SCALABLE NEURAL ARRAY PROCESSOR, G. G. Pechanek, and S. Vassiliadis, U.S. Ser. No. 07/682,786, filed Apr. 9, 1991; sometimes referred to as "T-SNAP".

SPIN: A SEQUENTIAL PIPELINED NEURO COMPUTER, S. Vassiliadis, G. G. Pechanek, and J. G. Delgado-Frias, U.S. Ser. No. 07/681,842, filed Apr. 8, 1991 sometimes referred to as "SPIN".

In addition, filed concurrently are related applications:

A LEARNING MACHINE SYNAPSE PROCESSOR SYSTEM APPARATUS G. G. Pechanek, S. Vassiliadis, and J. G. Delgado-Frias, U.S. Ser. No. 07/702,261, filed May 17, 1991 now abandoned sometimes referred to as "LEARNING MACHINE", or Pechanek LEARN 91.

VIRTUAL NERUOCOMPUTER ARCHITECTURES FOR NEURAL NETWORKS, G. G. Pechanek, J. G. Delgado-Frias, and S. Vassiliadis, U.S. Ser. No. 07/702,260, filed May 17, 1991, issued as U.S. Pat. No. 5,243,688 sometimes referred to as "VIRTUAL", or Penchanek VIRTUAL 91.

PLAN: PYRAMID LEARNING ARCHITECTURE NEUROCOMPUTER, G. G. Pechanek, S. Vassiliadis, and J. G. Delgado-Frias, U.S. Ser. No. 07/702,263, filed May 17, 1991, now abandoned sometimes referred to as "PLAN".

These co-pending applications and the present application are owned by one and the same assignee, namely, International Business Machines Corporation of Armonk, N.Y.

The descriptions set forth in these co-pending applications are hereby incorporated into the present application by this reference.

FIELD OF THE INVENTION

The inventions relate to a scalable flow virtual learning neurocomputer system and apparatus and particularly to a scalable hybrid control flow/data flow virtual learning neurocomputer which employs a new group partitioning algorithm, and a scalable virtual learning architecture, synapse processor architecture (SPA) mapping, inner square folding and array separation, with capability of back propagation for virtual learning.

REFERENCES USED IN THE DISCUSSION OF THE INVENTIONS

During the detailed discussion of our inventions, we will reference other work including our own unpublished works which are not Prior Art but which will aid the reader in following our discussion. These additional references are:

D. E. Rumelhart, J. L. McClelland, and the PDP Research Group, Parallel Distributed Processing Vol. 1: Foundations Cambridge, Mass.: MIT Press 1986. (Herein referred to as "Rumelhart 86".)

J. J. Hopfield, "Neurons With Graded Response Have Collective Computational Properties Like Those of Two-State Neurons," Proceedings of the National Academy of Sciences 81, pp. 3088-3092, May, 1984. (Herein referred to as "Hopfield 84".)

A LEARNING MACHINE SYNAPSE PROCESSOR SYSTEM APPARATUS G. G. Pechanek, S. Vassiliadis, and J.G. Delgado-Frias, U.S. Ser. No. 07/702,261, filed May 17, 1991 sometimes referred to as "LEARNING MACHINE" or Pechanek LEARN 91.

VIRTUAL NERUOCOMPUTER ARCHITECTURES FOR NEURAL NETWORKS, G. G. Pechanek, J. G. Delgado-Frias, and S. Vassiliadis, U.S. Ser. No. 07/702,260, filed May 17, 1991, issued as U.S. Pat. No. 5,243,688 sometimes referred to as "VIRTUAL" or Pechanek VIRTUAL 91.

H. Hellerman, Digital Computer System Principles McGraw-Hill Book Company, pp. 346-348. (Herein referred to as "Hellerman 67".)

BACKGROUND OF THE INVENTION

Virtual learning implies the ability to modify the virtual connection weights and the virtual neural state values stored in an external memory. This function would be desireable for an environment which demands the complete scalability of other functions developed in co-pending applications. This function and an apparatus for achieving it has not been developed.

SUMMARY OF OUR INVENTIONS

We have provided a virtural learning neurocomputer apparatus which is termed the Scalable Virtual Learning Machine (SVLM) providing high performance direct emulation and virtual learning capability in a completely connected scalable architecture. Our SVLM provides the ability to modify the virtual connection weights and the virtual neural state values stored in the external memory to which the apparatus can be connected. In accordance with our inventions we have provided a scalable group partitioned virtual neural synapse processor architecture apparatus with an N neuron structure partitioned into groups of synapse processing units. Each group has multiple synapse processing units that contain instruction and data storage units, receive instructions and data, and execute instructions, and interface with external data storage for weights and neuron output values for V neurons, where $V>N$ and V is the number of neurons in the neural network to be emulated on the group partitioned N neuron structure. The groups execute group instruction and have communicating adder trees. The N neuron structure has neuron activation function units in the preferred form of a sigmoid generator, and the structure provides for interconnecting the groups into an N neuron structure which supports V neurons and for communicating both instructions, data, and the outputs of the neuron activation function units back to the input synapse processing units by way of the communicating adder trees.

The scalable flow virtual learning neurocomputer system appratus has a scalable hybrid control flow/data flow and employs a group partitioning algorithm for the scalable virtual learning architecture. We provide synapse processor architecture mapping, inner square folding and array separation, with capability of back propagation for virtual learning.

The group partitioning algorithm creates a common building block of synapse processors containing their own external memory. The processor groups are used to create a general purpose virtual learning machine which maintains complete connectivity with high performance. The synapse processor group allows a system to be scalable in virtual size and allows direct execution capabilities. Internal to the processor group, the synapse processors are designed as a hybrid control flow/data flow architecture with external memory access and reduced synchronization problems.

The general computer architecture supporting neural networks which is developed utilizes a method of folding and separating an array of "synapse" processors creating a cluster of processors, or a processor group, which represents a common building block for neurocomputer implementations. A neurocomputer made up of these processor groups directly executes a completely connected N neuron network model and supports a virtual mode of execution for network models containing greater than N neurons. The synapse processor architecture (SPA) of each processor in the group supports the direct emulation scalability resulting from the group partitioning algorithm and supports virtual synapse scalability through the use of external memory. One of the features of the unique SPA is that it allows both control flow operation with sequential instruction execution and data flow operation where the execution is dependent upon the receipt of valid tagged data. Another unique feature of the architecture is the method of interfacing to processor groups which supports complete connectivity in a neural network model even though multiple processor groups are utilized in an implementation. Other unique features of the neurocomputer are the group notification of the completion of operations local to the synapse processors and support of learning algorithms.

These and other improvements are set forth in the following detailed description. For a better understanding of the inventions, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS

FIG. 1 and FIGS. 1A and 1B shows a 4-neuron structure supporting 16 virtual neurons (256 Weights) weights.

FIG. 2 and FIGS. 2A-2D illustrates an 8 neuron array model.

FIG. 3 and FIGS. 3A-3D shows an 8 neuron array model split into 1 square and 2 smaller triangular processor arrays.

FIG. 5 and FIGS. 5A and 5B shows the folded inner square separated into two triangular arrays.

FIG. 7 and FIGS. 7A-7C shows a 16 neuron array model weight matrix with neuron Y values.

FIG. 8 and FIGS. 8A and 8B shows triangular arrays 1 and 2.

FIG. 9 and FIGS. 9A and 9B shows triangular arrays 3 and 4.

FIG. 10 and FIGS. 10A and 10B shows a folded inner square 5 separated into two triangular arrays.

FIG. 11 and FIGS. 11A and 11B shows a folded inner square 6 separated into two triangular arrays.

FIG. 12 and FIGS. 12A and 12B shows a folded inner square 7 separated into two triangular arrays.

FIG. 13 and FIGS. 13A and 13B shows a folded inner square 8 separated into two triangular arrays.

FIG. 14 and FIGS. 14A and 14B shows a folded inner square 9 separated into two triangular arrays.

FIG. 15 and FIGS. 15A and 15B shows a folded inner square 10 separated into two triangular arrays.

FIG. 16 and FIGS. 16A and 16B illustrates a preferred external summation, sigmoid generator, with a reverse communication path.

FIG. 17 and FIGS. 17A, 17Ba, and 17Bb illustrates a switching mechanism.

FIG. 18 illustrates alternatively a modified 8 neuron switching mechanism to support learning.

FIG. 19 and FIGS. 19A and 19B illustrates alternatively a modified 16 neuron switching mechanism to support learning.

FIG. 20 and FIGS. 20A and 20B illustrates another part of a modified 16 neuron switching mechanism to support learning.

FIG. 22 and FIGS. 22A-22D illustrates a 4 neuron scalable virtual learning machine with $V=16$, $N=4$, $G=4$.

FIG. 24 and FIGS. 24A and 24B illustrates a scalable virtual learning machine's external memory structure for $V=16$, $N=4$, $H=16$, with 1 weight, 1 Y value bit per processor element, and H weight elements per processor group.

FIG. 25 and FIGS. 25A and 25B illustrates a synapse processor architecture with external memory, with a diagnoal synapse processor (DSYP) and a general synapse processor (GSYP).

FIG. 26 shows the 4-neuron SVLM timing for a 16 neuron neural network.

FIG. 27 shows the cycle time expanded to show detailed timing.

FIG. 31 and FIGS. 31A-31D shows an 11 neuron I/O encoder problem mapped onto a 4 neuron scalable SVLM with $V=16$, $N=4$, $G=4$.

FIG. 32 and FIGS. 32A-32D illustrates the initializiation.

FIG. 33 and FIGS. 33A-33D illustrates first layer execution.

FIG. 34 and FIGS. 34A-34D illustrates set SO count to advance mode and reverse communicate Y1' and Y2'.

FIG. 35 and FIGS. 35A-35D illustrates second layer execution.

FIG. 36 and FIGS. 36A-36D illustrates reverse communicate Y3'.

FIG. 37 and FIGS. 37A-37D illustrates third layer execution.

FIG. 39 and FIGS. 39A-39D illistrates fourth layer execution.

FIG. 40 and FIGS. 40A-40D shows the learning mode of Load S & I bits and SO and IA Counts, change data path to R4, and reverse communicate E8, E9, E10 and E11.

FIG. 41 and FIGS. 41A-41D shows the learning mode of issue MPY R6*R3 T to start multiply for weighted error summations: ER4, ER5, ER6 and ER7.

FIG. 42 and FIGS. 42A-42D shows learning mode of create weighted error summations: ER4, ER5, ER6 and ER7.

FIG. 43 and FIGS. 43A-43D shows the learning mode of step 1 weight updating MPY R5*R3 →R4.

FIG. 44 and FIGS. 44A-44D shows learning mode of step 2 weight updating MPY R4*IMD →R4.

FIG. 45 and FIGS. 45A-45D shows the learning mode of weight updating in external memory, ADD R6+R4→EXTMEM2.

Figure 2:
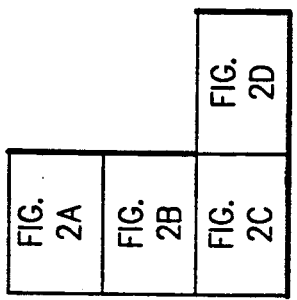
Figure 2A:
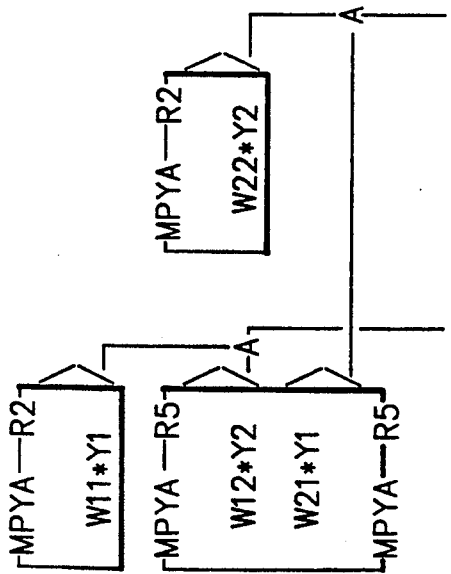
Figure 2B:
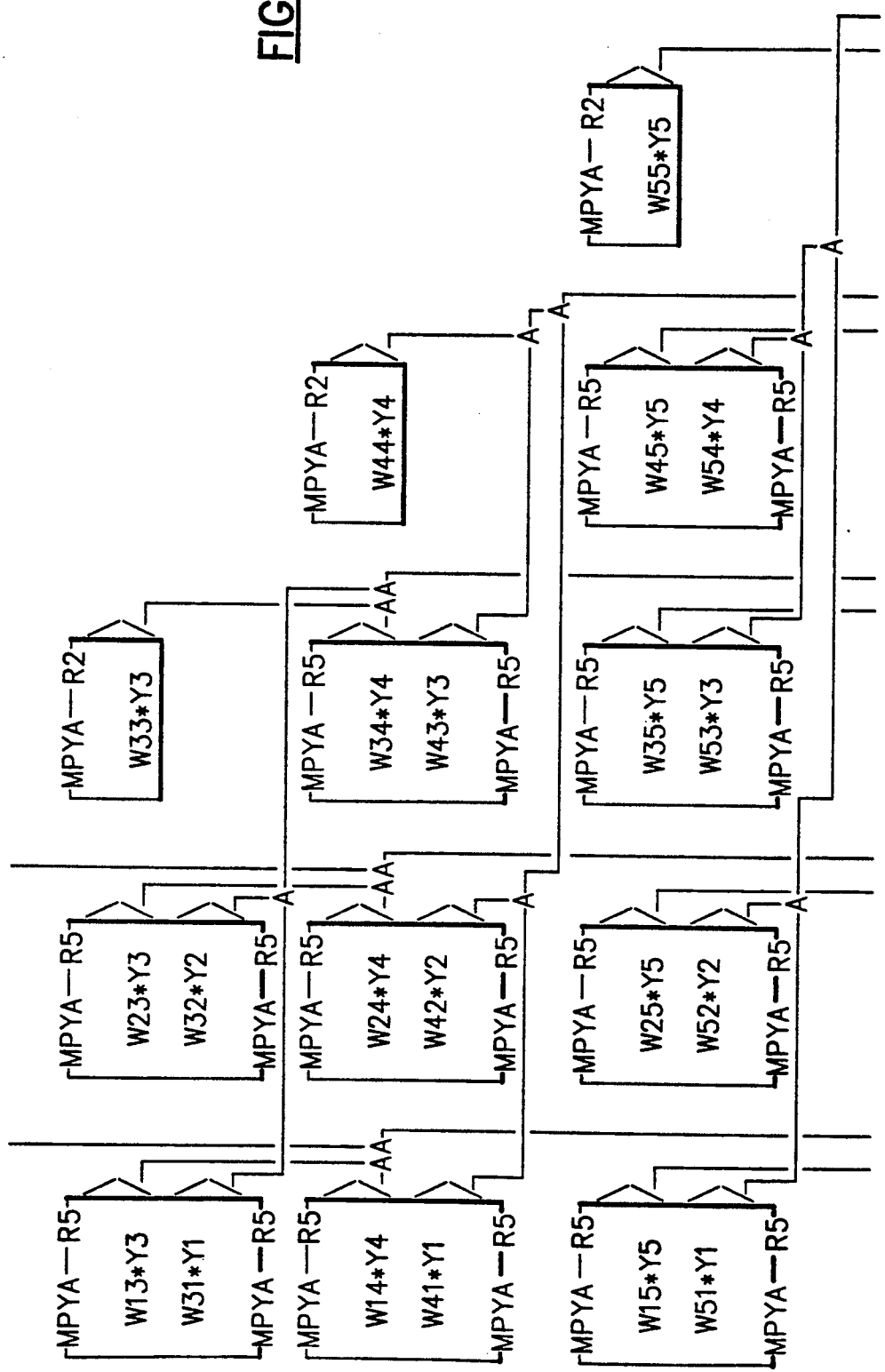
Figure 2D:
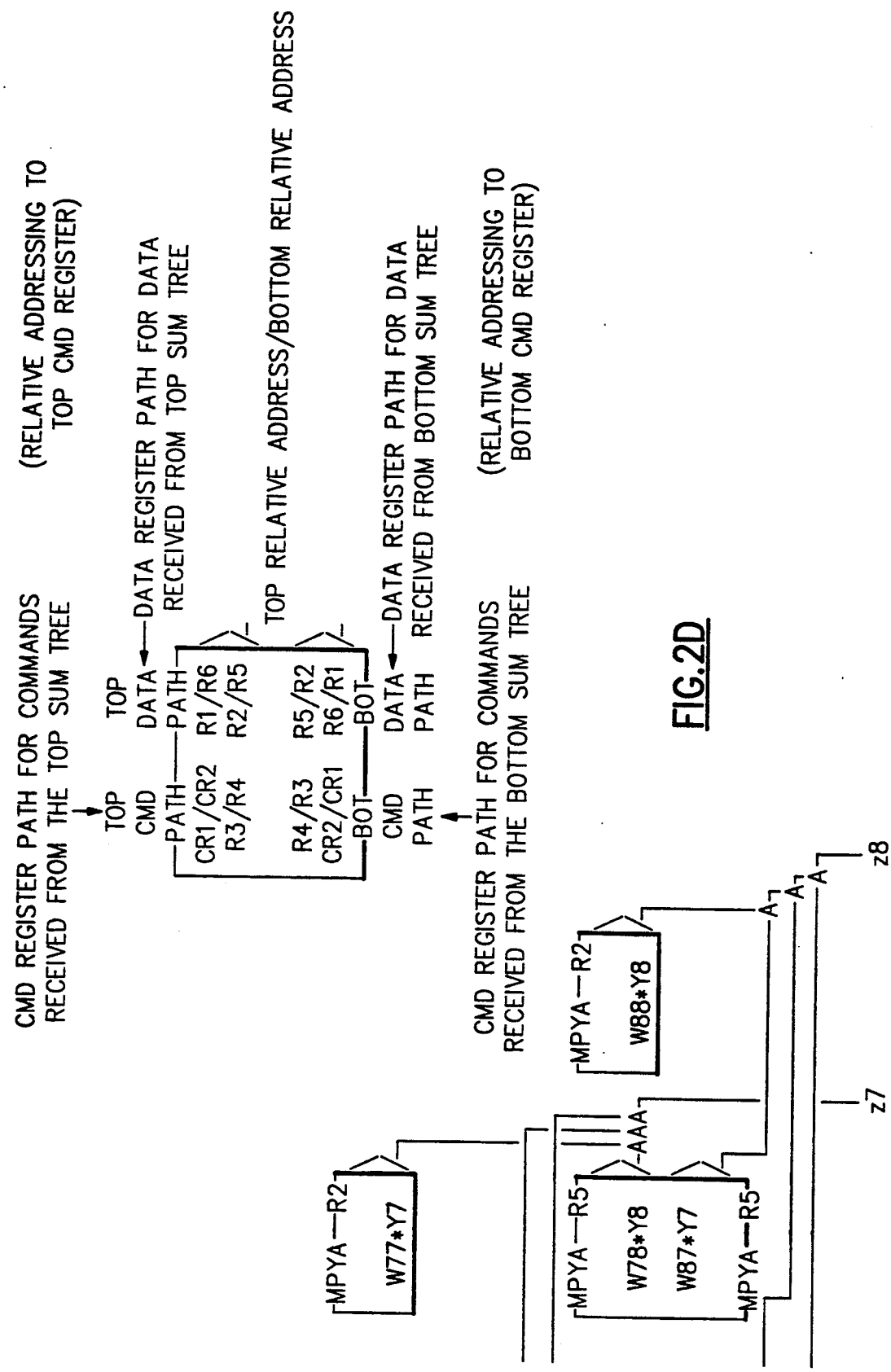

(Note: For convenience of illustration, FIGURES may be separated in parts and as a convention we place the top of the FIGURE as the first sheet, with subsequent sheets proceeding down when viewing the FIGURE, in the event that multiple sheets are used.)

Our detailed description follows as parts explaining our preferred embodiments of our inventions provided by way of example.

DETAILED DESCRIPTION OF THE INVENTIONS.

Before considering our preferred embodiments, it may be worthwhile to introduce some common features which are used in illustrating our preferred embodiments.

For the purposes of this description, the number V will be used to denote the number of neurons contained in the network to be modeled on the neurocomputer and the number N will denote the number physical neurons available in the physical implementation. For virtual processing V>N. The computational tasks to be implemented by the neurocomputer architectures described in this description are given by equation 1 and 2 which are based on a subset of the full Parallel Distributed Processing model of Rumelhart 86 and the Hopfield network, Hopfield 84.

$$Y_i = F\left( \sum_{j=1}^{V} Y_j W_{ij} + Ex_i \right) \quad (1)$$

Where:

V is the number of neurons in the neural network.

The subscripts on the weights W (such as $W_{13}$) are to be interpreted as meaning the weight of the connection from Neuron 3 to Neuron 1.

$Y_j$ is the $j^{th}$ neuron output value connected to the $i^{th}$ neuron input through a connection weight of $W_{ij}$.

$Ex_i$ is an external input to the $i^{th}$ neuron.

$-A < Ex_j \leq +A$ where $-A$ equates to $Y_j=0$ and $+A$ equates to $Y_j=1(\pm an$ acceptable range of error) for the case where $Ex_j$ is the only input to the neuron.

$F(Z_j)$ is the neuron activation function which many times is set equal to a sigmoid activation function whose form, for example, is:

$$F(z_i) = \frac{1}{1 + e^{-\frac{z_i}{T}}} \quad (2)$$

Where:

For the function $$F(z_i) \; z_i = \sum_{j=1}^{V} Y_j W_{ij} + Ex_i$$

$0 \leq F(Z_j) \leq 1$

T is a global control parameter used to modify the slope of the sigmoid function for a given set of $Z_j$ values.

e=Natural log (2.71828 ...)

Equations 1 and 2, for a completely connected V neuron network, contain four basic operations:
1. $V^2$ Multiplications
2. V Product Summations
3. V Activation Functions
4. V×V Communications Neurocomputer implementations have many difficult problems to surmount requiring a high degree of parallelism to achieve high performance. In relationship to the four basic operations for neural execution, it would be desireable to have $V^2$ multiplication engines, V product summation and activation mechanisms, and a V×V communications medium with minimum delay. Typically V is large compared to N, where N represents the physically realizable neurocomputer. Since V>N, a virtual emulation capability in the neurocomputer is desireable in order to support numerous sizes of neural network models. Learning imposes further requirements in that more general purpose execution capabilities are needed in the neurocomputer architecture. Complete connectivity along with high performance in conjunction with virtual and learning capability, while providing an architecture which is scalable in both virtual capacity and in direct emulation capability, has been a difficult task. These issues are addressed with the Scalable Virtual Learning Machine (SVLM).

While our other co-pending applications are basic and applicable to many situations where they provide the best way of delivering a solution to needed problems, there are, we now recognize in certain situations, certain limitations which can be found in specific environments. For example, the General Purpose Learning Machine (GPLM) Synapse Processing Architecture (SPA) of our Pechanek LEARN 91. has the storage capacity of only a single connection weight and neuron val e per synapse processing element as is appropriate for the direct execution of a neural network model. This direct emulation capability limits V to be less than or equal to N. Further the GPLM utilized a simple state machine control mechanism not requiring the utilization of tagged data for synchronizational control of the automatic mode (see Pechanek LEARN 91). As V becomes large and virtual capability is added, the state machine control becomes complex. The SPA also contained local processing instructions which did not provide notification of completion to the instruction-issuing learning processor. A state machine control operation in the learning processor was assumed such that time outs, dependent upon instruction type, determined when a new instruction could be sent to the synapse processors. The virtual TSNAP of Pechanek VIR- TUAL 91 included the storage of the virtual connection weights and neuron values within the synapse processing elements, allowing the emulation of networks of V neurons where V>N but thereby setting V to a fixed number and linking V and N to the technology capability. In addition, the virtual TSNAP did not support learning capability, using only a simple multiplication functional unit and the necessary weight and Y value storage instead. Multiple difficulties arise with both approaches due to the above characteristics as the number of neurons V to be emulated increases. One difficulty is the limitation on the size of a neural network which can be emulated on the structures. The GPLM will be limited to a physical implementation of N neurons, allowing only networks of V neurons where $V \leq N$ can be emulated. Whereas the GPLM limited N, the virtual TSNAP limits V, also due to technology consideration. Once V is chosen and the chips built for the virtual TSNAP, V cannot be increased. Another difficulty is the practical consideration of the number of synapse processors which can be placed on a chip due to a chosen technology's cell and I/O capacity. Assuming a large number of synapse processing elements on a chip and a large number of chips utilized in a desired system, the synchronization control becomes very difficult. A state machine control approach for all operations is not feasible for large systems; once a state machine controlled system is built, it will not be easily extendable. In order to solve the synchronization of an instruction's automatic mode of operation, a new architecture is developed to support both control flow (sequential instruction execution) and data flow (data dependent execution) modes of operation. An instruction's automatic mode of operation becomes defined as a data flow controlled operation which requires valid tagged data to be received prior to "firing" the function. The local processing of instructions without notification also becomes problematic for large systems. A new method of notification of local processing completion is defined whereby the group summation trees are utilized, providing not only successful operation completion but also communication of errors which may have occurred in an operation. In this manner, the completion of all operations are notified to the instruction/data issuing processor, thus ensuring proper control and further allowing scalability.

Given a limited number of synapse processors on a chip, a special situation which may occur, the question becomes how can one build a large N neurocomputer with learning capability made up of multiple synapse processing chips which supports V neurons, where $V \geq N$, allowing future growth through expansion of not only the weight and neuron value storage thereby increasing the virtual capacity, but also expansion of the synapse processing elements, thereby increasing the direct execution capacity improving performance? Multiple new concepts will be presented in this description, such as a group partitioning algorithm, the hybrid control flow/data flow architecture, and notification of local synapse processing completion in order to solve this scalability problem while still preserving learning and complete connectivity among the modeled neurons and providing high emulation performance. A method of breaking a large triangular array of processors into smaller triangular processor array groups via a novel partitioning algorithm is presented which allows a practical scaling mechanism. An external memory architecture is developed, allowing the growth of the connection weight and neuron value storage only dependent upon the amount of external memory utilized. Both the GPLM of the co-pending application and the virtual TSNAP of the co-pending application may be inadequate to accomplish the scalability in both capacity and performance. A new neurocomputer architecture is developed maintaining its support of learning and representing a new type of neurocomputer to be referred to as the Scalable Virtual Learning Machine (SVLM). To illustrate the best way of developing this kind of machine, we will present examples of our preferred embodiments. Presented first is the synapse processor architecture mapping onto a virtual TSNAP structure, next the inner square folding and array separation group partitioning algorithm, followed by the description of the new synapse processor architecture and group architecture supporting external memory, hybrid control flow/data flow operation, and notification of local synapse processing completion, with or without errors. An example of back-propagation learning will also be presented demonstrating the utilization of the new architecture.

SCALABLE VIRTUAL LEARNING ARCHITECTURE SPA MAPPING ONTO A VIRTUAL TSNAP

The virtual TSNAP of Pechanek VIRTUAL 91 includes the weights and neuron values in the synapse processor cells and shares the multipliers and adder trees in a cyclic fashion with the use of an iterative adder. Each iterative add cycle generates a partial sum, stored in the iterative adder (IA), which accumulates the network summation each iterative add cycle.

The register multiplier architecture of the virtual TSNAP can be mapped onto the Synapse Processor Architecture of Pechanek LEARN 91. There are two types of processor "cell" structures used for learning in the synapse processor architecture, the DSYP, diagonal synapse processing "cell" and the GSYP, general synapse processing "cell". The DSYP contains one weight/Y value multiplication element and the GSYP contains two weight/Y value multiplication elements. The connection weight and neuron value storage requirements for a virtual 16 neuron network mapped onto a four physical neuron GPLM is shown in FIG. 1. The DSYPs are outlined with dots and the GSYPs are outlined with dashes. The weights within the DSYPs and GSYPs are grouped into four columns where each column is made up of the connection weights associated with four iterative add cycles. In this example, four iterative add cycles are necessary to produce a neuron output. As depicted, the first set of four iterative add cycles will produce Y1', Y2', Y3', and Y4'. The second set of fout iterative add cycles will produce Y5', Y6', Y7', and Y8'. This continues until all 16 neuron outputs are produced. The merged structure represents the starting point for describing the new SVLM architecture.

INNER SQUARE FOLDING AND ARRAY SEPARATION

A GPLM structure of Pechanek LEARN 91 for eight neurons is shown in FIG. 2 where:

$$z_i = \sum_{j=1}^{N} Y_j W_{ij} \qquad (3)$$

Figure 3A:
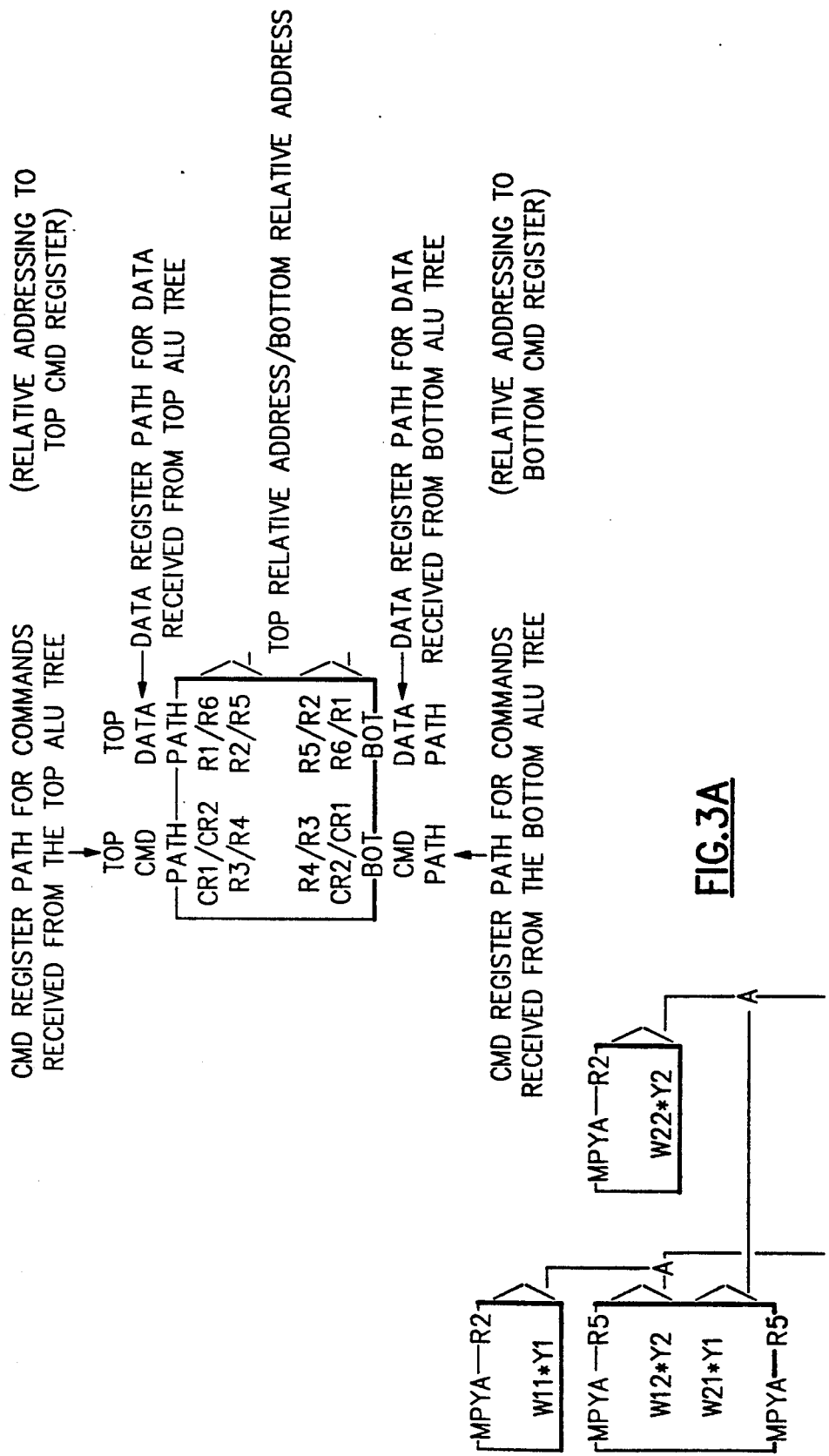
Figure 3C:
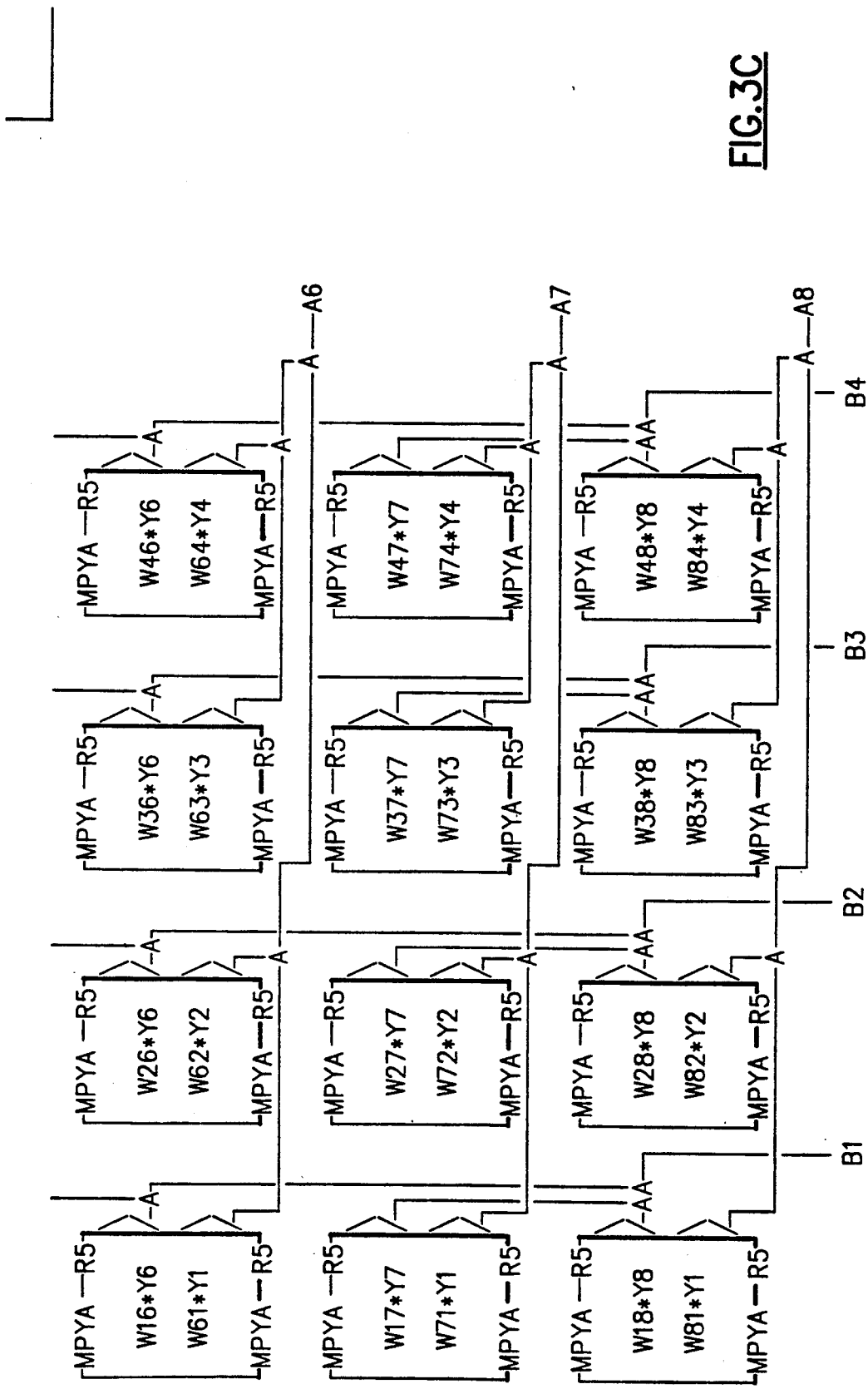
Figure 3D:
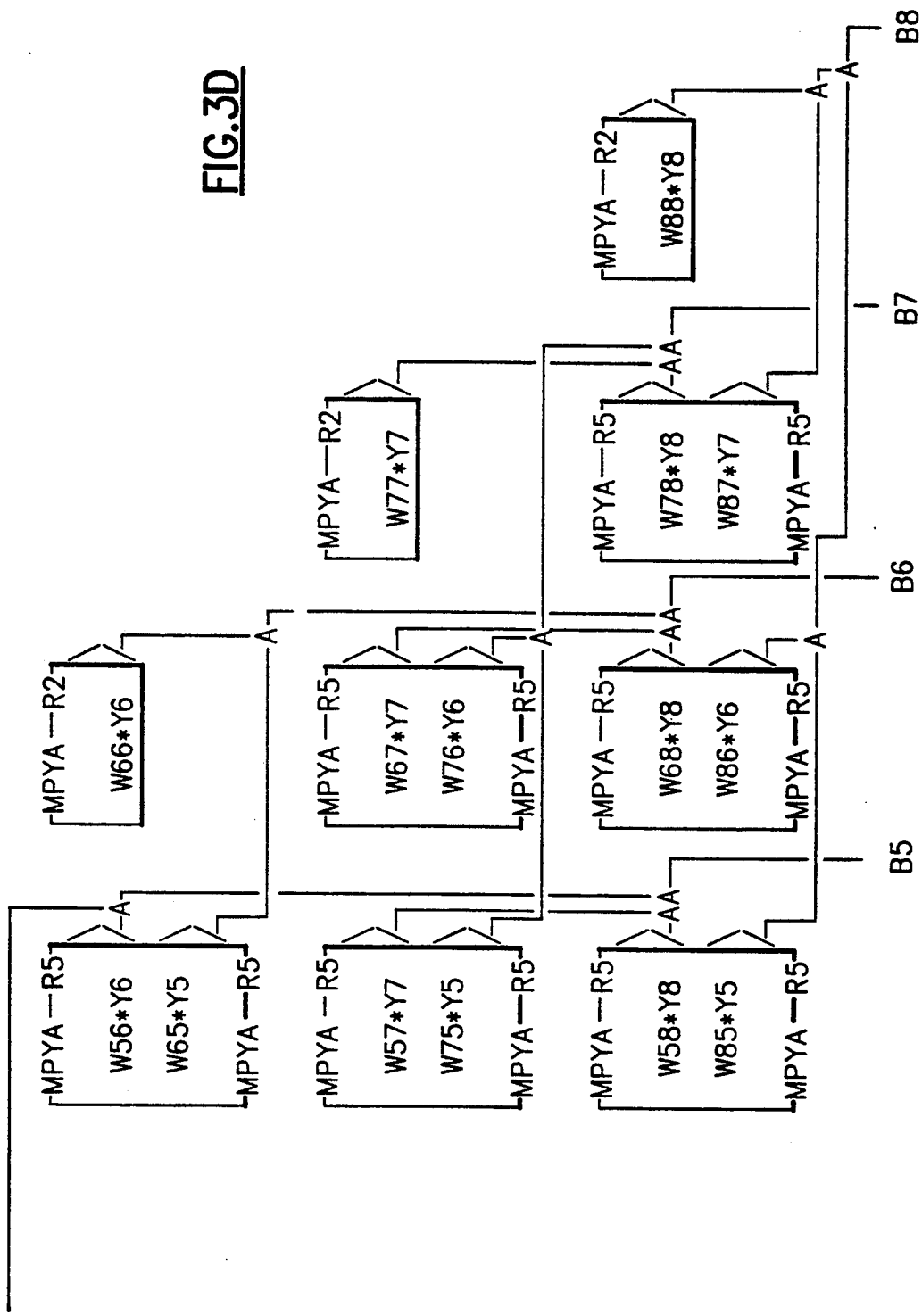
Figure 4A:
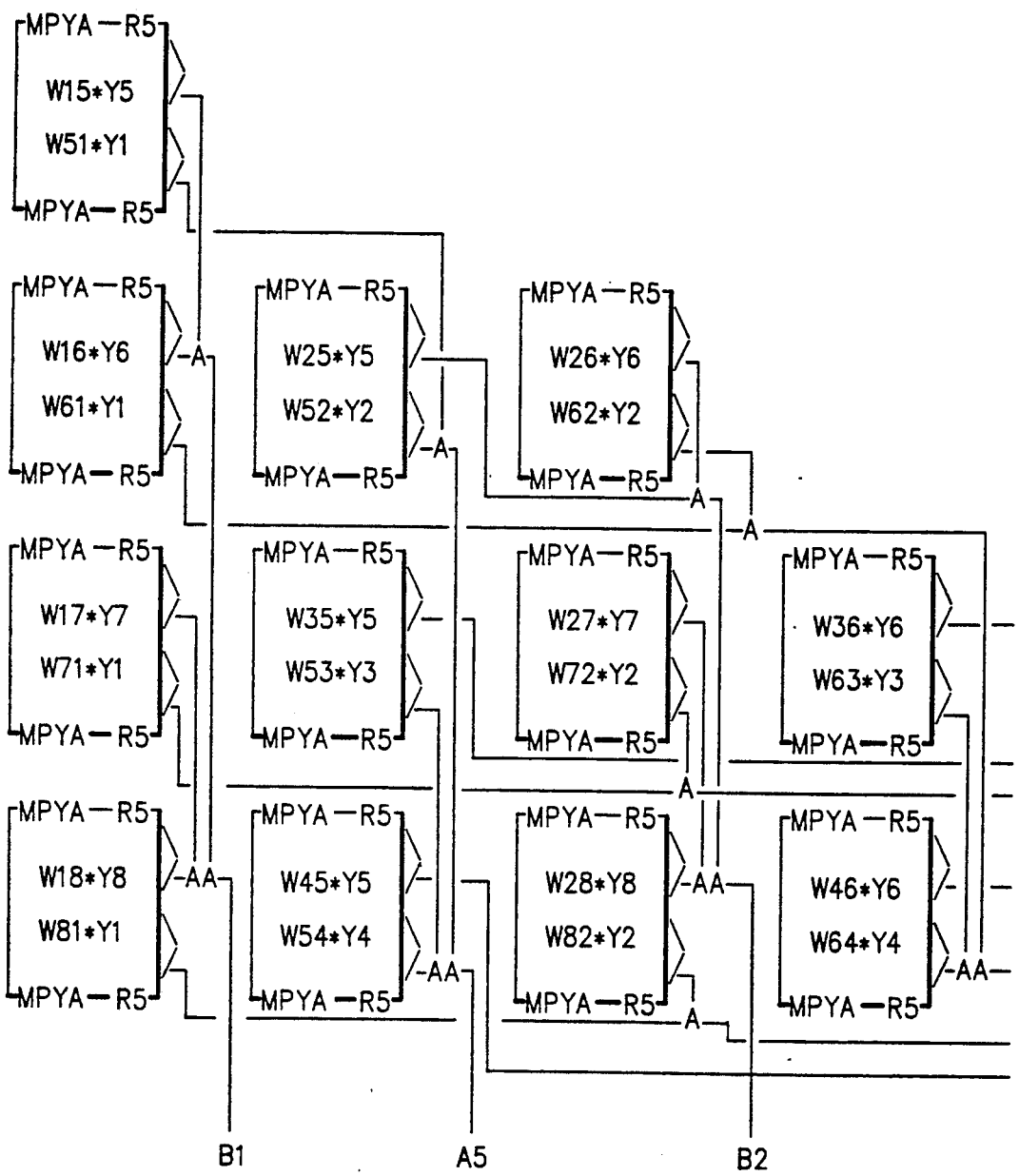
FIG. 4 and FIGS. 4A and 4B shows the folded inner square of the 8 neuron array model.
Figures 4, 4B:
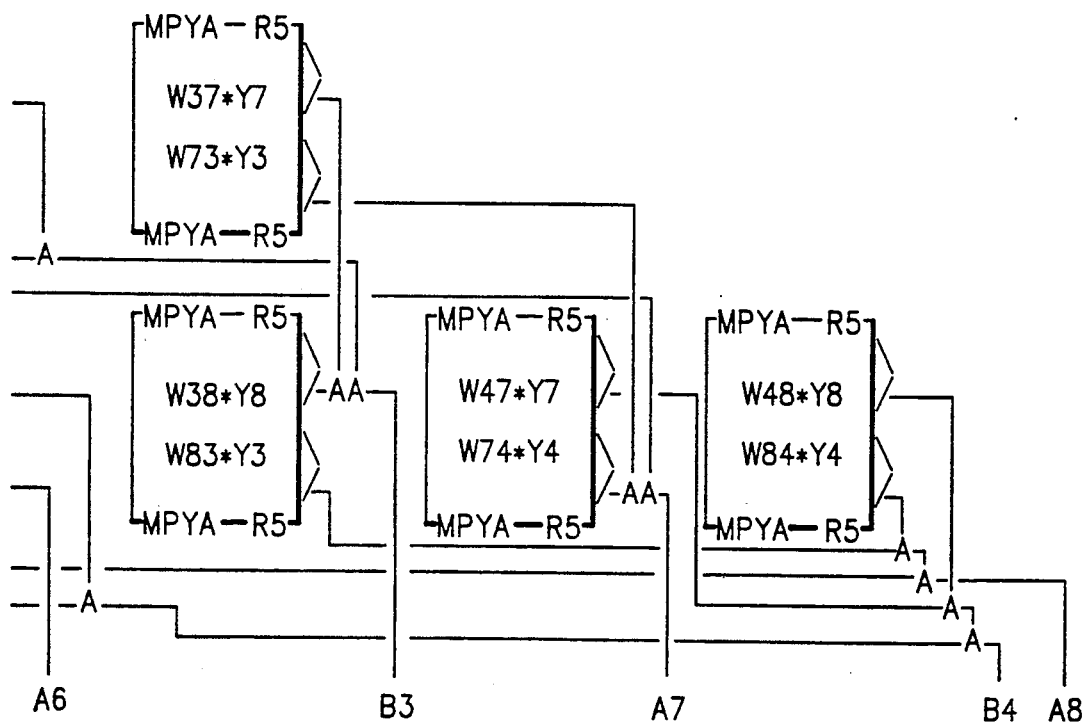
Figure 5A:
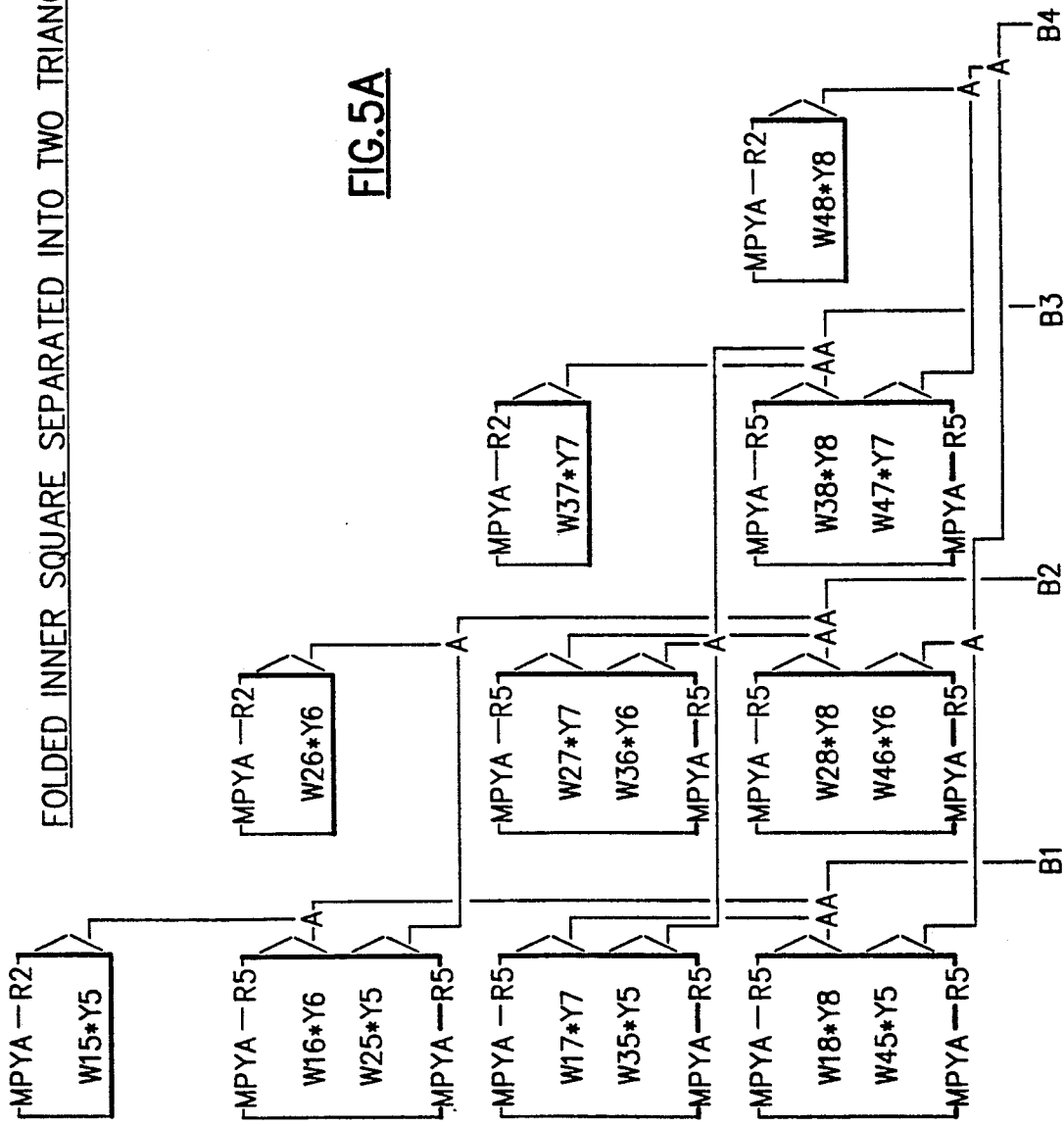

It can be noticed that there are one square and two smaller triangular arrangements of synapse processor cells within the larger triangular structure of FIG. 2. Separating these out from the main structure and allowing the final stage of the summation tree to be external to the arrangement of synapse processors creates the structure shown in FIG. 3. FIG. 3 contains three structures i.e. the two triangular arrays and one square array. In order to support scalability, a common replicatable design is desired. Since there are two types of structures shown in FIG. 3, a square and two triangular arrangements of synapse processors, scalability via a single design is not achievable. It will now be shown how the square organization can be restructured into two triangular arrays the same size as the other two triangular arrays making up the original 8 neuron model, thereby creating a common replicatable design. In order to accomplish this the square structure is first folded along its diagonal as is shown in FIG. 4 with all synapse processors kept intact and only the summation trees folded. By rearranging the weight and Y value storage within each synapse processor, the folded structure of FIG. 4 can be redrawn as two separate triangular processing arrays as shown in FIG. 5. By following this procedure the large triangular structure of FIG. 2 has been shown to be made up of 4 smaller triangular arrays.

Figure 6:
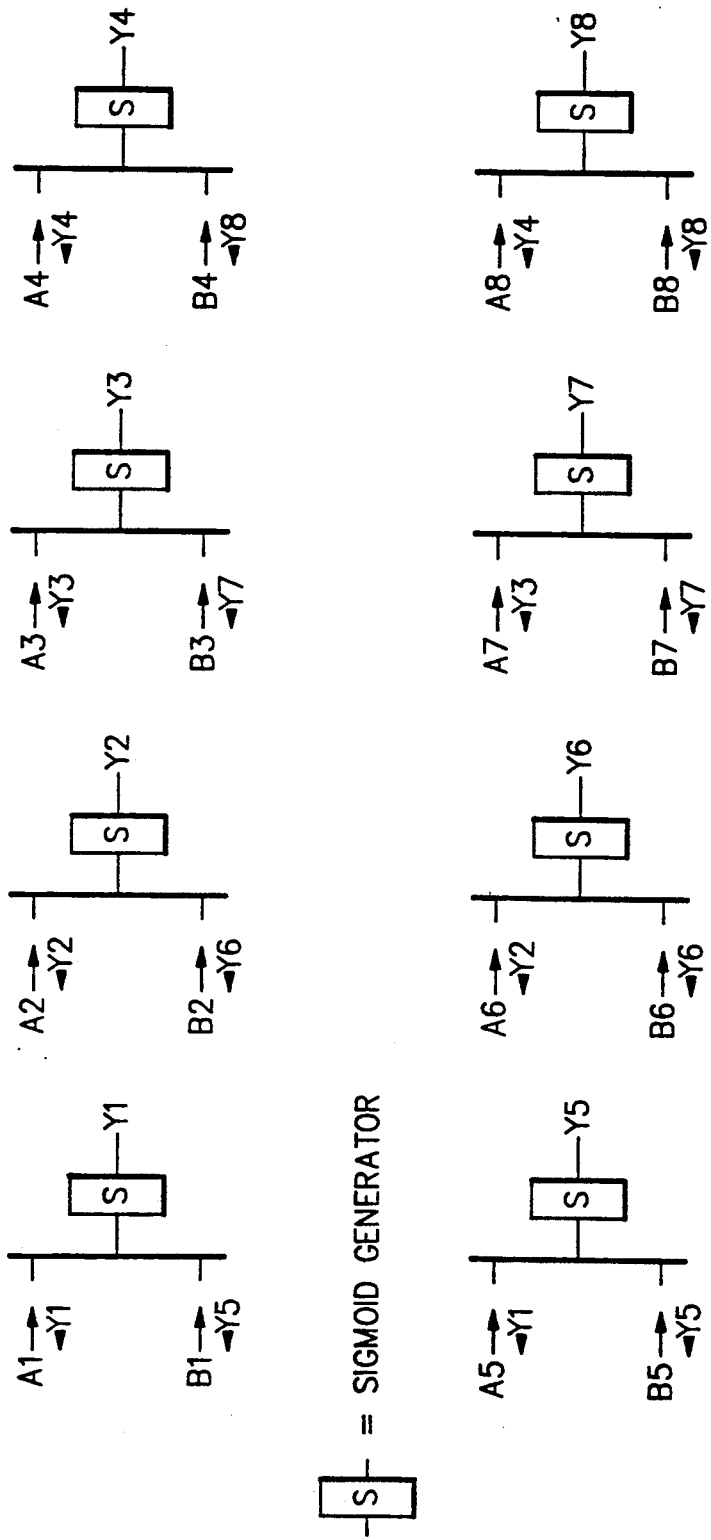
FIG. 6 shows a preferred external summation, sigmoid generator, and reverse communications path.
Figure 8A:
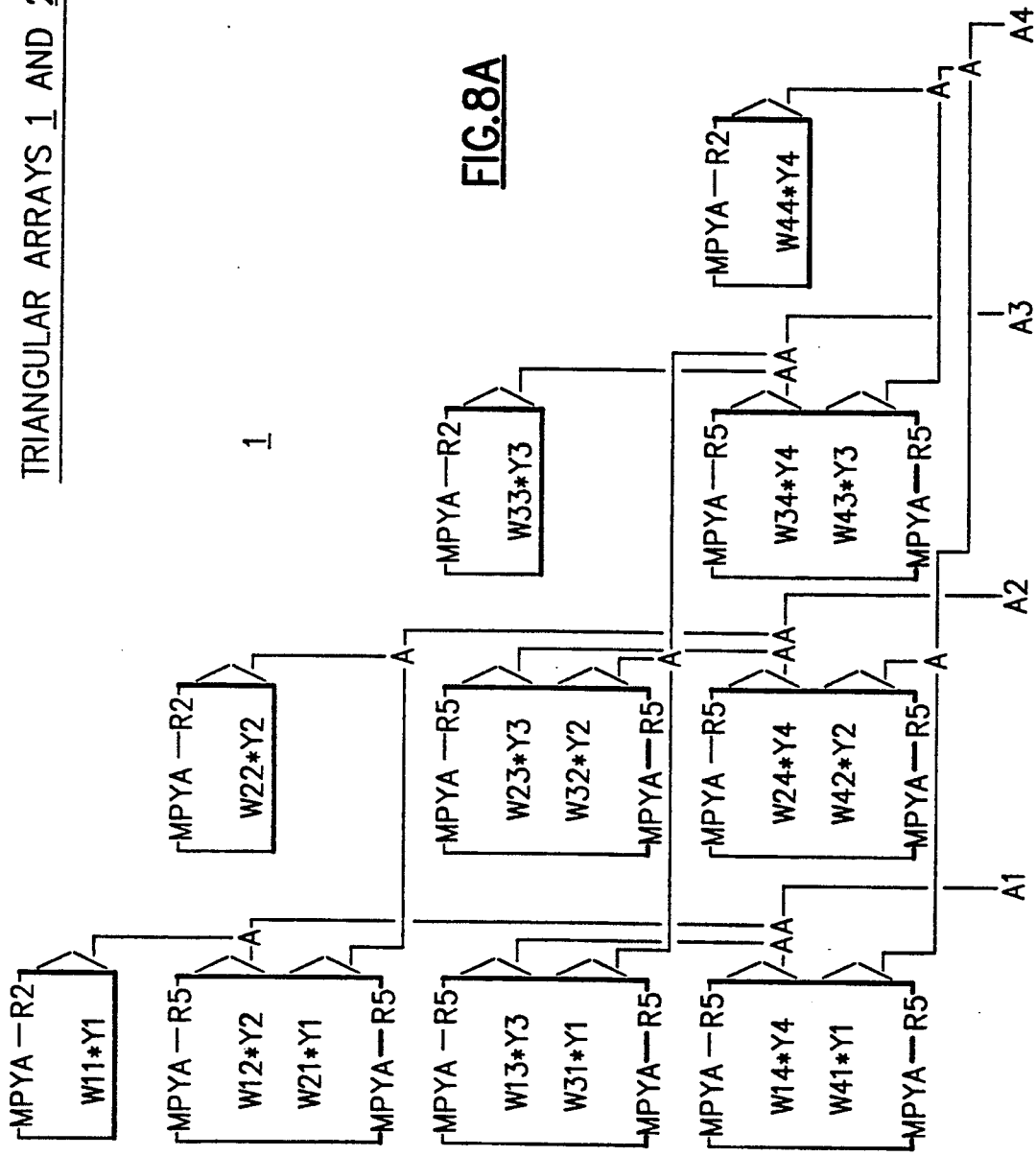
Figure 9A:
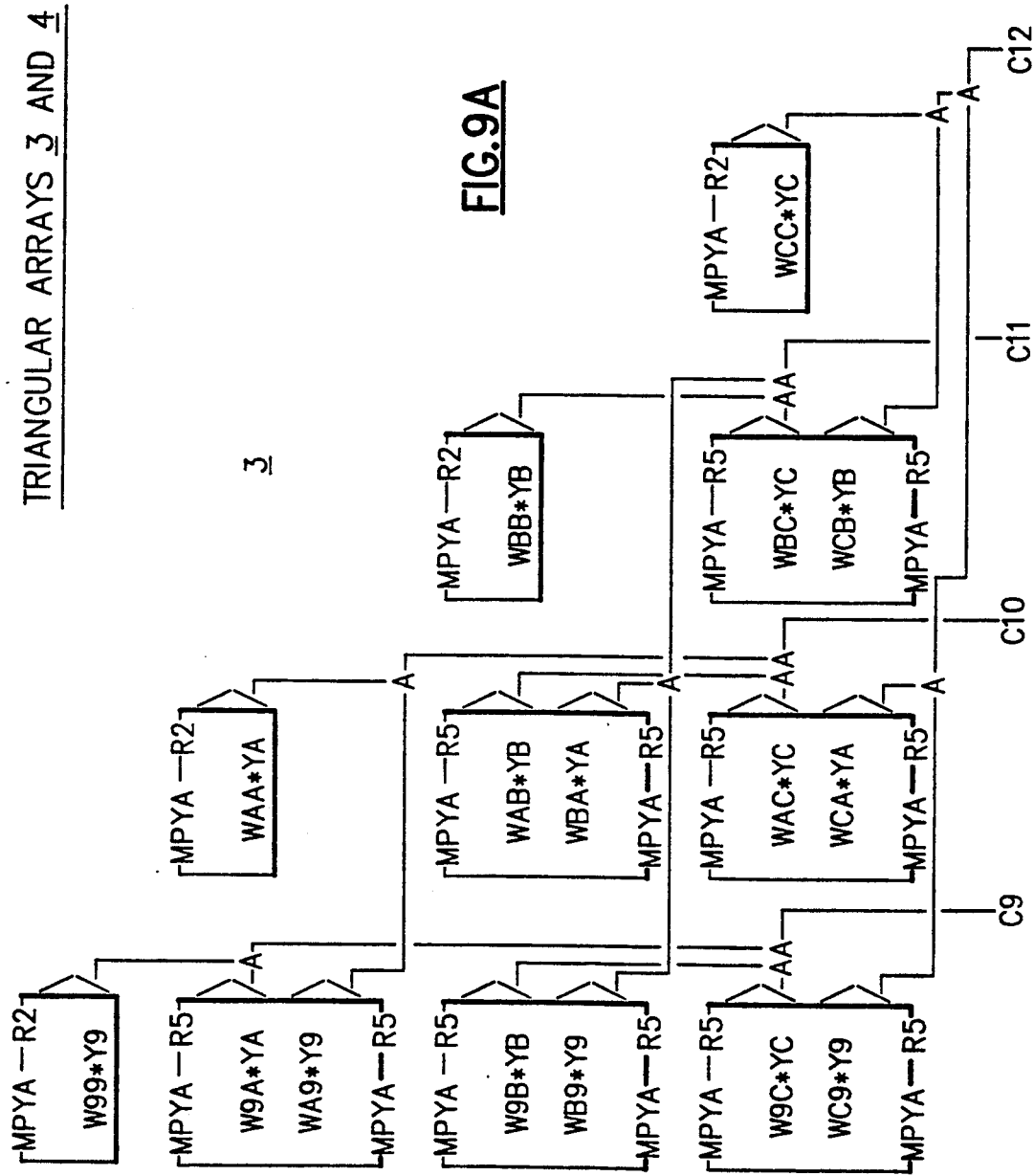
Figure 12A:
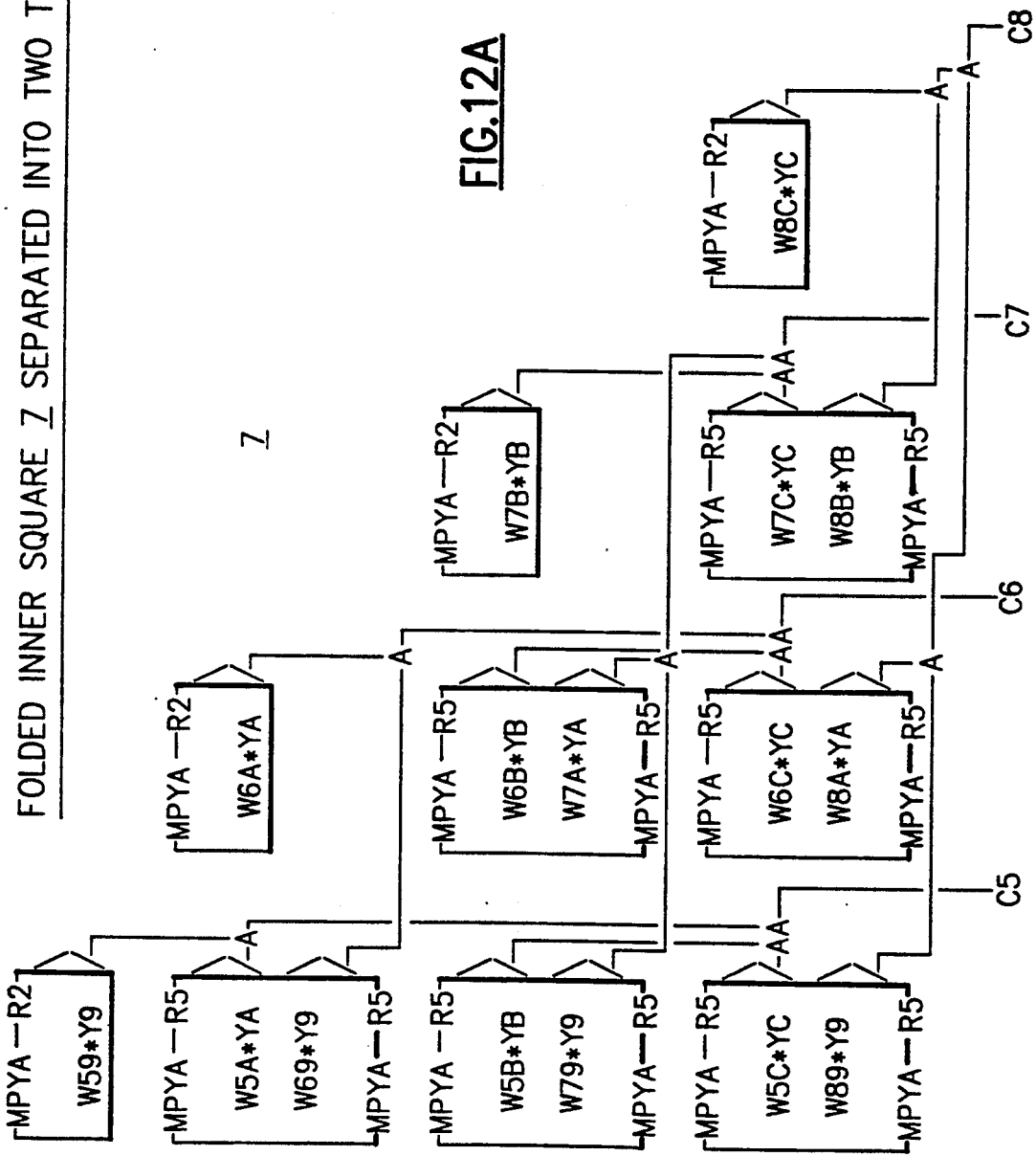
Figure 13A:
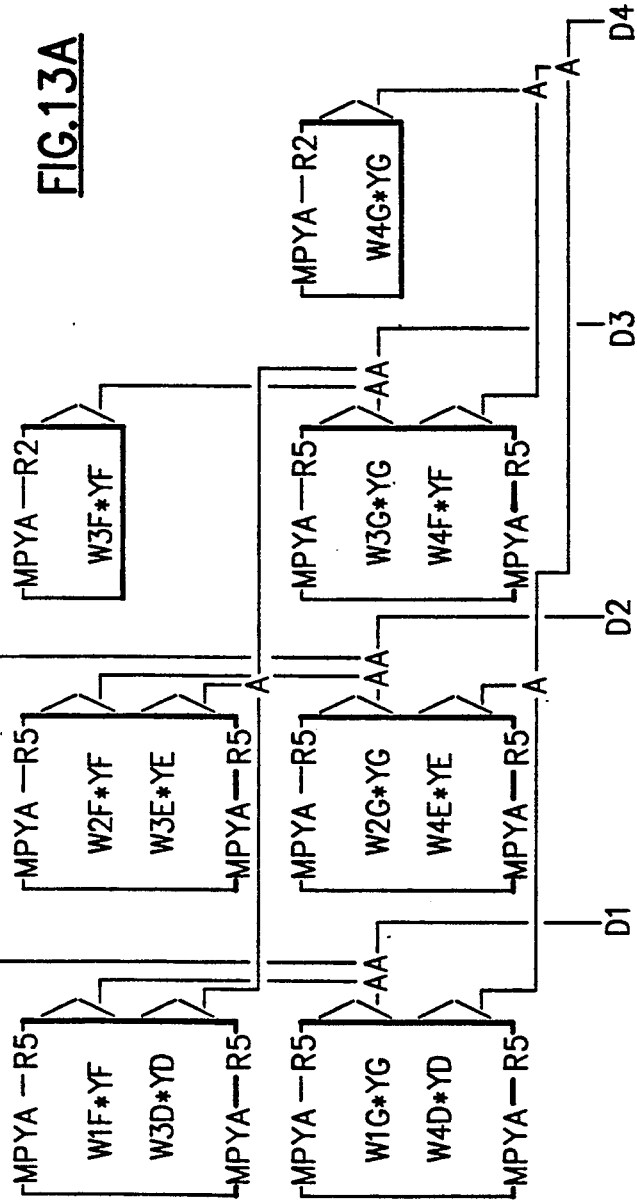
Figure 14A:
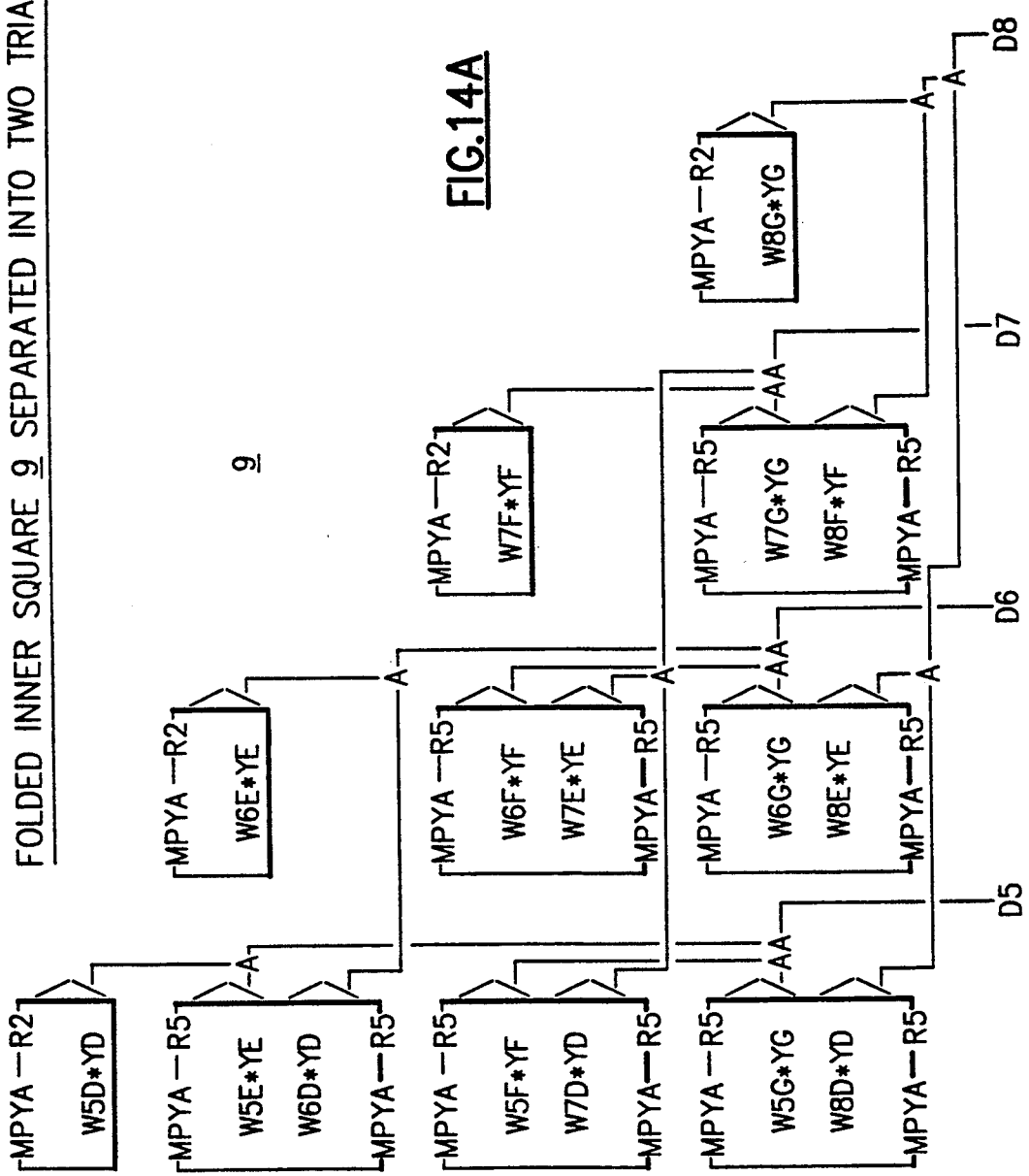

A new notation relating to groups of processors will now be introduced where G represents the number of groups and H represents the number of synapse processor elements within a group G. Each smaller triangular structure represents a group G of size H=16 in this case. FIG. 3 depicts two groups one producing A1, A2, A3, and A4 and the second producing B5, B6, B7, and B8. FIG. 5 depicts the separated triangular array groups one producing B1, B2, B3, and B4 and the other producing A5, A6, A7, and A8. To make the N=8 neuron triangular array, FIG. 2, four groups, G=4, are required. The external summation and sigmoid generation functions, and reverse communication paths, completing the 8 neuron model, are shown in FIG. 6 where the (→) indicates the forward summation path and the (←) indicates the reverse communications path.

Figure 16A:
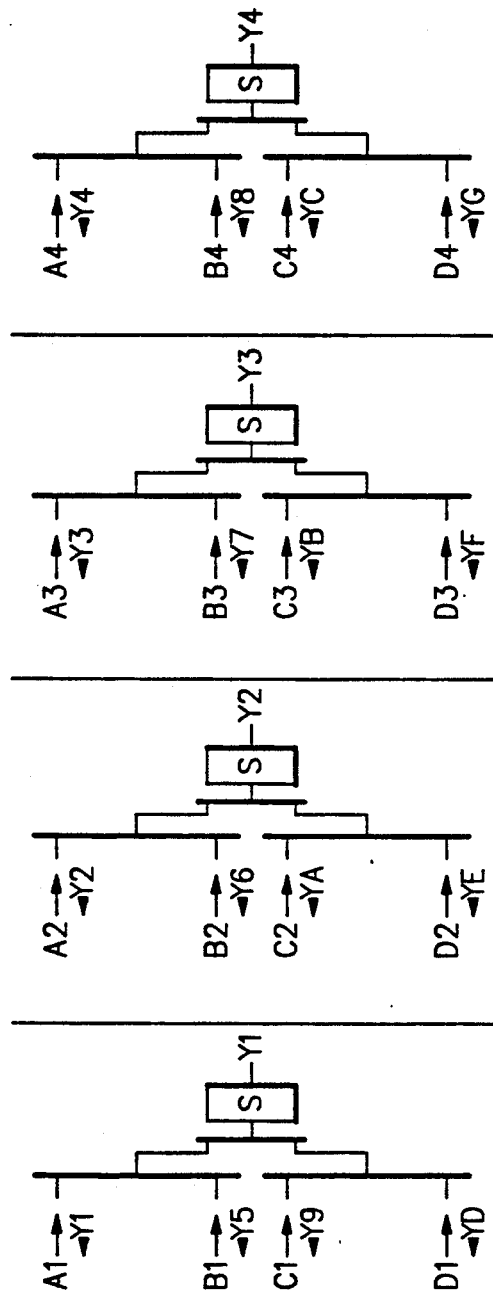
Figure 16:
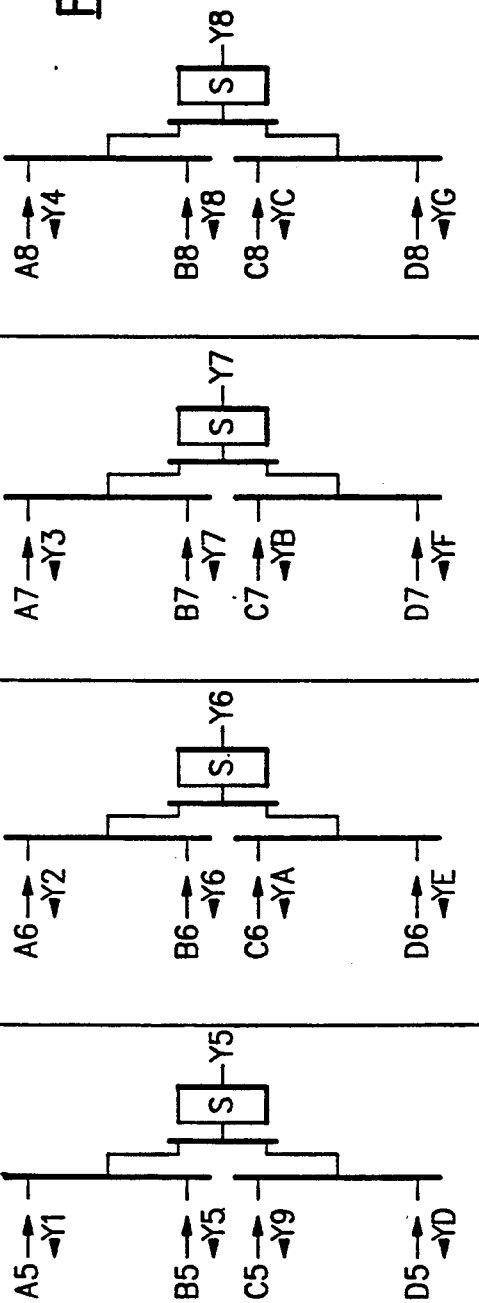

This partitioning concept is next presented for a 16 neuron neurocomputer. The first step is to partition the 16 neuron structure into groups of triangular and square arrays as shown in FIG. 7. For a 16 neuron model using a group size H of 16, there are 4 triangular arrays, labeled 1, 2, 3, and 4 and 6 square arrays, labeled 5, 6, 7, 8, 9, and 10. The square arrays are next folded and separated into the desired triangular arrays. The resulting 16 triangular arrays, in this case, are shown in FIGS. 8 through 15, each marked with a group label referring to FIG. 7. The external summation and sigmoid generation functions, and reverse communications paths, completing the 16 neuron model, are shown in FIG. 16, where (→) indicates the forward summation path and the (←) indicates the reverse communications path. For ease of representation in FIGS. 8-17 please note:

A=10
B=11
C=12
D=13
E=14
F=15
G=16

In general, as the group partitioning algorithm is applied to larger structures with a given size H, more summation stages are added to the external summation tree. Assuming an implementation where a processor group is placed on a single chip, i.e. H synapse processing elements on a chip, then a scalable neurocomputer design can be built where only the external summation tree needs to be modified as additional group chips are added. This can be seen in the 8 and 16 neuron model examples.

Figure 17B:
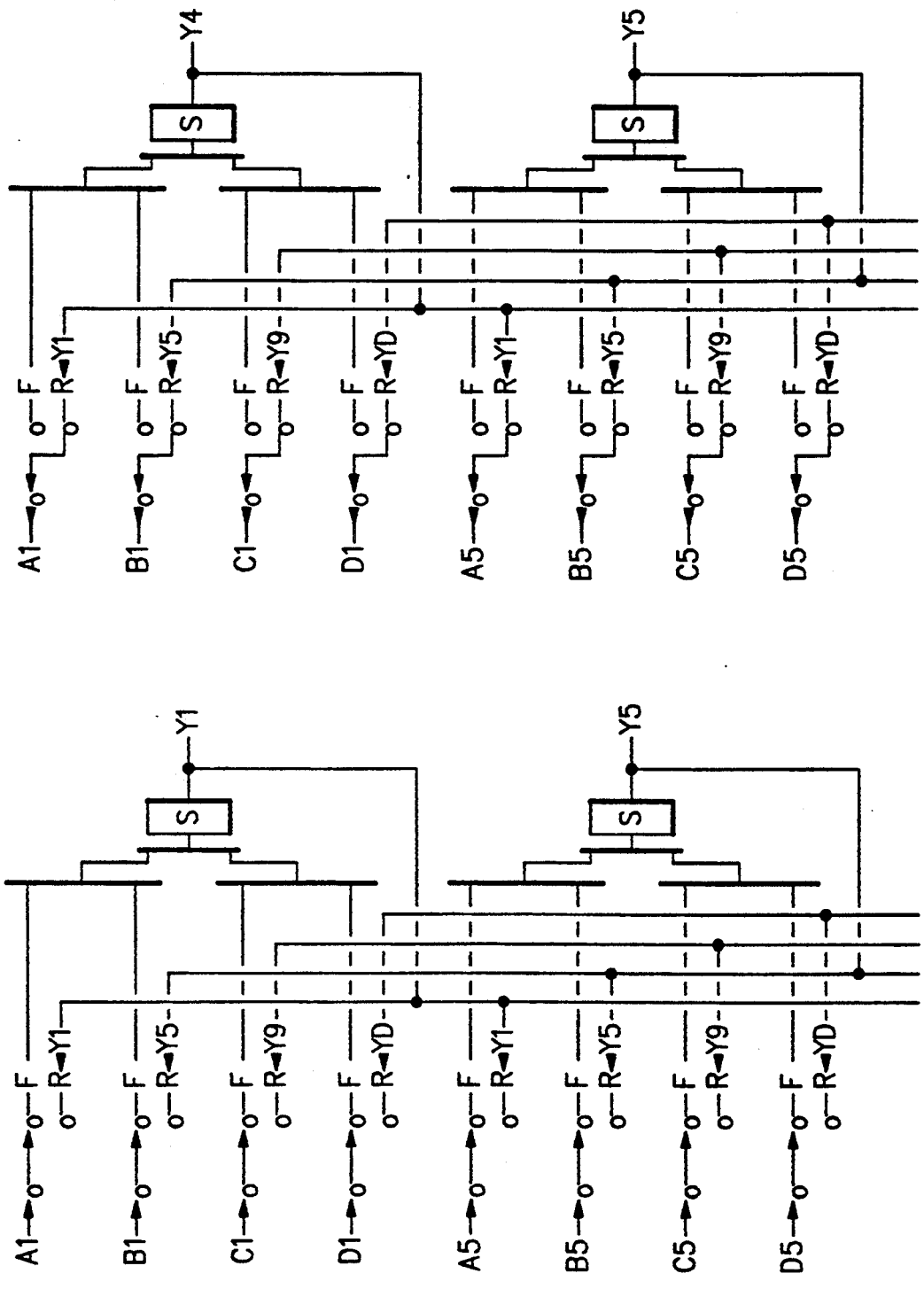

The rearrangement of Y values, which allows the square array to be restructured as two triangular arrays, affects the reverse communications path. The switching path mechanism is shown in more detail in FIG. 17. FIG. 17A presents the switches for the 8 neuron example for Y1 and Y5 while 17B presents the switches for the 16 neuron example for Y1, Y5, Y9, and YD. The same switching mechanism is used for the other neuron outputs in each example. It should be noticed that a path switch in the reverse communications path is implemented by the switching mechanism. For example in FIG. 17A Switch Position For Reverse Communications, Y1 is reverse communicated to the A1 and A5 summation path while Y5 is reverse communicated to B1 and B5. Looking back to FIGS. 3 and 5, triangular structures only, it will be seen that within the DSYPs and GSYPs the received Y values are serialized into the correct register, opposite from the respective summation tree's source point. The same switch in the reverse communications path is followed in the 16 neuron example, FIG. 17B.

The external switching mechanism, FIG. 17, requires further modification for the support of back-propagation learning. There are four different operating modes to be supported by the external processing switching mechanism, two due to the neuron execution, as presented in FIGS. 17A and 17B, and two due to back-propagation learning:

1. External summation of the neuron input summation function.
2. Reverse communication of neuron output Y values.
3. Reverse communication of error signals $E_j$ in learning.
4. External summation of the weighted error summations $ER_j$ in learning.

Operating modes 1 and 4 relate to the forward summation paths, and operating modes 2 and 3 relate to the reverse communications path. The external summation and reverse communication requirements for learning and neuron execution are different. Therefore, different values are externally summed and different values are reverse communicated depending upon whether the hardware is in a neuron execution mode or in a learning mode. In more detail, consider the reverse communication paths for neuron execution as compared to learning. In neuron execution mode, a reverse communicated $Y_j$ must be multiplied with its appropriate $W_{ij}$, while in learning, a reverse communicated error signal, $E_j$, must be multiplied with its appropriate $W_{ji}$. This seemingly small change in subscripts of the reverse communicated values, $Y_j$ and $E_j$, indicates that different reverse communications paths are required for the $Y_j$ value as compared to the $E_j$ value. The different paths are due to the separated triangles of the folded square. The external switch, FIG. 17 of the examples, must be modified to support both different path requirements.

Figure 19B:
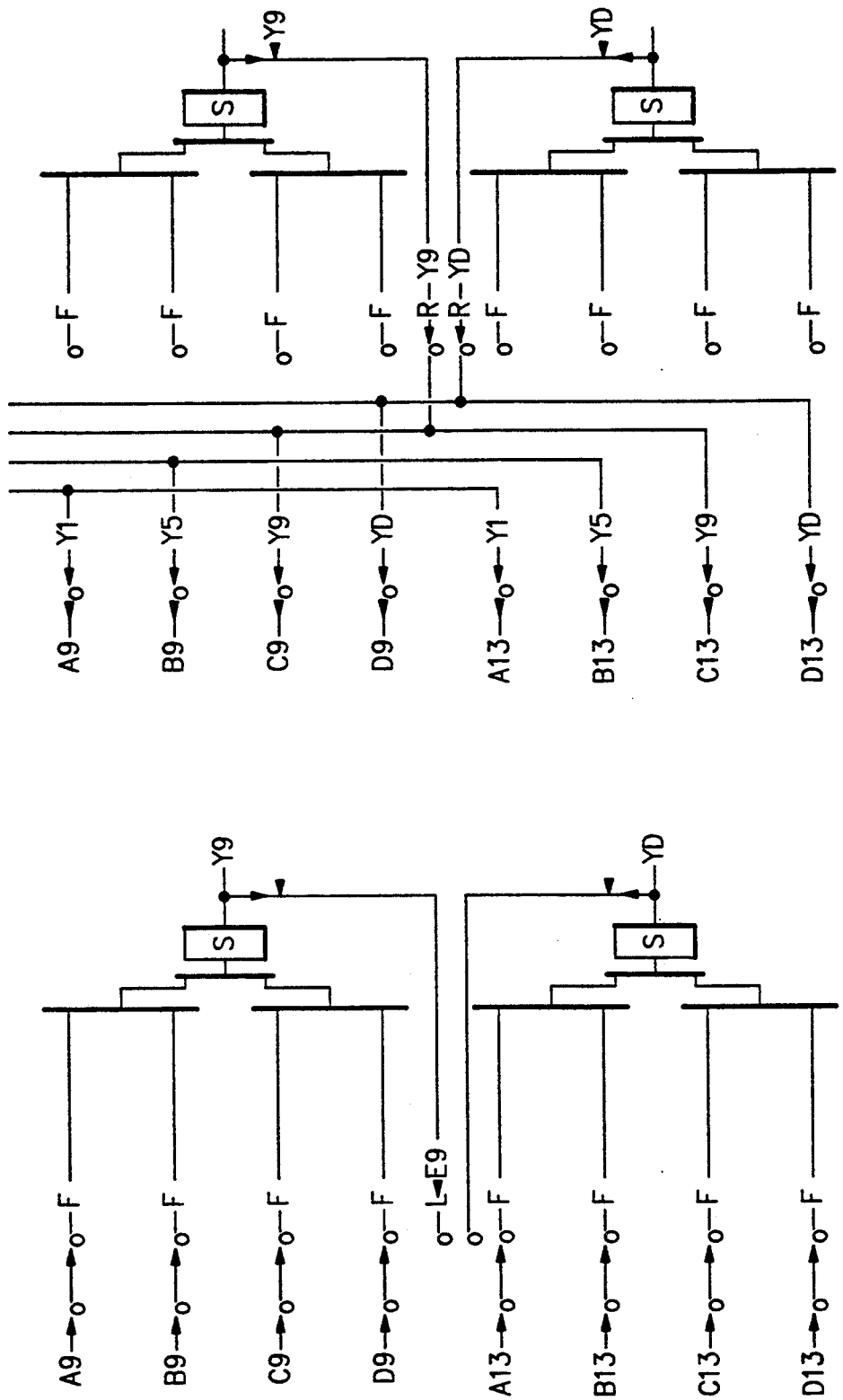
Figure 20B:
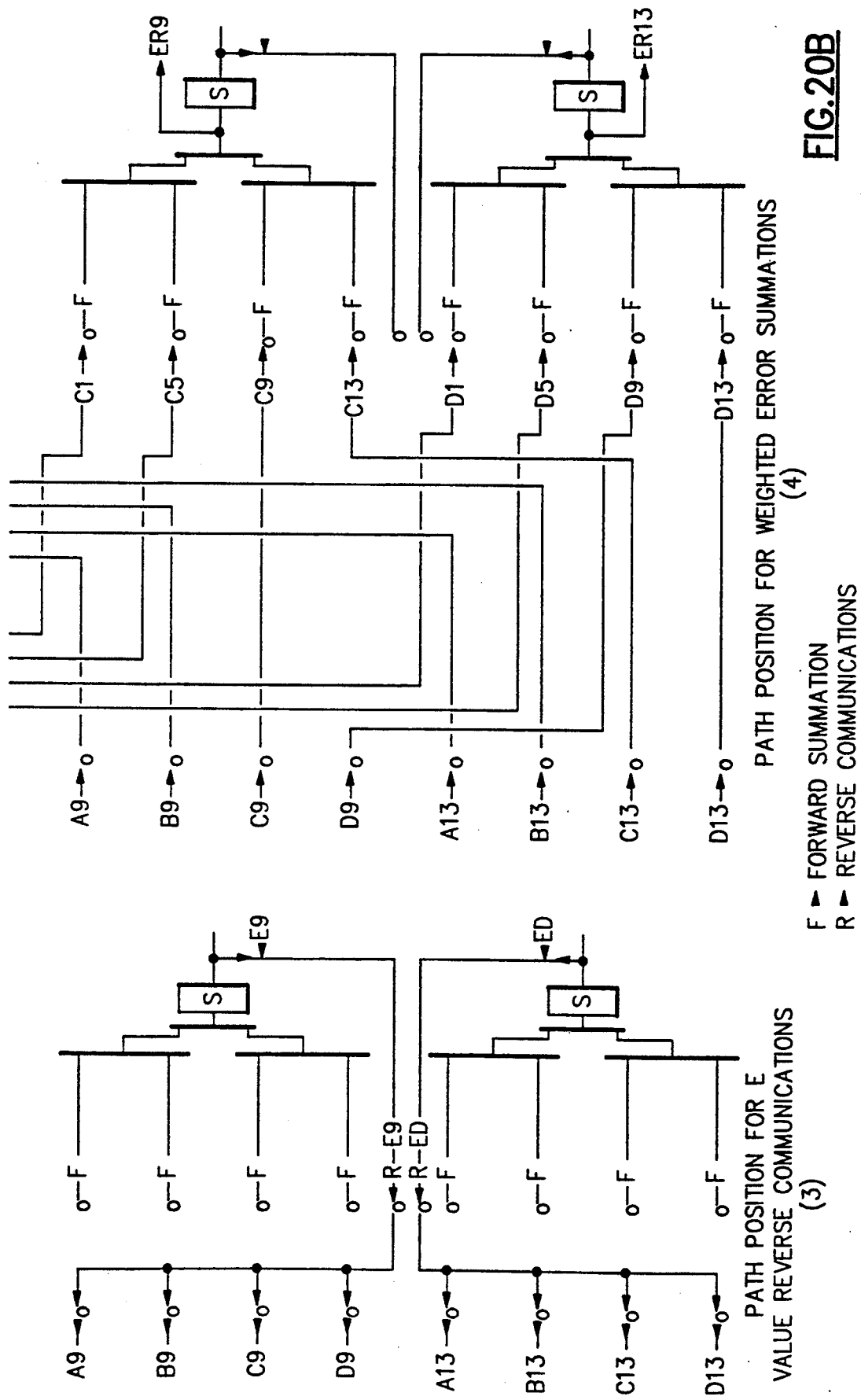

An additional change to the switching function of FIG. 17 is made to accommodate the forward summation requirements. FIG. 18 presents the modified external switching mechanism for the 8 neuron example where the labeled FIGS. 1-4 correspond to the four switch operating modes described above. FIGS. 19 and 20 present the modified external switching mechanism for the 16 neuron example. FIG. 19 corresponds to the switch operating modes 1 and 2 while FIG. 20 corresponds to switch operating modes 3 and 4. It will be noted that not all paths change depending upon the operating mode. Using FIG. 18 as an example, the neuron input forward summation paths (1) for A1 and B5 are the same paths required for the weighted error summations (4) for A1 and B5. In addition, the reverse communication's paths for A1 and B5 are the same in both neuron execution and in learning. It will be noticed from FIG. 3, that A1 and B5 are associated with the diagonal triangular arrays not requiring use of the folding algorithm. The paths which must change depending upon the operating mode are those that are associated with the separated triangular structures from the folded inner squares.

Figure 22D:
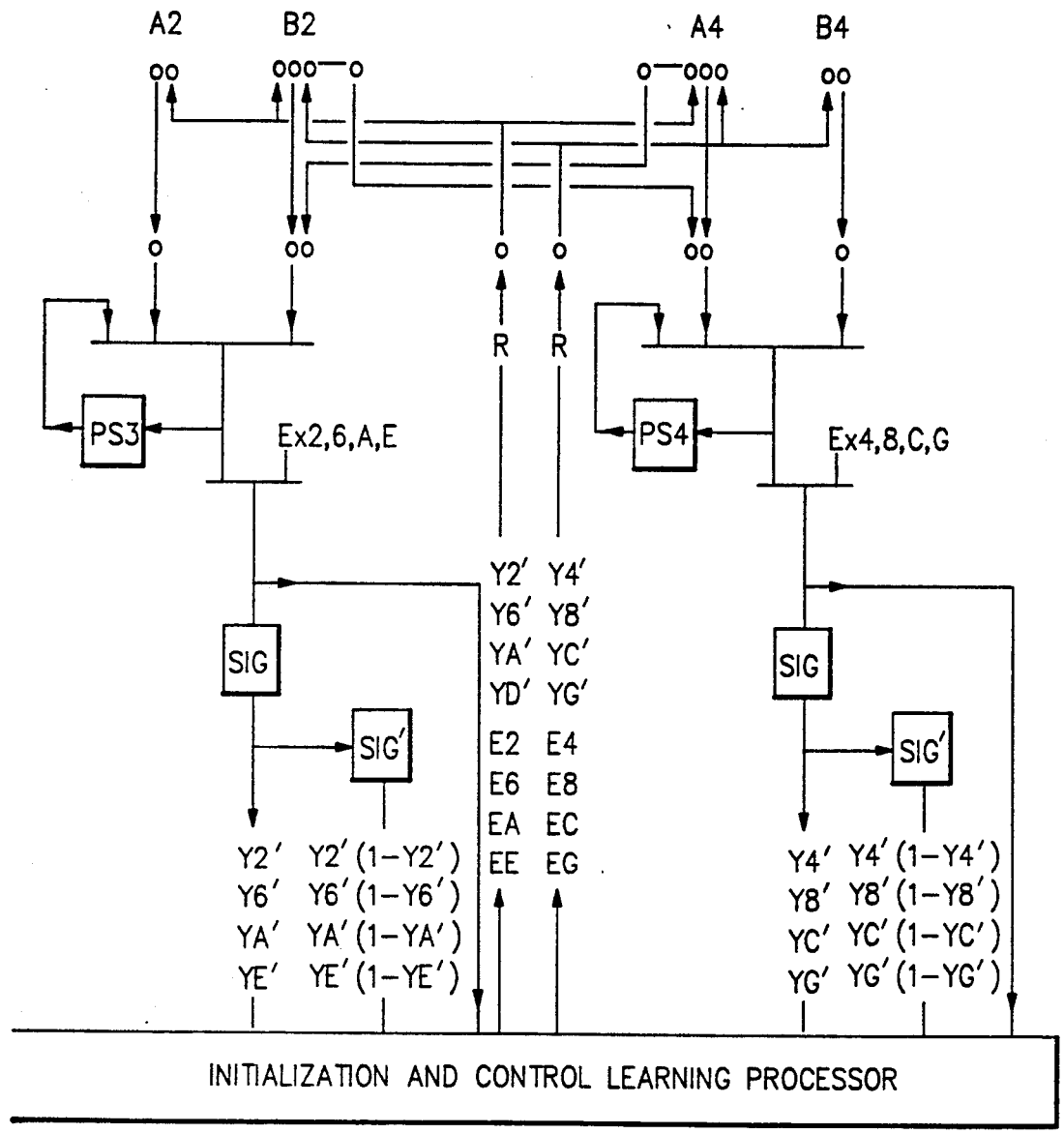
Figure 22:
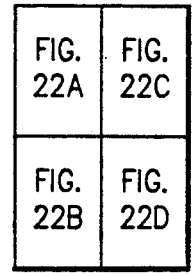
Figure 22A:
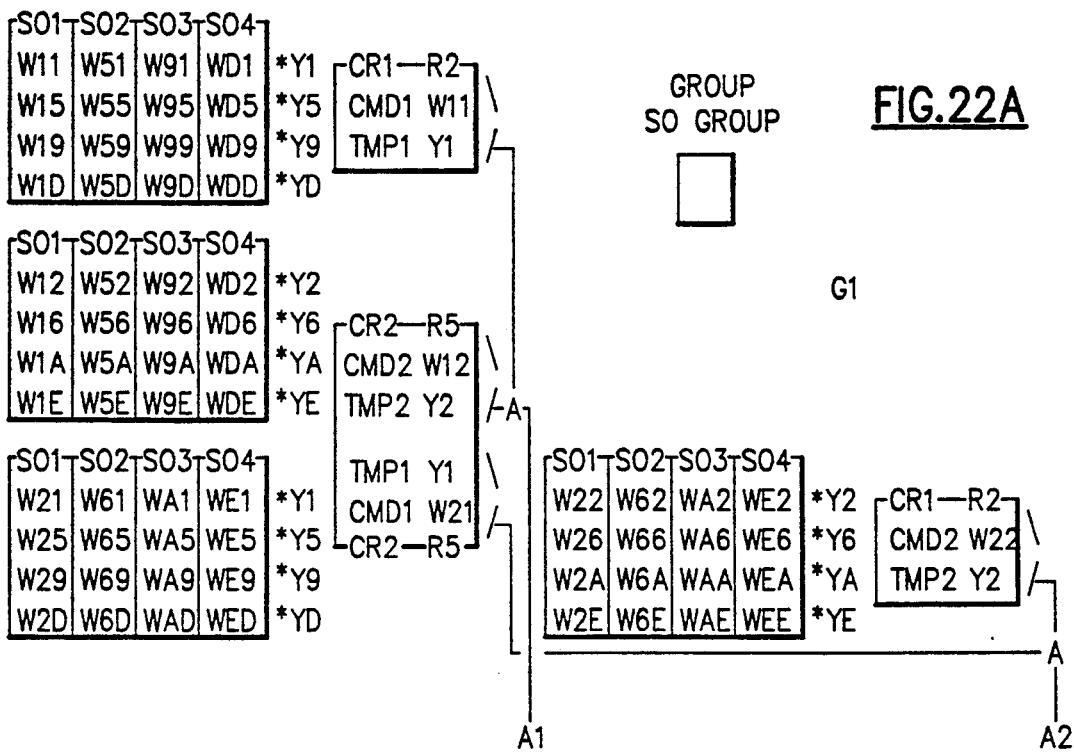
Figure 22B:
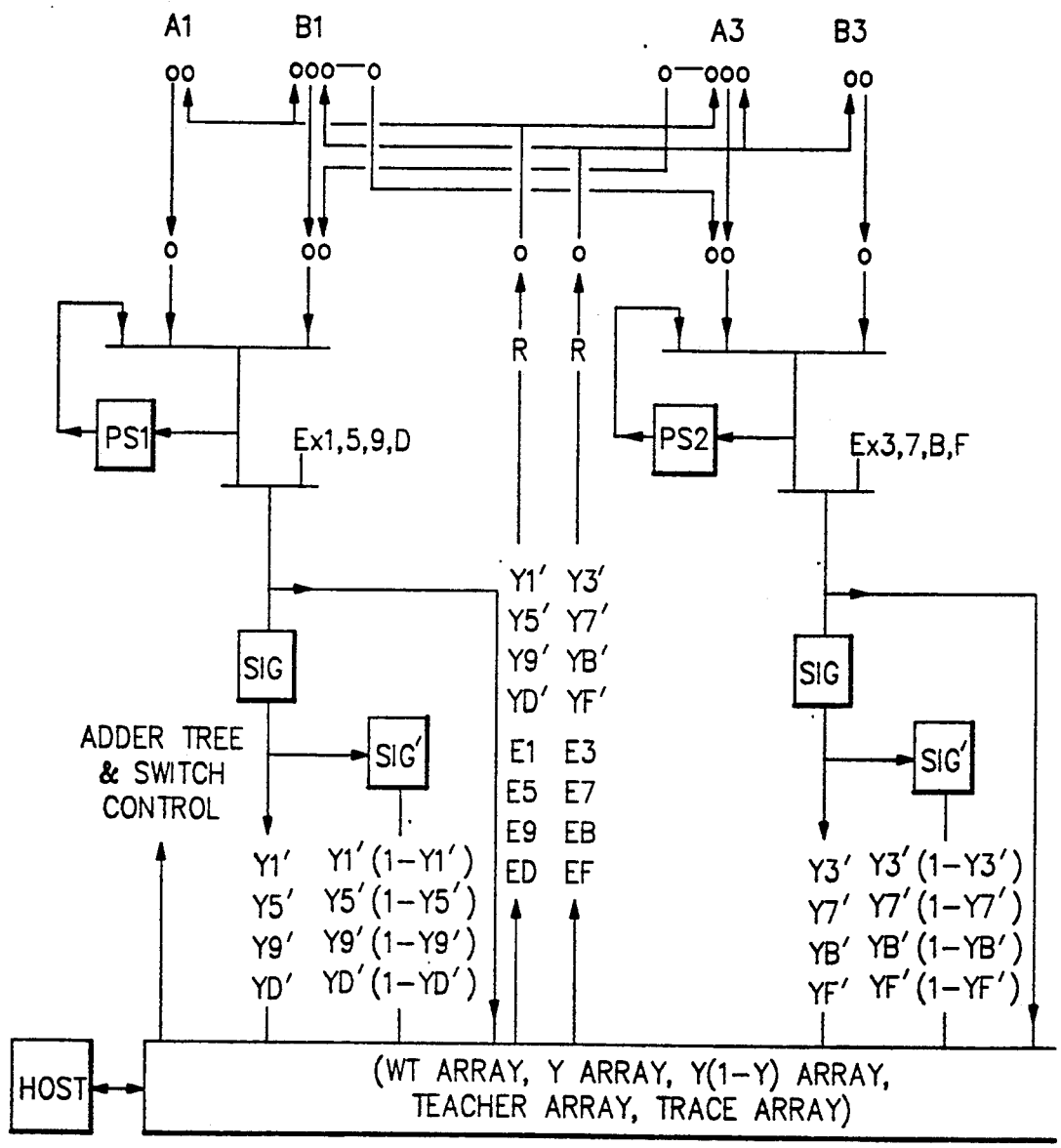

It should be noted that the folded inner square prior to separating, FIG. 4, could be used as a common replicatable building block. By zeroing out the weights and Y values for half of the folded array the folded array can model the functions of the edge triangular arrays using twice as many processors. With this arrangement of groups there is still a requirement for an external switching function. Instead of requiring the switching function due to the separated folded inner square triangular arrays, the switching function is needed for the edge triangular arrays modeled on the folded square building block. Since the folded square building block approach requires twice as many processors in a processor group, for a given size diagonal triangular array, and there is still a requirement for an external switching function, the folded square building block approach will not be considered further in this description. Neither the 8 nor the 16 neuron example, FIGS. 2 through 17, requires virtual capability as V=N in both cases. The virtual neural processing capability requires, in addition to the storage of more than one weight and Y value per synapse processing element, a method of processing a portion of the neuron input sum of products function. An iterative adder with a Partial Sum (PS) storage element allows the total neural processing to be broken up into multiple cycles, adding a previous partial sum to the newest partial summation generated. An example which adds virtual capability to the processor group concept is described next for the case where V=16, N=4, H=4, and G=4, FIG. 22, which will be used later in this description in the virtual learning example. FIG. 22 includes the modified switching mechanism, an iterative adder with Partial Sum (PS) storage, and the Initialization and Control Learning Processor which interfaces with the Host computer. The HOST computer assumes the responsibilities of initializing the processor groups through the learning processor. For example, the loading of the number of neurons in the network to be emulated, all the connection weights, (the initial neuron values, if required,) "teacher" values in support of a learning algorithm, the number of network update cycles to be run, as well as starting the model into execution are requirements which must be met prior to beginning an emulation cycle. In addition, the learning processor can contain a tracing facility for monitoring a network's execution.

There are G=4 groups where each group contains H=4 processing elements labeled in FIG. 22 as G1, G2, G3, and G4 where:

G1 generates A1 and A2
G2 generates A3 and A4
G3 generates B1 and B2
G4 generates B3 and B4

Since V=16, there are $V^2$ connection weights to be stored in memory. For this example, FIG. 22, there are four groups of four processing elements each resulting in sixteen total processing elements in the completed system. Therefore, there are required sixteen connection weights in each processing element to support a completely connected network of sixteen neurons.

Let a SO denote a Structure Output cycle and IA denote a partial sum Iterative Add cycle. In general, given V virtual neurons and N physical neurons, assuming, for simplicity, both are powers of 2, and a connection weight and neuron value storage associated with each synapse processing element, a virtual learning structure is formed:

(V/N) Y values to be stored at each synapse processor element (1 element per DSYP and 2 elements per GSYP).

($V^2/N^2$) connection weights to be stored at each synapse processor element.

(V/N) Iterative Add (IA) cycles of $N^2$ weight * Y value multiplications each per Structure Output (SO) cycle.

(V/N) SO cycles of N neuron values per SO cycle.

Figures 21, 23:
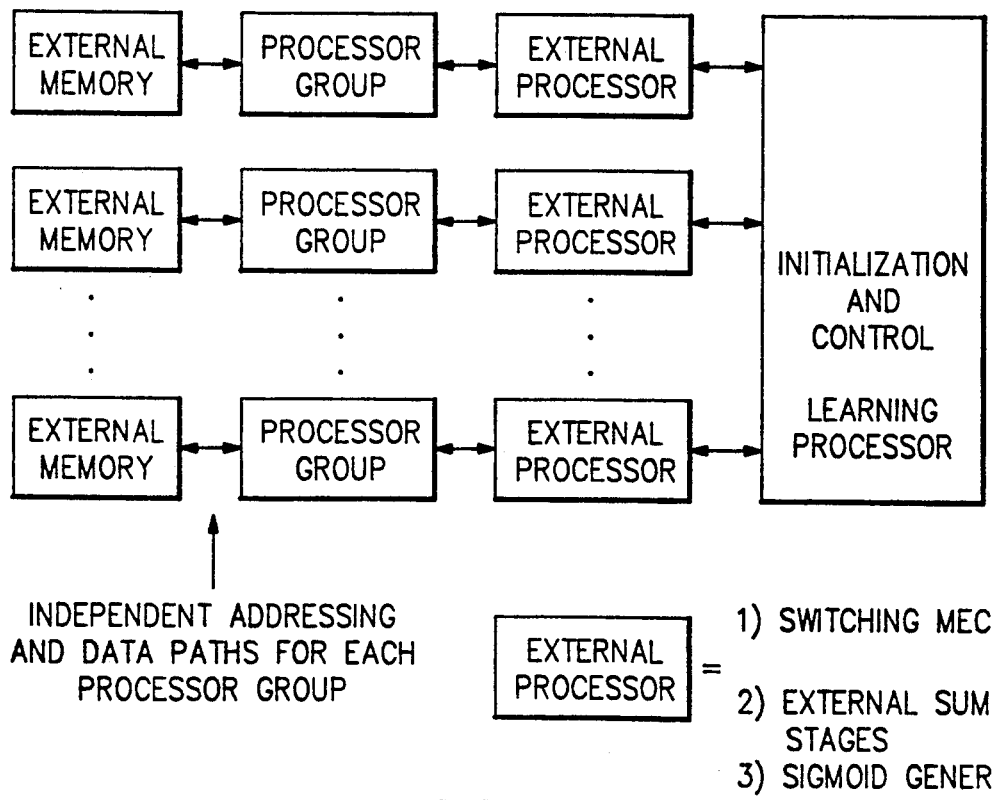
FIG. 21 is a table illustrating the V and N relationship to storage and operating cycles.
FIG. 23 shows an external memory structure.

For example, FIG. 21 shows a V, N relationship to storage and operating cycles.

In FIG. 22 each connection weight memory of 16 weight values is organized into four SO sets of four values each, labeled S01, S02, S03, and S04, on the connection weight storage blocks. Each set requires four partial sum iterative add cycles to generate one set of neuron N=4, values.

A few other general comments are in order for FIG. 22 regarding the switching mechanism and the iterative adder. The switching mechanism shown is a composite picture of all paths required to support the four switch operating modes of the structure. The iterative adder concept was presented in co-pending application Pechanek VIRTUAL 91 where an additional delay in the summation path was required due to the iterative adder. In the present architecture it will be noted that the iterative adder delay is not necessary as this function is incorporated in the last stage of the summation tree utilizing a 3 to 1 adder, FIG. 22. Additionally, an external input, $Ex_j$ path, as presented in co-pending application Pechanek LEARN 91 is provided prior to the neuron activation function input.

EXTERNAL MEMORY EXPANSION

The synapse processing architecture (SPA) provided by Pechanek LEARN 91 had the storage capacity of only a single connection weight per synapse processing element as appropriate for the direct execution of a neural network model. For larger network models, which contain V neurons where V>N, a general method of expanding the weight and neuron value storage is required without greatly impacting performance or requiring a new chip design containing expanded internal storage. For data parallel system processing provided in Pechanek LEARN 91 the same scaling issues apply where matrix elements must be easily accessed from the synapse processor level.

The memory can be thought of as being split among groups of synapse processors where each group has independent read/write and addressing capabilities. This concept is shown in FIG. 23 illustrating a preferred external memory structure.

Figure 24A:
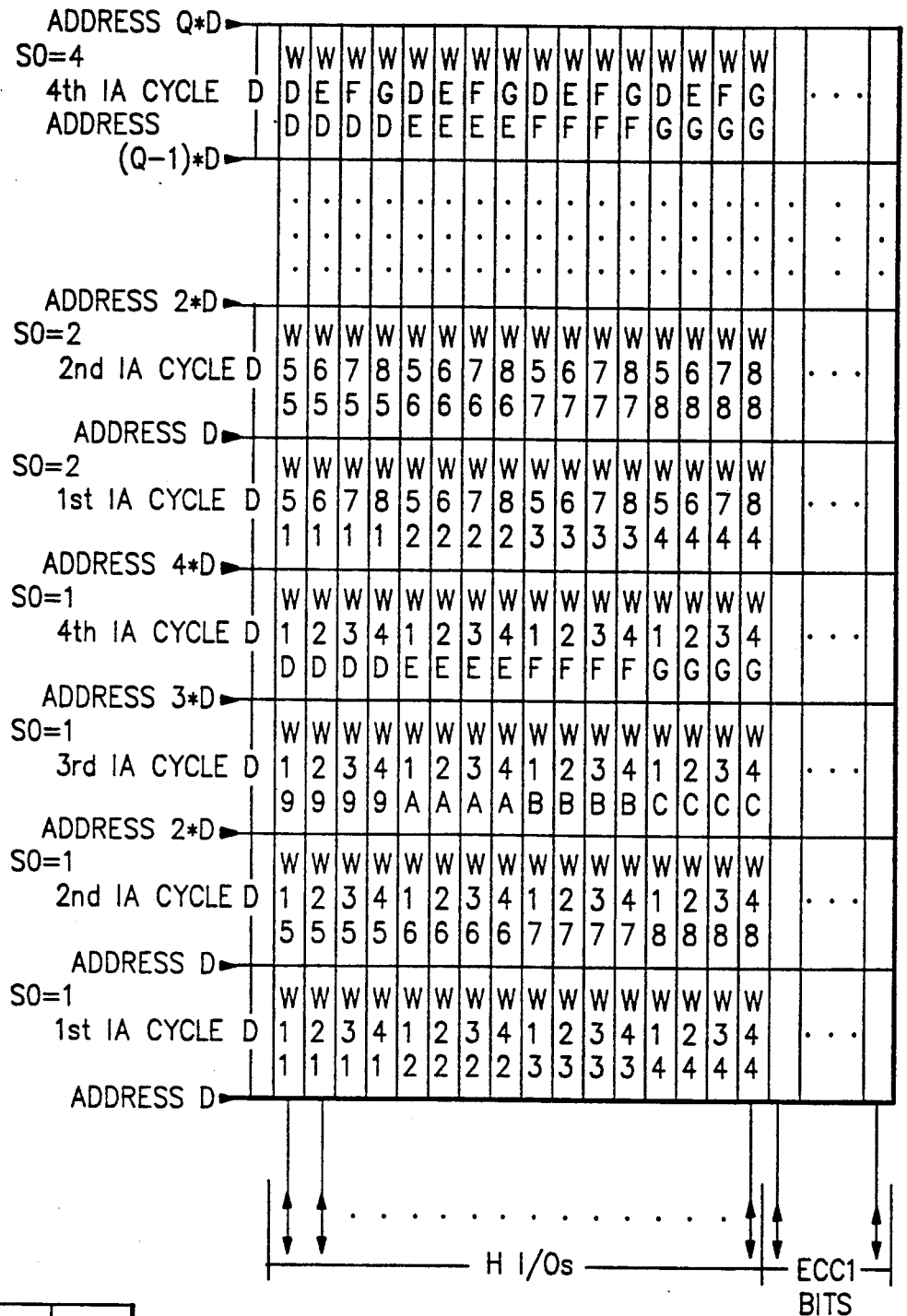
Figure 24B:
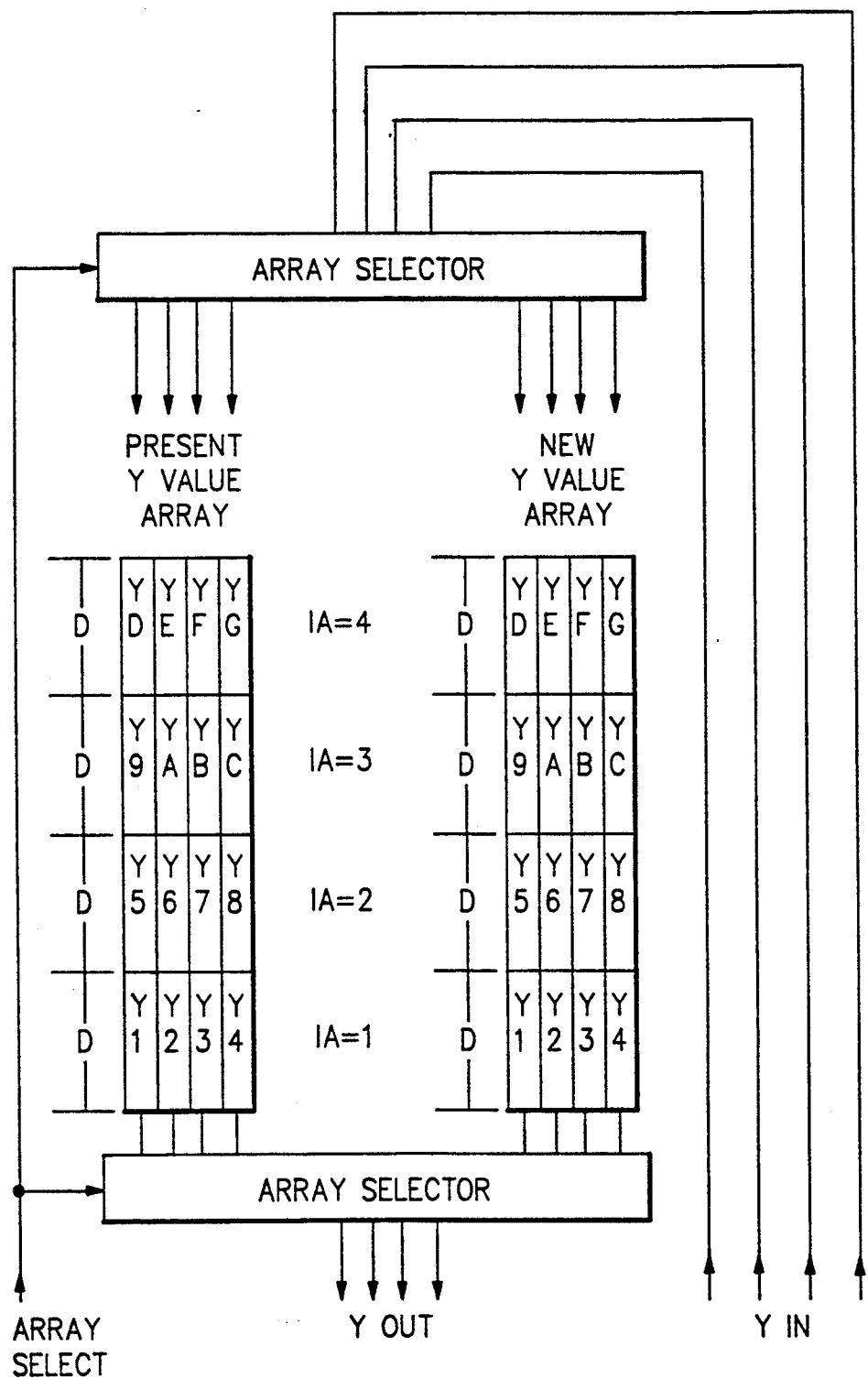

Assuming an external connection weight memory configuration as shown in FIG. 24, the memory is arranged in G groups where, given N physical neurons and H processor elements within a processor group, $G = N^2/H$. For example, assuming $N = 256$ and $H = 256$ then $G = 256^2/256 = 256$. If one assumes that a chip contains a single processor group, then a 256 neuron neurocomputer is made up of 256 group chips containing a total of 65,536 synapse processing elements. The external memory word length is made up of two pieces, one associated with the connection weight interface and the other associated with the neuron Y value interface. Both the weight and Y values are in bit-serial format. One weight memory address accesses H weight bits where there is one weight bit per processor elements in the processor group, (1 synapse processor element per Diagonal SYnapse Processor, DSYP, and 2 synapse processor elements per General SYnapse Processor, GSYP, FIG. 25). For simplicity, assume an even power of two criteria for specifying H and N, then the $\sqrt{}$ represents the number of Y values utilized within the processor group. The external memory interface then has a composite word length of $(H + ECC1 + \sqrt{} + ECC2)$ bits, the ECC1 bits correspond to error correction code bits on each group of H bits, and the ECC2 bits correspond to error correction code bits on each $\sqrt{}$ bits. Both ECC1 and ECC2 bits are determined using an error detection and error correction coding scheme such as the Hamming single-error correction code illustrated in Hellerman 67 which requires ECC additional bits based on equations 4 and 5:

$$2^{ECC1} \geq H + ECC1 + 1 \quad (4)$$

$$2^{ECC2} \geq \sqrt{H} + ECC2 + 1 \quad (5)$$

For example, with $H = 64$, corresponding to 64 synapse processing elements, then $ECC1 = 7$ additional bits must be used. The ECC interface will allow the fix up of data detected as in error. The weight array interface is bidirectional, allowing each synapse processor write access to its external weight value storage as is required to support learning. In addition to the weight memory, two other external memory arrays are utilized, one for the present neuron state value (Y) and one for the updated neuron state value (Y'). These are $\sqrt{HY}$ values output for each processor group. The present and new Y value arrays may be toggled back and forth every network update cycle. For example, the Present Y Value Array will output Y values for a whole network update cycle while updated Y values are being loaded into the New Y Value Array. For the next network update cycle, the arrays switch meaning where the newly updated Y values (New Y Value Array) are used as the present values in the next network update cycle and the previous Present Y Value Array is overwritten with new Y values. An array selector signal, which selects one array for output and the other array for loading Y values, allows the arrays to toggle back and forth. In another mode of operation, only the present Y value array is used and new Y values overwrite previously stored Y values. The synapse processor internal register length, which corresponds to the bit length of the parameters used, is D bits long which includes within the D bits the Conditional Execution Bit (CEB), FIG. 29. D external memory addresses correspond to H separate values of D bits each, which can be loaded 1 value per processor element in a bit-serial fashion. The external weight memory holds $Q*H$ values or equivalently $Q*D$ memory locations of $H + ECC1$ bits per memory location. Memory values are accessed for groups of processors and memory values can be read from or written to via group processor controls.

Figure 25A:
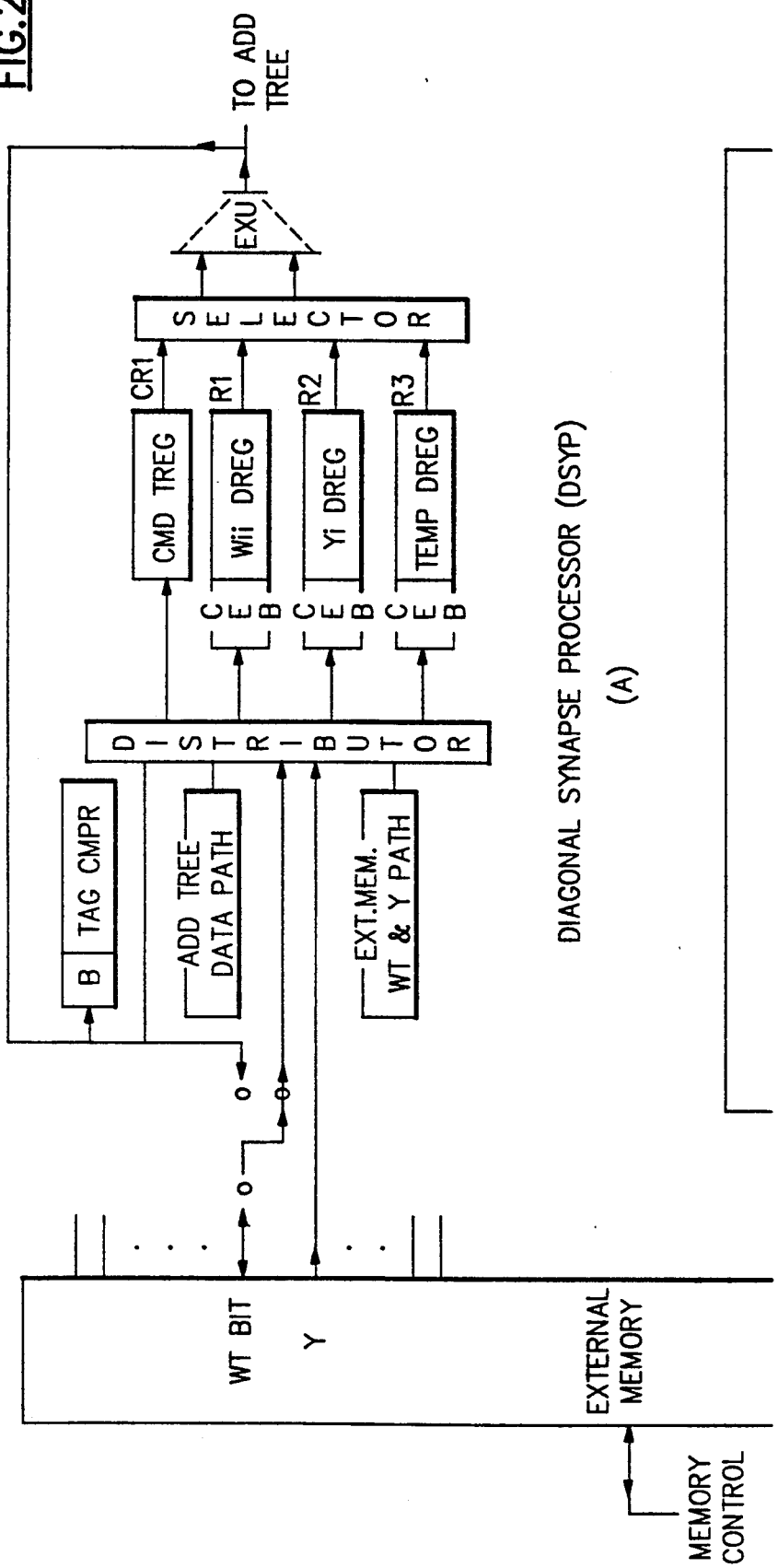

The memory connection to the synapse processor cells is depicted in FIG. 25. A memory connects to a diagonal synapse processor cell, FIG. 25A, with two external memory I/O line going to the distributor. The weight and Y value path from external memory is controlled by a stored PATH address. There is one address for the weight memory with bidirectional I/O lines, i.e. weight values can be either read from or written to memory separately but not simultaneously. There are two addresses for the Y value arrays, one set of addresses for each array and each independently controlled. For the G-cell synapse processors, FIG. 25B, a bidirectional weight bit and an output Y value bit for each synapse processor element are connected to the distributor allowing separate paths to the internal two processor elements in a GSYP. All memory accesses are loaded into the internal processor registers. The updated Y values, Y', are sourced to external memory directly from their entry point to the processor group chip. The Y values coming from the external memory are fanned out on the processor group chip to the synapse processor elements.

The source and destination addresses are relative to the command register. The relative addressing is shown in FIG. 25A and 25B where the top command register CMD TREG relative addresses are shown in columnar fashion located to the right of the register blocks, while the relative addressing for the bottom command register CMD BREG is shown in columnar fashion located to the left of the register blocks. It should be noted, for example, that the bottom command register R2 is the same as the top command register R5. A bit string received from the Add tree, if it is a command, is serialized into one of the two CMD registers in each G-cell and the single CMD register of a diagonal cell. Alternatively, a data bit string received from the Add tree, is serialized to one of the six other registers available in a G-cell and one of the 3 other registers available in a diagonal cell. In the DSYPs a source or destination address of R4 through R6 and CR2 are mapped as follows:

R4→R3
R5→R2
R6→R1
CR2→CR1

An example timing diagram for a 4 neuron SVLM with $V = 16$ neuron capacity for which there are $16/4 = 4$ SO cycles of 4 IA cycles each, is shown in FIG. 26.

Each SO cycle is made up of V/N IA cycles. An IA cycle consists of the weight times Y value multiplication followed by the summation of the V/N multiplied values and storing the partial summation result in the iterative adder. To ensure that good performance, the weight and Y values for the next IA cycle need to have been accessed during the first IA's multiply time. For this to occur, a requirement is placed upon the EXU's multiplier (or any EXU function) such that all operands entering the EXU are not held fixed, external to the EXU, during a function's execution. For the multiplier, this implies that it must contain its own operand register, if required, and for good performance, a result bit is generated one cycle later from when its corresponding operand bits enter the multiplier. To ensure no hazards occur the following relationship, equation 6, for the EXecution Unit (EXU) multiplier function must be met. This is applicable to other EXU functions also, equation 7.

$$D\delta_{extmem} \leq \delta_M \text{ FOR MULTIPLICATION} \quad (6)$$

$$D\delta_{extmem} \leq \delta_{EXU(fn)} \text{ IN GENERAL} \quad (7)$$

Where:
D bits per read/write access
$\delta_{extmem}$ is the external memory access delay
$\delta_M$ is the multiplier delay, typically $2*(D-1)$ clock cycles long
$\delta_{EXU(fn)}$ the delay of an EXU specified function All functions of the EXU can be made to execute in the same length of time by padding shorter executing functions. In this fashion the longest executing function determines the criteria for the external memory access timing. For example, assuming the multiplication function is the longest EXU executing function and the multiplication of two 32 bit operands takes 64 clock cycles to accomplish, the maxmimum external memory access delay of a 32 bit operand is 64 clock cycles. By forcing all EXU functions to be of the same delay no stricter requirements are placed on the external memory access delay. FIG. 27 depicts a timing diagram for one SO cycle which generates one set of N neuron values. The numbered items are explained in detail:

1. Begin IA1 cycle with first bit serialized into the EXU multiplier.
2. The first bit of the multiplied result exits the multiplier and enters the summation tree.
3. The first bit of the multiplied result plus a partial sum of 0 exits the 3 to 1 adder and enters the partial sum register.
4. The last bit of the multiplied result exits the multiplier and enters the summation tree.
5. The last bit of the multiplied result plus a partial sum of 0 exits the 3 to 1 adder and enters the partial sum register.
6. The last bit of the second IA cycle's partial sum is stored into the partial sum register.
7. The last bit of the third IA cycle's partial sum is stored into the partial sum register.
8. The last bit of the fourth IA cycle's partial sum enters the sigmoid generator.
9. The first bit of the sigmoid result exits the sigmoid generator and enters the summation tree for the reverse communications back to either external memory or a register in the synapse processor.
10. The last bit of the sigmoid result exits the sigmoid generator and enters the summation tree for reverse communications.
11. The last bit of the sigmoid result is received in either external memory or in a register (first set of N Y values stored).

The time from 1 to 4 represents the time available to load a new Y value or weight value from external memory, as illustrated by FIG. 27, where the time scale is expanded to show detailed timing.

Figure 28:
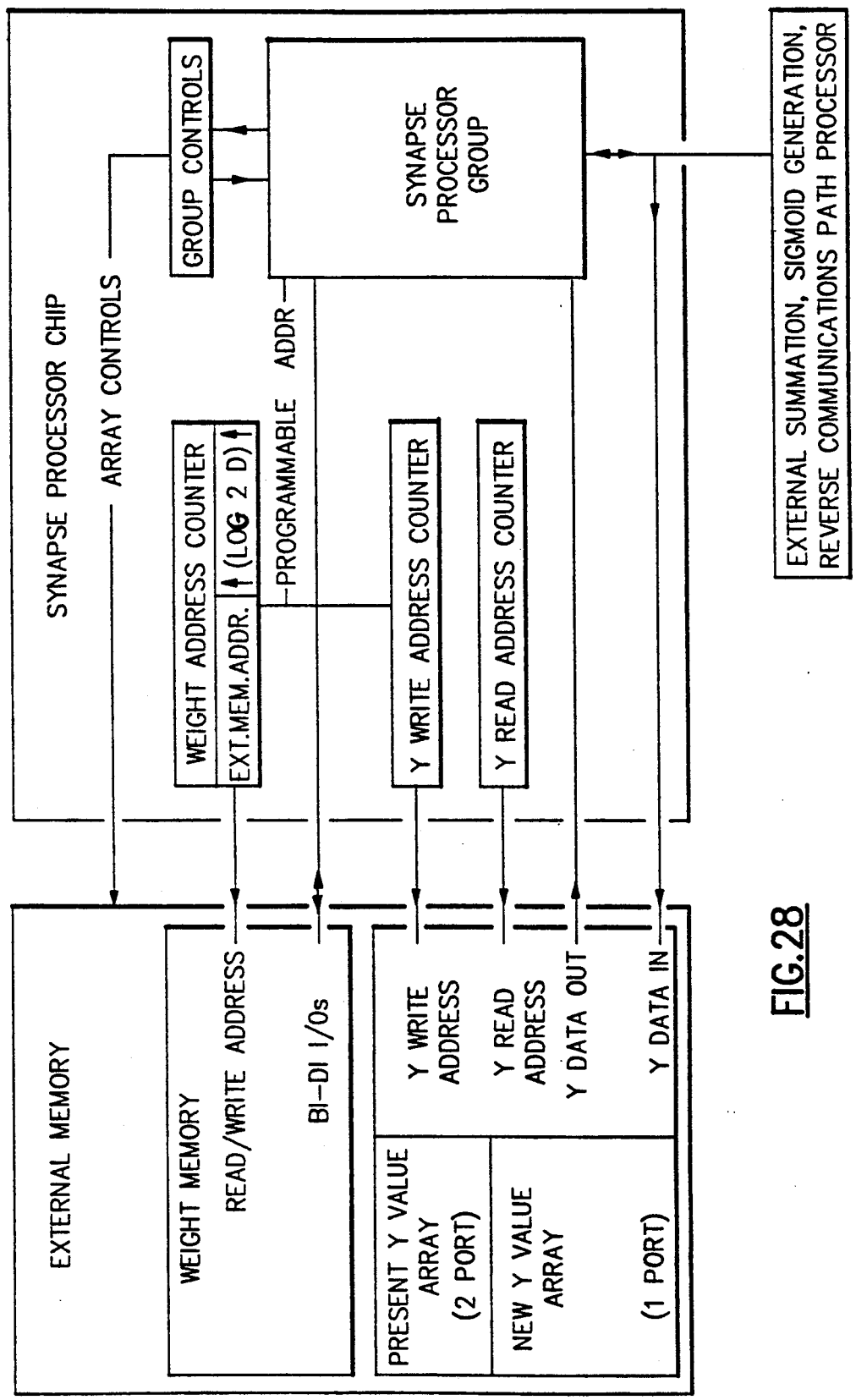
FIG. 28 illustrates a memory subsystem associate with each synapse processor group and the external memory addresssing structure.

The processor group size depends upon the chip technology cell and I/O specifications. There will be one memory subsystem associated with each synapse processor group chip as depicted in FIG. 28.

There must be two types of commands required to support the processor group concept, one dedicated for group only commands and the other associated with the synapse processors. The command format also must support the external memory as a new source and destination point. Addressing for external memory can be obtained by using the immediate data field of a synapse command. Further, the Conditional Execution Bit, CEB, must be associated with each weight and Y value stored in the external memory.

For example with N=256 neurons, H=256, and D=33 bits the command format L is defined as:

| | | |
|---|---|---|
| B BROADCAST BIT | → 1 BIT | |
| TAG | → 8 BITS | ($\log_2 N^2/H$) |
| TAG PARITY | → 1 BIT | |
| CMD BIT | → 1 BIT | |
| GROUP BIT | → 1 BIT | |
| AUTO BIT | → 1 BIT | |
| CMD | → 4 BITS | (16 COMMANDS) |
| SOURCE 1 | → 4 BITS | (16 SOURCE LOCATIONS) |
| SOURCE 2 | → 4 BITS | (16 SOURCE LOCATIONS) |
| DESTINATION | → 4 BITS | (16 DESTINATION LOCATIONS) |
| IMMED.DATA/EXT.MEM.ADR. | → 15 BITS | (15 BIT DATA/32K D-BIT LOCATIONS) |
| ECC | → 6 BITS | |
| TOTAL | → 50 BITS | |

A data word example with N=256 neurons, H=256, and D=33 bits (CEB +32 bits Data) the data format L is defined as:

| | | |
|---|---|---|
| B BROADCAST BIT | → 1 BIT | |
| TAG | → 8 BITS | ($\log_2 N^2/H$) |
| TAG PARITY | → 1 BIT | |
| CMD BIT | → 1 BIT | |
| CEB BIT | → 1 BIT | |
| DATA | → 32 BITS | |
| ECC | → 6 BITS | |
| TOTAL | → 50 BITS | |

Figure 29:
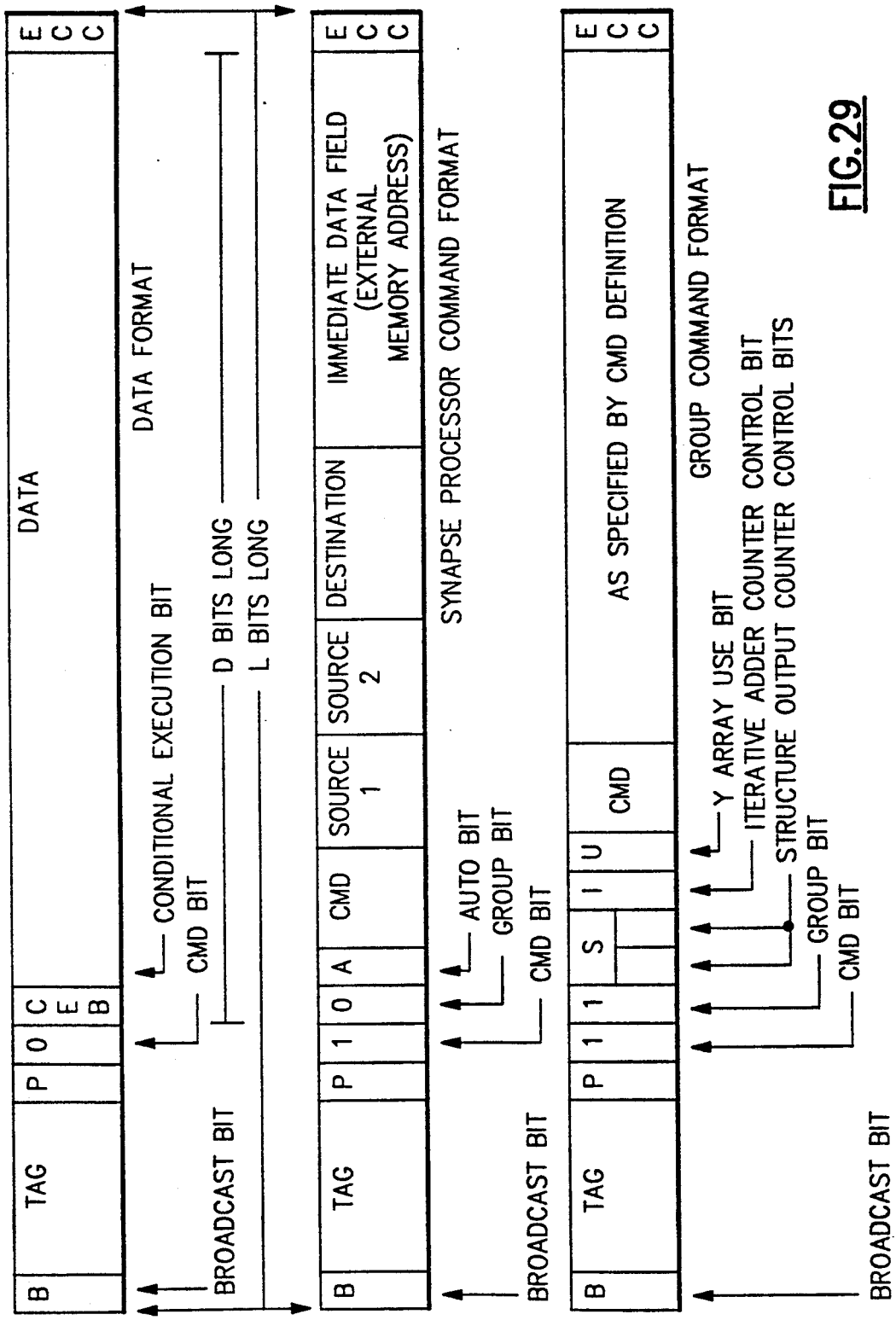
FIG. 29 illustrates a neuron processor tagged instruction/data format.

Since the internal instructions and data are D bits long, FIG. 29, and each must be received in their entirety, the external memory address is formed by appending ceiling ($\log_2 D$) bits to the memory address specified in the instruction field. The ceiling function takes the next largest integer of the function in parenthesis result. For example, 6 bits are appended to the address for a 33 bit data word stored in memory and 5 bits for a 32 bit word. The additional bits are generated automatically from a counter which is incremented each bit-slice access from the memory. After D bits have been accessed per instruction specified memory address, the counter returns to zero in preparation for the next access. In a D=32 bit example, a 15 bit external memory address field in the instruction translates to a 15+5 bit external memory address allowing a 20 bit field or $Q^*D=2^{20}$ or 1 MEG locations of H+ECC bits each or $2^{15*}$ H (32K*H) weight values. For an H=256 processor group with D=32 bits there are addressable up to 8 MEG connection weights per processor group chip.

BROADCAST BIT

The Broadcast bit indicates the following:
B=0: Command/Data is for a specific group.
B=1: Command/Data is for all groups.

GROUP COMMANDS

There is a single group command register within each processor group chip. An alternative exists for utilization of the group command register for acting as the command source for all synapse processing elements. By utilizing one command register per processor group, the individual processing element command registers could be eliminated by combining the synapse processor commands with the group commands. One group command register would save H command registers, representing a considerable savings in chip real estate. The savings in chip real estate, however, does not come free, as the group command decode must now be distributed to each of the processing elements to control the H-EXUs H-distributors, and H-selectors. In addition to the wiring problem this may cause, there is also a timing penalty due to the potentially large fanout of signals from the centralized source. Consequently, the synapse processing element command registers are left intact and only group oriented commands, typically associated with the external memory control, are implemented. There is a single group tag which is loaded into all H tag registers at initialization time. There are two types of commands specified, both with the Command Bit set to a "1" to differentiate the commands from the data (where the Command Bit is set to a "0"). A Group Bit (G) specifies whether the command is for the synapse processors (G=0) or for the group of synapse processors (G=1). Table 1 lists the presently defined group commands. The SO counter can be set to advance or decrement depending upon the requirements, advancing in neural execution mode and decrementing in back-propagation learning mode, for example. For advancing, the counter begins at 1 and advances to the specified SO COUNT and then wraps around to 1. For decrementing, the counter begins at the SO COUNT and decrements to 1 and then wraps around to the SO COUNT. For sparsely connected networks, the SO count and IA count for each group can be specified by a group command, GLDCT with S=00 & I=0, thereby not requiring the SO or IA counters to be clocked, as will be shown in the back-propagation learning example. When specified to count, the IA counter is always advanced at the completion of the instruction execution. The SO counter is advanced or decremented at the completion of all IA count cycles.

For any neural network emulation, the group level commands must be issued to specify the number of IA cycles per SO cycle and the total number of SO cycles required for emulation of V neurons in the network model. In addition, the "S", "I", and "U" bits specify how the processor group accesses the external memory, providing control on the addressing via the "S" and "I" bits and control on how the external Y value arrays are utilized via the "U" bit. With the "S" bits set to a "00", the external memory address will not advance beyond the presently defined SO cycle, though the memory address will advance for each IA cycle, if "I"=1, allowing full execution of the IA cycles for the presently defined SO cycle. With "S" set to a "01" the SO count will advance after the next instruction is executed, which requires the specified number of IA cycles to be completed. Advancing the SO and IA counters allows execution to proceed through the V neurons where V≦N. Holding the SO count fixed allows repeated execution of the N neuron values being executed, a facility used when multiple layers of a multilayer neural network are mapped onto a single SO cycle set of N neurons. With the "U" bit set to a "0", only one Y value array is utilized, for example the Present Y Value Array which causes newly updated Y values to overwrite the old Y values stored in the array. With the "U" bit set to a "1", both Y value arrays are used such that new Y values are only written to the opposite array which is being used for the present network emulation, and the arrays toggle their meaning after V neurons have been updated. A Y value can be read from external memory while a Y value is being written to the external memory. If "U"="0", this simultaneous operation must occur from the same external memory array, requiring an array two port operation.

Since the group command is common to all synapse processors on a chip, only one input path is necessary to communicate to the group. To accomplish this, one of the processor summation tree paths is designated as unique in that it also serves as the group communications path. Once specified, this path is uniquely identified and used for group communications from the initialization and control learning processor.

TABLE 1

| CMND | *S* | *I* | *U* | CMD SPECIFIC DATA FIELD | | COMMENTS |
|---|---|---|---|---|---|---|
| | | | | PROCESSOR GROUP INSTRUCTION SET | | |
| GNOP | NOT USED | NOT USED | NOT USED | NOT USED | | |
| GSET | S = 00 DON'T COUNT | I = 0 DON'T COUNT | U = 0 USE 1 ARRAY | NOT USED | | |
| | S = 01 ADVANCE THE COUNT | I = 1 COUNT | U = 1 USE 2 W/TOGGLE | | | |
| | S = 10 DECREMENT THE COUNT | | | | | |
| | S = 11 NOT USED | | | | | |
| GLDCT | S = 00 DON'T COUNT | I = 0 DON'T COUNT | U = 0 USE 1 ARRAY | SO COUNT | IA COUNT | LOAD IA AND SO COUNTS |
| | S = 01 ADVANCE THE COUNT | I = 1 COUNT | U = 1 USE 2 W/TOGGLE | | | |
| | S = 10 DECREMENT THE | | | | | |

TABLE 1-continued
PROCESSOR GROUP INSTRUCTION SET

| CMND | *S* | *I* | *U* | CMD SPECIFIC DATA FIELD | COMMENTS |
|---|---|---|---|---|---|
| | COUNT S = 11 NOT USED | | | | |

SYNAPSE PROCESSOR COMMANDS

With the Command Bit set to a "1" and the Group Bit set to a "0", the command received is specified for the synapse processors. Table 2 lists the synapse processor's instruction set which supports external memory. An external memory address may be specified in the immediate data field of an instruction or may be specified to use the present SO and IA count values for the address i.e. for local address control of the external memory. The source or destination code specifies which addressing mode to use.

TABLE 2

SYNAPSE PROCESSOR INSTRUCTION SET

| CMND | *AUTO* | SOURCE 1 | SOURCE 2 | DESTINATION | DESTINATION 2 | IMMED. DATA | COMMENTS |
|---|---|---|---|---|---|---|---|
| NOP | N.U. | N.U. | N.U. | N.U. | | N.U. | NO OPERATION |
| PATH | N.U. | ADD TREE | NOT USED (N.U.) | R1, R2, R3, R4, R5, R6, CR1, CR2 EXT. MEM. 1, 2 | | C E B | IF DESTINATION IS CR1 OR CR2 SET THE COMMAND PATH BIT = 0 FOR PATH TO CR1 AND = 1 FOR PATH TO CR2. IF DESTINATION IS R1, R2, ..., R6 THEN SET THE DATA PATH REGISTER TO THE DESTINATION ADDRESS AND THE DESTINATION REGISTER'S CEB AS SPECIFIED. |
| PATH | N.U. | EXT. MEM. | DESTINATION 1 — (WEIGHT PATH) R1, R2, R3, R4, R5, R6 CR1, CR2 | DESTINATION 2 — (Y PATH) R1, R2, R3, R4, R5, R6, CR1, CR2 | | C E B | IF DESTINATION IS CR1 OR CR2 SET THE COMMAND PATH BIT = 0 FOR PATH TO CR1 AND = 1 FOR PATH TO CR2. IF DESTINATION IS R1, R2, ..., R6 THEN SET THE DATA PATH REGISTER TO THE DESTINATION ADDRESS AND THE DESTINATION REGISTER'S CEB AS SPECIFIED. |
| MPY | 0 = NO 1 = AUTO | R1, R2, R3, R4, R5, R6, IMD1, IMD2 | R1, R2, R3, R4, R5, R6, IMD1, IMD2 | R1, R2, R3, R4, R5, R6, ADD TREE, EXT. MEM. 1, 2 | | DATA OR EXT. MEM. ADDRESS | |
| ADD | 0 = NO 1 = AUTO | R1, R2, R3, R4, R5, R6, IMD1, IMD2 | R1, R2, R3, R4, R5, R6, IMD1, IMD2 | R1, R2, R3, R4, R5, R6, ADD TREE, EXT. MEM. 1, 2 | | DATA OR EXT. MEM. ADDRESS | |
| AND | 0 = NO 1 = AUTO | R1, R2, R3, R4, R5, R6, IMD1, IMD2, CEB VECTOR | R1, R2, R3, R4, R5, R6, IMD1, IMD2 | R1, R2, R3, R4, R5, R6, ADD TREE, EXT. MEM. 1, 2, CEB VECTOR | | DATA OR EXT. MEM. ADDRESS | CEB VECTOR = (CEB1, CEB2, ..., CEB6) WHERE CEBx = DEB BIT FOR REGISTER Rx |
| OR | 0 = NO 1 = AUTO | R1, R2, R3, R4, R5, R6, IMD1, IMD2, CEB VECTOR | R1, R2, R3, R4, R5, R6, IMD1, IMD2 | R1, R2, R3, R4, R5, R6, ADD TREE, EXT. MEM. 1, 2, CEB VECTOR | | DATA OR EXT. MEM. ADDRESS | CEB VECTOR = (CEB1, CEB2, ..., CEB6) WHERE CEBx = CEB BIT FOR REGISTER Rx |
| INV | 0 = NO 1 = AUTO | R1, R2, R3, R4, R5, R6, IMD1, IMD2, CMP FLAGS, CEB VECTOR | N.U. | R1, R2, R3, R4, R5, R6, ADD TREE, EXT. MEM. 1, 2, CEB VECTOR | | DATA OR EXT. MEM. ADDRESS | CEB VECTOR = (CEB1, CEB2, ..., CEB6) WHERE CEBx = CEB BIT FOR REGISTER Rx |
| EXOR | 0 = NO 1 = AUTO | R1, R2, R3, R4, R5, R6, IMD1, IMD2, CEB VECTOR | R1, R2, R3, R4, R5, R6, IMD1, IMD2 | R1, R2, R3, R4, R5, R6, ADD TREE, EXT. MEM. 1, 2, CEB VECTOR | | DATA OR EXT. MEM. ADDRESS | CEB VECTOR = (CEB1, CEB2, ..., CEB6) WHERE CEBx = CEB BIT FOR REGISTER Rx |
| CMPR | 0 = NO 1 = AUTO | R1, R2, R3, R4, R5, R6, IMD1, IMD2 | R1, R2, R3, R4, R5, R6, IMD1, IMD2, CMP FLAGS | TRF, BRF, EF FLAGS | | DATA | TRF = TOP REG. > BOT REG. or IMD1 or IMD2 BRF = BOT REG. > TOP REG. or IMD1 or IMD2 EF = TOP REG. = BOT REG. or IMD1 or IMD2 |
| MIN | 0 = NO 1 = AUTO | R1, R2, R3, R4, R5, R6, IMD1, IMD2 | R1, R2, R3, R4, R5, R6, IMD1, IMD2 | R1, R2, R3, R4, R5, R6, ADD TREE, EXT. MEM. 1, 2 | | DATA OR EXT. MEM. ADDRESS | MIN(SOURCE1, SOURCE2) = DESTINATION |
| MAX | 0 = NO 1 = AUTO | R1, R2, R3, R4, R5, R6, IMD1, IMD2 | R1, R2, R3, R4, R5, R6, IMD1, IMD2 | R1, R2, R3, R4, R5, R6, ADD TREE, EXT. MEM. 1, 2 | | DATA OR EXT. MEM. ADDRESS | MAX(SOURCE1, SOURCE2) = DESTINATION |
| READM | N.U. | EXT. MEM. 1, 2 | N.U. | R1, R2, R3, R4, R5, R6, ADD TREE | | EXT. MEM. ADDRESS | |
| WRITEM | N.U. | R1, R2, R3, R4, R5, R6, IMD | N.U. | EXT. MEM. 1, 2 | | EXT. MEM. ADDRESS | ADDRESS |

*AUTO* = 1 → AUTOMATIC REPEAT OF FUNCTION AFTER RECEIPT OF UPDATED DATA FROM SOURCE EXTERNAL TO SYNAPSE PROCESSOR
*IMD1, IMD2* = IMMEDIATE DATA IN COMMAND REGISTERS 1 OR 2, AS SPECIFIED
*EXT. MEM. 1 = USE EXT. MEM. ADDRESS IN IMMED. DATA FIELD
*EXT. MEM. 2 = USE PRESENT SO AND IA COUNT VALUES AS ADDRESS, i.e. LOCAL ADDRESSING

The definition of the Automatic bit depends upon the setting of the S bits which are loaded by a group command. The definition is as follows:

A=0, S=00: Single SO cycle update; with "I"=1 all IAs at present SO cycle are executed and then wait for next instruction. The SO count is not advanced.

A=0, S=01 or 10: Execute present SO cycle and advance or decrement the SO count and then wait for a new command. With "I"=1 all IAs at present SO cycle are executed.

A=1, S=00: Execute present SO cycle then wait for new data. Upon receipt of valid tagged data execute the same SO cycle and wait for new data. This procedure is repeated upon every receipt of valid tagged data, continuing until a new command is received which stops it.

A=1, S=01 or 10: Execute present SO cycle and advance or decrement the SO count and then wait for new data. Upon receipt of valid tagged data, execute a SO cycle and advance or decrement the SO count and then wait for new data. This procedure is repeated upon every receipt of valid tagged data, continuing until a new command is received which stops it.

The automatic bit essentially specifies when an execution cycle begins; For A=0 the execution cycle begins only on receipt of an instruction and for A=1 the execution cycles begin, after the first execution of the automatic instruction, bn every receipt of valid tagged data.

Before continuing with the synapse processor instruction set discussion, a brief description of the utilization of the "A", "S", "I", and "U" bits will be reviewed in their application to two "classic" types of neural networks. Beginning with the Hopfield network, the automatic bit will be set to a "1", the "S" bits set to a "01", the "1" and the "U" bits each set to a "1". Each set of N Y values will be written each SO cycle into the Y array opposite to the one being used for the present V neuron network emulation. This is accomplished by overlapping the write operation with the fetch of a set of present Y values by utilizing separate address and control lines for each Y value array. After the receipt of the last set of N values making up the V neuron emulation, the selection of the Y array will toggle such that the recently updated Y values will be treated as the present Y values for the next network update cycle. This process will continue until a new command is received which stops the operation, such as a NOP instruction. In a multilayer network emulation, the Automatic bit will probably be set to a "1", the "S" and "I" bits will be set dependent upon the network execution sequence, and the "U" bit will be set to a "0". If multiple layers are mapped onto one set of N neurons in SVLM, the "S" bits will be set to a "00" for the execution of a subset of those layers. For example with 3 layers mapped onto one set of N neurons, "S" will be kept set at a "00" for the execution of the first 2 layers. Then a Group Command would he issued, changing "S" to a "01" so that the network emulation can continue with advancing the SO count after the execution of the next layer (i.e. the third layer of the three mapped onto one SO cycle set of N neurons). Since "U" is set to "0", the new Y data overwrites the Y data in the present Y value array such that each layer's execution will utilize the previous layers calculated Y value data, which is the normal operation in a feedforward multilayer neural network. In order to specify the "U", "I", and "A" bits, capitals "U", "I", and "A" will be appended to an instruction mnemonic to indicate whether the specified bits are set to a "1". If "U", "I", or "A" are not appended to an instruction, the bits are set to a "0". The "S" bits value is specified as either "1" or "2" as no specification indicates the "S" bits are "00" and "11" is not presently defined.

The synapse processor instruction set contains an external memory address field (immediate data field) which, through the use of the PATH (EXT.MEM.) command, allows external memory to be specified as a data source. The utilization of the PATH command with external memory will be described first, followed by the description of the common method the other instructions used in writing to external memory.

The PATH command sets up the data and cmd (command) path within a synapse processor, for information either reverse communicated up the Adder tree or accessed from external memory, by loading the Add tree destination path in one path register and the EXT. MEM. register destination path in another separate register, FIG. 25. The PATH command's Source 1 field determines which register is to be used and can be viewed as a command field extension further defining the PATH command. The PATH command specifies only the destination point for data received from the Add tree or from EXT. MEM.. Because of this, a PATH command specifying data received from EXT.MEM. with a destination of EXT.MEM. would not accomplish anything, as the same data would be received and sent to the same location without any processing, i.e. a NOP action. The path once specified remains the same unless a new PATH command is received which changes the path. For example, in a Hopfield network model on SVLM, if the default paths had been changed due to previous processing, the PATH commands for the reverse communicated Y values and the virtual weights would be issued once allowing, in reverse communication mode within a GSYP synapse processing cell, the top Adder tree to connect its Y value to the bottom Y value register and the bottom Adder tree to connect its Y value to the top Y value register. For the Hopfield model, this path command remains in effect through out the network execution, assuming a fixed weight mode of execution. The PATH command also allows the specification of the path for the next commands. In a virtual mode example of the Hopfield network, the fetch of the weight values from the external memory will be done during the previously fetched weight multiplication time.

In data flow computing, an instruction execution waits until all operands have been received, at which point the instruction is "fired". The data dependent controlling mechanism can be viewed as using tagged data such that when the valid data operands are received with matching tags the instruction is executed. Given the operands may not be received at the same time, this data dependent mechanism offers great performance potential and resolution of synchronization problems. The automatic mode is a data dependent operation in that the next execution of the instruction will not occur until valid data with a matching tag are received. Reverse communicated Y values, for example, sent back to a processor group will contain a common group tag. The receiving processor group will compare each Y value's tag in the synapse processing elements with the group tag and if they match the auto instruction will be executed. For the present architectural example, all $\sqrt{H}$ tags to a processor group chip must have the same group tag or a groud error will occur. In a similar manner, data from external memory can be tagged. The tagging control may not be done in the same manner as the reverse communicated data from an external source since each processor group chip interfaces to its own set of external memory arrays. For example, using a tag does not imply that a tag is associated with each weight and Y value in memory since the tag is the same for all stored values. Rather, a tag source may be set up in external memory which is multiplexed onto the data lines at the appropriate times. Alternatively, a different type of tag can be used on the external memory interface to minimize the interfacing impact. Since the memory and group chip are tightly coupled, a smaller tag field can be used than that required from the reverse communications tree path, as identification between different group chips is not required. Equations 6 and 7 must be revisited depending upon the implementation decision.

Many instructions specify a destination which is local to the individual synapse processor. This local processing can cause synchronization problems if not handled correctly. In the GPLM of co-pending Pechanek LEARN 91, the synchronization problem was localized to the learning processor at the neuron output point. No notification of local processing completion was generated from the synapse processors. Rather a fixed hardware mechanism was provided at the neuron output point to guarantee safety of the operations. Any local processing command to the same synapse processor was to be separated from the next command to that same synapse processor by the specified instruction's execution time. For example, a multiply could take $2*(D-1)$ clocks to ensure the completion of a MPY command before the second command can be sent. For SVLM this time out method is not sufficient to resolve the synchronization problem. A new method is used where all local instructions notify completion of execution to the issuing point. The method uses the summation tree as the communications channel. Consider a local operation done at each synapse processing element where the result is stored back into a local synapse register. At the successful completion of the local operation, assume each synapse processing element entered a value of "1" to the summation tree. Then, after a delay of $\log_2 N$ cycles, a summed value of N would result, indicating normal completion of all N local operations associated with a particular summation tree. Any other value would indicate an error had occurred in the operation sequence. By allowing each processor group chip to append an error value different than the other group chips, isolation to a failing chip becomes feasible. In a similar manner, different summed values could indicate different types of errors detected. This communications of local operation completion incurs a small time penalty as compared to the time out approach in that the next instruction to a processor group cannot be sent until notification of completion has been received. The time to communicate instruction completion is small, being a $\log_2 N$ delay addition to the local execution time. Non-local instructions, i.e. those instructions where the destination is the ADD TREE, provide notification of operation completion when the converged tree result reaches the learning processor. The learning processor must only distinguish between local and non-local instructions for instruction issuing synchronization control, and no variable time out control is required.

As a final note, a SVLM compiler would be required to ensure no destination conflicts occur in programs using the described instruction set.

BACK-PROPAGATION VIRTUAL LEARNING EXAMPLE

An input/output encoder problem will be used to demonstrate how back-propagation is employed on the SVLM structure. Table 3 presents the input to output pattern encoding problem recognized by Rumelhart 86.

TABLE 3

INPUT/OUTPUT ENCODING PROBLEM

| INPUT PATTERNS | | OUTPUT PATTERNS |
|---|---|---|
| 00 | → | 1000 |
| 01 | → | 0100 |
| 10 | → | 0010 |
| 11 | → | 0001 |

Figure 30:
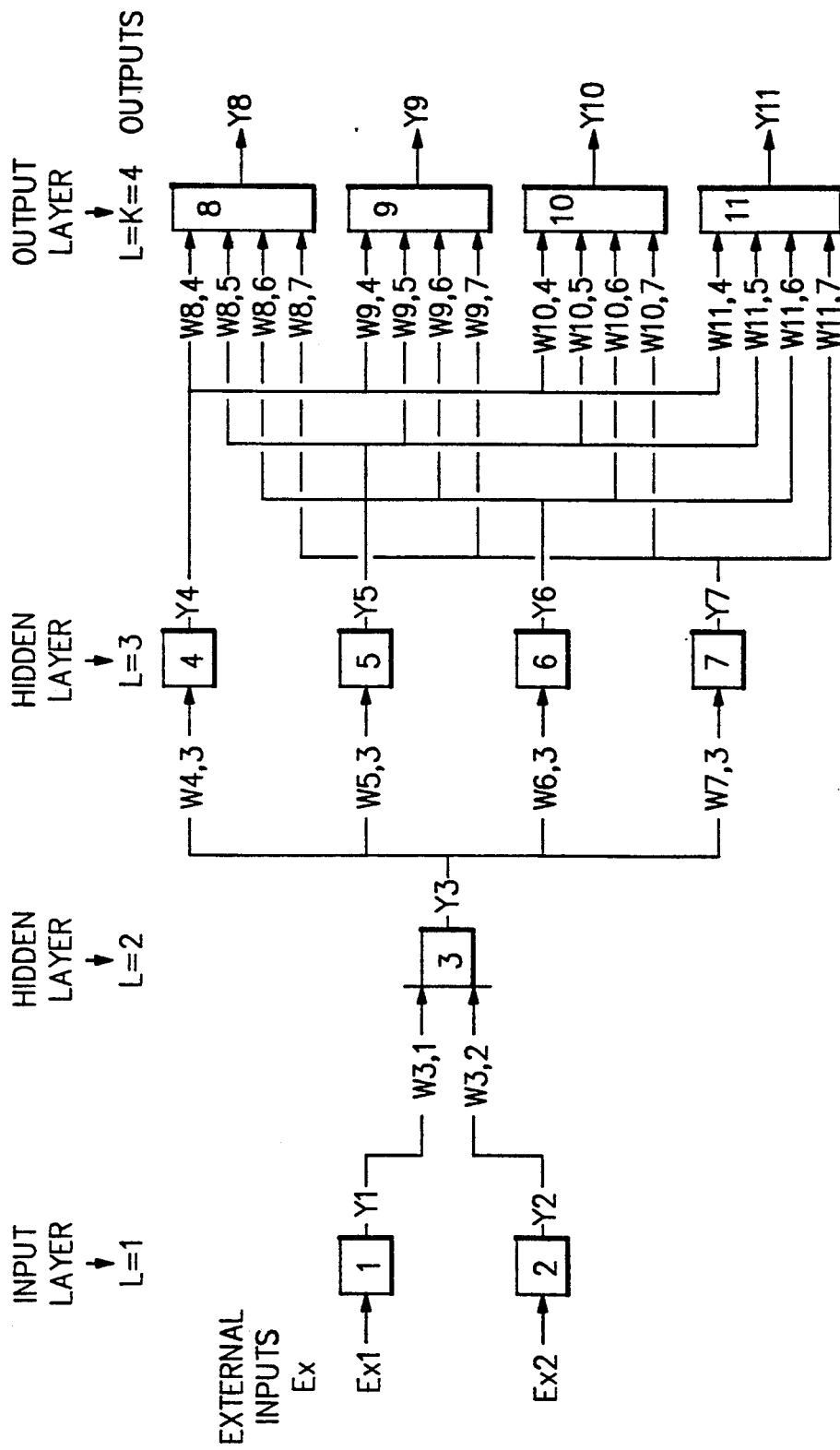
FIG. 30 illustrates a neural network for solving the input/output problem.

The network structure used for this problem is shown in FIG. 30, which illustrates an example neural network for the input/output encoding problem.

Multi-layer networks are mapped onto a completely connected network structure where unused connection paths are kept at a zero weight value by the weight registers' Conditional Execution Bit being set to zero. For the virtual machine, the size of the largest layer of neurons dictates the minimum size of N the number of physical neurons in the SVLM structure. There are 11 neurons in the I/O encoder problem but the largest layer has only 4 neurons which is the criteria for determining the number of physical neurons. A 4 neuron SVLM structure will be used in the input/output encoding problem. For example, the one already depicted in FIG. 22 is made up of four groups, G=4, each of size H=4 capable of emulating a 16 neuron network.

The input/output encoder problem does not require all possible connections available in the 11-neuron SVLM structure. For example, the input/output encoder network equation for neuron 9 is:

$$Y_9 = F(W_{9,4}Y_4 + W_{9,5}Y_5 + W_{9,6}Y_6 + W_{9,7}Y_7)$$

Figure 31B:
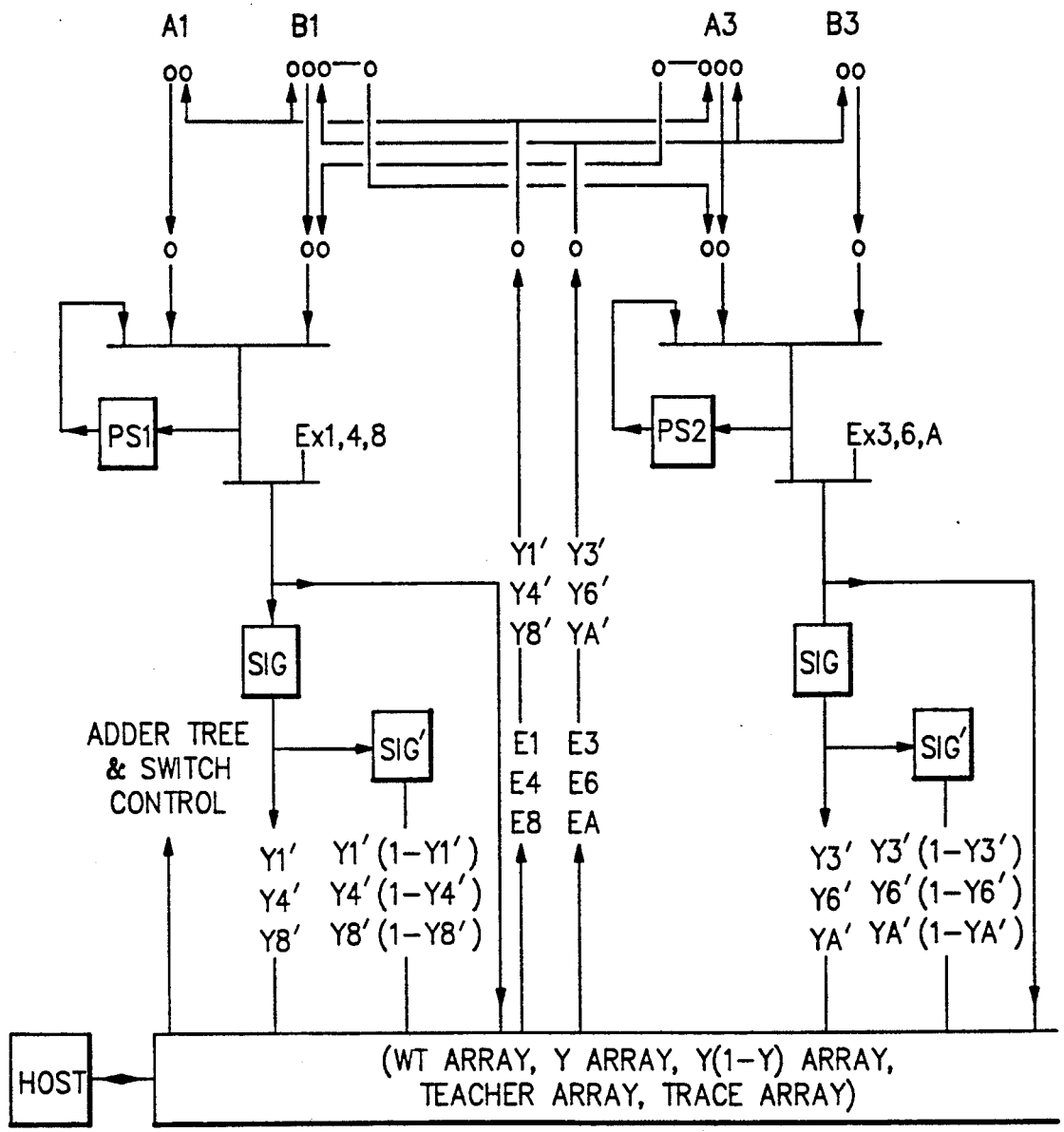
Figures 31, 31D:
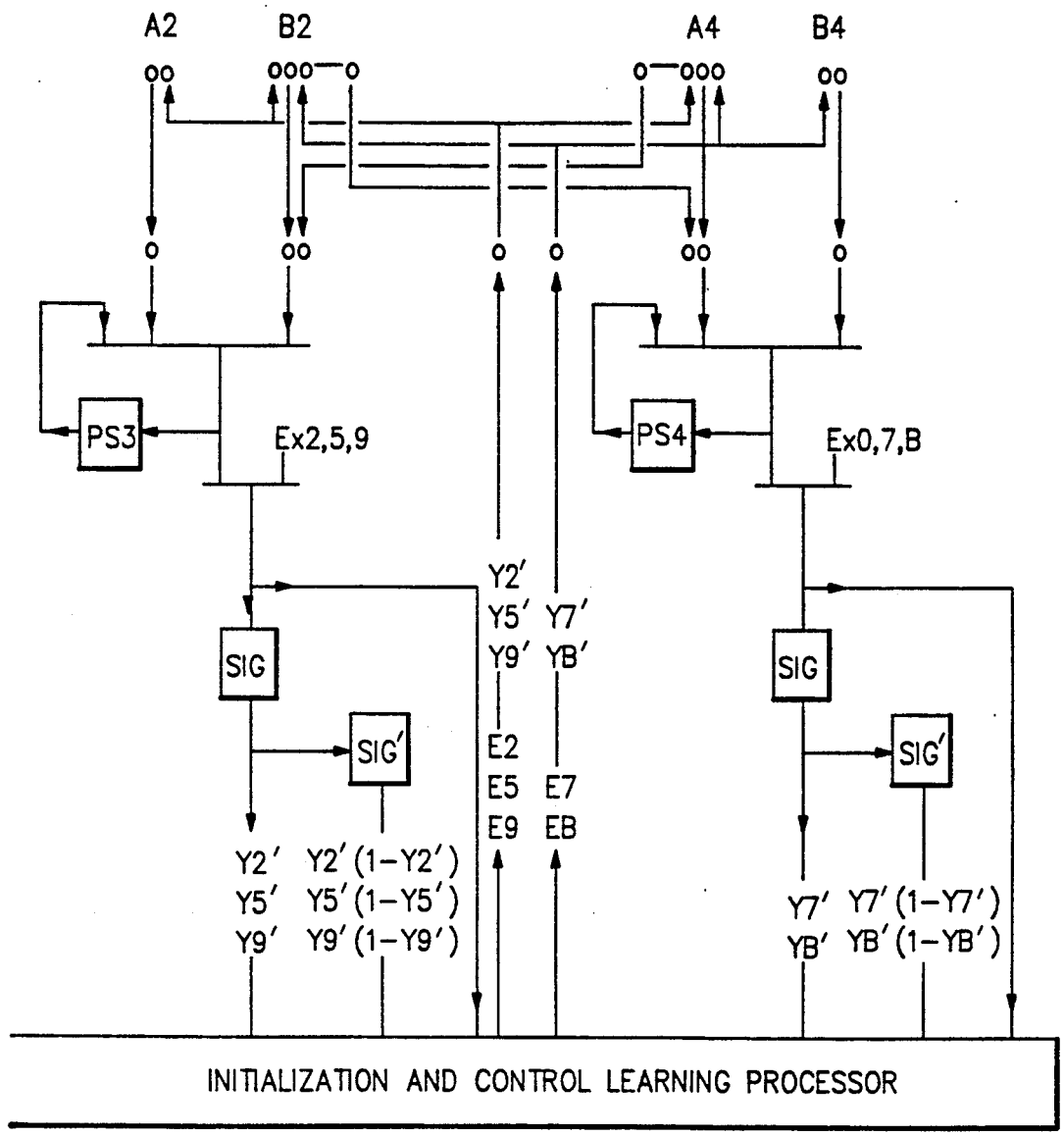

FIG. 31 shows the general 11 neuron SVLM with each synapse processing external memory Weight and Y values shown for a completely connected 11 neuron structure. There are 121 weights in a completely connected 11 neuron network all of which are presented in FIG. 31. Note that the neuron mapping is different than that presented in FIG. 22 to allow the processing of the largest layer of N neurons to be accomplished in one update cycle of N neurons. Further note that layers 1 and 2, neuron outputs Y1, Y2, and Y3, are mapped to the S01 cycle of N neurons.

During execution mode the Y values are calculated layer by layer, layer 1 first whose Y value results are used for layer 2, and continuing through the layers. After all K layers of neurons have been processed, the network is placed into a learning mode. The output neurons calculate the error signals from the output layer and then reverse communicate the error signal values through the tree to the synapse processing cells. The back-propagation of error signals is done layer by layer beginning at the output layer and continuing to the input layer. The error signals are used in the weight updating algorithm. By executing the proper instructions in the various synapse processors, the back-propagation algorithm can be executed.

A detailed example with ordered procedures will explain how the input/output encoder learning problem is implemented with a back-propagation algorithm when mapped onto the SVLM.

For some pattern p (in general the superscript p is removed for clarity) the following itemized procedure is followed in the SVLM neurocomputer: (The "no-connection" weights are blanked out for clarity. The positions of the registers, as viewed relative to the command register, within each synapse processing element are shown in FIG. 31.)

Figure 32B:
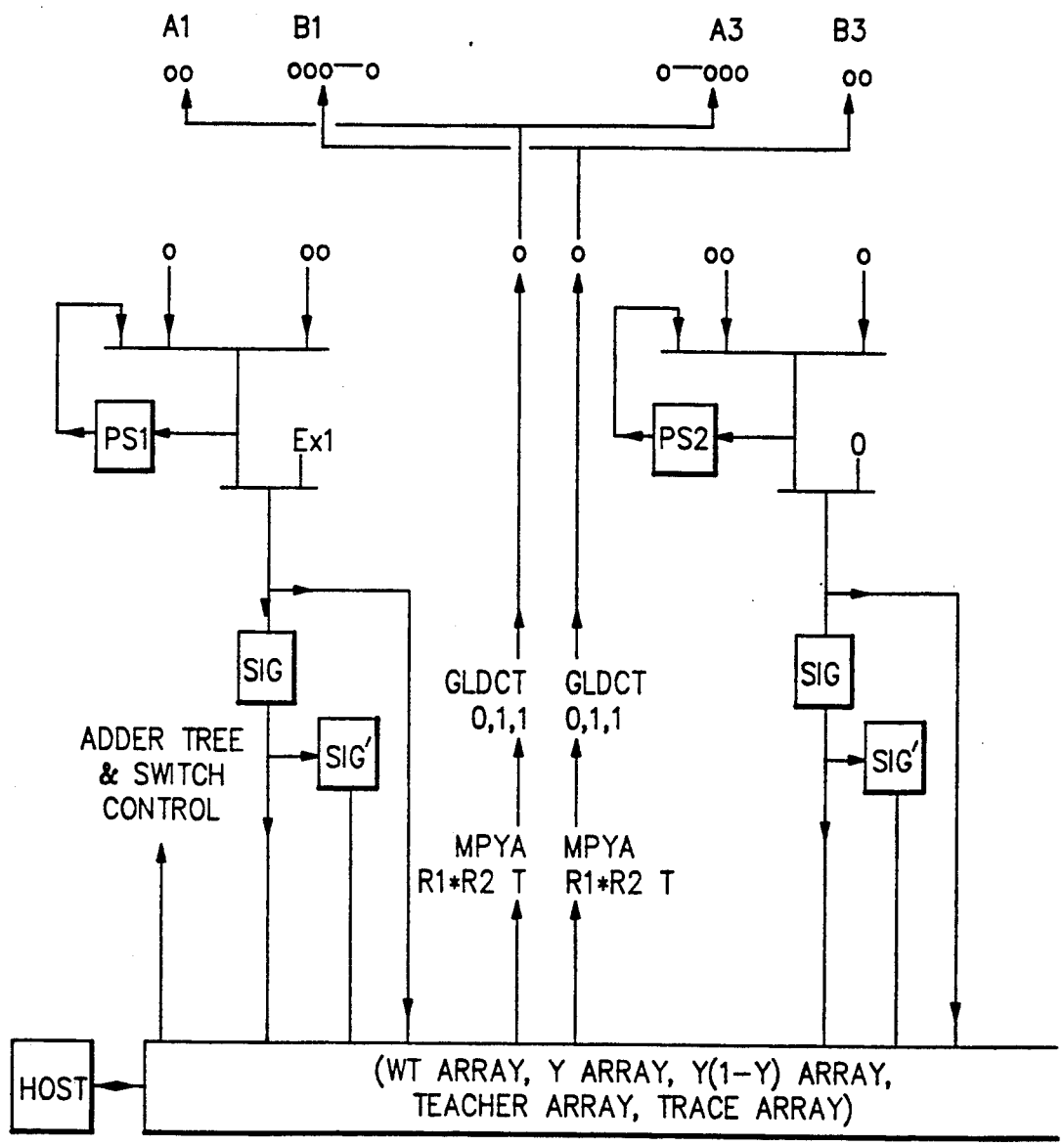
Figure 32D:
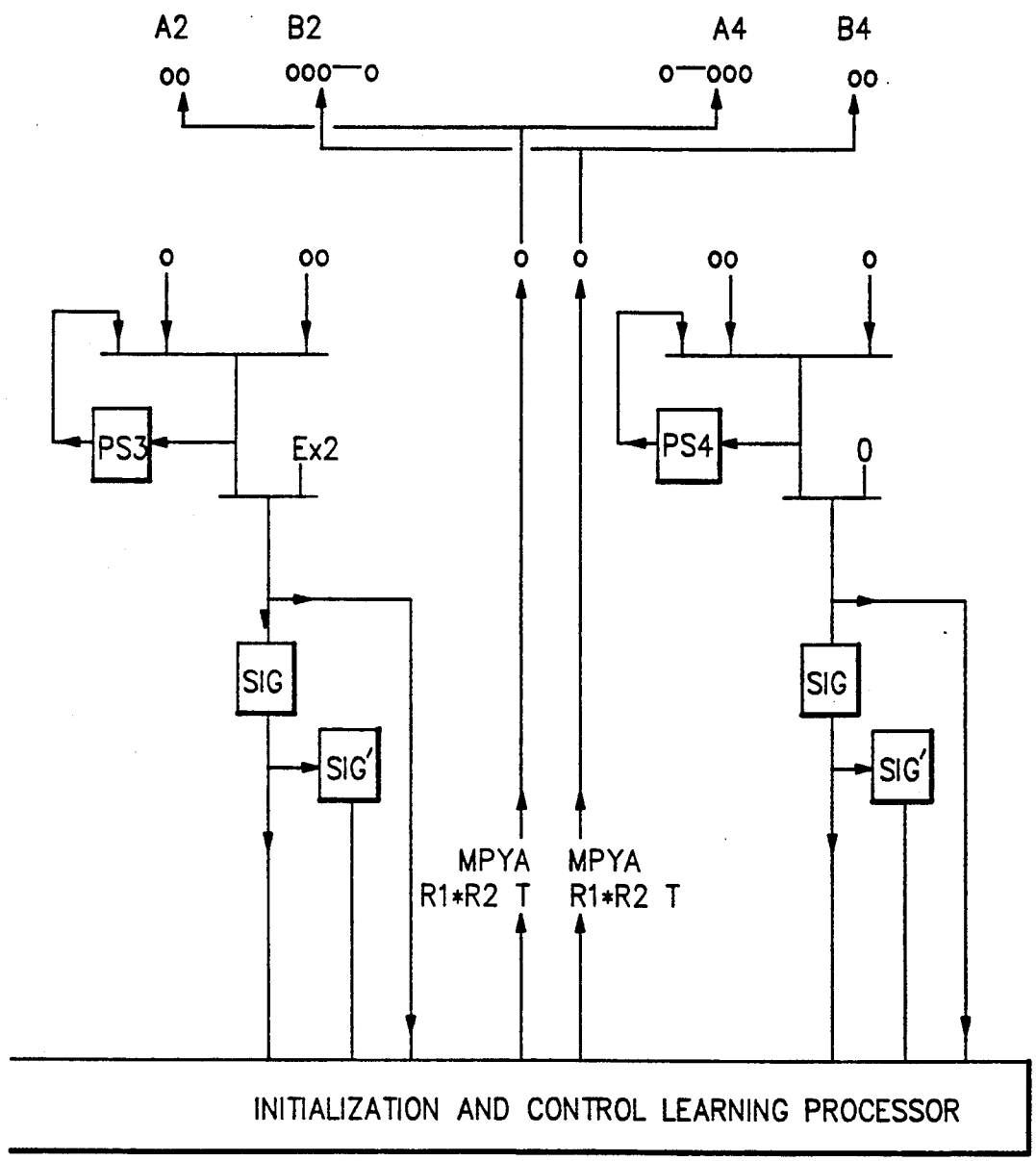

1. SVLM is initialized by reading in the initial set of weight and Y values from external memory with the CEB bits set to a "0" for those connections not to be used in the model, FIG. 32. Only 22 out of 121 possible connection weights for a completely connected 11 neuron model are utilized in the I/O encoder example. Three SO cycles of three IA cycles each are executed to obtain the 11 neuron outputs. The fourth SO and IA cycle are not needed in this example as there are no neuron 13, 14, 15, or 16 in the I/O encoder problem. A Group command is issued to load the IA and SO counts and set the "S", "I", and "U" control bits. GLDCT 0,1,1 sets "S", "I", and "U" to "0"s and loads SO=1 and IA=1.

2. After initialization, SVLM is placed into execution mode and an input pattern applied, EX1 and EX2. The default path is assumed for the General Synapse Processors. Specifically, commands received from the top ADD tree go to CR2, the bottom command register, and commands received from the bottom ADD tree go to CR2, the top command register. Data received from the top ADD tree goes to R5 the $Y_j$ register and data received from the bottom ADD tree goes to R5 the $Y_j$ register. (Relative addressing is assumed.)

3. The four physical neurons issue MPYA R1*R2→ADD TREE (T). The automatic mode is used to improve performance by not having to reissue the multiply instruction for each layer of the network execution. Since layers 1 and 2 are mapped onto the S01 cycle of N neurons "S"="00" keeping the SO counter from advancing the SO count. In addition, with the "U" bit set to a "0" the newly updated Y values will be utilized in the next neuron updates. Since the Y value registers in the SVLM structure are initially zero, all weight times Y values will produce a zero product which when summed produce a zero summation value.

Figure 33B:
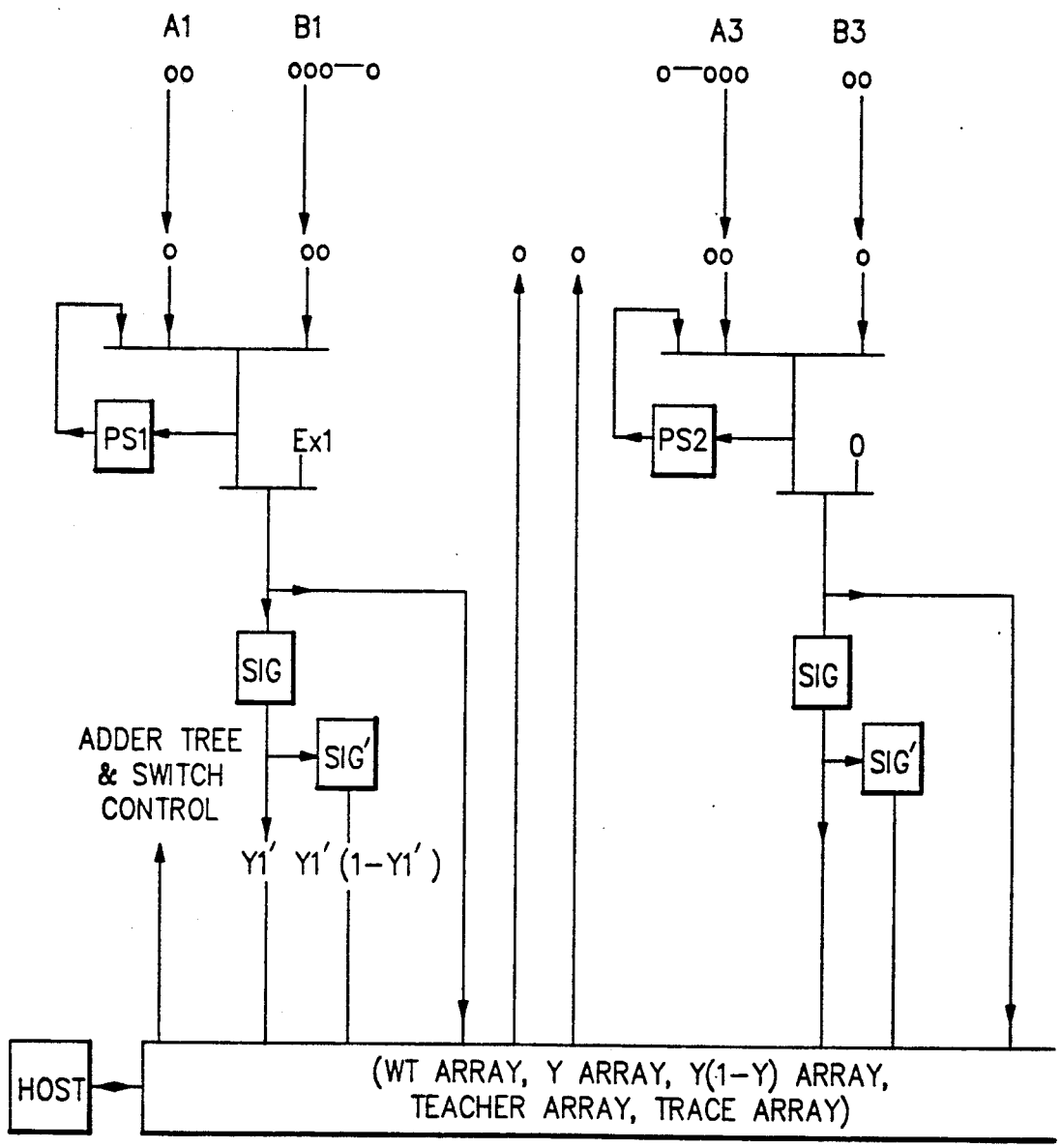
Figures 33, 33D:
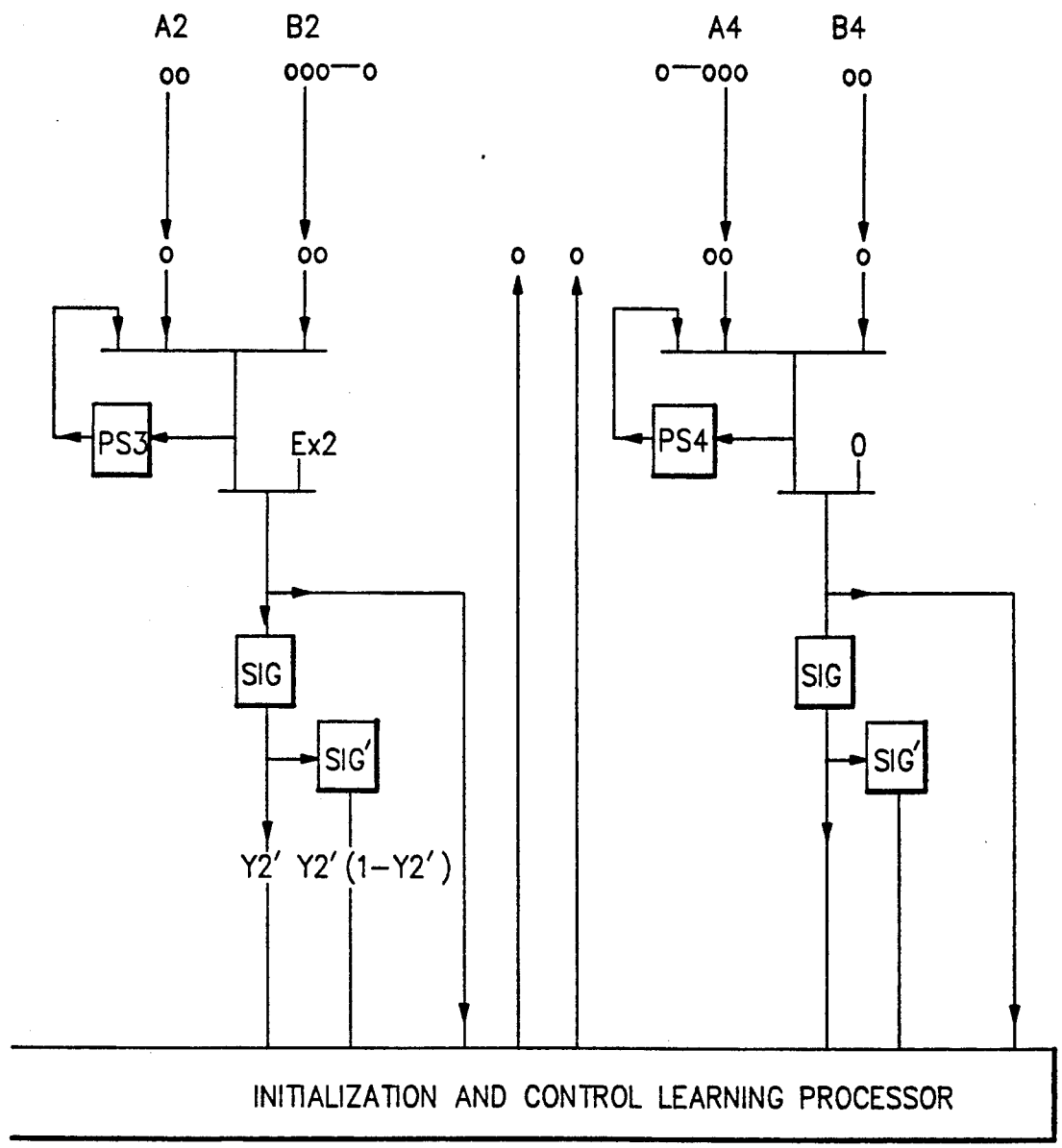

4. The first layer of neurons is executed on the SVLM structure, creating the first layer neuron outputs and their derivatives, FIG. 33. (The learning processor ignores the other two neuron output values.)

$Y_1 = F(Ex_1)$
$Y_2 = F(Ex_2)$
$Dr_1 = Y(1-Y_1)$
$Dr_2 = Y_2(1-Y_2)$

Figure 34B:
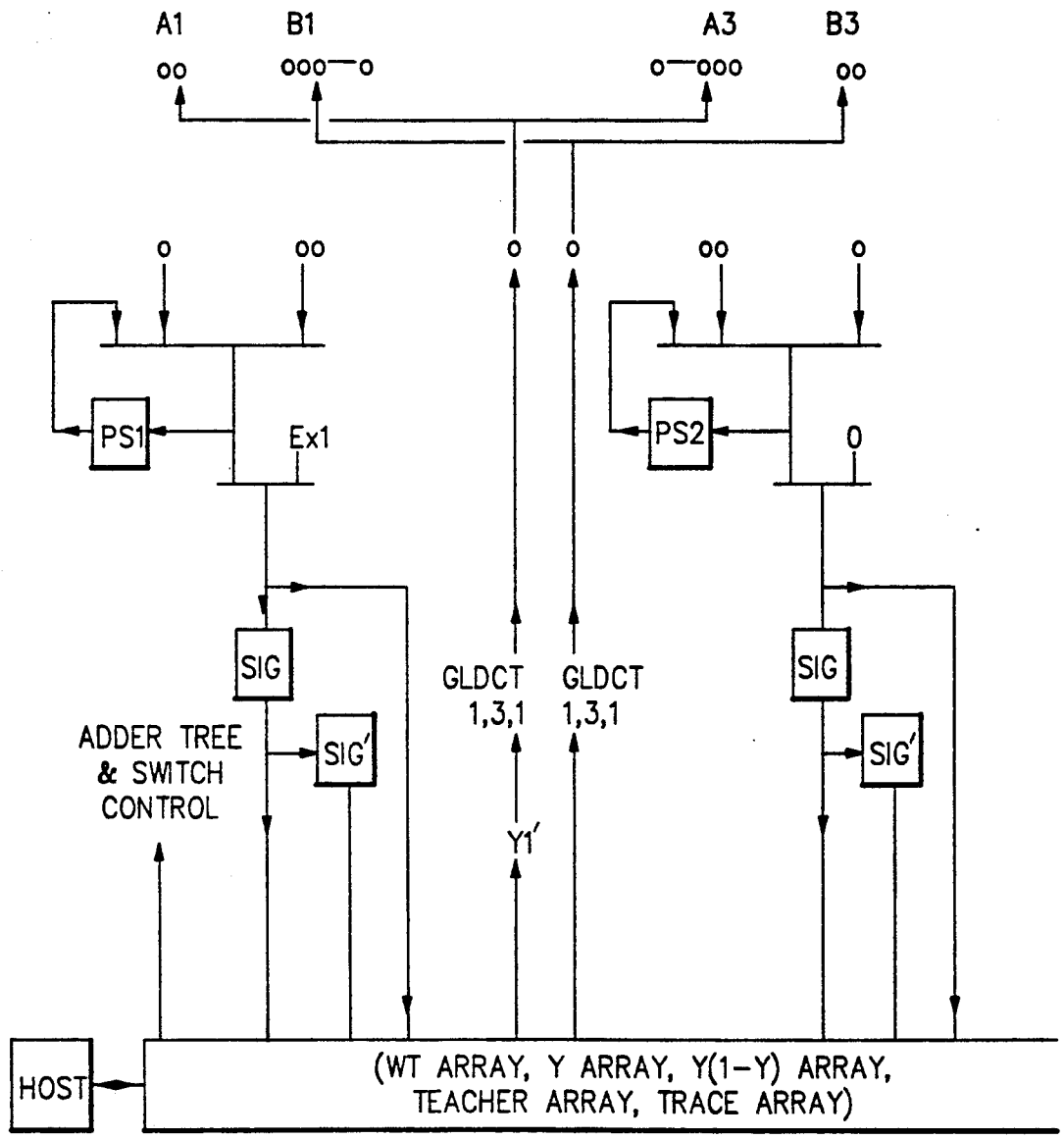
Figure 34D:
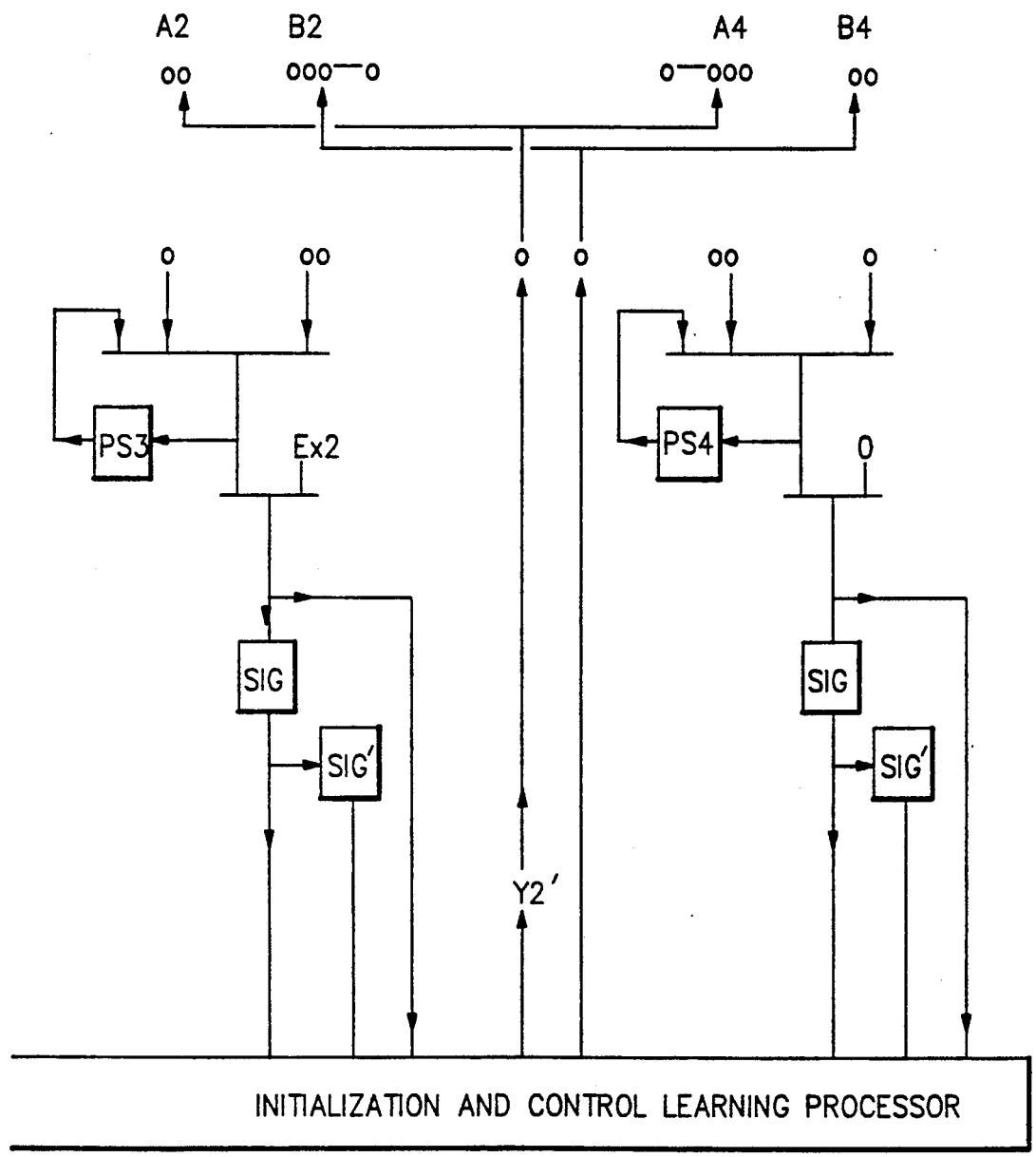
Figure 35B:
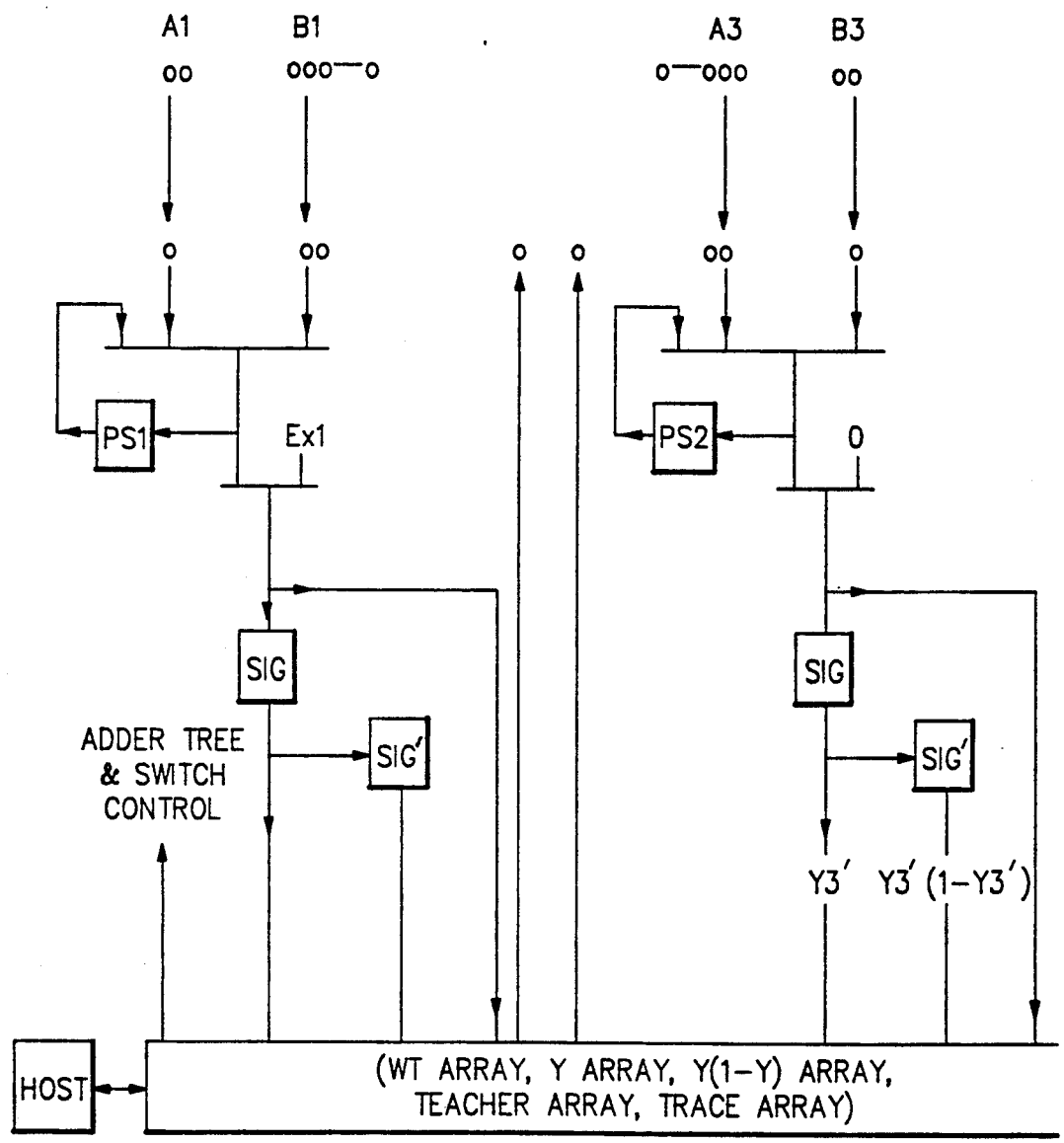
Figures 35, 35D:
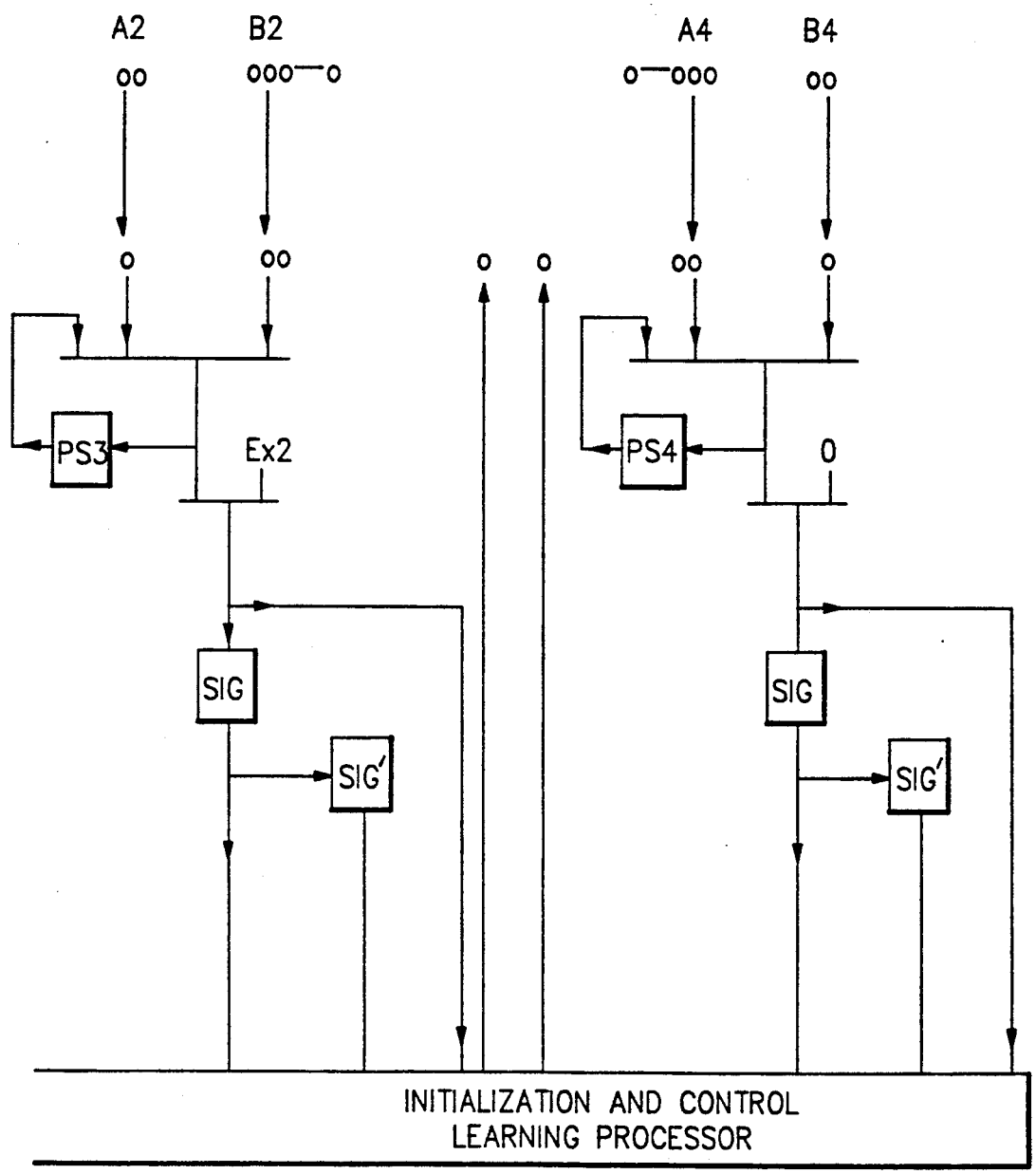

5. To emulate the 2nd layer of the network model and then continue with layers 3 and 4 the SO count must be advanced after the execution of the 2nd layer. To accomplish this a new Group instruction is issued changing the state of "S" to a "01", GLDCT 1,3,1. the "I" and "U" bits are not specified so they both remain set to a "0". After the GLDCT 1,3,1 instruction is sent, the first layer neuron outputs are fed back into SVLM, FIG. 34. Since the automatic MPY instruction was specified, the second layer of neurons is executed upon receipt of Y1 and Y2, creating the second layer of neuron outputs and their derivatives, FIG. 35. After the 2nd layer is executed the SO count is advanced to 2.

Reverse communicate $Y_1$ and $Y_2$.
$Y_3 = F(W_{3,1}Y_1 + W_{3,2}Y_2)$
$Dr_3 = Y_3(1-Y_3)$ 6. This continues until all layers have been executed and the network output and their derivatives are obtained, FIGS. 36, 37, 38, and 39. Upon receipt of $Y_3'$ the second SO cycle is initiated which generates the third layer outputs, namely $Y_4$, $Y_5$, $Y_6$, $Y_7$ and then the SO count is advanced to 3. The third layer Y values are reverse communicated and the third SO cycle is initiated which generates the fourth layer outputs and advances the SO count to 1 as the network emulation is completed.

Third layer execution begins with the SO count equal to 2.

Figure 36B:
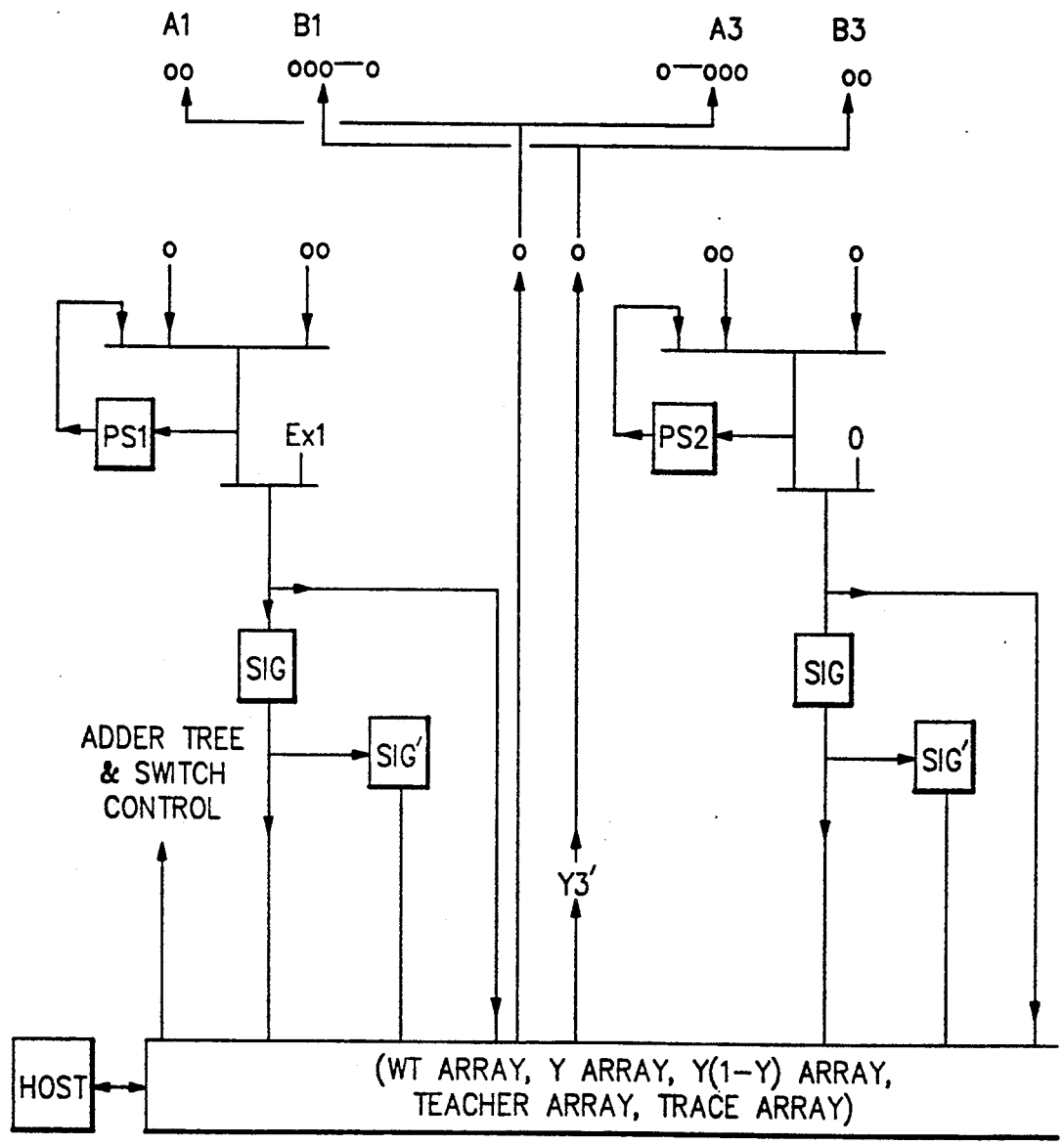
Figures 36, 36D:
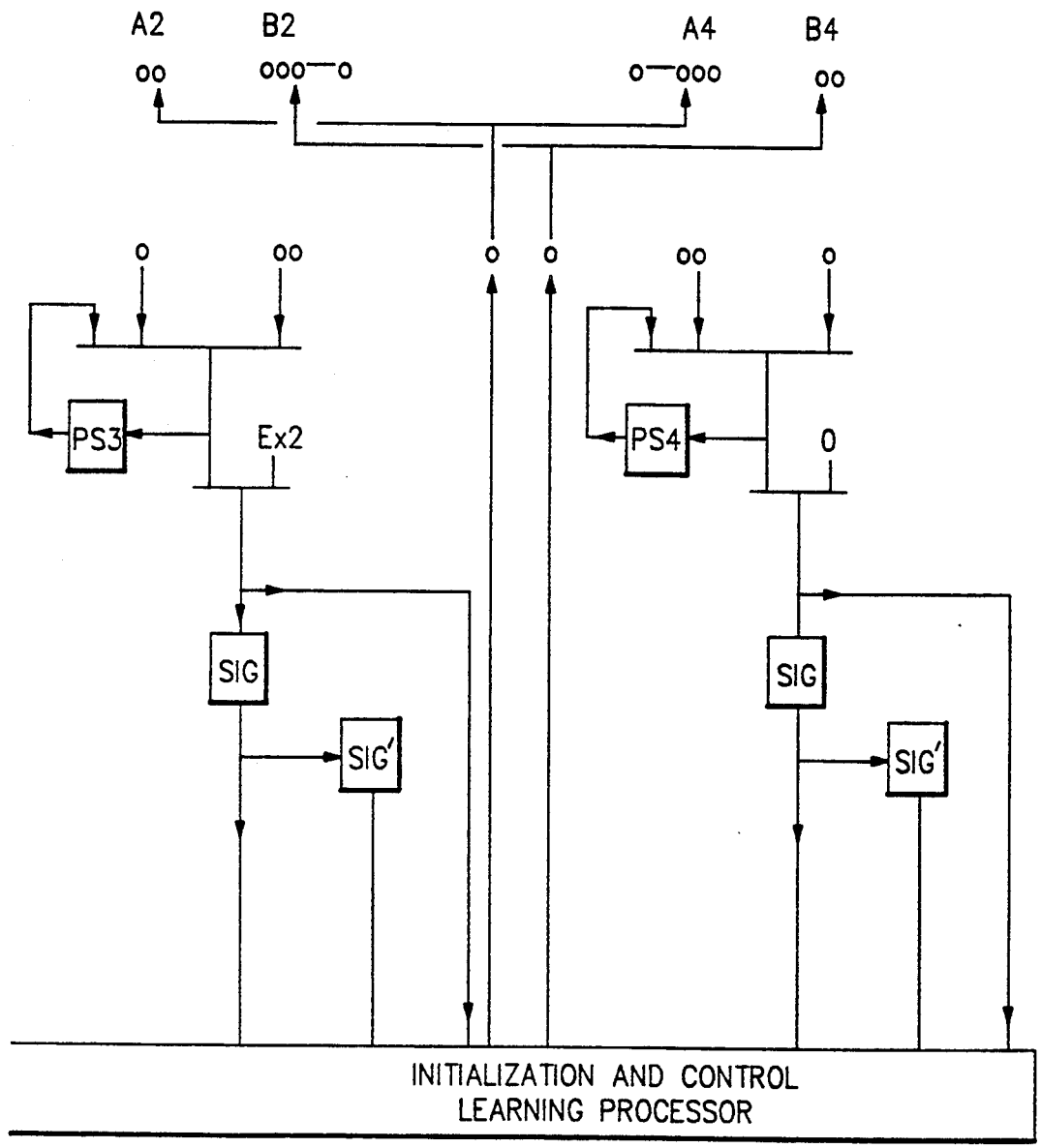
Figure 37B:
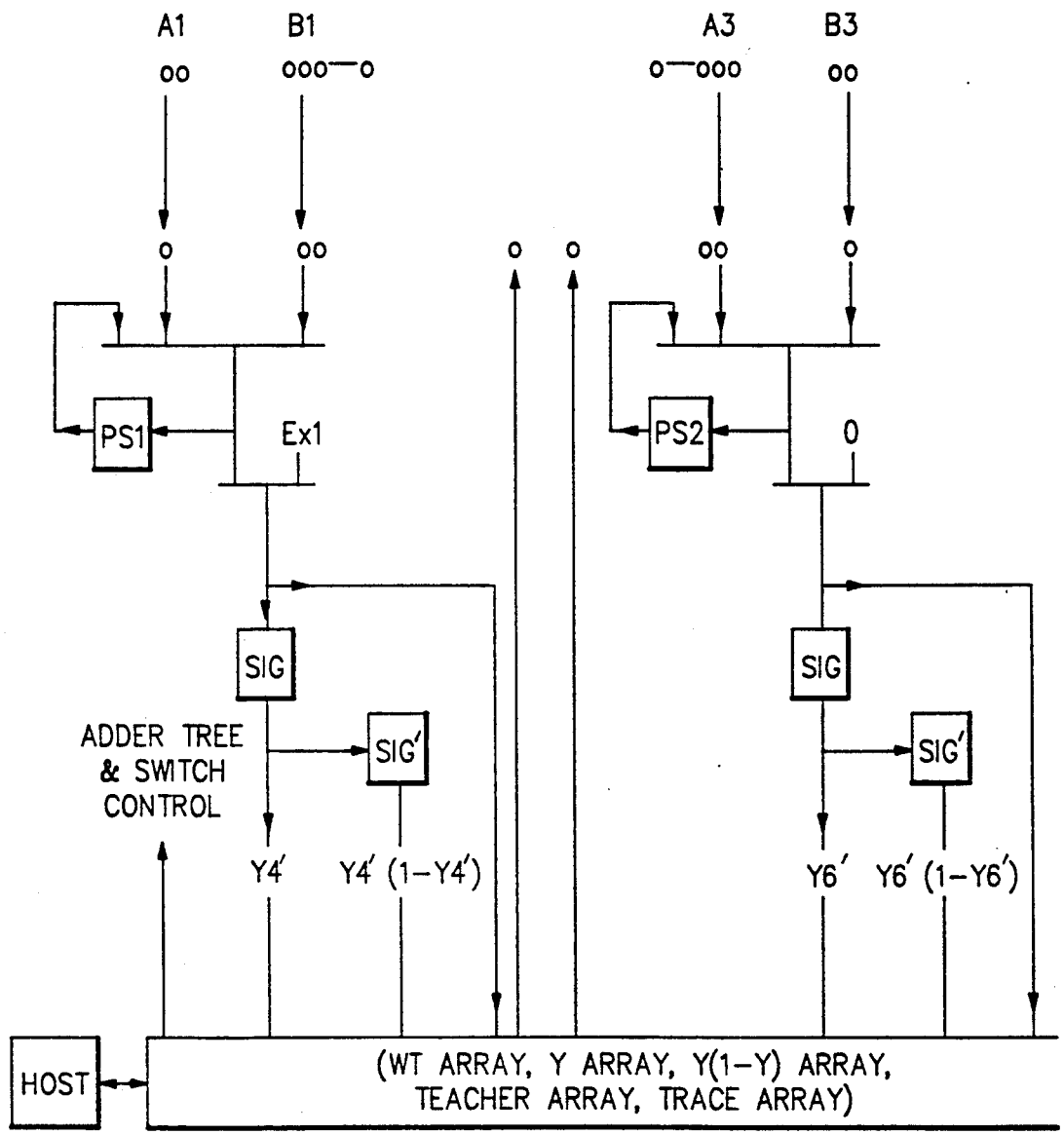
Figure 37D:
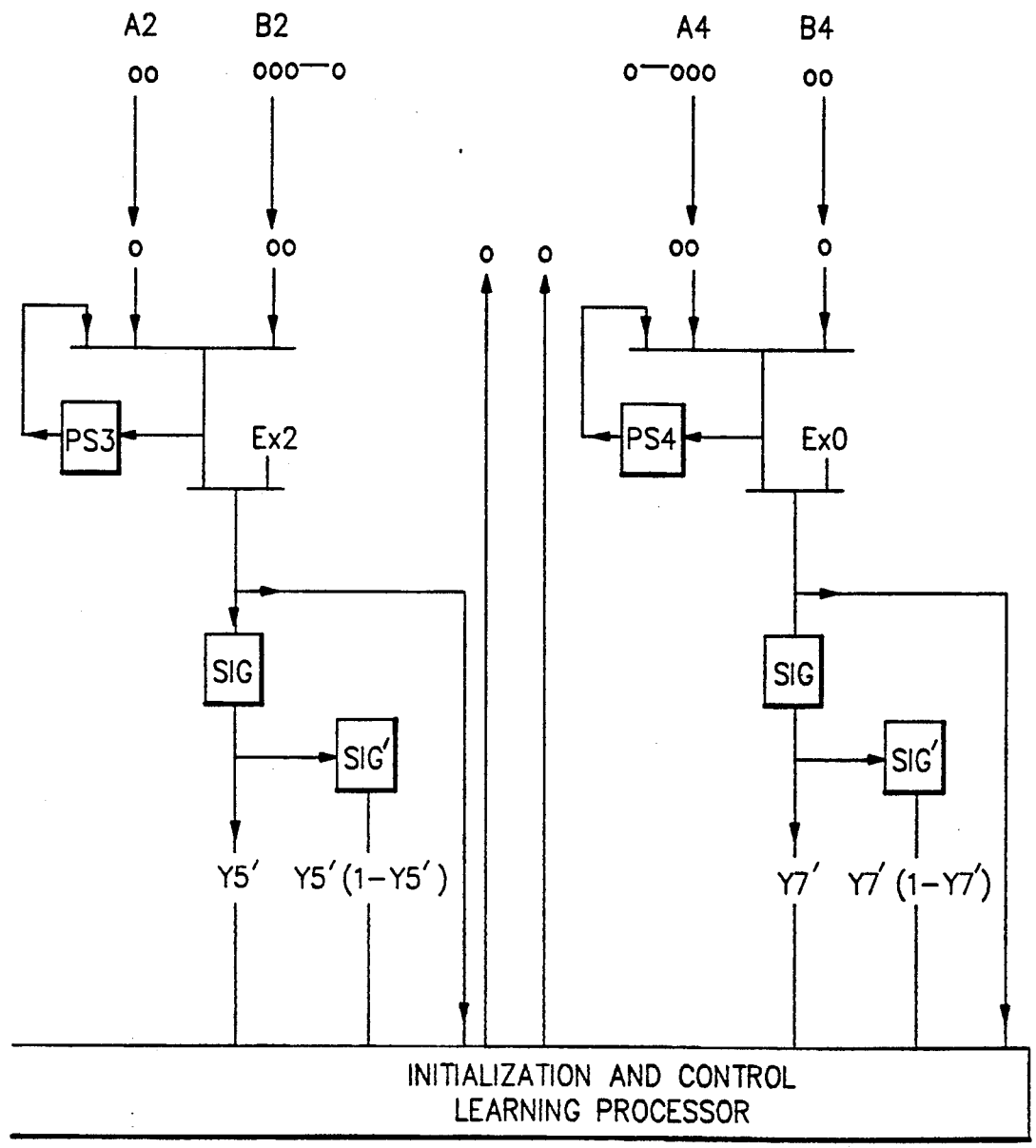

Reverse communicate $Y_3$, FIG. 36.
Third layer execution, FIG. 37.
—$Y_4 = F(W_{4,3}Y_3)$
—$Y_5 = F(W_{5,3}Y_3)$
—$Y_6 = F(W_{6,3}Y_3)$
—$Y_7 = F(W_{7,3}Y_3)$
—$Dr_4 = Y_4(1-Y_4)$
—$Dr_5 = Y_5(1-Y_5)$
—$Dr_6 = Y_6(1-Y_6)$
—$Dr_7 = Y_7(1-Y_7)$
—Advance SO count to 3.

Issue GLDCT 1,3,2 to load the IA COUNT with a 2 so that the proper weights can be accessed from external memory. The "S" bits "01" and the SO COUNT = 3 remain the same.

Fourth layer execution begins with the SO count equal to 3.

Figure 38B:
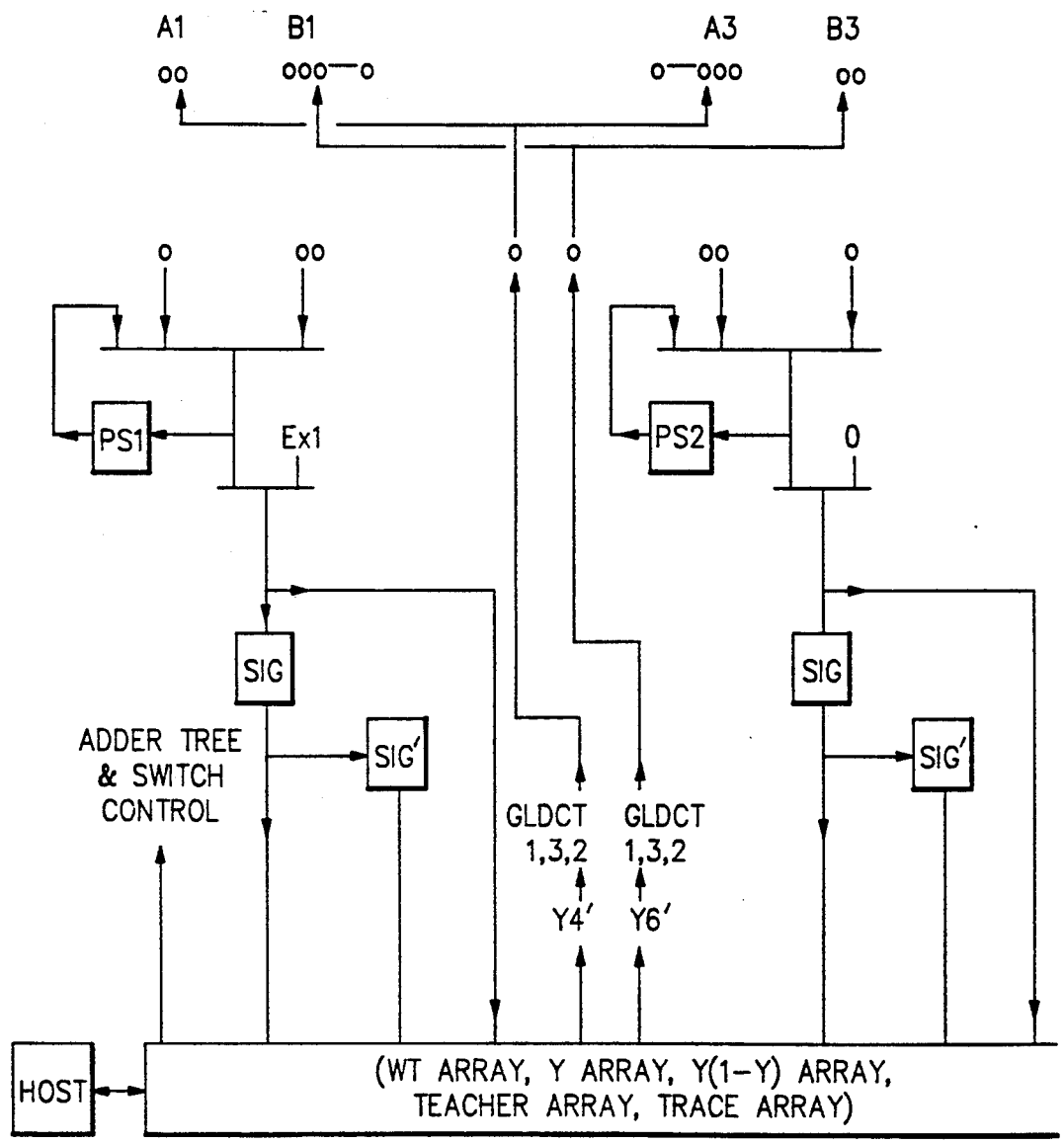
FIG. 38 and FIGS. 38A-38 D illustrates reverse communicate Y4', Y5', Y6', and Y7'.
Figures 38, 38D:
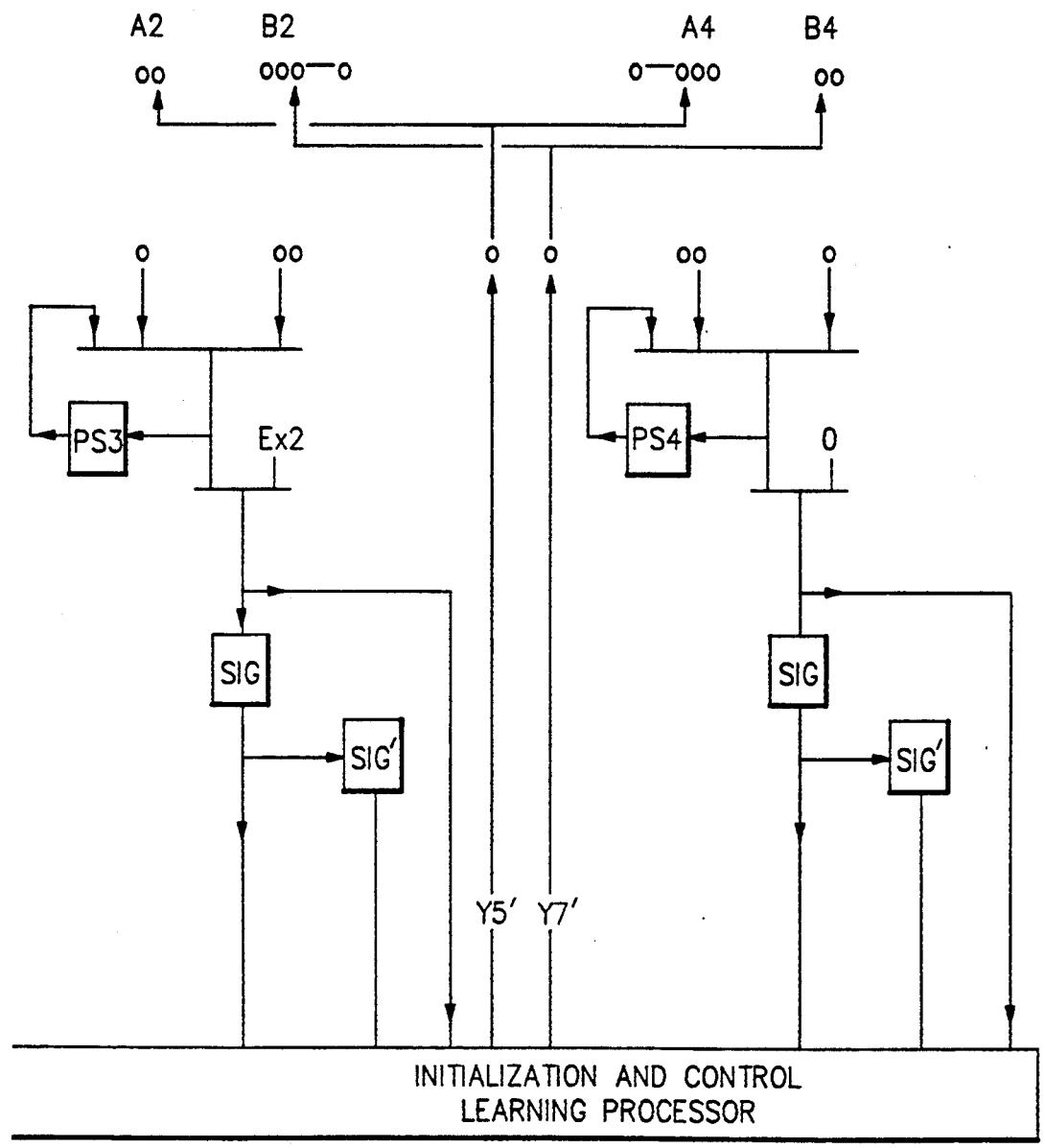
Figure 39B:
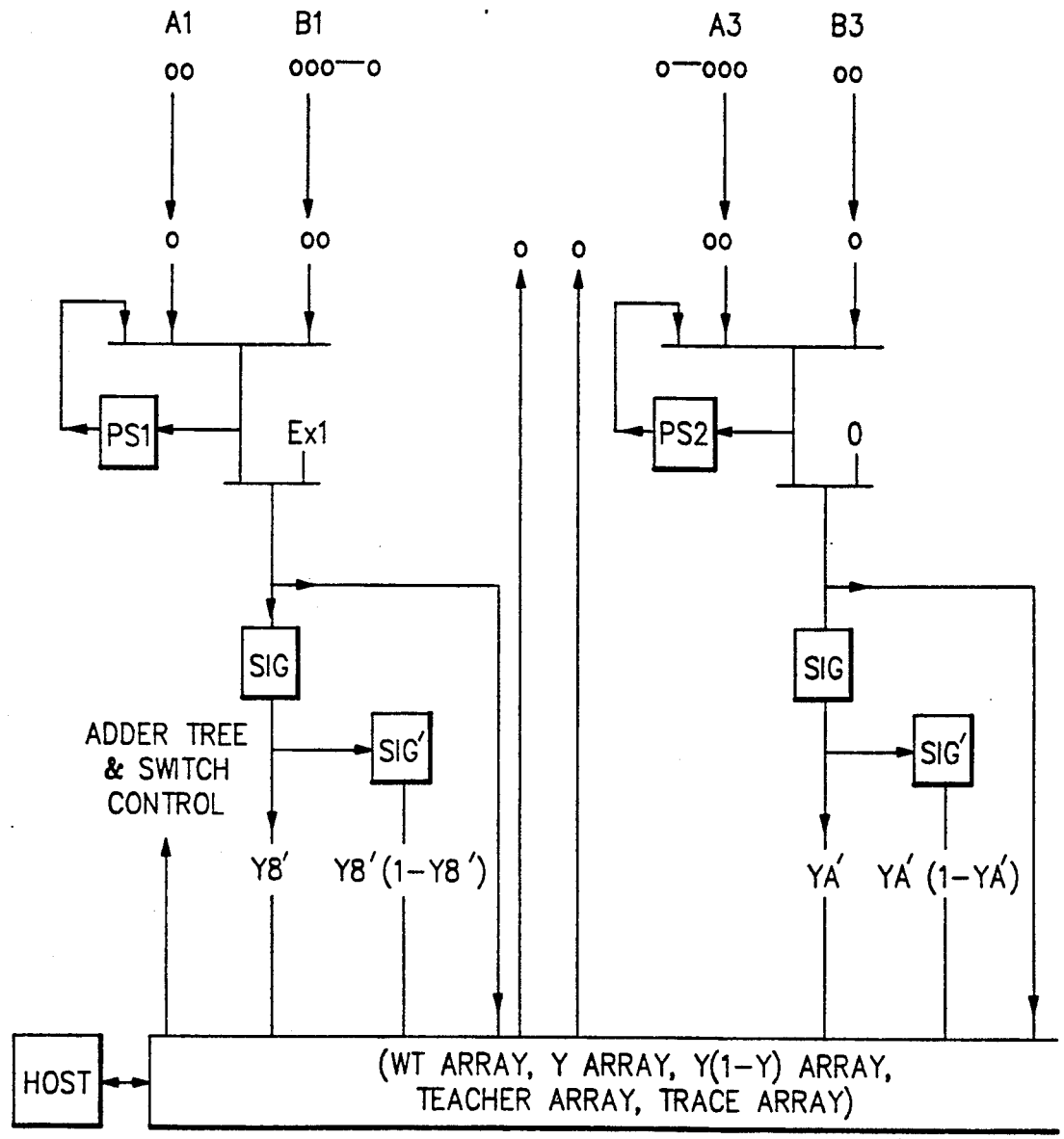
Figure 39D:
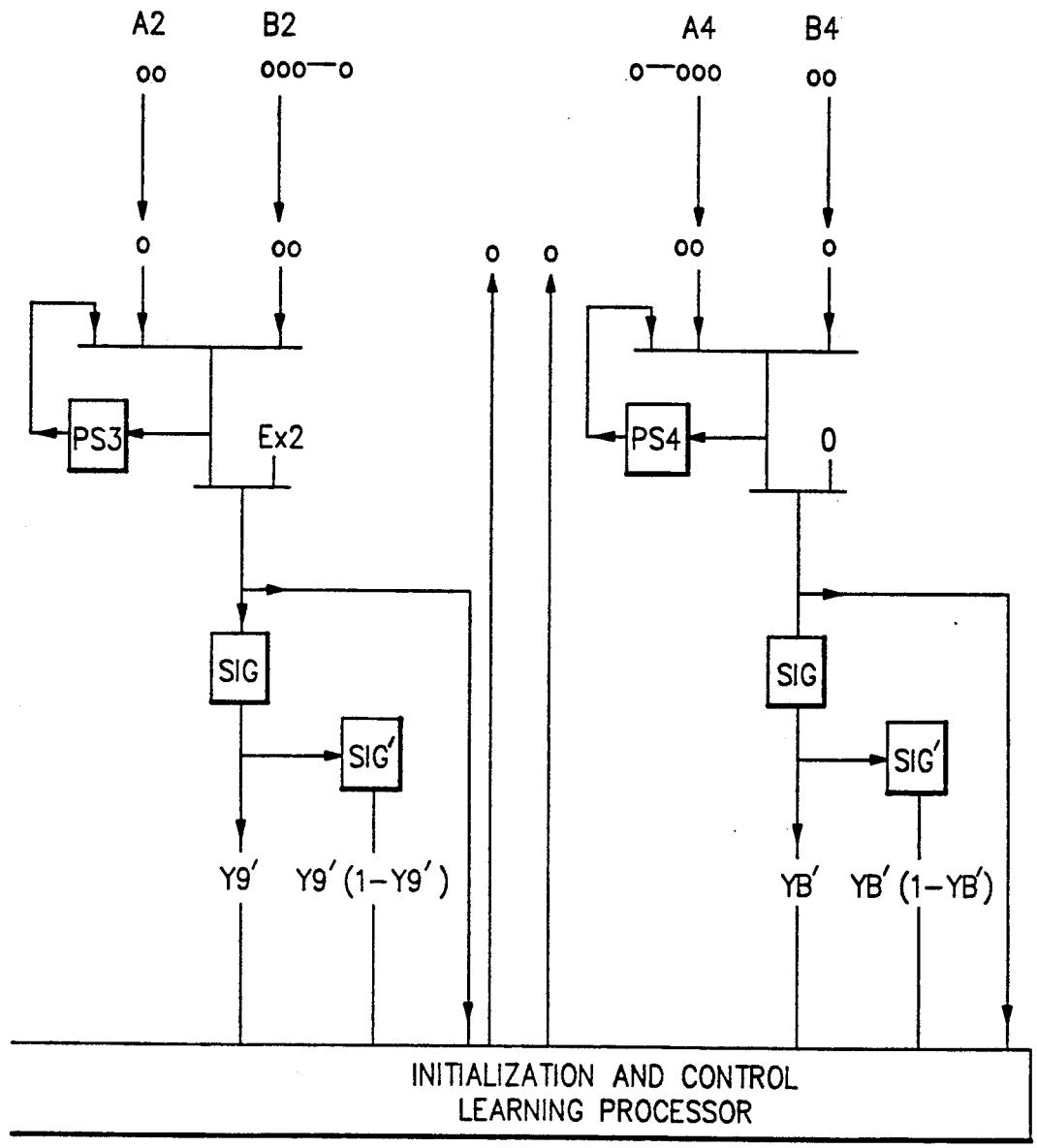

Reverse communicate $Y_4$, $Y_5$, $Y_6$, and $Y_7$, FIG. 38.
Fourth layer execution, FIG. 39.
—$Y_8 = F(W_{8,4}Y_4 + W_{8,5}Y_5 + W_{8,6}Y_6 + W_{8,7}Y_7)$
—$Y_9 = F(W_{9,4}Y_4 + W_{9,5}Y_5 + W_{9,6}Y_6 + W_{9,7}Y_7)$
—$Y_{10} = F(W_{10,4}Y_4 + W_{10,5}Y_5 + W_{10,6}Y_6 + W_{10,7}Y_7)$
—$Y_{11} = F(W_{11,4}Y_4 + W_{11,5}Y_5 + W_{11,6}Y_6 + W_{11,7}Y_7)$
—$Dr_8 = Y_8(1-Y_8)$
—$Dr_9 = Y_9(1-Y_9)$
—$Dr_{10} = Y_{10}(1-Y_{10})$
—$Dr_{11} = Y_{11}(1-Y_{11})$
—Advance SO count to 1.

7. After all 11 neuron values and their derivatives have been calculated and placed into a Y value and Y derivative array, SVLM is placed into the learning mode. For sparsely connected networks, as in this example, the IA and SO counts are used in a no clocking manner and changed explicitly by a group command instruction whenever a new IA or SO count is desired.

8. The learning processor checks the $Y_j$s for convergence to the minimum specified error. If reached, the learning process can be stopped for pattern p. If the convergence has not been reached, the learning for pattern p continues.

ConvergenceTest$Y_8 = |(t_8-Y_8)| \leq$ Minimum Error
ConvergenceTest$Y_9 = |(t_9-Y_9)| \leq$ Minimum Error
ConvergenceTest$Y_{10} = |(t_{10}-Y_{10})| \leq$ Minimum Error
ConvergenceTest$Y_{11} = |(t_{11}-Y_{11})| \leq$ Minimum Error 9. The learning processor calculates the $\delta_j{}^p$ for the output neurons for use in updating the weights between the output neurons and the neurons in the previous layer.

$$\delta_j^p = (t_j^p - Y_j^p) Dr_j^p$$

$$\delta_8 = E8 = (t_8 - Y_8) Dr_8$$

$$\delta_9 = E9 = (t_9 - Y_9) Dr_9$$

$$\delta_{10} E10 = (t_{10} - Y_{10}) Dr_{10}$$

$$\delta_{11} E11 = (t_{11} - Y_{11}) Dr_{11}$$

Figure 40B:
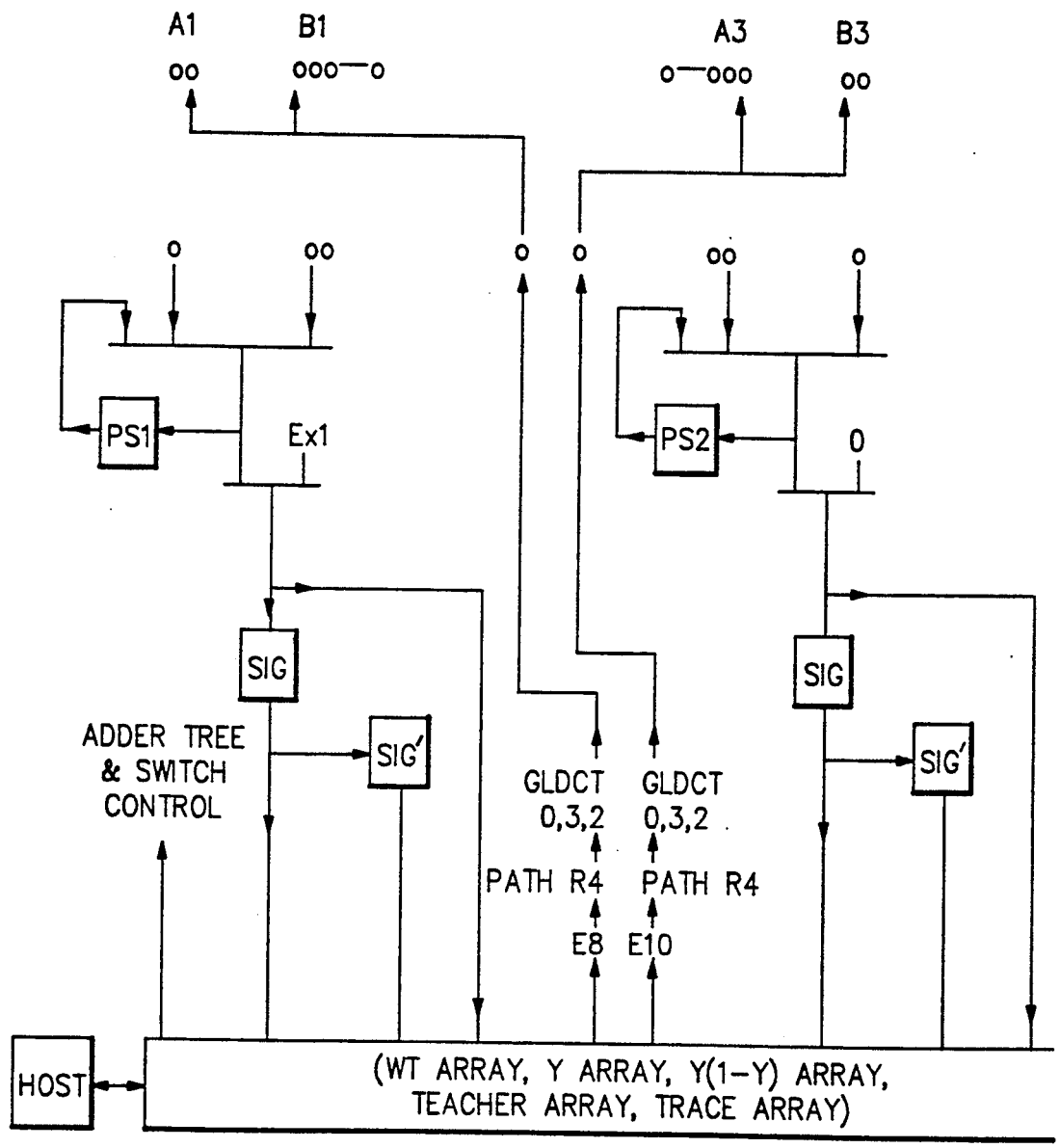
Figure 40D:
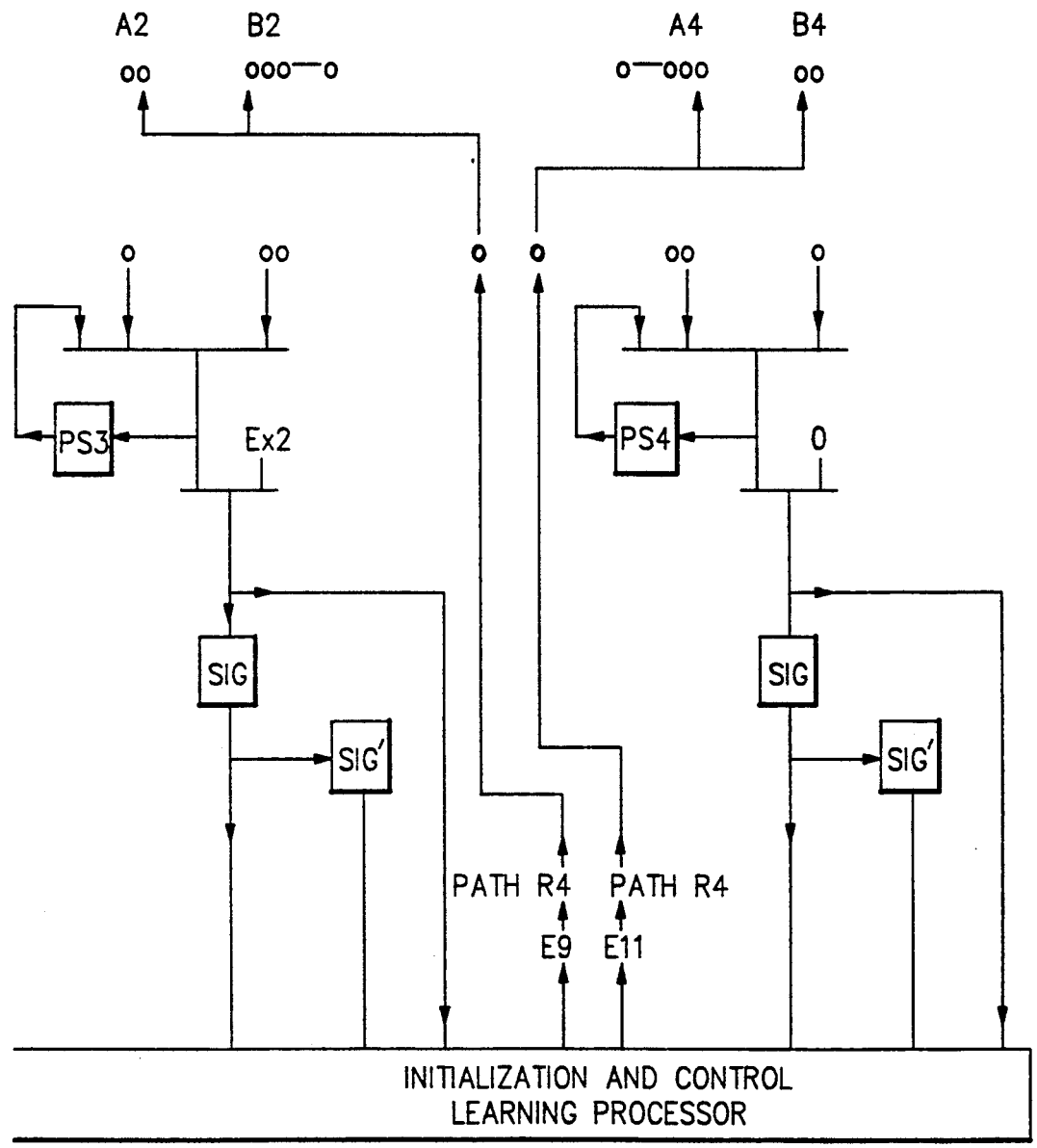
Figure 40:
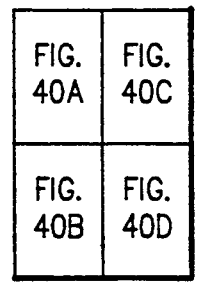

10. Load the SO and IA counts with no clocking mode specified. The data path is changed, and the error signals are then reverse communicated to their respective synapse processor elements' temporary registers, FIG. 40.

GLDCT 0,3,2 loads SO=3 and IA=2 which points to where all the weights are located in external memory and ensures both the SO and IA counters are not clocked, i.e. S=00 and I=0.

The four physical neurons change the data path by issuing PATH R4. The issuance of PATH R4 stops the automatic multiply mode specified by MPYA issued in step 3 above. The next data being received goes to the relative address R4 temporary register in the GSYPs and R3 in the DSYPs. The command path remains unchanged.

E8, E9, E10, and E11 are reverse communicated from the $Y_8$, $Y_9$, $Y_{10}$, and $Y_{11}$ source points.

11. Issue MPY instruction to start the multiply of the error signals times the appropriate weights, FIG. 41. The products are summed, creating the error summations, $ER_j^p$, to be used in the next layer back weight modification process, FIG. 42. Since the command path was not changed, i.e. top ADD tree command to bottom command register (CR2) and bottom ADD tree command to top command register (CR2), the error signals are residing in R3 the temporary register address relative to the received commands.

$$ER_j^p = \sum_{c=m+1}^{N} \delta_c^p W_{ci} \quad (25)$$

Where $m = M_1 + M_2 + \ldots M_L$

Figure 41B:
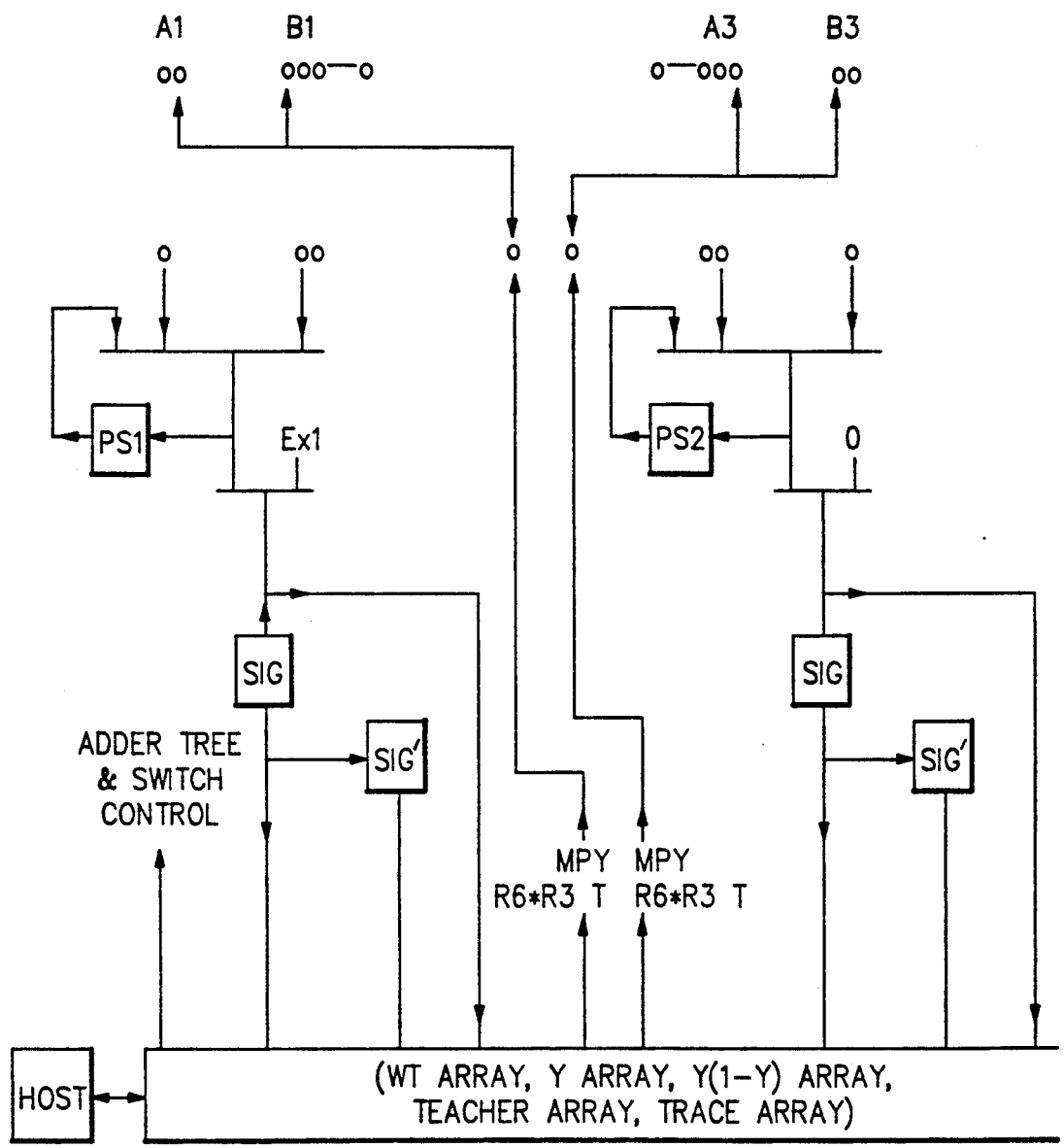
Figure 41D:
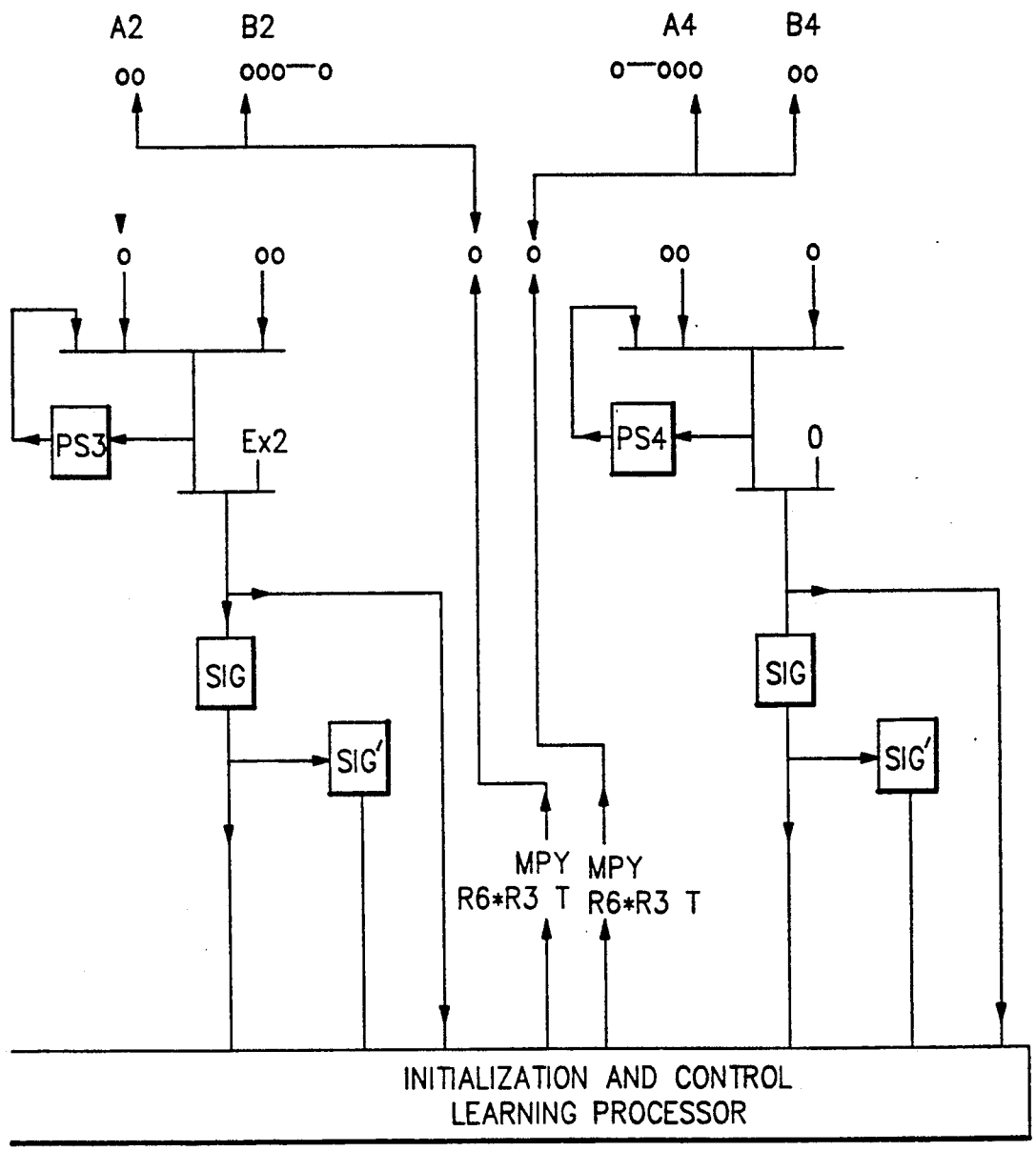
Figure 42B:
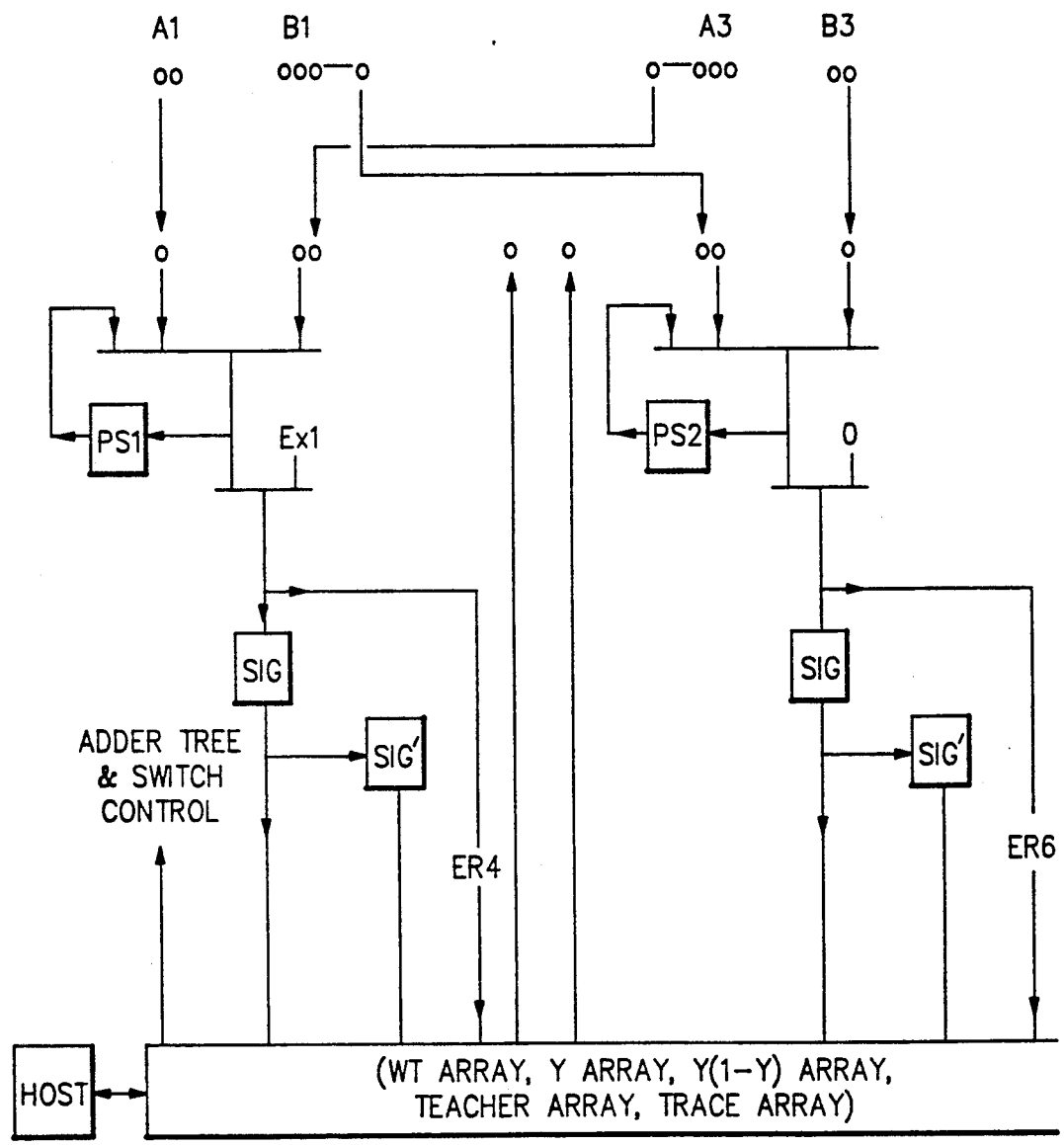
Figure 42D:
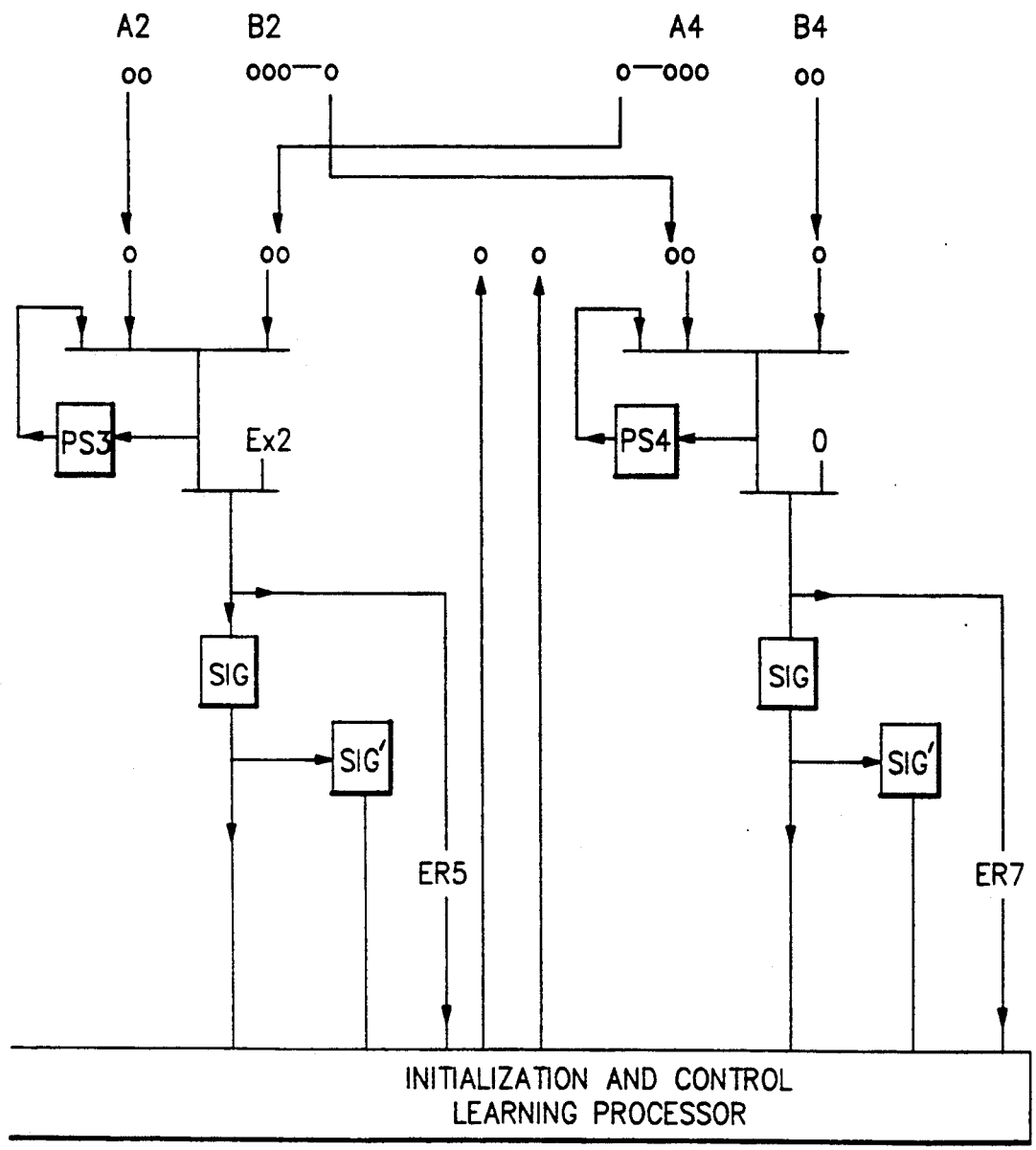

Neurons 8, 9, 10, and 11 issue MPY R6*R3→ADD TREE (T), FIG. 41.

Create weighted error summations: $ER_4$, $ER_5$, $ER_6$, $ER_7$, FIG. 42.

$$-ER_4 = W_{8,4}E_8 + W_{9,4} + E_9 + W_{10,4}E_{10} + W_{11,4}E_{11}$$

$$-ER_5 = W_{8,5}E_8 + W_{9,5}E_9 + W_{10,5}W_{10} + W_{11,5}W_{11}$$

$$-ER_6 = W_{8,6}E_8 + W_{9,6}E_9 + W_{10,6}E_{10} + W_{11,6}E_{11}$$

$$-ER_7 = W_{8,7}E_8 + W_{9,7}E_9 + W_{10,7}E_{10} + W_{11,7}E_{11}$$

Figure 43B:
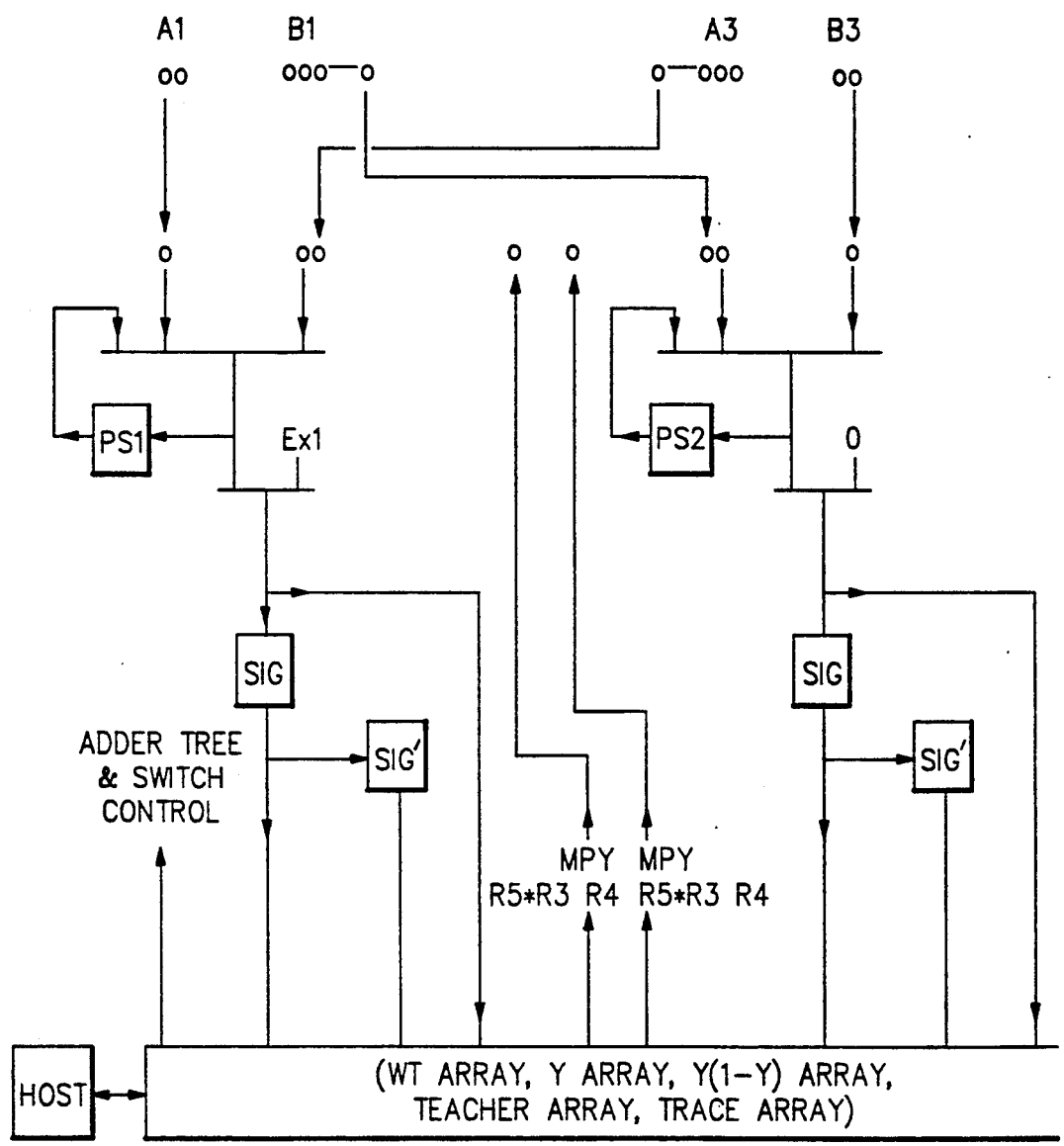
Figure 43D:
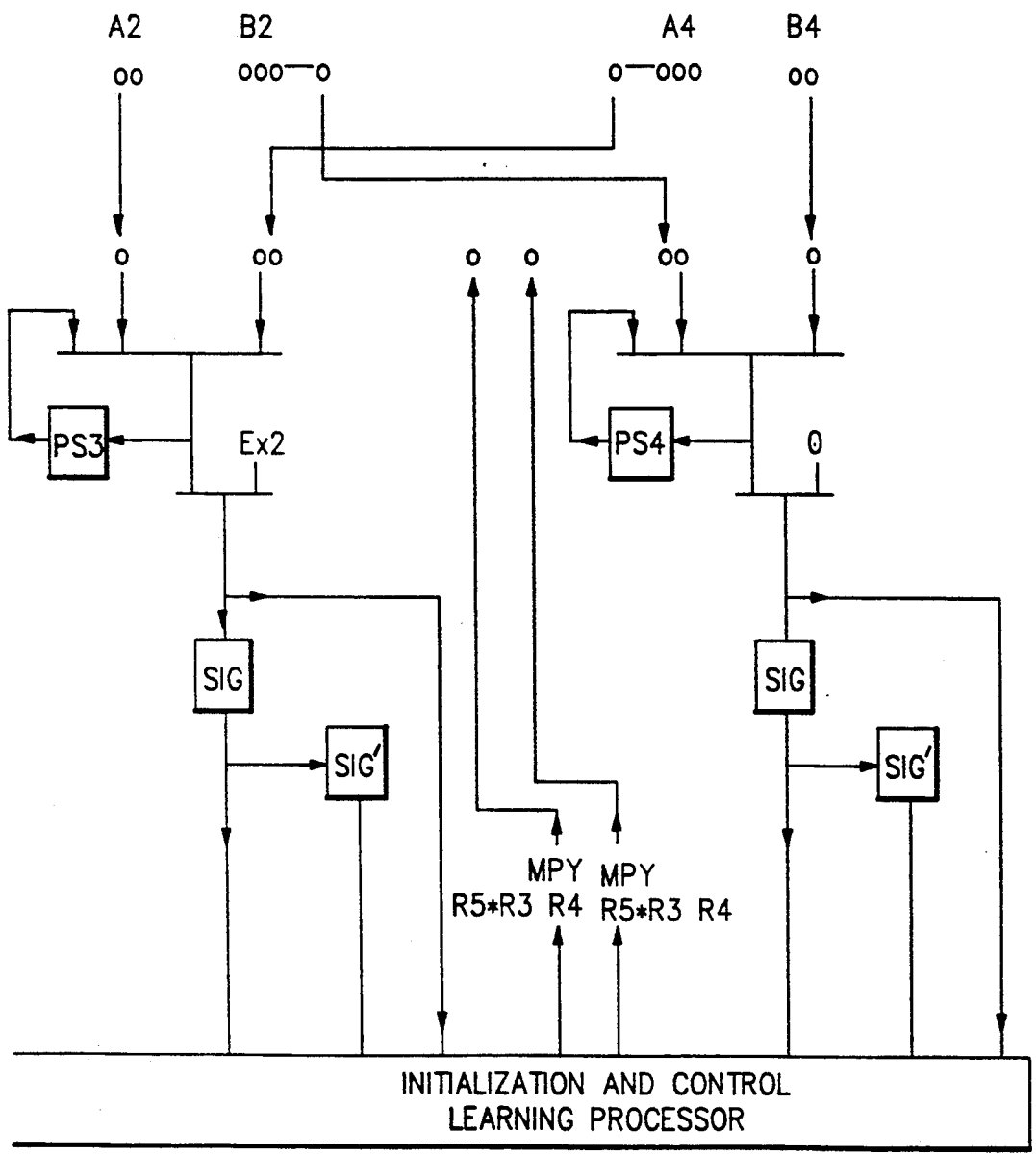
Figure 44B:
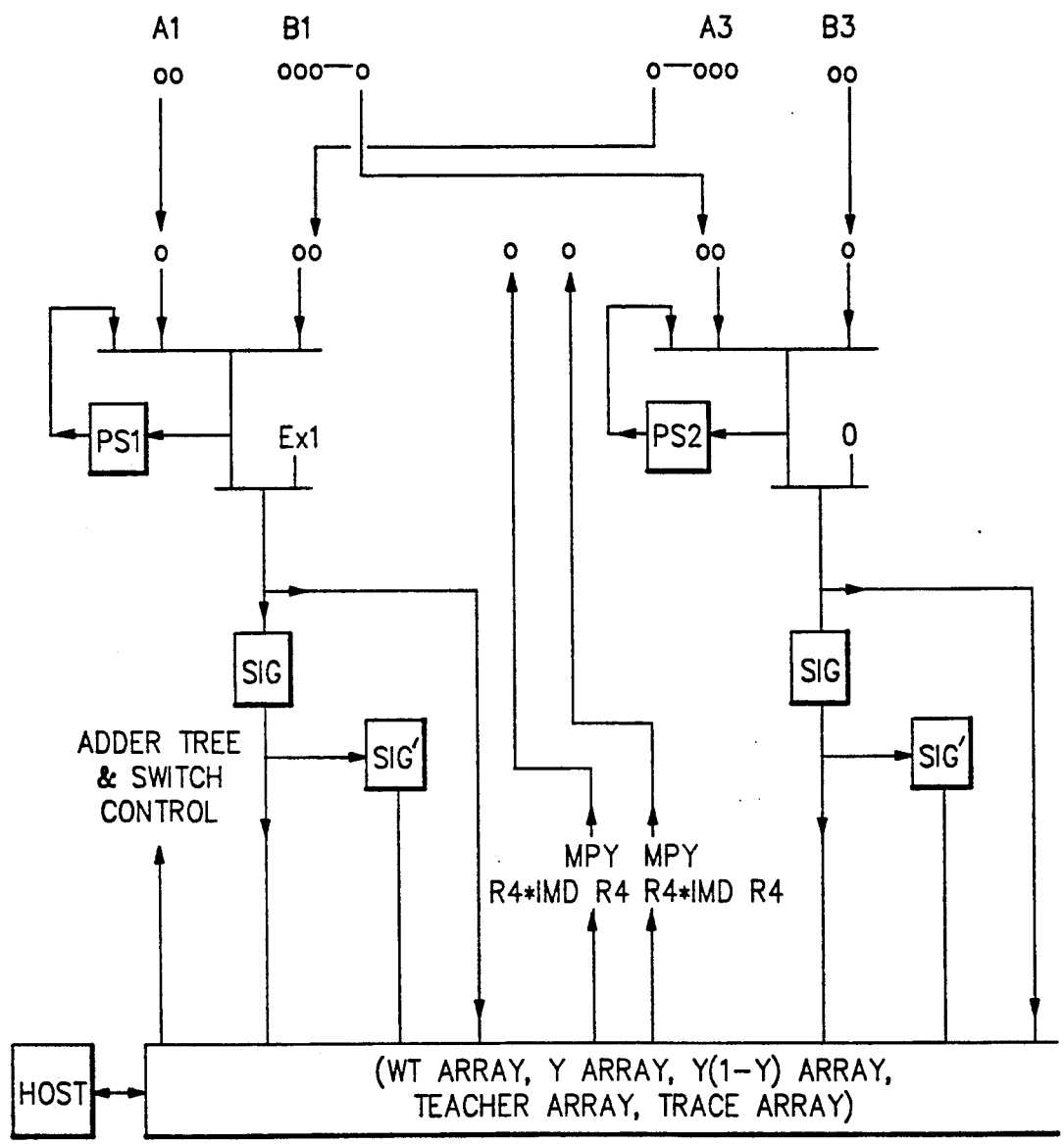
Figures 44, 44D:
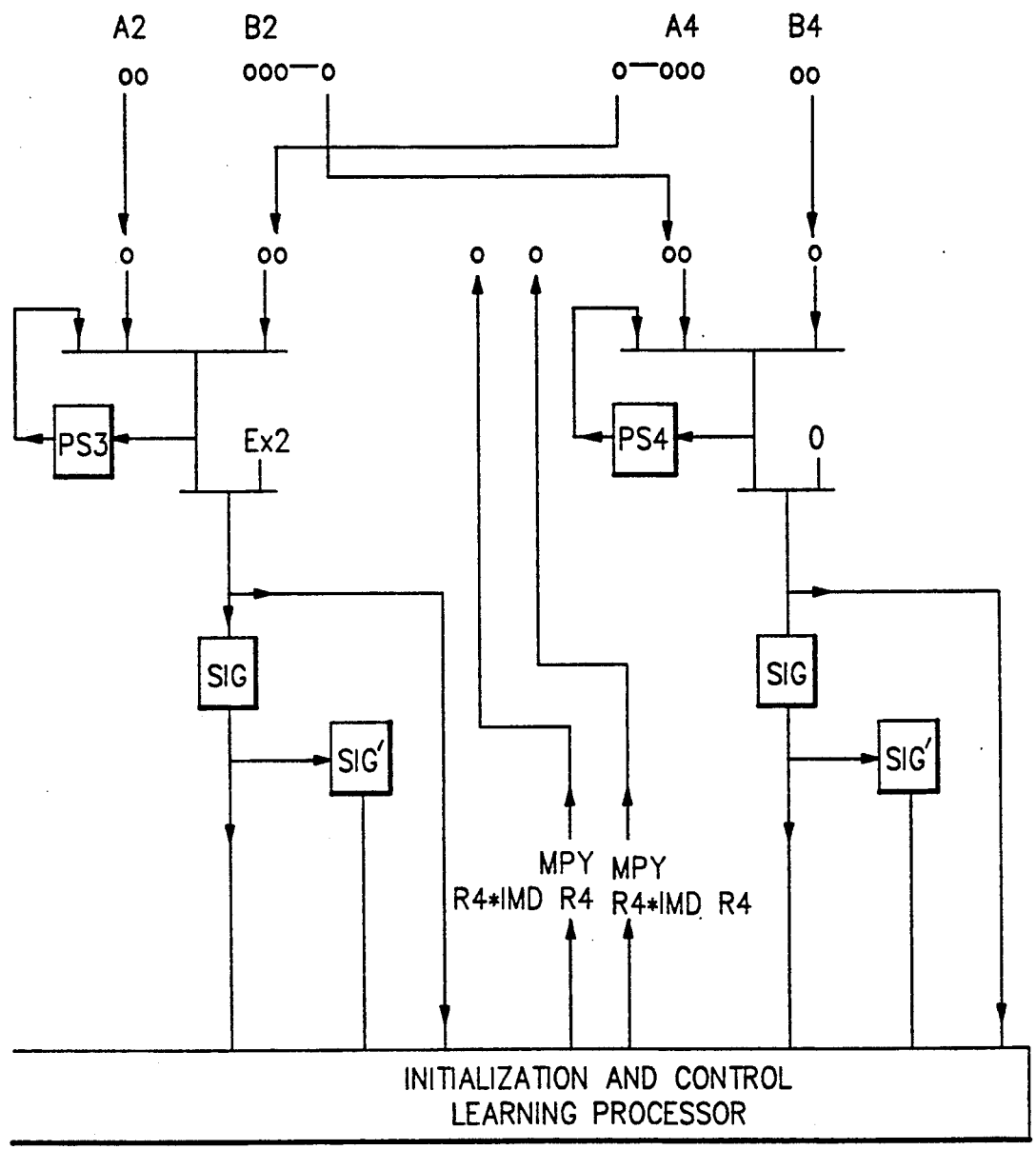
Figure 45B:
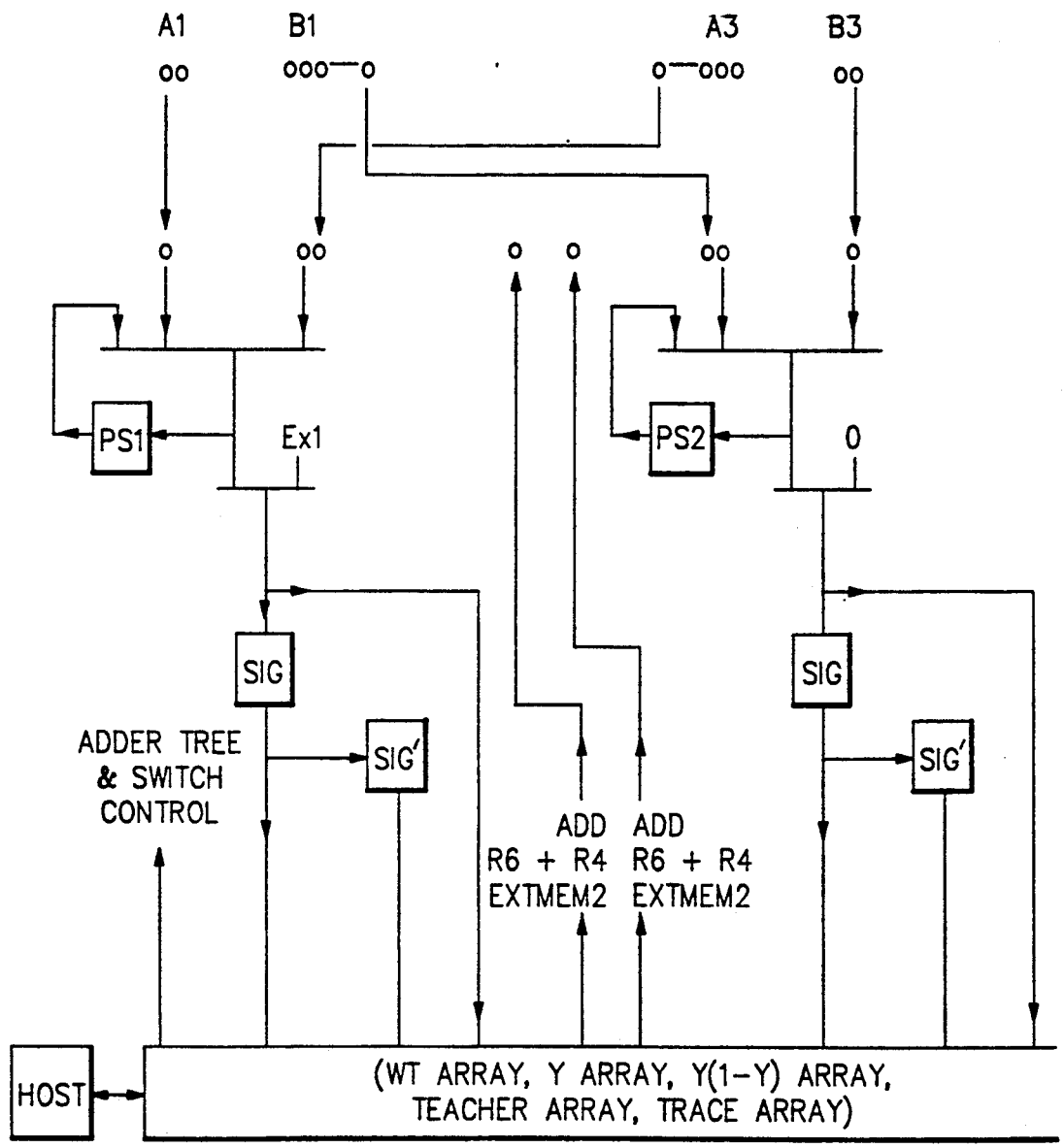
Figures 45, 45D:
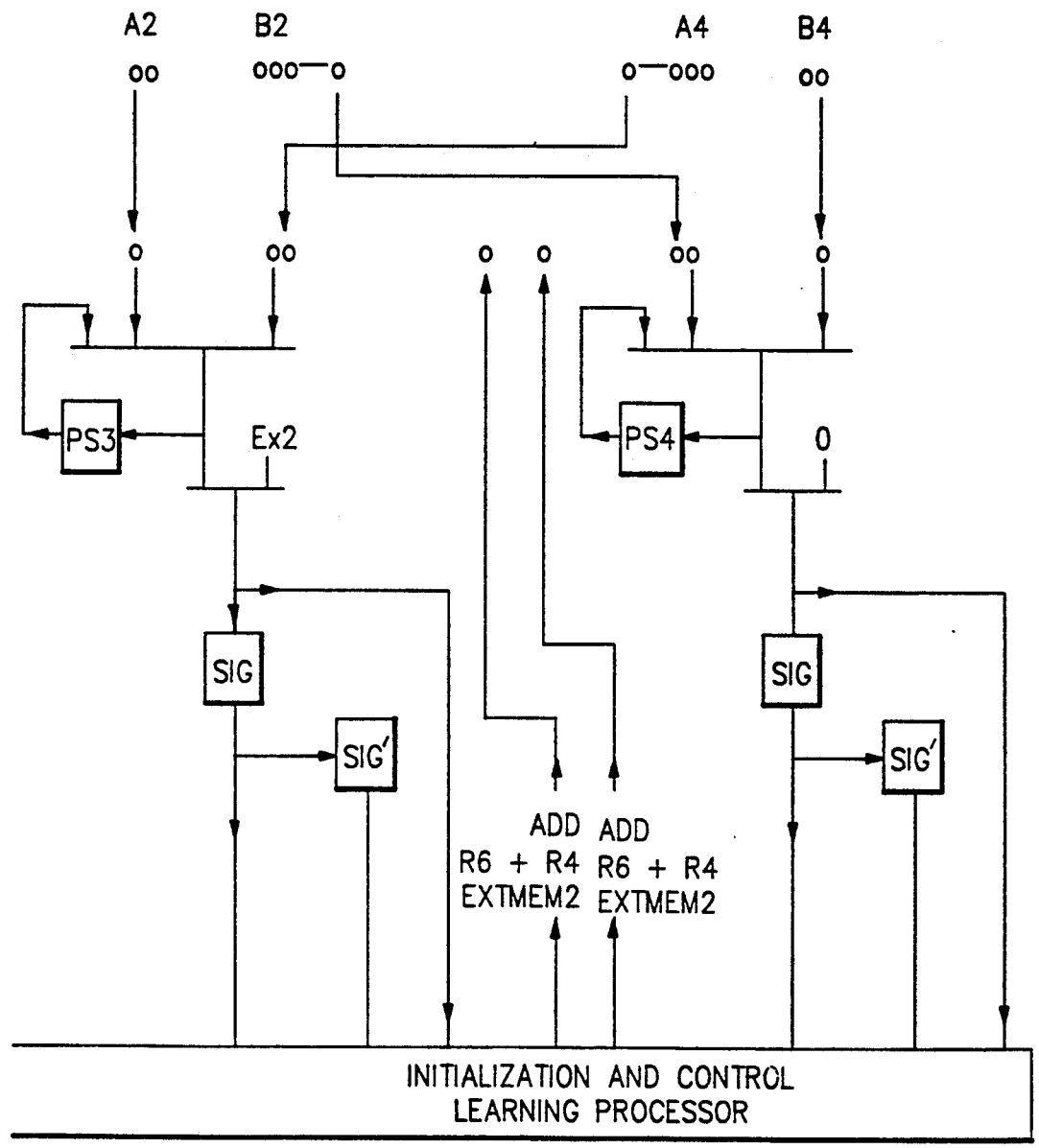

12. The weights between layers 3 and 4 are now modified by the learning rule. $\Delta W_{ij}$ is created by $\rho Y_j Ei$ in two instruction steps.

a. STEP 1 - MPY R5*R3→R4, FIG. 43
TEMPREG$_{8,4}$ = $Y_4 E_8$
TEMPREG$_{8,5}$ = $Y_5 E_8$
TEMPREG$_{8,6}$ = $Y_6 E_8$
TEMPREG$_{8,7}$ = $Y_7 E_8$
TEMPREG$_{9,4}$ = $Y_4 E_9$
Continuing until:
TEMPREG$_{11,7}$ = $Y_7 E_{11}$ b. STEP 2 - MPY R4*IMD→R4, FIG. 44.
$\Delta W_{8,4} = \rho$TEMPREG$_{8,4}$
$\Delta W_{8,5} = \rho$TEMPREG$_{8,5}$
$\Delta W_{8,6} = \rho$TEMPREG$_{8,6}$
$\Delta W_{8,7} = \rho$TEMPREG$_{8,7}$
$\Delta W_{9,4} = \rho$TEMPREG$_{9,4}$
Continuing until:
$\Delta W_{11,7} = \rho$TEMPREG$_{11,7}$ 13. One more step creates the new weights values between layers 3 and 4. New $W_{ij} = W'_{ij} =$ Old $W_{ij} + \Delta W_{ij}$. The new weights are stored in external memory. ADD R6+R4→EXT.MEM.2 use the present SO and IA counts as the address to external memory, FIG. 45.

$$W'_{8,4} = W_{8,4} + \Delta W_{8,4}$$

$$W'_{8,5} = W_{8,5} + \Delta W_{8,5}$$

$$W'_{8,6} = W_{8,6} + \Delta W_{8,6}$$

$$W'_{8,7} = W_{8,7} + \Delta W_{8,7}$$

$$W'_{9,4} = W_{9,4} + \Delta W_{9,4}$$

Continuing until:
$W_{11,7} = W_{11,7} + \Delta W_{11,7}$

14. By following this procedure, the weights can be updated for the other layers in the network. For layer 3, SO=2 and IA=1, error signals E4, E5, E6, and E7 can be created from the general equation $E_j = Dr_j ER_j$ in the learning processor and then the error signals can be reverse communicated in the structure. The error signal $ER_3$ can then be created followed by the weight updating sequence for weights $W_{4,3}$, $W_{5,3}$, $W_{6,3}$, $W_{7,3}$. This continues until all weights are updated.

15. A new path command is sent in preparation for the next learning cycle, PATH R2 so that the new Y values are sent to the proper registers.

16. SVLM is placed in execution mode and the existing pattern p is applied again until the adjusted weights allow the output pattern to match the teaching pattern with a minimum specified error. Until the minimum specified error is reached SVLM will alternate between execution mode and learning mode. After convergence to the minimum specific error is reached, a new pattern can be applied and the process repeated until all teaching patterns have been applied.

SUMMARY

A group partitioning algorithm has been presented which creates a common building block of synapse processors containing their own external memory. The processor groups are used to create a general purpose virtual learning machine which maintains complete connectivity with high performance. The synapse processor group allows a system to be scalable in virtual size and have direct execution capabilities. Internal to the processor group, the synapse processors are designed as a hybrid control flow/data flow architecture with external memory access and reduced synchronization problems.

While we have described our preferred embodiments of our inventions it will be understood that those skilled in the art, both now and in the future, upon the understanding of these discussions will make various improvements and enhancements thereto which fall within the scope of the claims which follow. These claims should be construed to maintain the proper protection for the inventions first disclosed.

What is claimed is:

1. A computer system comprising a virtual neural synapse processor apparatus including:

an N physical neuron structure, wherein N is an integer greater than or equal to one, partitioned into groups including means for synapse processing including means for storing instructions and data, means for receiving instructions and data, means for executing instructions, and means for interfacing with external data storage for weights and neuron output values for V neurons, where V is greater than N and V is a number of neurons to be emulated (virtual neurons) on the N neuron structure, means for executing group instructions, and communicating adder trees, said N neuron structure further including neuron activation means for controlling a start of a neuron activation function, means for interconnecting said groups into the N neuron structure, and means for communicating instructions, data, and outputs of the neuron activation means back to input means for synapse processing through the communicating adder trees.

2. The system according to claim 1 wherein the apparatus includes $N^2$ means for synapse processing, each associated with a connection weight in a N neuron network which is placed in the form of a N by N connection weight matrix folded along a diagonal and which includes diagonal cells and general cells.

3. The system according to claim 2 wherein the diagonal cells each include a single means for synapse processing and are associated with diagonal connection weights of the folded N by N connection weight matrix, and wherein the general cells each include a top means for synapse processing and a bottom means for synapse processing, said general cells associated with symmetric connection weights of the folded N by N connection weight matrix.

4. The system according to claim 3 wherein the diagonal cells' means for synapse processing include means for supplying results to and receiving instructions and data from an attached communicating adder tree of the N neuron structure.

5. The system according to claim 3 wherein the top and bottom means for synapse processing each include means for supplying a result to and receiving instructions and data from an attached communicating adder tree of the N neuron structure.

6. The system according to claim 2 wherein the N neuron structure is partitioned into G groups, where G is an integer greater than one, and wherein each said group includes diagonal cells and general cells and each said diagonal cell is attached to a communicating adder tree and each said general cell is attached to a top communicating adder tree and a bottom communicating adder tree.

7. The system according to claim 6 wherein each said group further includes means for interfacing with means for external storage, said means for interfacing including H read and write weight value data paths, with H an even power of two, H read only neuron output value data paths, H write only neuron output value data paths, means for addressing group weight values, and means for separate addressing of the write only neuron output value data paths and the read only neuron output value data paths.

8. The system according to claim 7 further including a common weight value reading and writing means for simultaneously reading H weight values from the means for external storage and for simultaneously writing H weight values to the means for external storage.

9. The system according to claim 7 wherein the apparatus further includes a programmable group execution means responsive to group commands, received from a selected communicating adder tree, for controlling the means for interfacing with means for external storage.

10. The system according to claim 1 wherein the means for storing instructions and data includes one bit which controls whether the data may be overwritten.

11. The system according to claim 1 wherein the means for neuron activation includes a non-linear sigmoid generator for providing a neuron value ("Y") output and a sigmoid derivative generator for providing a Y (1−Y) value output.

12. The system according to claim 1 wherein the communicating adder trees contain $Log_2 N$ 2 to 1 communicating adder stages.

13. The system according to claim 12 wherein each stage in the communicating adder trees contain 2 to 1 communicating adders comprised of a 2 to 1 adder, an adder bypass path for communicating values in a reverse direction than that used for an addition, and means for switching between the addition and a reverse communication path.

14. A neural synapse processor apparatus comprising a neural network emulation structure including:

partitioned groups comprised of at least one synapse processing unit including means for storing instructions and data, means for receiving instructions and data, means for executing instructions, means for interfacing with external storage units to communicate weights and neuron output values, means for executing group instructions, and communicating adder trees;

neuron activation units;

means for interconnecting the groups into a N physical neuron structure supporting the emulation of V neurons (virtual neurons), where N and V are positive integers and V is greater than or equal to N; and means for communicating instructions, data, and outputs of the neuron activation units back to the synapse processing units through the communicating adder trees;

the synapse processing units each associated with a connection weight in a neutral network, the neural network in the form of a N by N matrix folded along a diagonal, including diagonal cells and general cells, each of the diagonal cells including one of the synapse processing units and each of the general cells including two of the synapse processing units.

15. The apparatus according to claim 14 wherein the neural network is separated into one or more square matrices each including 2H of said synapse processing units made up of general cells and multiple triangular matrices each including H of said synapse processing units comprising said diagonal and general cells, where H is a positive integer.

16. The apparatus according to claim 15 wherein each of the square matrices is folded along its diagonal by folding communicating adder trees communicating with said synapse processing units.

17. The apparatus according to claim 16 wherein the folded square matrices become two separate triangular arrays by rearranging the weights and neuron output values in each synapse processing unit, and wherein each of the triangular arrays includes H synapse processing units and wherein each of the triangular arrays represents a processor group.

18. The apparatus according to claim 14 wherein the partitioned groups are attached to external summation and switching mechanisms, said summation and switching mechanisms including:
means for external summation of N partial neuron input summations generated from the groups' communicating adder trees;
means for reverse communication of neuron activation unit output values to the corresponding synapse processing unit's storage, said synapse processing units including corresponding connection weight storage;
means for reverse communication of neuron error signal values, wherein each of the error signal values is communicated to one of the corresponding synapse processing unit's storage;
means for external summation of partial weighted error summations of products generated from the groups' communicating adder trees.

19. The apparatus according to claim 18 wherein the external summation and switching mechanisms are attached to iterative adders each including an accumulating storage unit.

20. The apparatus according to claim 19 wherein the iterative adders are incorporated into a final summation stage of an external summation tree.

21. The apparatus according to claim 19 wherein the iterative adders each connect to an additional summation stage wherein an external input value is summed with an output of one of the iterative adders and said additional summation stage provides results to the neuron activation units.

22. The apparatus according to claim 19, wherein the apparatus further comprises a programmable processor controller which interfaces to a host computer system and to external summation and switching mechanisms, the processor controller including:
means for controlling the external summation and switching mechanisms, the communicating adder trees, and the iterative adders;
means for initializing the synapse processing units;
means for issuing synapse processing unit instructions and data;
means for calculating algorithmic data;
means for starting and for stopping a neural network emulation; and
means for sequence control of multi-layer networks,
the means for stopping a neural network emulation including means for stopping by convergence testing to a desired result or by completing a host computer system specified number of emulation cycles.

23. The apparatus according to claim 14, wherein the external storage units include one weight array, a present neuron output value array, and a new neuron output value array.

24. The apparatus according to claim 23, further comprising means for storing newly created neuron output values into the new neuron output value array while using neuron output values read from the present neuron output value array in neural calculations, and means for writing the newly created neuron output values in the present neuron output value array from which neuron output values are read.

25. The apparatus according to claim 14, wherein the N neuron structure is scaled to a larger V by adding more external storage locations in each external storage unit that interfaces with the synapse processing units.

26. The apparatus according to claim 14 wherein the weights and neuron output values are stored in a bit-serial format in the external storage units.

27. The apparatus according to claim 14, wherein the two synapse processing units in each of the general cells comprise a top synapse processing unit and a bottom synapse processing unit, the apparatus further comprising:
data path storage units; and
means for directing instructions;
wherein during one mode of operation the means for directing instructions passes instructions received from a top communicating adder tree to a top synapse processing unit's instruction storage unit and instructions received from a bottom communicating adder tree to a bottom synapse processing unit's instruction storage unit and data received from the top communicating adder tree to a top synapse processing unit's specified data storage unit and data received from the bottom communicating adder tree to a bottom synapse processing unit's specified data storage unit.

28. The apparatus according to claim 27, wherein, during a second mode of operation, the means for directing instructions passes instructions received from the top communicating adder tree to the bottom synapse processing unit's instruction storage unit and instructions received from the bottom communicating adder tree to the top synapse processing unit's instruction storage unit and data received from the top communicating adder tree to the bottom synapse processing unit's specified data storage unit and data received from the bottom communicating adder tree to the top synapse processing unit's specified data storage unit.

29. A neural synapse processor apparatus comprising:
$N^2$ synapse processing units;
N communicating adder trees;
a programmable processor controller; and
N neuron activation units for a N physical neuron structure partitioned into G groups of H synapse processing units per group, each said group interfacing with means for external storage for providing storage capabilities for V virtual neurons, where V is greater than N, with N external summation switching mechanisms, where G, H, V, and N are positive integers.

30. The apparatus according to claim 29, wherein each communicating adder tree is attached to N synapse processing units at leaf nodes of the tree and to one neuron activation unit, and wherein the apparatus further comprises:
means for communicating data between the means for external storage and the synapse processing units;
means for controlling a destination of data received from the means for external storage in each synapse processing unit; and
means for controlling the external summation and switching mechanisms.

31. The apparatus according to claim 30 further comprising means for inputting weights and data values to each of the synapse processing units, the means for inputting weights and data values including the processor controller which has access to a weight and data value storage unit in each synapse processing unit and in external storage.

32. The apparatus according to claim 30 further comprising means for communicating tagged instructions, data, and neuron output values back to the synapse processing units through tag matching units and the communicating adder trees.

33. The apparatus according to claim 30, further comprising an instruction decoding mechanism, for controlling a destination of instructions, data, and neuron output values received from the attached communicating adder trees, in each of the synapse processing units.

34. The apparatus according to claim 30, further comprising means for executing received synapse processor instructions in each synapse processing unit responsive to a synapse processor instruction set.

35. The apparatus according to claim 30, further comprising means for executing received group instructions in each of the G groups by separate group logic controlling external storage address formation and responsive to a synapse processor instruction set.

36. The apparatus according to claim 30, further comprising instruction decoding means for operand selection and destination path control, thereby allowing results to stay locally in each synapse processing unit, to be sent to external storage, or to be sent to the attached communicating adder tree.

37. The apparatus according to claim 30, further comprising:
means for signalling completion of operations whose results remain in each synapse processing unit to the programmable processor controller; and
means for signalling an unsuccessful synapse processor operation.

38. The apparatus according to claim 30, further comprising means for summing values received from the synapse processing units via the attached communicating adder trees acting in a function execution mode and via the external summation and switching mechanisms acting in a summation mode.

39. The apparatus according to claim 30, further comprising means for inputting external input values to each neuron activation unit, the external input value provided by the programmable processor controller and applied to a final summation stage located at an output of an iterative adder.

40. The apparatus according to claim 30, further comprising means for generating new instructions, data, and neuron output values via the neuron activation units and the programmable processor controller which interfaces to an attached host computer and to the N external summation and switching mechanisms.

* * * * *